(12) United States Patent
Morshed et al.

(10) Patent No.: US 6,760,903 B1
(45) Date of Patent: Jul. 6, 2004

(54) COORDINATED APPLICATION MONITORING IN A DISTRIBUTED COMPUTING ENVIRONMENT

(75) Inventors: Farokh Morshed, Amherst, NH (US); Robert Meagher, Milford, NM (US)

(73) Assignee: Compuware Corporation, Detroit, MI (US)

( * ) Notice: Subject to any disclaimer, the term of this patent is extended or adjusted under 35 U.S.C. 154(b) by 688 days.

(21) Appl. No.: 09/643,501

(22) Filed: Aug. 22, 2000

Related U.S. Application Data

(63) Continuation-in-part of application No. 09/548,127, filed on Apr. 12, 2000, and a continuation-in-part of application No. 09/250,626, filed on Feb. 16, 1999, now Pat. No. 6,314,558, which is a continuation-in-part of application No. 09/066,988, filed on Apr. 23, 1998, now Pat. No. 6,186,679, which is a continuation-in-part of application No. 08/916,125, filed on Aug. 21, 1997, now Pat. No. 5,987,249.

(60) Provisional application No. 60/045,018, filed on Apr. 28, 1997, provisional application No. 60/024,624, filed on Aug. 27, 1996, and provisional application No. 60/036,250, filed on Jan. 24, 1997.

(51) Int. Cl.⁷ .................................................. G06F 9/44
(52) U.S. Cl. ...................................................... 717/130
(58) Field of Search ........................................ 717/130

(56) References Cited

U.S. PATENT DOCUMENTS

| | | | | | |
|---|---|---|---|---|---|
| 5,432,795 | A | * | 7/1995 | Robinson | 717/125 |
| 5,528,753 | A | * | 6/1996 | Fortin | 714/35 |
| 5,581,696 | A | * | 12/1996 | Kolawa et al. | 714/38 |
| 5,613,063 | A | * | 3/1997 | Eustace et al. | 714/38 |
| 5,664,191 | A | * | 9/1997 | Davidson et al. | 709/100 |
| 5,732,273 | A | * | 3/1998 | Srivastava et al. | 717/128 |
| 5,734,908 | A | * | 3/1998 | Chan et al. | 717/154 |
| 5,758,154 | A | * | 5/1998 | Qureshi | 713/1 |
| 5,790,858 | A | * | 8/1998 | Vogel | 717/130 |
| 5,958,010 | A | * | 9/1999 | Agarwal et al. | 709/224 |
| 5,987,249 | A | * | 11/1999 | Grossman et al. | 717/130 |
| 6,186,677 | B1 | * | 2/2001 | Angel et al. | 717/118 |
| 6,314,558 | B1 | * | 11/2001 | Angel et al. | 717/118 |

OTHER PUBLICATIONS

Compuware NuMega Product Description; TrueTime; Automatic Performance Analysis and Optimization, May 27, 1998, 2 pages.

* cited by examiner

*Primary Examiner*—Todd Ingberg
(74) *Attorney, Agent, or Firm*—Choate, Hall & Stewart

(57) ABSTRACT

Techniques for gathering execution information about an application, such as a distributed application, are described. Key communication points in cross execution context calls, such as remote procedure calls, are determined and control is transferred to interception routines to insert and extract execution information. Outgoing remote procedure calls are intercepted on a client that inserts call origin information into the request sent to a server system. The server system intercepts and extracts the call origin information and additionally inserts other information in a response sent to the client system upon completion of a remote procedure call. In turn, the client system intercepts the response and extracts other performance information. On each client and server system, information is gathered by a reader and forwarded to a local collector. Program execution data may be collected and correlated for coordinated application monitoring.

50 Claims, 77 Drawing Sheets

| | | |
|---|---|---|
| CNMFilePair | Encapsulates pairs of files | 1372 |
| CNM FileCollection | Encapsulates a list of file pairs | 1374 |
| CNMSessionData | Encapsulates session and script source file content and session summary information for a session between a collector and a monitor process. | 1376 |
| CNMProcessGroup | Implements context for a local client session. | 1378 |
| CNMSnapshotGroup | Implements context for a single snapshot of a local client session. | 1380 |
| CNMQueueEntry | Encapsulates information used by a processing routine when session data is queued as may be received from local and remote sessions asynchronously. | 1382 |

COORDINATED APPLICATION MONITORING IN A DISTRIBUTED COMPUTING ENVIRONMENT

CROSS-REFERENCE TO RELATED APPLICATIONS

This application is a continuation-in-part of pending U.S. patent application Ser. No. 09/548,127, filed on Apr. 12, 2000, and is a continuation-in-part of U.S. patent application Ser. No. 09/250,626 filed on Feb. 16, 1999, now U.S. Pat. No. 6,314,558, which is a continuation-in-part of U.S. patent application Ser. No. 09/066,988 filed on Apr. 23, 1998 now U.S. Pat No. 6,186,677, which is based on U.S. Provisional Patent Application No. 60/045,018 filed on Apr. 28, 1997 and which is also a continuation-in-part of issued U.S. patent application Ser. No. 08/916,125, filed on Aug. 21, 1997 (now issued U.S. Pat. No. 5,987,249 on Nov. 16, 1999), which is based on U.S. Provisional Patent Applications Nos. 60/024,624 and 60/036,250 filed on Aug. 27, 1996 and Jan. 24, 1997, respectively.

BACKGROUND

This application generally relates to computer systems, and more particularly to monitoring a computer program executing in a computer system.

As part of software development, it may be useful to obtain execution information about a software application. This may be performed by monitoring the software application as it executes in a computer system. In particular, there exists automated techniques for gathering execution information about a software application. This information may include execution information, such as profiling and coverage data, to enable a software developer, for example, to identify performance bottlenecks, testing coverage performed for a particular application, and the like.

Generally, software application monitoring tools for gathering test coverage and execution information exist for monitoring a single process. Problems may exist in using existing monitoring tools to gather information in connection with a software application executing in a distributed computing environment. In particular, if the software application includes more than one process in which each process executes on more than one processor, existing software tools do not automatically provide for collectively gathering execution information about the multiple processes of the software application. In other words, existing monitoring tools may not provide for correlating and collectively gathering execution information, such as related to profiling and testing coverage, about multiple processes of an N-tier software application.

Additionally, existing software application monitoring tools may be deficient in support provided for gathering execution information about N-tier applications that execute in a distributed computing environment, such as execution information particularly useful in a client-server application. For example, particularly relevant in a distributed computing environment may be information related to client and server communications, such as measuring latency in communication.

Thus, it may be useful to provide an efficient technique for gathering execution information about an application having more than one process executing concurrently, in particular, in a distributed computing environment.

SUMMARY OF THE INVENTION

In accordance with principles of the invention are a method and computer program product for gathering data about an application. Execution control is intercepted at a first communication point between a calling function and a called function for a cross execution context call. The calling function is associated with a first execution context and the called function is associated with a second execution context. The call origin information is extracted prior to executing the called function at a second communication point. At least one parameter is communicated between a called function and the calling function in which the at least one parameter is associated with information about the cross execution context call.

In accordance with another aspect of the invention are a method and computer program product for gathering data about a distributed application. Execution control is intercepted at a first communication point between a client and a server for a remote procedure call to include call origin information in a request to perform the remote procedure call. The call origin information is extracted prior to servicing the request at a second communication point. At least one parameter is communicated between the client and the server in which the at least one parameter is associated with information about the remote procedure call.

BRIEF DESCRIPTION OF THE DRAWINGS

Features and advantages of the present invention will become more apparent from the following detailed description of exemplary embodiments thereof taken in conjunction with the accompanying drawings in which:

FIG. 44 is an example of an embodiment of classes of methods that may be used by software included in the computer system 1000;

DETAILED DESCRIPTION OF PREFERRED EMBODIMENT(S)

Figure 1:
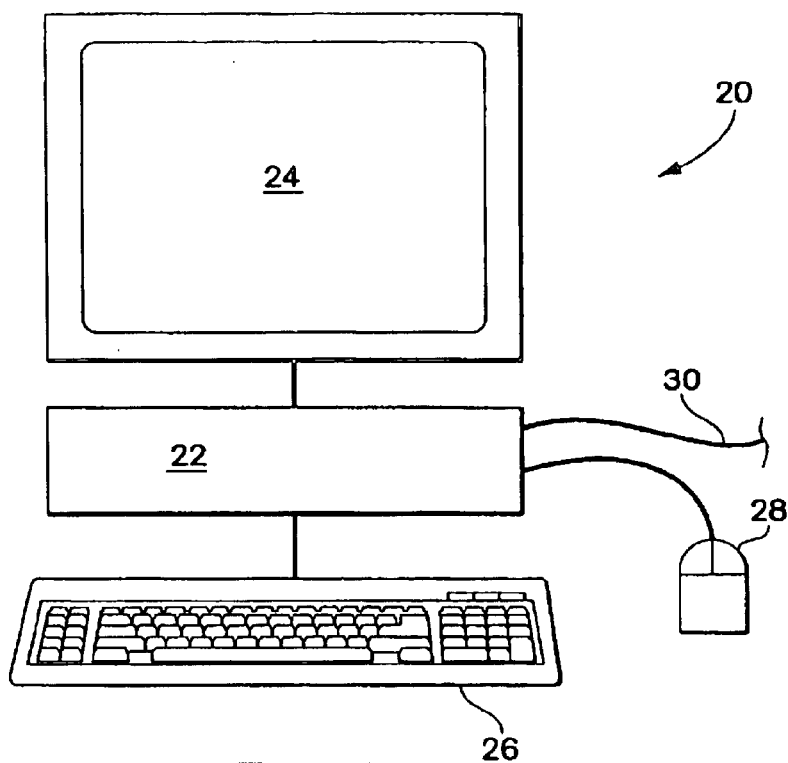
FIG. 1 shows a computer system that may be used to implement IR code instrumentation.

Referring to FIG. 1, a computer system 20 includes a processor 22, a display unit 24, a keyboard 26 and (optionally) a mouse input device 28. The user provides input to the processor 22 via the keyboard 26 and the mouse 28 and views output from the processor 22 via the display unit 24. The computer system may be a model P5-166 manufactured by Gateway Computer of Sioux City, S.Dak.

The computer system 20 may include a connection 30 to a conventional computer network (not shown), such as the Microsoft NT network. The computer system 20 may receive data and/or other network services, in a conventional manner, through the connection 30 to the network. The processor 22 may include conventional local storage or may use conventional storage available on the network wherein the processor 22 sends and receives data to and from the network via the network connection 30. The computer system 20 may use a combination of local storage and network storage in a conventional manner. In the discussion that follows, no specific reference is made to the type of storage device (i.e., local, network, or a combination thereof) since the system described herein does not depend on the type of computer data storage used.

Figure 2:
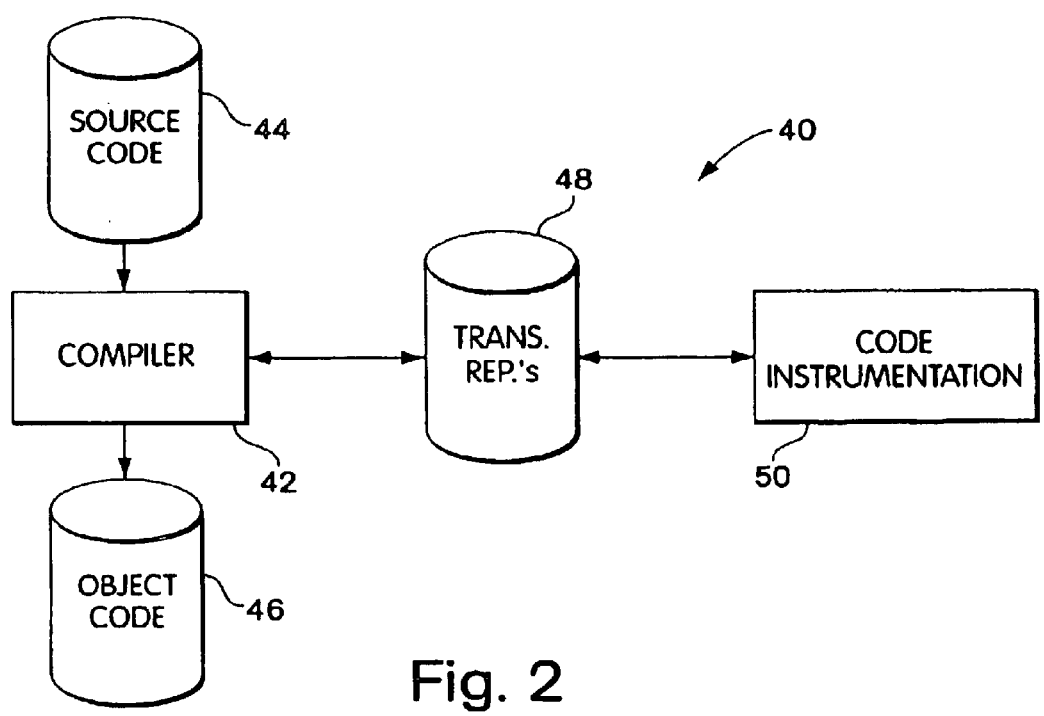
FIG. 2 is a data flow diagram illustrating a compiler operating in conjunction with IR code instrumentation.

Referring to FIG. 2, a data flow diagram 40, illustrates relationships between various executable code and data segments stored using the storage device of the processor 22. A software compiler 42 includes executable code that converts data representing computer source code 44 into data representing computer object code 46. The compiler 42 may be any one of a variety of conventional, commercially available, software compilers, such as the Microsoft C++ compiler manufactured by Microsoft Corporation of Redmond, Wash. If the compiler 42 is a C++ compiler, then the source code 42 represents C++ source code information entered by a user in a conventional manner such as, for example, entering the C++ source code statements into a text file in the computer system 20 using the keyboard 26 and mouse 28. The source code 44 may also be generated by any one of a variety of alternative techniques, such as other conventional, commercially available software that automatically generates the source code 44.

The object code 46 includes low-level code that is executable on a target processor (not shown). Accordingly, the object code 46 is target-specific. Note that the target processor may be the same type of processor as the processor 22 used in the computer system 20 or, alternatively, the target processor may be a different processor. The object code 46 is provided by the compiler 42 in a conventional manner.

In the course of compiling the source code 44 into object code 46, the compiler 42 may generate a plurality of transitional representations 48 that correspond to intermediate stages of the compile process. The transitional representations 48 may include a plurality of (usually temporary) data files that are created and accessed by the compiler 42. Each stage of the compiler 42 may access and/or create a particular one of the transitional representations that is provided by the previous stage of the compiler 42. Features of some of the transitional representations 48 are described in more detail hereinafter.

Code instrumentation software 50, that executes on the processor 22, accesses the transitional representations 48 and adds instrumentation instructions that ultimately provide instrumentation functionality to the object code 46. When the object code 46 is executed, the thus-added instrumentation functionality facilitates debugging in a manner described in more detail hereinafter.

Figure 3:
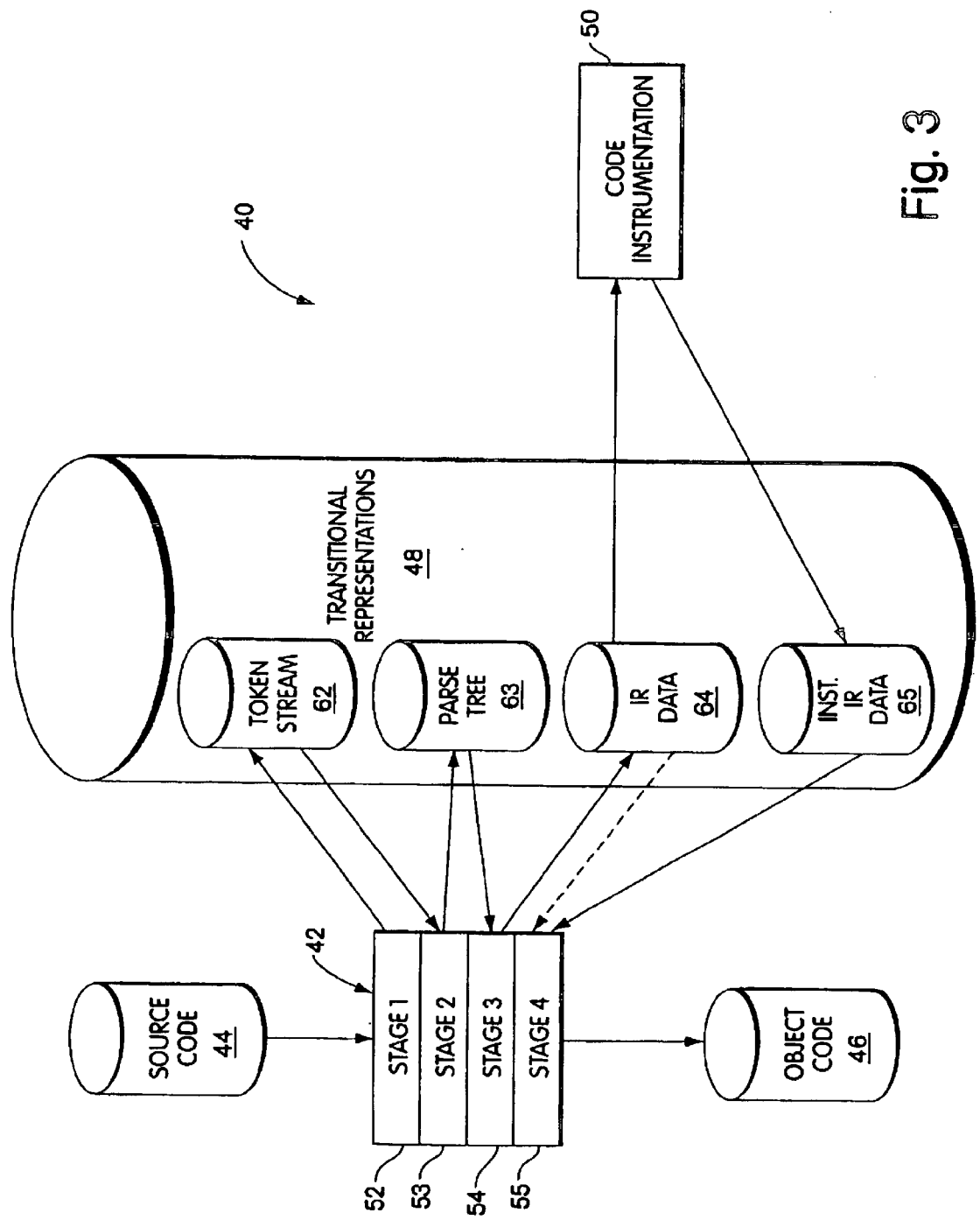
FIG. 3 is a data flow diagram illustrating interaction between various stages of the compiler and the IR code instrumentation according to the present invention.

Referring to FIG. 3, the data flow diagram 40 of FIG. 2 is illustrated with additional details included for the compiler 42 and for the transitional representation 48. The compiler 42 is shown herein as having four stages 52–55 that each perform a different phase in the process of transforming the source code 44 into the object code 46. The transitional representations 48 are shown as including various data elements that are created and/or accessed by the compiler 42. Note that other compilers may have more or less stages and that portions of the transitional representations 48 may be stored in a file, a computer memory, a combination thereof, or a variety of other means for maintaining computer data.

For the embodiment illustrated herein, the first stage 52 of the compiler 42 accesses the source code 44 and, in a conventional manner, converts the source code into tokens stored in a token stream data element 62. The token stream data element 62 contains symbols that represent individual source code statements. The symbols may be ordered according to the order of source code statements in the source code 44. The token stream 62 is provided to the second stage 53 of the compiler 42, which, in a conventional manner, converts the tokens from the token stream data element 62 into data stored in a parse tree data element 63. The parse tree data element 63 is a tree-like data structure that is constructed in a conventional manner using nodes corresponding to tokens from the token stream data element 62 that are interconnected in a directed graph according to entry and exit points of portions of the source code.

The parse tree data element 63 is provided to the third stage 54 of the compiler 42 which uses the data from the parse tree data element 63 to produce Intermediate Representation (IR) data that is stored in an IR data element 64. As described in more detail hereinafter, the IR data element 64 contains an intermediate representation of the program that is independent of the particular language used for the source code 44 and is also independent of the target processor on which the object code 46 will execute.

The fourth stage 55 of the compiler 42 converts IR data from the IR data element 64 into the object code 46. Without the code instrumentation unit 50, the fourth stage 55 of the compiler 42 could access the IR data element 64 (as indicated by the dashed line connecting the IR data element 64 to the fourth stage 55) and convert IR data from the IR data element 64 into the object code 46. However, in the system described herein, the IR data element 64 is provided to the code instrumentation 50 which, in a manner described in more detail below, instruments the IR data element 64 to provide an instrumented IR data element 65. In the system described herein, the fourth stage 55 of the compiler 42 accesses the instrumented IR data element 65 to provide the object code 46. Note that since the IR data element 64 and the instrumented IR data element 65 have the same basic structure, it is virtually transparent to the fourth stage 55 of the compiler 42 that the instrumented IR data element 65, instead of the IR data element 64, is being accessed to create the object code 46.

The IR data element 64 and the instrumented IR data element 65 contain conventional IR data that is both source and destination independent. The IR data represents the logical flow and operation of the program independent of the particular source code that is used in the source program to describe the logical flow and operation. In addition, the IR data is independent of the specific form of the object code (i.e., the specific target processor). Such IR data is well known in the prior art and will not be described in detail herein except as necessary to describe the invention.

Figure 4:
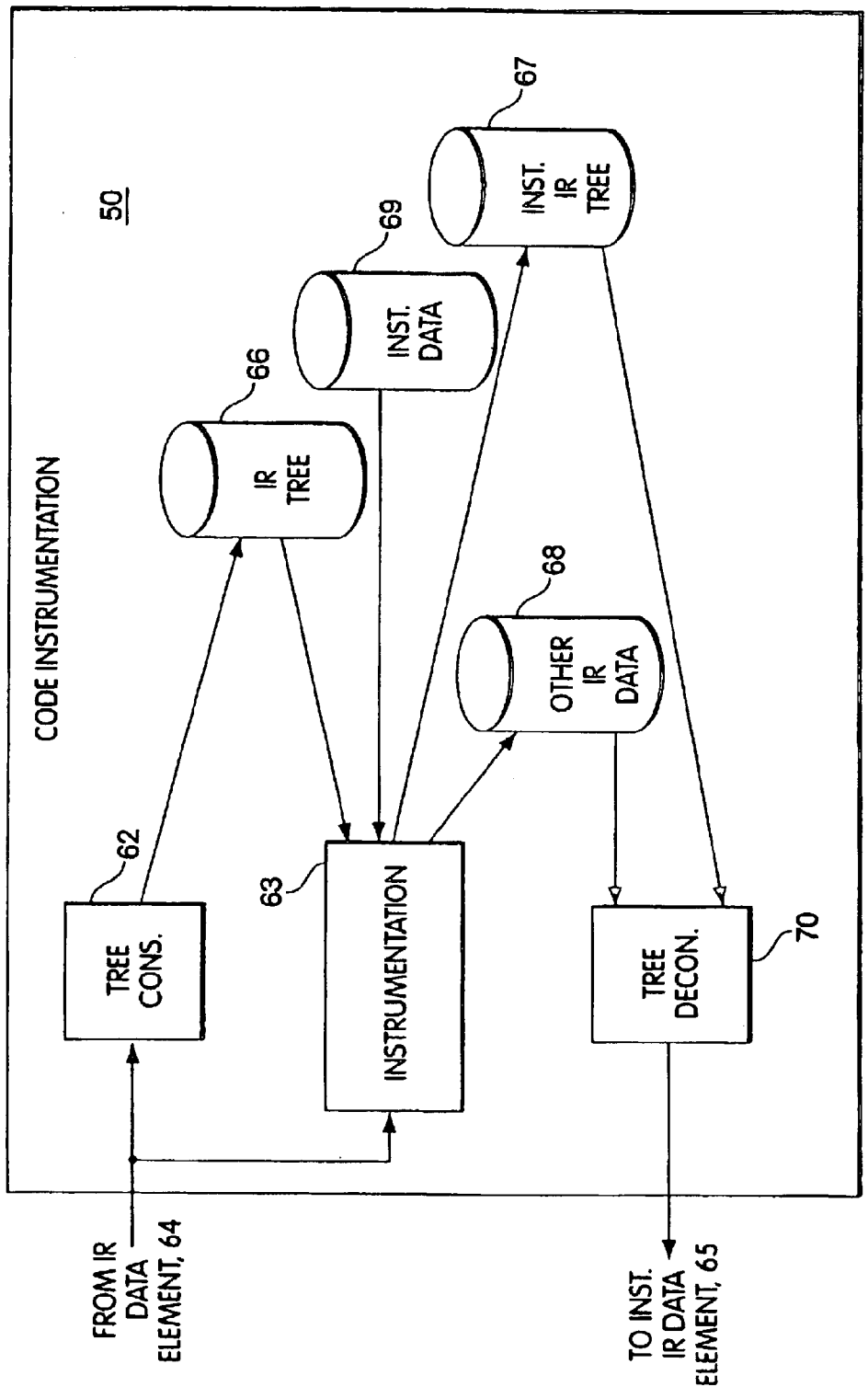
FIG. 4 is a data flow diagram illustrating in detail operation of the software for IR instrumentation.

Referring to FIG. 4, the code instrumentation 50 includes tree construction software 62 for constructing an IR tree, instrumentation software 63 for instrumenting both the IR tree and other IR data, and tree deconstruction software 70 for converting the thus-instrumented IR tree and other IR data into the instrumented IR data element 65. The tree construction software 62 receives input from the IR data element 64 and, in a manner described in more detail below, constructs an IR tree to provide to an IR tree data element 66. The instrumentation software 63 uses the IR tree data element 66 and other IR data from the IR data element 64 to provide an instrumented IR tree 67 and other IR data 68.

The instrumentation software 63 may also be provided with instrumentation data from an instrumentation data element 69. The instrumentation data element 69 may contain run time instrumentation routines and other IR data that is inserted by the instrumentation software 63 into the instrumented IR tree data element 67, the other IR data 68, or a combination thereof. The instrumentation software 63 and the instrumentation data element 69 are described in more detail hereinafter. The tree deconstruction software 70 uses the instrumented IR tree data element 67 and the other IR data 68 to create the instrumented IR data element 65. The tree deconstruction software 70 is described in more detail hereinafter.

The IR data consists of a plurality of operations and operands that correspond to the logic of the underlying source computer program. Note that the terms "operation" and "operand" may be defined broadly in this instance to include any type of statements found within IR data, including program transition statements such as call and goto, and static information such as line numbers. An operand can be a simple operand (e.g., a single variable or constant) or can be a complex operand (e.g., an expression) that corresponds to additional suboperations and operands. For example, IR data may indicate that the left side of an expression is to be set equal to the right side of an expression. The left side of the equation could be a single variable (i.e., a simple operand). The right side of the equation could also be simple operand (e.g., a constant) or could be a complex operand (e.g., an expression) that must be further evaluated in the context of additional operators and operands (e.g., addition of two variables).

Note that the IR data is both source language independent and target machine independent so that, for example, a source code statement written in a first source language could generate IR data that is identical to a programatically equivalent source language statement in a second source language if the underlying operations are identical. Similarly, a particular set of IR data can be converted by a compiler into many different object codes depending on the target machine. Although a specific IR representation may be particular to a specific compiler manufacturer, IR data and IR representations are generally known in the art. See, for example, a section titled "Graphical Representations" at pages 464–465 of Aho, Seth & Ullman, *Compilers, Principles, Techniques, and Tools,*

Figure 5:
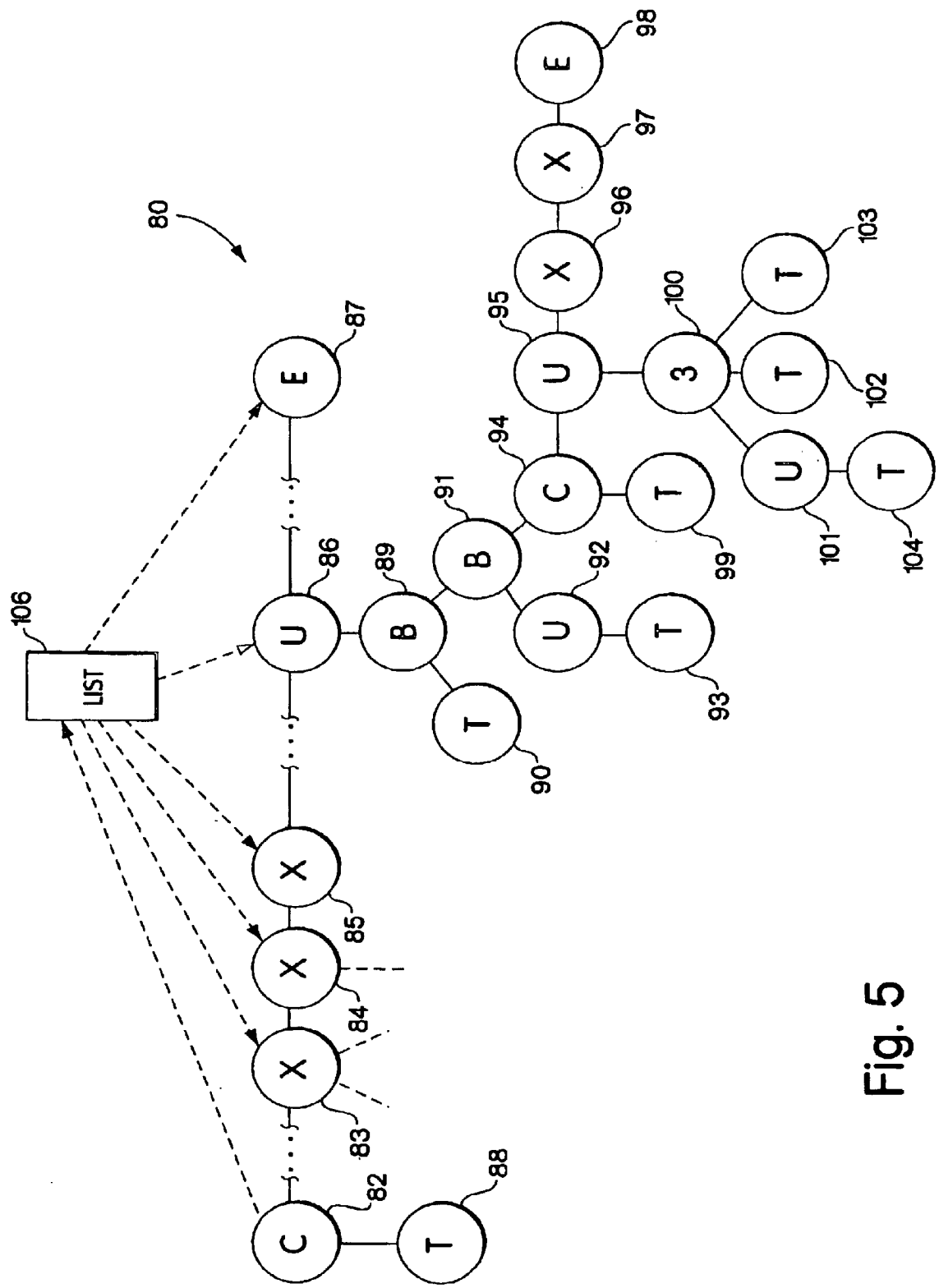
FIG. 5 illustrates a tree data structure corresponding IR code operators and operands.

Referring to FIG. 5, a tree 80 corresponds to the IR tree data element 66 provided by the tree construction software 62 shown in FIG. 4 and discussed above. The tree 80 includes a plurality of nodes 82–104. The nodes 82–104 have different types and are labeled according to type as follows:

T: terminal node
U: unary node
B: binary node
3: ternary node
C: combination node
E: end of list indicator node
X: indeterminate node, one of the above listed types of nodes The terminal nodes 88, 90, 93, 99, 102–104 are nodes of the tree 80 having no children. The unary nodes 86, 92, 95 have only one child. The binary nodes 89, 91 have two children. The ternary node 100 has three children. The combination nodes 82, 94 have two children wherein one of the children is a list terminated by the end of list nodes 87, 98. The indeterminate nodes 83–85, 96, 97 represent nodes that could be any one of the other types of nodes and have been included in the tree 80 to facilitate illustration of the structure of the tree 80.

Each of the nodes 82–104 represents an IR operation and/or an IR operand within the IR data. For any particular one of the nodes 82–104, the children thereof represent the operators and the operands used to evaluate the parent. For example, the binary node 89 could represent an operation having two operands corresponding to the two children of the binary node 89: the terminal node 90 and the binary node 91. The terminal node 90 does not have any children and thus may correspond to a simple operand (e.g., a constant). The binary node 91 is a complex operand having children (the unary node 92 and the combination node 94) which are evaluated in order to evaluate the complex operand represented by the binary node 91.

For the combination nodes 82, 94, the attached list elements are shown as being linked together so that, for example, the node 83 is shown being linked to the node 84 and the node 84 is shown as being linked to the node 85. Another possible way to construct the list is to have the combination node 82 point to a separate list data structure 106 that contains pointers to the remaining nodes 83–87 that represent elements of the list. In that case, there would be no need for the connections between members of the list so that the node 83 would not contain a pointer to the node 84, nor would the node 84 contain pointers to the nodes 83, 85, nor would the node 85 contain a pointer to the node 84. The advantage of such a construction is that none of the nodes 83–87 would use extra storage space for pointers to the peers thereof. Of course, separately constructing the list 106 may add complexity and possibly additional processor time in connection with manipulating the combination node 82. Note that irrespective of whether the list nodes 83–87 are connected peer to peer or are simply pointed to by the separate list 106, the end of list may conveniently be indicated by the end of list node 87.

The tree 80 illustrates that the underlying program corresponding to the IR data can be represented as a list of root nodes of a plurality of subtrees. That is, the program may be represented by a list of nodes 82–87 that correspond to root nodes of a plurality of subtrees. Of course, some of these subtrees may simply have a root node without substructure while other subtrees, such as the subtree emanating from the node 86, may have a more involved structure. Note also that, in some embodiments, the tree 80 may represent a single function among a plurality of functions contained in the IR data element 64.

Figure 6:
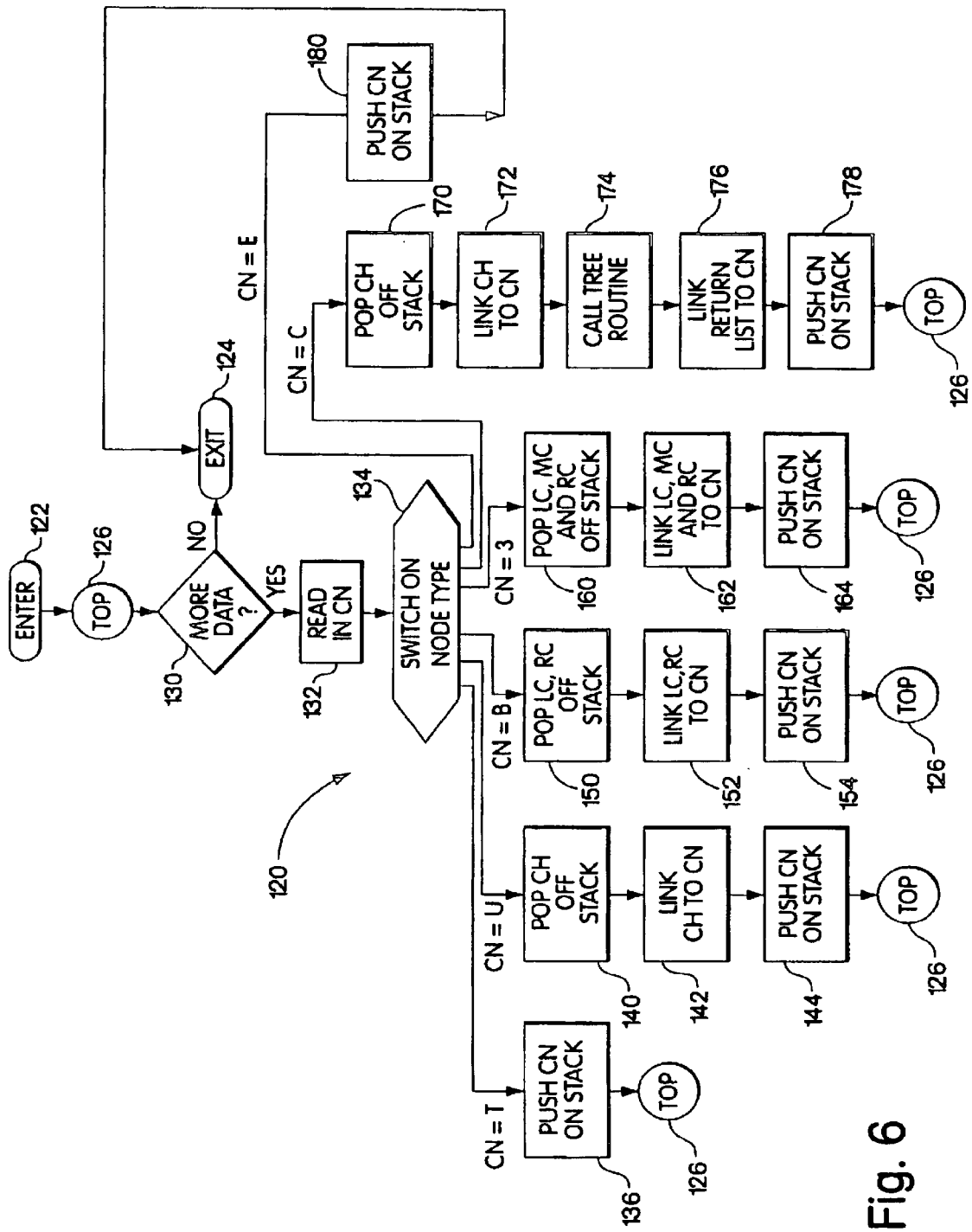
FIG. 6 is a flowchart illustrating steps used to construct the tree data structure of FIG. 5.

Referring to FIG. 6, a flowchart 120 illustrates operation of the tree construction software 62 of FIG. 4 that uses data from the IR data element 64 to provide the IR tree data element 66. The flowchart includes an entry point 122 and an exit point 124. A connector 126 labeled "TOP" is used to simplify the flowchart 120 by decreasing the number of flow lines thereon. All points on the flowchart labeled with the connector 126 represent the same logical point in the flow of the code.

The data that is read from the IR data element 64 and processed by the tree construction software 62 could be stored in a computer file. In other embodiments, data may be stored in computer memory or stored using any one of a variety of means sufficient for providing the IR data element 64. Each node may be represented by a variable length record having conventional type and size indicators. In the embodiment illustrated herein, it is assumed that the data is stored in a conventional computer file with the operands corresponding to a node being at an earlier point in the file than the node itself. For example, if a particular node representing the addition operation has two children representing the first and second operands that are being added, then the three nodes (parent and two children) may be stored in the file with the first and second operands being located sequentially prior to the node indicating the addition operation. Accordingly, for any tree or subtree, the root node may be located in the file following all of the children nodes. In a preferred embodiment, the data from the IR data element 64 is first read into a flat list (such as a linked list or an array). Then the flat list is processed to provide the tree 80. The nodes that are part of the flat list may be the same nodes stored in the tree 80 (i.e., the same data), with the tree 80 being constructed by simply adding links to the nodes in the flat list to form the tree 80. Alternatively, the flat list may be part of the IR data element 64.

Processing for the routine illustrated in FIG. 6 begins at a test step 130 which determines if there is more data to be processed. If not, then processing is complete and control passes to the exit point 124 to exit the tree construction software. Otherwise, control passes to a step 132 where the current node (CN) is read in. The CN represents the node that is processed by the remainder of the software. Note that if a separate flat list of nodes is used, then "reading in" CN may simply refer to examining the next node in the list. Otherwise, the CN may be read directly from the IR data element 64.

Following the step 132 is a step 134 where the node type of the CN is determined. Note that there are many conventional techniques known in the art for associating a type with a portion of data such as, for example, using a unique numeric code to differentiate between types. Once the node type is determined at the step 134, control passes to one of a plurality of code branches that process the particular node type.

If it is determined at the step 134 that the CN is a terminal node, then control passes from the step 134 to a step 136 where the CN is pushed onto a stack. As discussed in more detail below, the tree construction software 62 uses a local stack to construct the tree 80. Following with step 136, control passes back to the beginning of the routine (as indicated by the connector 126) to the steps 130, 132 (discussed above) that check to see if there is more data to be processed and, if so, then read that data into the CN.

If it is determined at the step 134 that the CN is a unary node (i.e., a node with one child), then control passes from the step 134 to a step 140 where the child (CH) of the unary node is popped off the local stack. Note that the child of the unary node would have been read in previously, per the convention adopted for storing the IR data, discussed above. Following the step 140 is a step 142 where the child of the unary node (i.e., the child of the CN) is linked to the CN. Following the step 142 is a step 144 where the CN is pushed onto the local stack. Note that the CN may be a child of another node that will be subsequently read in. Following the step 144, control passes back to the beginning of the routine, as indicated by the connector 126.

If it is determined at the step 134 that the CN is a binary node (i.e., a node having two children), then control passes from the step 134 to a step 150 where the left child (LC) and the right child (RC) of the CN are popped off the local stack. Following the step 150 is a step 152 where the left child and right child are linked to the CN. Following the step 152 is a step 154 where the CN is pushed onto the local stack. Following step 154, control transfers back to the beginning of the routine, as indicated by the connector 126.

If it is determined at the step 134 that the CN is a ternary node, then control transfers from the step 134 to a step 160 where the three children of the ternary node, the left child (LC), middle child (MC), and right child (RC), are popped off the local stack. Following the step 160 is a step 162 where the left child, middle child, and right child are linked to the CN. Following the step 162 is a step 164 where the CN is pushed onto the local stack. Following the step 164, control transfers back to the beginning of the routine, as indicated by the connector 126.

If it is determined at the step 134 that the CN is a combination node, then control transfers from the step 134 to a step 170 where the child node (CH) is popped off the local stack. As discussed above in connection with FIG. 5, a combination node has two children where the first child is a single node and the second child is a list of nodes. In terms of storage of the IR data associated with a combination node, the first child may be stored prior to the combination node but the second child (the list elements) may be stored immediately after the combination node. Note also that, as discussed above, the end of the list is indicated by an end of list node.

Following the step 170 is a step 172 where the child node is linked to the CN. Following the step 172 is a step 174 where the routine is recursively called to process the elements of the list to be attached to the CN. As discussed in detail below, the return from the recursive call to the routine occurs when the end of list indicator is reached. Also, by convention, the routine may return a list containing items remaining on the local stack used by the routine.

Following the step 174 is a step 176 where the list returned by the call to the routine at the step 174 is linked to the CN to become the attached list of the combination node. Note that the call to the routine at step 174 causes each of the elements of the list for the combination node to be processed and placed on the local stack. Accordingly, the list of local stack elements may be returned upon returning from the call to the routine at the step 174. Following the step 176 is a step 178 where the CN (i.e., the combination node) is pushed onto the stack. Following step 178, control passes back to the beginning of the routine, as indicated by the connector 126.

If it is determined at the step 134 that the CN is an end of list indicator node, then control passes from the step 134 to a step 180 where the CN is pushed onto the local stack. Following the step 180, control passes back to the step 124 to return from the routine. Note that, in many instances, the return from the routine at this point is a return from a previous recursive call to the routine that was made when the corresponding combination node (the parent for the current list) was first encountered, as described above in connection with the steps 174, 176.

As discussed above, the instrumentation software 63 shown in FIG. 4 operates on the IR tree data element 66 to provide the instrumented IR tree data element 67. The instrumentation software 63 also uses data from the other instrumentation data element 69 which, as discussed in detail below, includes a plurality of run time instrumentation routines that may be added to the IR tree to facilitate run time debugging. In addition, as discussed in more detail below, the instrumentation software 63 instruments other IR data to provide the other IR data element 68 that includes instrumented versions of IR data. Once the instrumentation software 63 has provided the instrumented IR tree data element 67, the tree deconstruction routine 70 uses the instrumented IR tree data element 67 and the other IR data element 68 to provide the instrumented IR data element 65.

Figure 7:
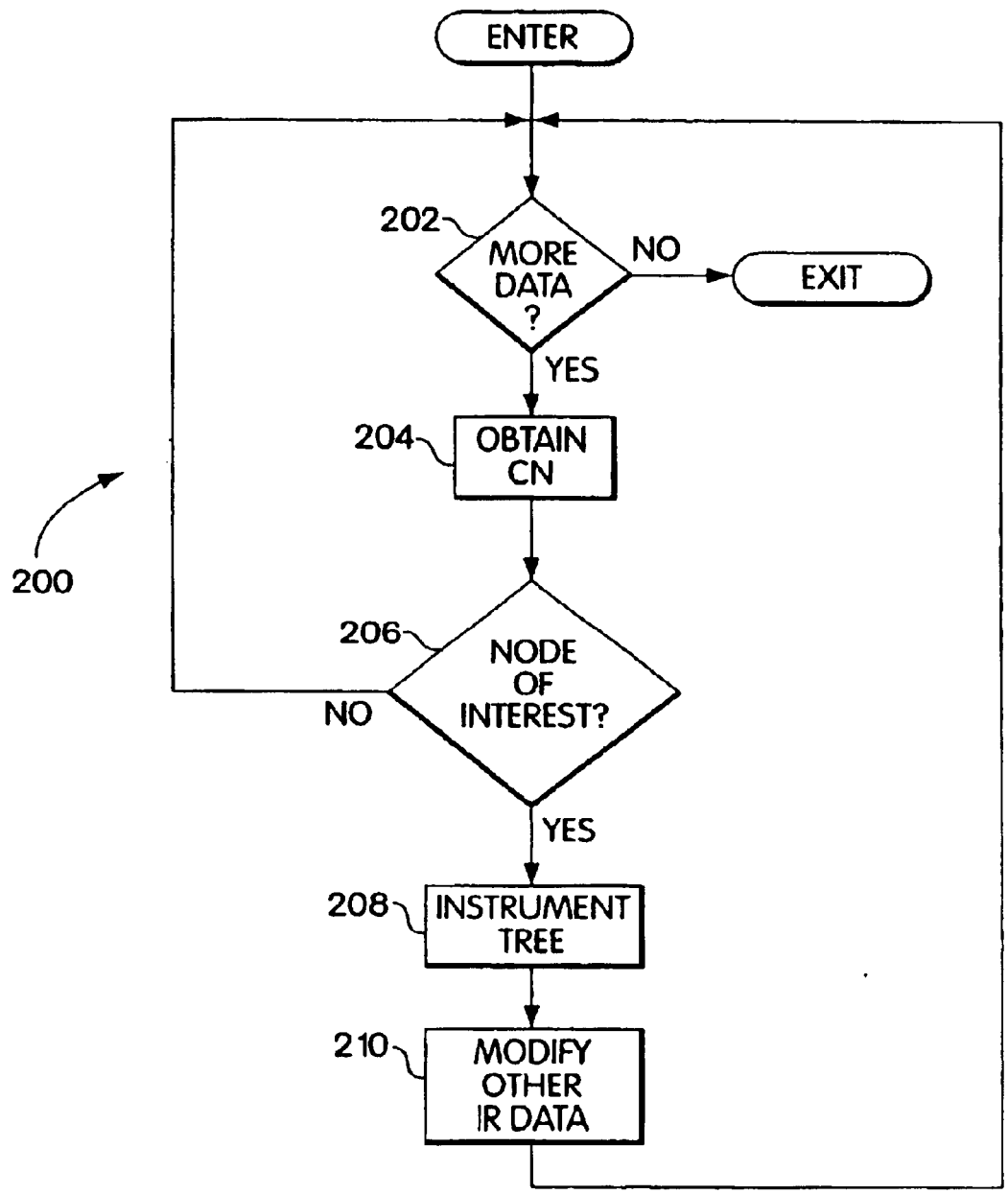
FIG. 7 is a flowchart illustrating instrumentation of the tree data structure of FIG. 5.

Referring to FIG. 7, a flowchart 200 illustrates operation of the instrumentation software 63 of FIG. 4. The instrumentation software 63 examines data found within the IR data element 64 and, in a manner discussed in more detail below, provides instrumentation. Processing begins at a test step 202 where it is determined if there is more data (i.e., more nodes) to examine. Note that the data that is processed could be either directly from the IR data element 64 or could be from the flat list of IR nodes, discussed above, that may be created in connection with creating the IR tree 80. If it is determined at the test step 202 that there is no more data to process (i.e., the end of the list or the end of the file containing the data has been reached), then processing is complete and the routine of FIG. 7 is exited.

If it is determined at the test step 202 that there is more data to be processed, then control passes from the test step 202 to a step 204 where the current node (CN) is obtained. In a manner similar to that discussed above in connection with construction of the IR tree 80, obtaining the CN may include reading the CN directly from the IR data element 64 or simply obtaining the next node in the flat list of nodes that may have been constructed prior to building the IR tree 80.

Following the step 204 is a test step 206 where it is determined if the CN is a node of interest. As discussed in more detail below, a node of interest includes any node that is to be instrumented or which indicates that instrumentation is appropriate. Identifying which nodes are nodes of interest at the test step 206 is discussed in more detail hereinafter.

If it is determined at the test step 206 that the CN is not a node of interest, then control passes from the test step 206 back up to the step 202 where it is determined if there is more data to be processed, as discussed above. Otherwise, if it is determined at the test step 206 that the CN is a node of interest, then control passes from the test step 206 to a step 208 where a portion of the IR tree 80 is instrumented, either by replacing the CN and/or adding additional nodes the near location of the CN in the tree 80. Following the step 208 is a step 210 where other IR data is modified, as appropriate. Following the step 210, control passes back to the step 202 to determine if there is more data to be processed.

Generally, it is possible to instrument any one or any subset of a variety of the nodes found in the IR tree 80. In many instances, however it is useful to instrument memory access instructions in order to detect illegal memory operations at run time. In addition, for many higher-level languages, variables that may be defined locally within a particular code block (such as a function) become undefined once that code block is exited. Accordingly, monitoring the variables of a program that access memory may necessitate monitoring exiting and entering blocks of code where variables become defined and undefined. For instance, a pointer variable may be defined within a particular block of code and used to allocate memory from the heap. If that block of code is exited before the memory is released, this would, in many instances, constitute an error since there would be no way to free the memory allocated using the (subsequently undefined) pointer variable.

In a preferred embodiment, the system described herein determines nodes of interest at the test step 206 by determining if the CN corresponds to one of: a pointer arithmetic operation that compares pointers or does pointer arithmetic, an operation that reads memory locations, an operation that changes memory locations, or an operation that causes variables to become defined or undefined, such as a scope change, a goto statement, a function call or a return from a function call. In the case of memory variable operations, whenever a variable is used to read memory, the run time instrumentation routines determine if the variable corresponds to memory that has been allocated and initialized. Similarly, if a variable is being used to write memory, the run time instrumentation routines determine if the variable corresponds to memory that has been allocated. Pointer comparisons are instrumented since it is often not proper to compare pointers that point to blocks of memory allocated by separate calls to the allocation routine(s). Operations that read or write to memory locations are instrumented to ensure that the memory variable(s) being used point to the memory allocated for the variable(s) during the read or write operation (e.g., an array index does not cause an access to an array to point beyond the end of the array).

Function calls and returns may be instrumented for a variety of purposes, including keeping track of variables becoming defined or undefined in connection with function calls and returns. In addition, note that it is possible to pass a variable pointer to a function and have that pointer be assigned to another variable within the function. These types of operations are instrumented since, even if a local variable is used to allocate memory, if that local variable corresponds to a passed variable, then it may not be improper to return from the function before freeing the memory allocated using the local variable.

Each block of code has a particular "scope" associated therewith. Transition from a block of code having one scope to a block of code having another scope is called a "scope change". One reason scope changing instructions are instrumented is to detect memory leaks (i.e., allocating memory that is not subsequently freed). As discussed above, it is an error to allocate memory to a local variable and then return or exit out of the scope which defines the local variable without first freeing the memory or copying a pointer for the memory to a variable that is not going out of scope. Another reason that scope changes are instrumented is to detect read accesses to unitialized variables. Note that associating blocks of code with particular scopes is known in the art. See, for example, a section titled "Representing Scope Information" at pages 438–440 of Aho, Seth & Ullman, *Compilers, Principles, Techniques, and Tools,* published by Addison-Wesley of Reading Mass., 1986.

One possible optimization is to not instrument scope changes that have minimal effect on monitoring variable operations. This optimization may be performed by first determining the scope of each portion of the IR code and then setting an effective scope of appropriate portions of the code to the effective scope of the immediately preceding block of code. In some instances, the block of code that immediately precedes the current block of code is the "parent" block of code. A preceding block of code is said to have a "preceding scope" relative to the current scope. For instance, in some higher level languages, a FOR loop will cause a scope change in connection with transition from the head of the loop to the body of the code that is executed within the loop. Thus, the scope of the head of the FOR loop is the preceding scope of the body of the FOR loop.

An effective scope table indicates the effective scope of each block of IR code. As discussed in more detail below, the effective scope of a portion of IR code is deemed to be the scope of that portion for purposes of instrumenting operations that use program variables. The effective scope table creates a mapping between the actual scope and the effective scope of blocks of the IR code.

Figure 8:
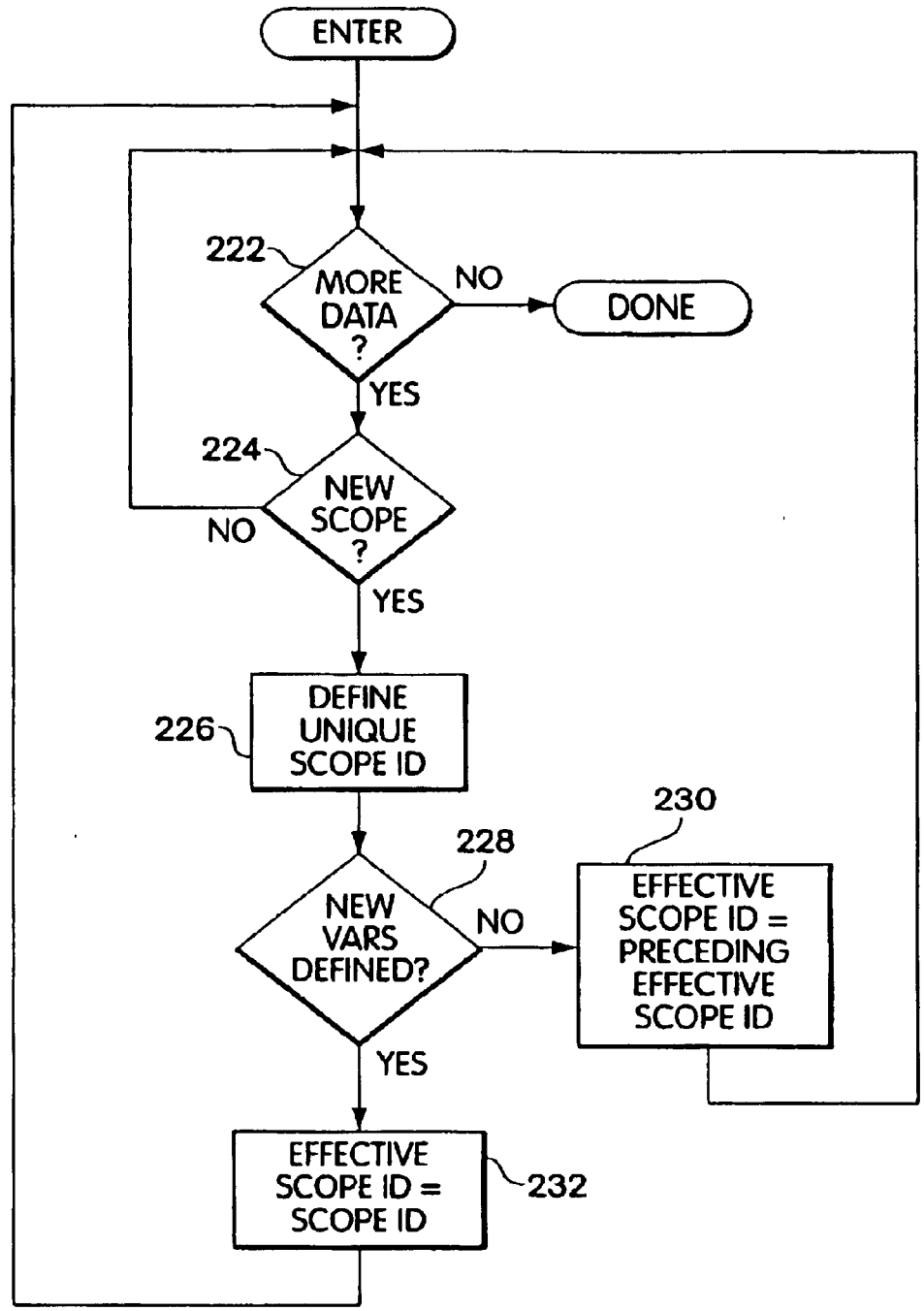
FIG. 8 is a flowchart illustrating construction of an effective scope table used in connection with instrumenting the tree data structure of FIG. 5.

Referring to FIG. 8, a flowchart 220 illustrates using the IR code to construct the effective scope table. Processing begins at a test step 222 which determines if there is more data to be processed, in a manner similar to that discussed above in connection with other processing. If it is determined at the test step 222 that there is no more data, then processing is complete. Otherwise, control passes from the test step 222 to a test step 224 which determines if the data that has been read in and is being processed indicates a scope change. Note that, depending on the specific IR implementation, a scope change may be indicated explicitly within the IR data or may be indicated implicitly, in which case the processing at the test step 224 would use conventional means for detecting a scope change, such as examining the data for the type of instructions that cause a scope change.

If it is determined at the test step 224 that there is no scope change, then control passes back to the test step 222 to determine if there is more data to be processed. Otherwise, if a scope change is detected at the test step 224, then control passes from the step 224 to a step 226 where a unique scope identifier is defined and assigned to the code block being processed. Construction of the effective scope table includes providing a unique scope identifier for each block of IR code having the same scope. Accordingly, one of the entries in the effective scope table is the unique scope identifier associated with each of the IR code blocks.

Following the step 226 is a test step 228 which determines if new variables are being defined within the block of code corresponding to the current scope. The variable definitions may be stored in the IR tree 80 or may be stored elsewhere, depending upon the specific implementation of the IR. If no new variables are defined within the current scope, then, for purposes of instrumenting memory variable accesses, it is not necessary to instrument the scope change. Accordingly, if it is determined at the test step 228 that no new variables are defined within the block of code corresponding to the current scope, then control passes from the step 228 to a step 230 where the effective scope of the current block of code is set equal to the effective scope of to the preceding block of code by associating the effective scope of the preceding block with the current scope. Note that setting the effective scope of the current block of code to the effective scope of the preceding block of code indicates that the scope change from the preceding block of code to the current block of code is not especially significant for purposes of instrumenting variable accesses. Note also that the effective scope of a preceding block may have been previously set to the effective scope of the preceding block of the preceding block. In this way, many scopes may be set to the same effective scope.

If it is determined at the test step 228 that new variables are defined within the current block of IR code, then control passes from the step 228 to a step 232 where the effective scope table is modified to indicate that the effective scope of the current block of code is equal to the actual scope assigned to that block of code. Following either the step 230 or the step 232, control passes back to the beginning of the routine. The thusconstructed effective scope table may be used to provide instrumentation optimizations, as discussed below.

Figure 9A:
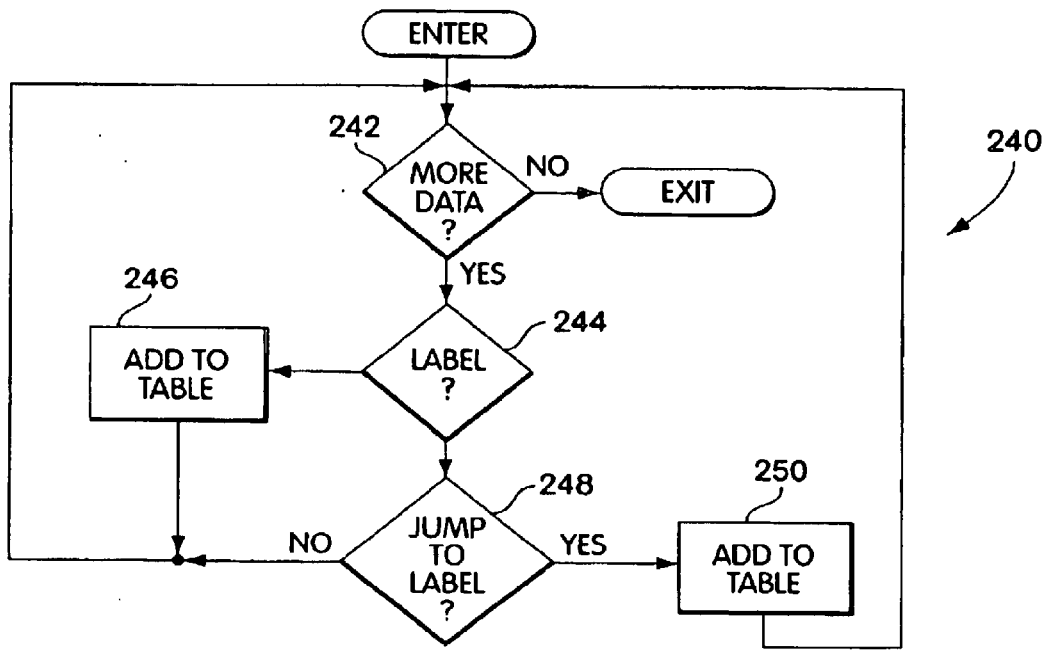
FIGS. 9A and 9B are flowcharts illustrating scope optimization used in connection with instrumenting the tree data structure of FIG. 5.

Referring to FIG. 9A, a flowchart 240 illustrates code for identifying labels and jumps to labels within the IR code. Note that, in many conventional IR implementations, symbolic labels are used to identify locations within the code so that control flow instructions within the IR code may jump to those labels. In some instances, a jump to a label could cause a scope change and, therefore, could be instrumented if the jump causes program variables to become defined or become undefined. However, a possible optimization includes identifying labels that do not require instrumentation either because there are no jumps to those labels or because all jumps to those labels are from code having the same effective scope as the code corresponding to the label.

Processing begins at a test step 242 which determines if there is more data to be processed in a manner similar to that discussed above. If there is no more data, then processing is complete. Otherwise, control passes from the test step 242 to a test step 244 which determines if the current IR node being processed is a label for a block of IR code. If so, then control passes from the test step 244 to a step 246 where the label is added to a label table that is used by follow on processing, as discussed in more detail below.

If it is determined at the test step 244 that the data being processed is not a label, then control passes from the step 244 to a test step 248 which determines if the current data being processed includes IR code that jumps to a label. If not, then control passes from the test step 248 back to the step 242 to process additional data. Otherwise, if it is determined at the test step 248 that the current data being processed includes IR code that jumps to a label, then control passes from the step 248 to a step 250, where an entry is made to the label table. Following the step 250, control passes back to the beginning of the routine to process additional data. The processing illustrated in the flowchart 240 creates the label table to identify all labels and all jumps to labels within the IR code. Note that the term "table", as used herein, should be understood in its broader sense to include other equivalent data structures such as linked lists, storage in a temporary file, etc., familiar to one of ordinary skill in the art.

Figure 9B:
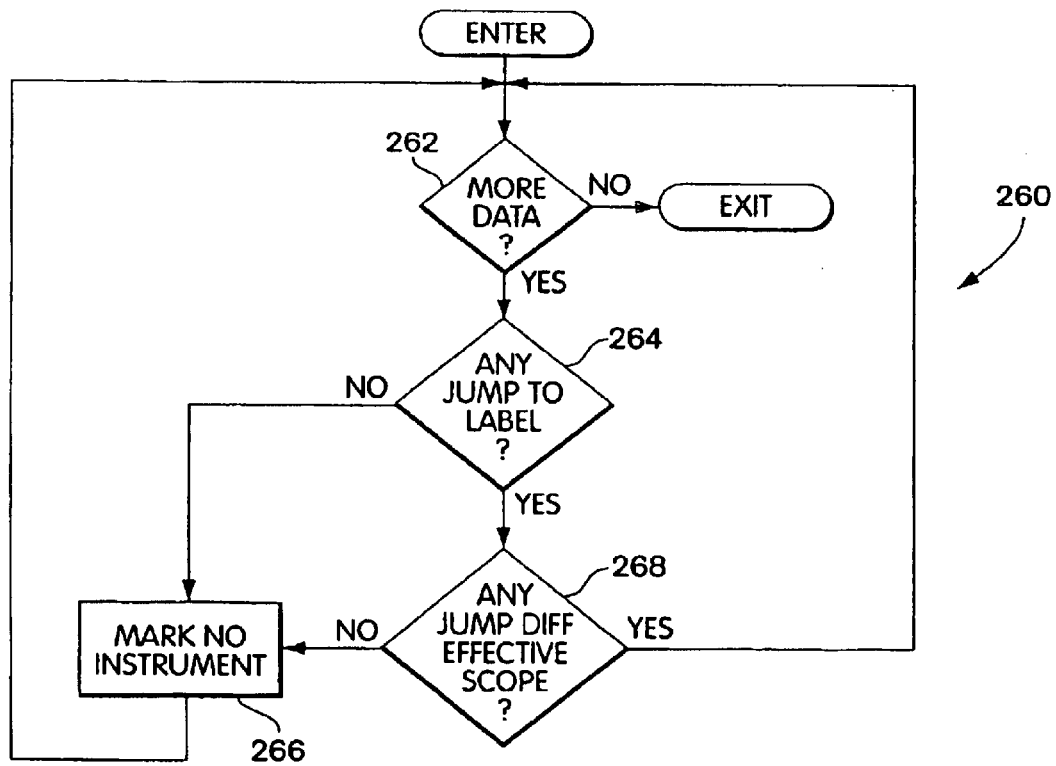

Referring to FIG. 9B, a flowchart 260 illustrates optimization operations that use the label table. Each label that is identified in the label table is examined to determine if there are any jumps to that label or if any of the jumps to the label are from IR code blocks having a different effective scope. Processing begins at a test step 262 which, in a manner similar to that discussed above, determines if there is more data to be processed. Note that, in this instance, the test for more data at the test step 262 is directed to processing each of the label entries in the label table.

If it is determined at the step 262 that there is no more data (i.e., there are no more labels to be processed), then processing is complete. Otherwise, if there are more labels to be processed, then control passes from the test step 262 to a test step 264 which examines the label table to determine if there are any jumps to the current label being processed. Note that, generally, it is possible for the compiler to generate IR code having labels that are ultimately not used (i.e., there is no IR code that jumps to the labels). Accordingly, if such labels exist, they are detected at the test step 264 and control passes to a step 266 where the label is marked (in a conventional manner) to indicate that the label is not to be instrumented. Following the step 266, control passes back to the beginning of the routine.

If, on the other hand, it is determined at the test step 264 that there are jumps to the label being processed, then control passes from the step 264 to a test step 268 where it is determined if any of the jumps to the label are from IR code having a different effective scope than that of the label. Note that at the steps 246, 250 of FIG. 9A, the label table entries may be made to include the effective scope (from the effective scope table) of IR code corresponding to the labels and the jumps to the labels. Accordingly, at the step 268, the effective scope of the IR code corresponding to the label is compared with the effective scopes of all of the code containing jumps to the label. If it is determined at the step 268 that none of the jumps to the label are from IR code having a different effective scope than the code associated with the label, then control passes from the step 268 to the step 266, where the label is marked to indicate that the label is not to be instrumented. Since the effective scope tracks variables becoming defined and undefined within a code block and between different code blocks, then marking certain labels at the step 266 provides a worthwhile optimization when instrumenting code in connection with run time variable accesses.

If it is determined at the step 268 that there are jumps to the label that cause a change in effective scope, then control passes from the test step 268 back to the beginning of the routine. Once all the labels have been thus marked, it is possible to perform the remainder of the processing indicated by the step 206 in FIG. 7 where the nodes of interest are identified for subsequent instrumentation. Note that it is possible to use a boolean variable to indicate whether a label node is to be instrumented.

Figure 10:
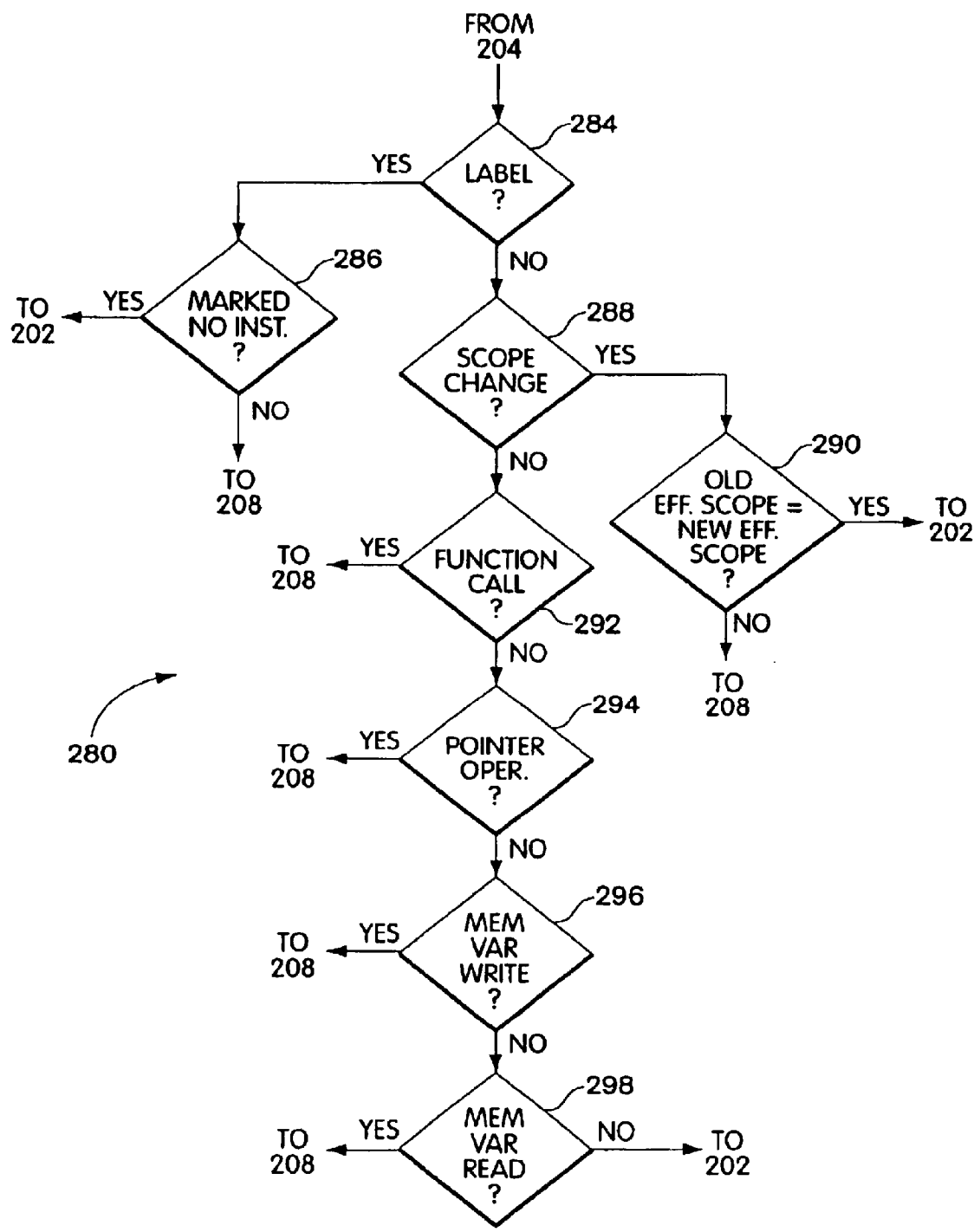
FIG. 10 is a flowchart illustrating in detail a portion of the flowchart of FIG. 7 where nodes are selected for instrumentation.

Referring to FIG. 10, a flowchart 280 illustrates a portion of the processing at the step 206 of FIG. 7 that determines which nodes in the IR code are to be instrumented. Processing begins at a test step 284, which is reached from the step 204 of FIG. 7. At the test step 284, it is determined if the data being processed corresponds to a label in the IR code. If so, then control passes from the test step 284 to a test step 286 to determine if the label has been marked to indicate that the label is not to be instrumented, as discussed above in connection with FIGS. 9A and 9B. If it is determined at the test step 286 that the label being processed has been marked to indicate that the label is not to be instrumented, then control passes from the test step 286 to the step 202 of FIG. 7. Otherwise, if it is determined that the test step 286 that the label is to be instrumented, then control passes from the step 286 to the step 208 of FIG. 7 where the IR tree 80 is instrumented.

If it is determined at the test step 284 that the data being processed is not a label, then control passes from the step 284 to a step 288 where it is determined if the data being processed indicates a scope change. If so, then control passes from the step 288 to a test step 290 to determine if the old effective scope (i.e., the effective scope before the scope change) equals the new effective scope (i.e., the effective scope after the scope change). The effective scope is discussed above in connection with construction of the effective scope table. If it is determined that the scope changed detected at the test step 288 does not cause a change in the effective scope, then control passes from the test step 290 to the step 202 of FIG. 7. Otherwise, if it is determined at the test step 290 that the old effective scope does not equal the new effective scope, then control passes from the step 290 to the step 208 of FIG. 7 where the tree 80 is instrumented.

If it is determined at the step 288 that the data being processed does not cause a scope change, then control passes from the step 288 to a test step 292 where is determined if the data being processed is a function call. If so, then control passes from the test step 292 to the step 208 of FIG. 7. Otherwise, control passes from the test step 292 to a test step 294 which determines if the data being processed is a pointer operation. If so, then control passes from the test step 294 to the step 208 of FIG. 7. Otherwise, control passes from the test step 294 to a test step 296 where it is determined if the data being processed is a memory write operation (i.e. an operation with a program variable causing a write to memory). If so, then control passes from the test step 296 to the step 208 of FIG. 7. Otherwise, control passes from the step 296 to a test step 298 which determines if the data being processed relates to a memory read (i.e., is an operation with a program variable causing a read from memory). If so, then control passes from the test step 298 to the step 208 of FIG. 7. Otherwise, control transfers from the step 298 to the step 202 of FIG. 7.

FIG. 10 illustrates an embodiment of the invention where the instructions being instrumented relate to memory variable accesses and scope changes. In other embodiments of the invention, it is possible to instrument other types of IR instructions, depending upon which instructions are deemed appropriate for monitoring program operation at run time. For example, it may be possible to add instrumentation to monitor run time performance of the program. Other examples of possible uses of instrumentation include, but are not limited to, code coverage analysis and run time error handling.

Instrumenting memory variable accesses and scope changes, as disclosed herein, facilitates uncovering program errors relating to memory read and write operations that occurred during run time. Note that the specific IR operations, and the arguments thereof, vary depending upon the particular implementation of the IR. In addition, as discussed above, the choice of which operations to instrument varies depending upon the needs of the user of the instrumentation program.

The step 208 of instrumenting the IR tree, which is shown as FIG. 7, involves adding nodes to the tree that assist in the performance of the run time instrumentation. As discussed in more detail below, each of the specific run time instrumentation routines that is provided may include a function that is called to perform the instrumentation operation. Note that the instrumentation calls are added in a way that has no net effect on the underlying, uninstrumented, program. That is, the behavior of the IR code with the run time instrumentation routines added thereto has to be the same as the behavior of the original IR code without the instrumentation routines added. Thus, the instrumentation routines may add new variables, but do not change any of the program variables except in instances where the value of a program variable is undefined. The additional nodes, instrumentation function calls, etc. may be provided by the instrumentation data element 69 shown in FIG. 4.

Figure 11A:
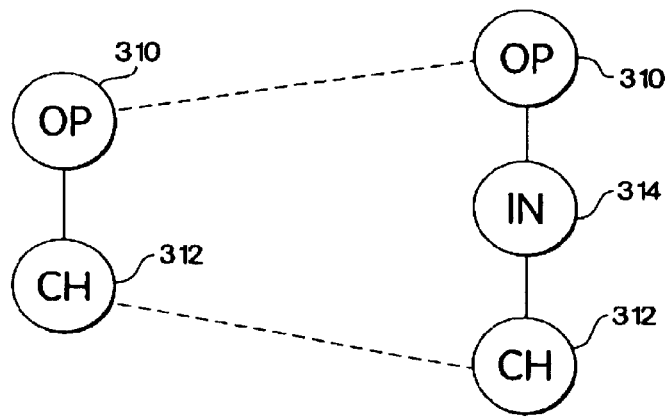
FIGS. 11A–11C illustrate insertion of nodes in connection with instrumentation of the tree data structure of FIG. 5.

Referring to FIG. 11A, a portion of an IR tree is shown containing a unary operation node 310 and a child node 312 thereof. The operation node 310 represents a node of interest that is to be instrumented. The child node 312 represents the sole child of the operation node 310. In order to instrument the operation node 310, a run time instrumentation node 314 is interjected between the operation node 310 and the child node 312. The run time instrumentation node 314 may be a function call to a run time instrumentation function that uses the child node 312 as one of the arguments and returns the value of the child node 312 from the function call to make the value available for the operation node 310. Interjecting the run time instrumentation node 314 between the operation node 310 and the child node 312 in this manner is virtually transparent to the operation node 310, since the value returned by the run time instrumentation node 314 is the value of the child node 312. Note that other arguments may be provided in a conventional manner to the function corresponding to the run time instrumentation node.

Figure 11B:
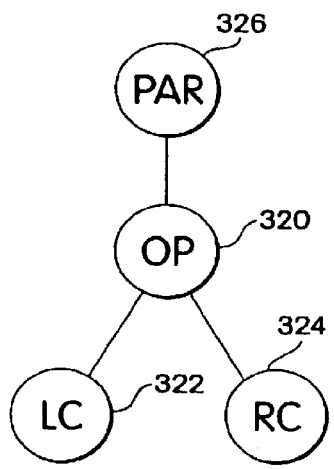

Refer to FIG. 11B, a binary operation node 320 has a left child 322, a right child 324, and a parent node 326. If the operation node 320 is a node of interest, then it may be instrumented by interjecting various nodes that are effectively transparent to the operation node 320 as well as effectively transparent to the left child 322, the right child 324 and the parent node 326.

Figure 11C:
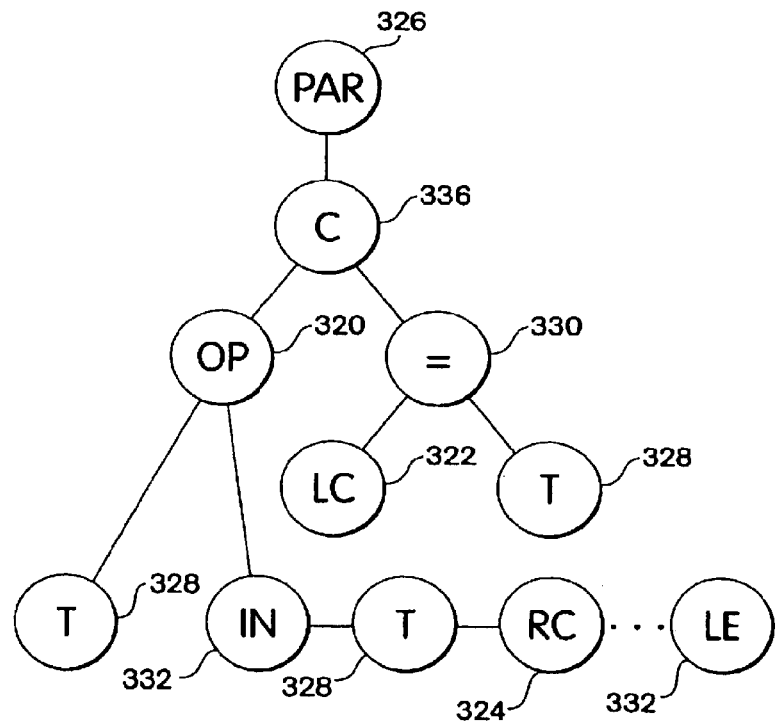

Referring to FIG. 11C, the operation node 320 is instrumented by adding a variety of other nodes. One of the other nodes that is added is a temporary node 328 that is used to store the value of the left child 322. An assignment node 330 is used to assign the value that results from evaluating the left child 322 to the value of the temporary node 328. As discussed below, right subtree is evaluated before the left subtree. Thus, the operation that evaluates the value of the left child and assigns the value to the temporary node 328 will occur before other operations shown in FIG. 11C.

An instrumentation node 332 is represented in the subtree of FIG. 11C as a function having arguments that include the temporary node 328 and the right child 324. Since the arguments to the function that corresponds to the instrumentation node 332 are illustrated as a list, then a list end node 334 is shown at the end of the list. Other arguments to the instrumentation node 332, as well as arguments to the instrumentation node 314 of FIG. 11A may include a variety of other conventional compile time and run time parameters that facilitate debugging.

The function defined by the instrumentation node 332 returns the result of evaluating the right child 324. Thus, the next operation is the operation of the instrumented node 320, which receives the value of the temporary node 328 and the value of the instrumentation function 332. Note that, as discussed above, the value of the temporary node 328 is the value of the left child 322 and the value of the function defined by the instrumentation node 332 is the value of the right child 324. Thus, the operation node 320 is provided with values for children that are the same as those provided to the operation node 320 shown in FIG. 11B. The node labeled "C" 336 of FIG. 11C simply causes execution of the right sub-tree (in this case having a root node 330 that does the assignment of the value of the left child 322 to the temporary node 328) followed by the operation of the left sub-tree (in this case the operation being instrumented 320). The node labeled "C" 336 provides the value derived from the operation node 320 to the parent node 326. Thus, the parent node 326 in FIG. 11C receives the same value provided to the parent node 326 in the configuration show in FIG. 11B. Instrumentation of the binary node illustrated in FIGS. 11B and 11C is expandable to ternary and to nodes having even more children using this same basic methodology described herein.

The run time instrumentation code may be implemented by using a separate set of routines (such as a DLL under the Windows environment) that is linkable to the code being instrumented via the function calls provided to the IR code in the course of instrumentation. In a preferred embodiment, the function calls are performed by indirectly calling functions that are initially set to an initialization routine that initializes the run time instrumentation system. The initialization routine determines if an executable library corresponding to the run time instrumentation routine is available. If not, then the addresses of the functions that are called indirectly by the indirect function calls added by instrumentation are set to "stub" routines that simply return without executing anything. Accordingly, even if the user program has been instrumented, if the run time instrumentation program is not also available during run time, then the instrumented code will simply return from the instrumentation function calls.

If, on the other hand, the initialization routine determines that the executable library for providing instrumentation during run time is available, then the addresses of the functions that are called indirectly by the instrumentation nodes are set to the instrumentation routines. The run time instrumentation routines that are used depend on the nature of the IR code being instrumented. Generally, the instrumentation routines may be fairly conventional and test for run time error conditions such as memory leaks (i.e., a scope change that causes a pointer variable to become undefined prior to freeing the allocated memory associated with the pointed variable). Other detected errors may include memory write operations that use variables that do not point to memory that is allocated to the variable, memory read operations that use memory variables that do not point to memory that is either allocated for the variable or, if allocated, then is not initialized. In addition, modifications to pointer variables may be instrumented to ensure that the pointer variables point to the proper allocated block of memory. Other run time instrumentation routines may test and compare the size of variables in connection with a data read from one memory location into another, test for indirect calls to assure that the pointer used points to executable code, and test that pointers that are compared are allocated to the same block of memory.

Once the IR tree 80 has been instrumented in the manner discussed above to create the instrumented IR tree data element 67, the tree deconstruction software 70 of FIG. 4 collapses the IR tree stored in the instrumented IR tree data element 67 and uses the other IR data element 68 to provide the instrumental IR Data Element 65. Collapsing the IR tree back into a flat file is a simple matter of using the conventional post order traversal algorithm to first write the right child sub-tree of each node, then the left child sub-tree, then the actual node. For the combo node, after the child tree is written, the list is processed, treating each item in the list as a top-level node in its own tree. This process is essentially the inverse of the process used to construct the IR tree, discussed above.

The other IR data element 68 shown in FIG. 4 may include a global symbol table that contains locations of each function contained in the IR code. Note that since IR code is being supplemented (i.e., increased in size) by the instrumentation process, then generally, the location of each of the functions within the IR code is likely to move. The locations of each of the functions are stored in the other IR data element 68 and are written back to the other IR data element 68 as the IR tree 80 is collapsed into a flat list by the tree deconstruction software 70 shown in FIG. 4. Note that global function symbols within the global symbol table, and corresponding functions within the IR tree, may be correlated in a conventional manner by using symbol keys that cross-reference items between the IR code and the items in global symbols table.

Once the instrumented IR data element 65 is provided, then, as shown in FIG. 3, the compiler 42 may continue the compile process by accessing the instrumented IR data element 65 to provide the object code 46. Instrumenting the IR code in this way is virtually transparent to the compiler 42 since the IR data element 64 and the instrumented IR data element 65 have virtually the same structure. The thus-provided object code 46 contains the additional nodes added during instrumentation, including the run time function calls that call the run time debugging routines.

During execution of the object code, errors may be indicated by the run time debugging routines in any one of a variety of conventional manners, including providing an indication on the screen and stopping execution of the code when the error occurs, logging errors to a file, or any one of a variety of other ways for indicating to a user that a run time error condition, or a potential run time error condition, has occurred.

Other embodiments also exist. Described below are methods of automatically editing the executable byte code representation of a computer program or other methods for generating instrumented byte code. In one embodiment, the byte code is altered by the addition of new instructions and/or the deletion or modification of existing instructions.

Byte code is a generic term for a family of binary (i.e., non-textual) file formats for computer software programs created by compiling source code written in a computer programming language. Byte code is a format that is usually independent of the source language from which it was compiled, and which is intended to be independent of any computer hardware and/or operating system on which it might run. Byte code programs are executed by a software program sometimes referred to as a virtual machine, byte-code interpreter or p-code interpreter, a separate version of which must be implemented for each computer hardware and/or operating system. One type of byte code, Java byte code, may be provided by compiling a Java source language program. The Java byte code may then be run on a computer having an appropriate program for interpreting the Java byte code. A detailed description of this may be found, for example, in *The Java Virtual Machine Specification,* by Tim Lindholm and Frank Yellin and published by Addison Wesley, of Reading, Mass., 1997, which is incorporated by reference herein.

One objective of the instrumentation process is to alter the program to facilitate the gathering of diagnostic and statistical information on the program when it is executed; i.e., dynamic analysis. This allows the program's internal state to be monitored for variety of purposes. These purposes include, but are not limited to: diagnosing error conditions that occur at run time, creating a record of the inner details of program execution, measuring program execution to provide code coverage analysis and performance profiling, or providing additional run time error or exception handling.

Another objective of the editing process is to examine the byte code according to various heuristics; i.e., static analysis. Through static analysis, several types of useful information may be derived. These include, but are not limited to: code metrics and complexity analysis, usage information (including library usage), and enhanced symbolic information for debugging.

Static analysis also makes it possible to detect some types of errors that might not be caught at runtime, since it is difficult to guarantee that all code will actually be executed under all circumstances. These errors include, but are not limited to: improper parameter lists passed to functions, methods or procedures, and use of uninitialized variables.

There are many different ways to instrument byte code. In one embodiment, the editing is performed automatically as a separate post-compile process before the byte code is executed. In another embodiment, the editing is performed automatically by the run time environment itself, which has been modified to alter the code before it is executed. In a third embodiment, the final stage 55 of the compiler 42 shown in FIG. 3 generates instrumented byte code from the instrumented IR data 65 rather than generating the object code 46, as described above.

Figure 12:
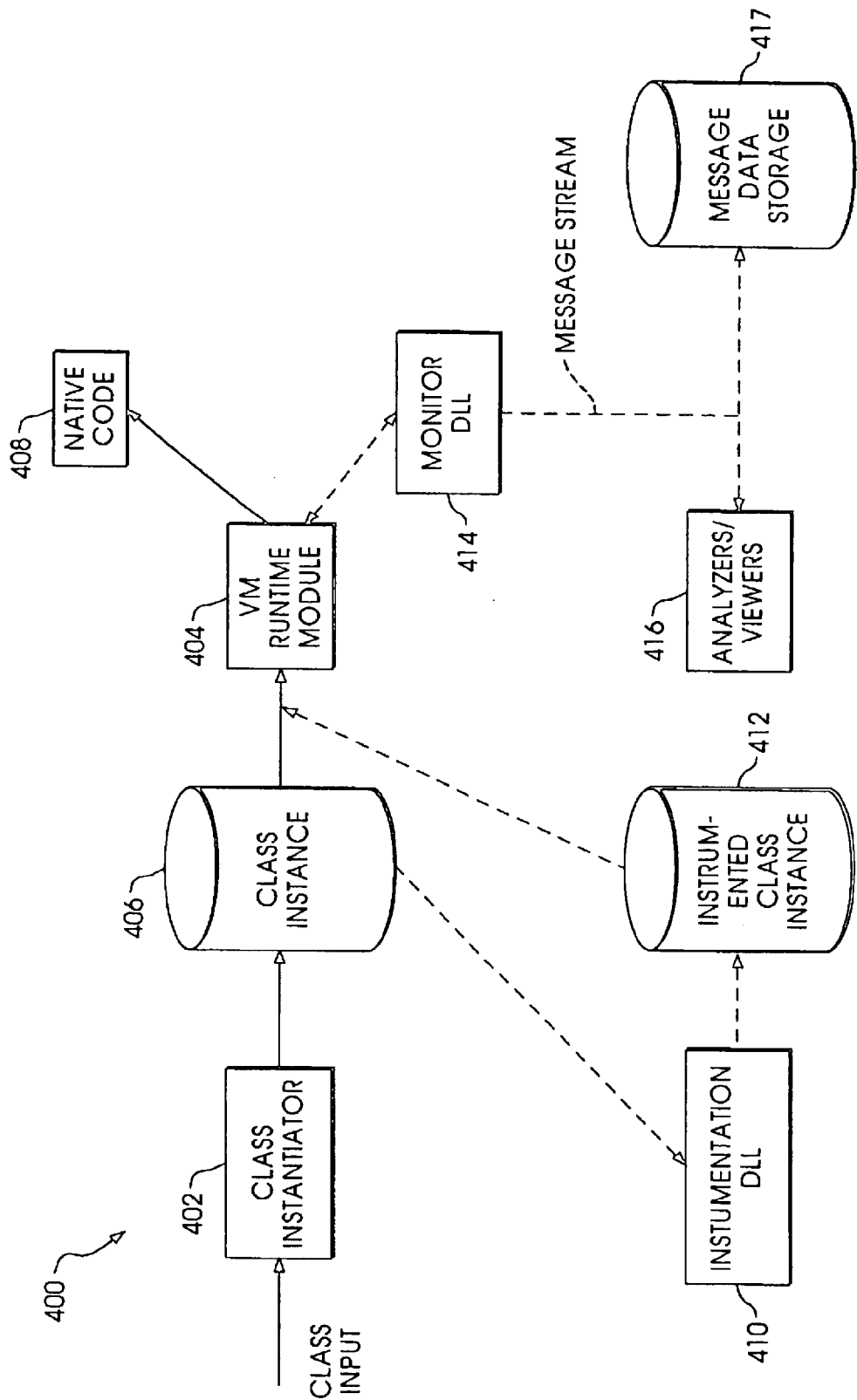
FIG. 12 is a data flow diagram illustrating instrumentation of byte code.

Referring to FIG. 12, a data flow diagram 400 illustrates operation of a virtual machine (VM) runtime system that interprets and runs byte code, such as Java byte code. In the data flow diagram 400, the VM runtime system has been broken up into two modules, a class instantiator 402 and a VM runtime module 404. The class instantiator 402 may receive a class input from any one of a variety of possible sources, including a file, over a local area network, from the Internet, from a zip file, from a CAB file, from another program that dynamically generates a class, or by any one of another variety of sources for computer data.

The class instantiator 402 generates a class instance 406, which, in a preferred embodiment, is a memory image representing a class that can be accessed by the VM runtime module 404 to perform operations indicated by the class instance 406. Absent any instrumentation, the class instance 406 is provided as an input to the VM runtime module 404 which interprets and executes the executable steps of the class instance 406 as well as performing any other operations indicated thereby.

In many implementations, a user can supplement the byte code provided in the class instance 406 with separate native code that may be used in conjunction with the byte code. In the case of the VM runtime module provided by Microsoft Corporation of Redmond, Wash., one of the interfaces between byte code and native code is called the Raw Native Interface (RNI). In the case of the VM runtime module provided by Sun Corporation of Burlington, Mass., an interface between byte code and native code is called Java Native Interface (JNI).

The interface may be provided by allowing declarations of method names and parameters in the byte code and by having a special designator indicating that the executable portions corresponding to the declared methods are found in one or more blocks of native code 408 that are separate from the VM runtime module 404. The native code runtime mechanism is described in more detail hereinafter in connection with describing instrumentation of native code.

Byte code may be instrumented by instrumenting each class as the class is loaded by the VM runtime system. As shown in FIG. 12, the class instance 406 is provided to an instrumentation DLL 410 which instruments the byte code of the class instance 406 to provide an instrumented class instance 412. The instrumented class instance 412 is provided as an input to the VM runtime module 404 instead of the class instance 406. That is, the VM runtime module 404 uses the instrumented class instance 412 instead of the class instance 406. The mechanism for providing the instrumented class instance 412 to the VM runtime module 404 is described in more detail hereinafter.

The instrumented class instance 412 contains native calls to a monitoring DLL 414 which provides a message stream to a plurality of analyzers/viewers 416 that are used to view the results of the instrumentation. In some instances, the monitoring DLL 414 may make calls in to the VM runtime module 404 to obtain more information for the message stream. Also note that it is possible to optionally store the message stream data in a message data storage 417. Storage of data in the message data storage 417 may be in addition to, or alternative to, providing the data to the analyzers/viewers 416. The monitoring DLL 414, the analyzer/viewers 416, and the message data storage 417 are described in more detail hereinafter.

Figure 13:
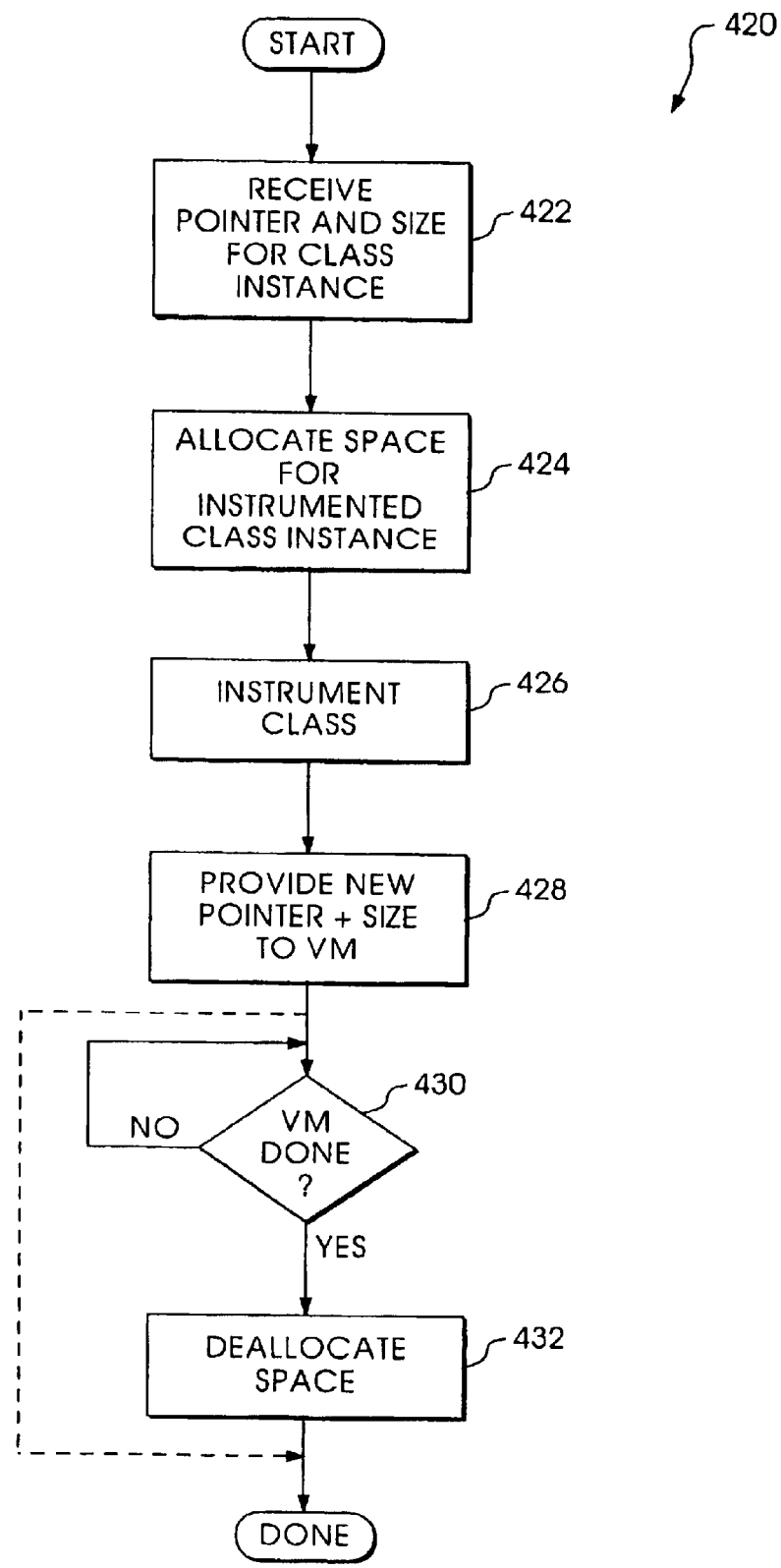
FIG. 13 is a flowchart illustrating steps for instrumenting byte code and executing the instrumented byte code.

Referring to FIG. 13, a flowchart 420 illustrates basic operation of the instrumentation DLL 410. The instrumentation program 410 operates in cooperation with the VM runtime system and may take advantage of particular hooks or calls provided by the vendors of the VM runtime system.

The flowchart 420 shows a first step 422 where the instrumentation DLL 410 receives a pointer and a size value for the class instance 406, which allows the instrumentation DLL 410 to access the class instance 406 in connection with providing instrumentation. Following the step 422 is a step 424 where the instrumentation DLL 410 allocates space for providing the instrumented class instance 412. In some embodiments, this allocation may be performed using conventional memory allocation routines. In other instances, the vendor of a VM runtime system may provide specialized memory allocation routines to be used. Following the step 424 is a step 426 where the class is instrumented to provide the instrumented class instance 412. Instrumentation of the class is described in more detail hereinafter. Following the step 426 is a step 428 where a pointer to the space that was allocated at the step 424, as well as a size value, are passed back to the VM runtime system in order to allow the VM runtime module 404 to use the instrumented class instance 412.

In embodiments where a specialized space allocation routine is used at the step 424, processing may be complete after the step 428. In those cases, the VM runtime module 404, or other portions of the VM runtime system, handle deallocation of the space allocated at the step 424.

In other embodiments, the instrumentation DLL 410 waits for the VM runtime module 404 to use the instrumented class instance 412. This is represented by the test step 430 which shows the instrumentation DLL 410 waiting for the VM runtime module 404 to signal the VM routine module 404 is done with the instrumented class instance 412. Of course, this may be implemented in a conventional fashion by having the VM call a particular entry point in the instrumentation DLL 410 so that the instrumentation DLL 410 does not have to poll the VM runtime module 404. Following the step 430 is a step 432 where the instrumentation program 410 deallocates the space that was allocated at the step 424. As discussed above, the steps 430, 432 may not be necessary in instances where a specialized memory allocation routine is used at the step 424 and the VM runtime system handles deallocation of the allocated memory.

The hooks in to the VM for providing the capabilities described above are provided by each VM vendor. For example, for the VM provided by Microsoft, the hooks are provided in the Microsoft Software Development Kit (SDK) for Java, Version 3.0, which is freely available from the Internet at http://www.microsoft.com/java. The hook used to intercept Java classes as they get loaded into the VM is declared in a C++ header file called "jclshook.h". In an installed version of the SDK, this file resides in the include directory called "include/jclshook.h". The mechanism that is used to cause the instrumentation DLL to be loaded into the Microsoft VM is part of Microsoft's Java Language Profiler Interface, which is discussed in detail in the SDK documentation. The SDK documentation is shipped as HTML. Two main files that provide information about the hook mechanism are Docs/htm/jprf_nar.htm and Docs/htm/jprf_ref.htm.

In a preferred embodiment, not all classes that are loaded are necessarily instrumented. As discussed in detail below, there are special cases of classes that are not instrumented at all. In addition, there are other special cases of classes that are only partially instrumented, as described in more detail below.

Figure 14:
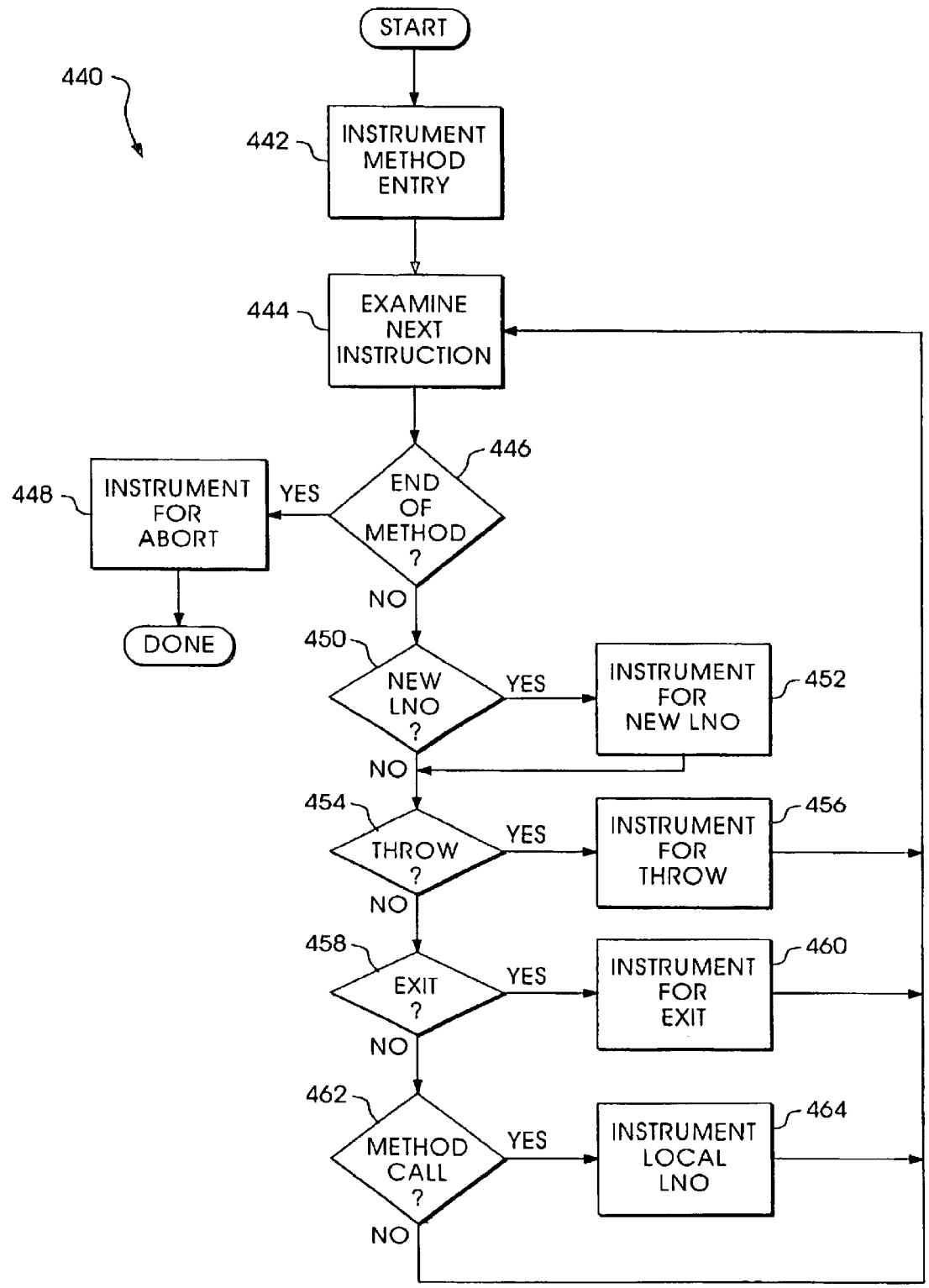
FIG. 14 is a flowchart illustrating instrumenting a method of a class.

Referring to FIG. 14, a flowchart 440 illustrates in more detail the step of instrumenting the class 426 of FIG. 13. All methods of the class, both static and non-static, are instrumented, with a few exceptions set forth below. The flowchart 440 illustrates instrumentation of a method.

Processing begins at a step 442 where the entry of the method is instrumented. Instrumentation of the method entry point at the step 442 is described in more detail hereinafter. Following step 442 is a step 444 where the next byte code instruction of the method is examined. The step 444 represents reading through each byte code instruction of the method and thus, each time the step 444 is performed, the next instruction of the method byte code is examined.

Following the step 444 is a test step 446 where it is determined if the end of the method has been reached. If it is determined at the test step 446 that the end of the method has been reached, then control passes to a step 448 where the method is instrumented to catch any aborts that occur while the method is being executed. Instrumenting for aborts at the step 448 is described in more detail hereinafter. Following the step 448, processing is complete since the end of the method has been reached.

If it is determined at the test step 446 that the end of the method has not been reached, then control passes from the test step 446 to a test step 450 where it is determined if a new line number has been reached. Note that, in many conventional byte code compilers, there is a switch allowing the user to obtain line number information correlating the source code line numbers with the byte code generated from that source code. The line number information may be provided in the form of a table. If line number information is available, then the test step 450 determines if the byte code being examined corresponds to a new line number in the source code by comparing the entries in the line number table with the byte code offset.

If it is determined at the test step 450 that byte code corresponding to a new source code line number has been reached, then control passes from the test step 450 to a step 452 where byte code is inserted into the method to cause a local line number variable to be set to the new line number when the method runs. The local line number variable, which is created at the method entry step 442, is described in more detail hereinafter.

Following the step 452 or the step 450 is a test step 454 where it is determined if a throw instruction has been reached. If so, then control passes from the test step 454 to a step 456 where the throw instruction is instrumented. Instrumenting the throw instruction at the step 456 is described in more detail hereinafter. Following the step 456, control passes back to the step 444 where the next byte code instruction is examined.

If it is determined at the test step 454 that a throw instruction has not been reached, then control passes from the test step 454 to a test step 458 where it is determined if an exit point for the method has been reached. An exit point for the method at the step 458 may be detected by, for example, detecting a return instruction in the byte code. If it is determined at the test step 458 that an exit point for the method has been reached, then control passes from the test step 458 to a step 460 where the exit point is instrumented. Instrumentation of the exit point at the step 460 is described in more detail hereinafter. Following the step 460, control passes back to the step 444 where the next byte code instruction of the method is examined.

If it is determined at the test step 458 that an exit point for the method has not been reached, then control passes from the test step 458 to a test step 462 where it is determined if the byte code instructions that are being examined correspond to a call to another method. If it is determined at the test step 462 that a method call has been reached, then control passes from the test step 462 to a step 464 where the line number of the current method is instrumented. Instrumenting the line number at the step 464 is described in more detail hereinafter. Following the step 464, control passes back to the step 444 where the next instruction is examined. The step 444 is also reached if it is determined at the step 462 that the byte code being examined does not correspond to a method call.

Figure 15:
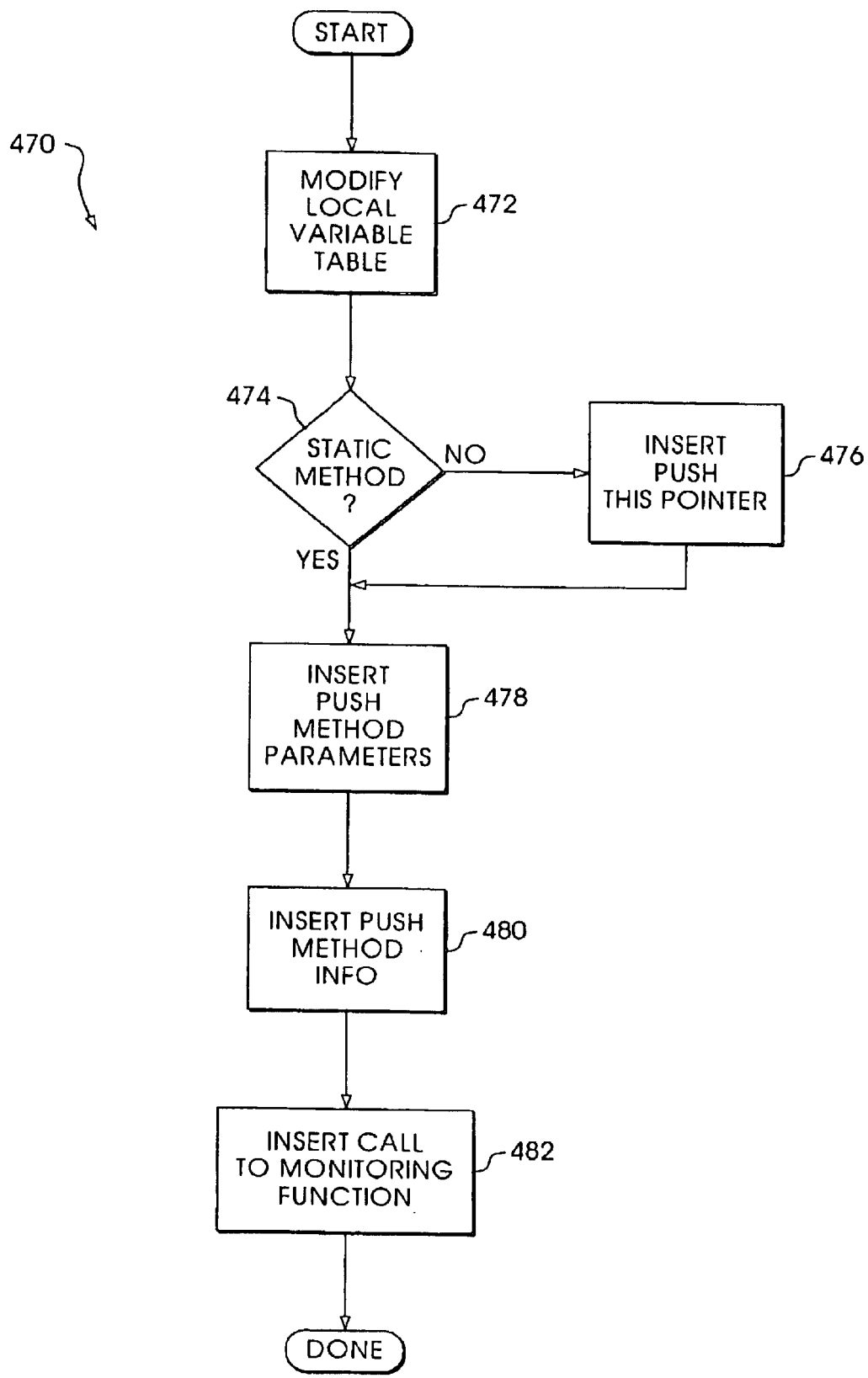
FIG. 15 is a flowchart illustrating in more detail a portion of the flowchart of FIG. 14.

Referring to FIG. 15, a flowchart 470 illustrates in more detail the instrumentation of the method entry step 442 of FIG. 14. Processing begins at a first step 472 where a local line number variable for the method is created in a conventional manner by incrementing max_locals for the function and providing storage space for the local line number variable. The local line number variable is used during instrumentation to keep track of lines of source code that correspond to the byte code and is set during run time to correlate the byte code and the source code line numbers of the method being instrumented. The local line number is also used in connection with other instrumentation that is described elsewhere herein.

Following the step 472 is a test step 474 where it is determined if the method being instrumented is a static method. The indication as to whether or not a method is a static method is provided in the access_flags byte associated with the method. If it is determined at the test step 474 that the method being instrumented is not a static method, then control passes from the step 474 to a step 476 where byte code instructions are inserted to push the this pointer of the non-static method on to the stack. For non-static methods, the this pointer may be used to identify the object on which the method was invoked.

Note that parameters that are passed during instrumentation are passed in a conventional fashion using the stack. Thus, the parameters are pushed on to the stack prior to invocation of the monitoring function being called.

Following the step 476, or following the step 474 if the method being instrumented is a static method, is a step 478 where instructions are inserted to push the method parameters that were passed to the method when the method was invoked. Note that the number and type of parameters passed to the method when the method was invoked may vary. Thus, the instructions that are inserted to push the parameters at the step 478 may similarly vary.

Following the step 478 is a step 480 where the byte code is instrumented by inserting instructions that push method information. In a preferred embodiment, the method information is a record that includes a method identifier, information identifying the number and types of parameters of the method, the local line number, and the type of instrumentation being performed. The same monitoring function may be called for instrumenting enter, exit, and abort. Thus, the type of instrumentation information differentiates among the three types within a generic monitoring function that is called.

Following the step 480 is a step 482 where instructions are inserted to call the monitoring function. The result of the call to the monitoring function that is inserted at the step 482 is described in more detail hereinafter. Following the step 482, processing is complete.

Figure 16:
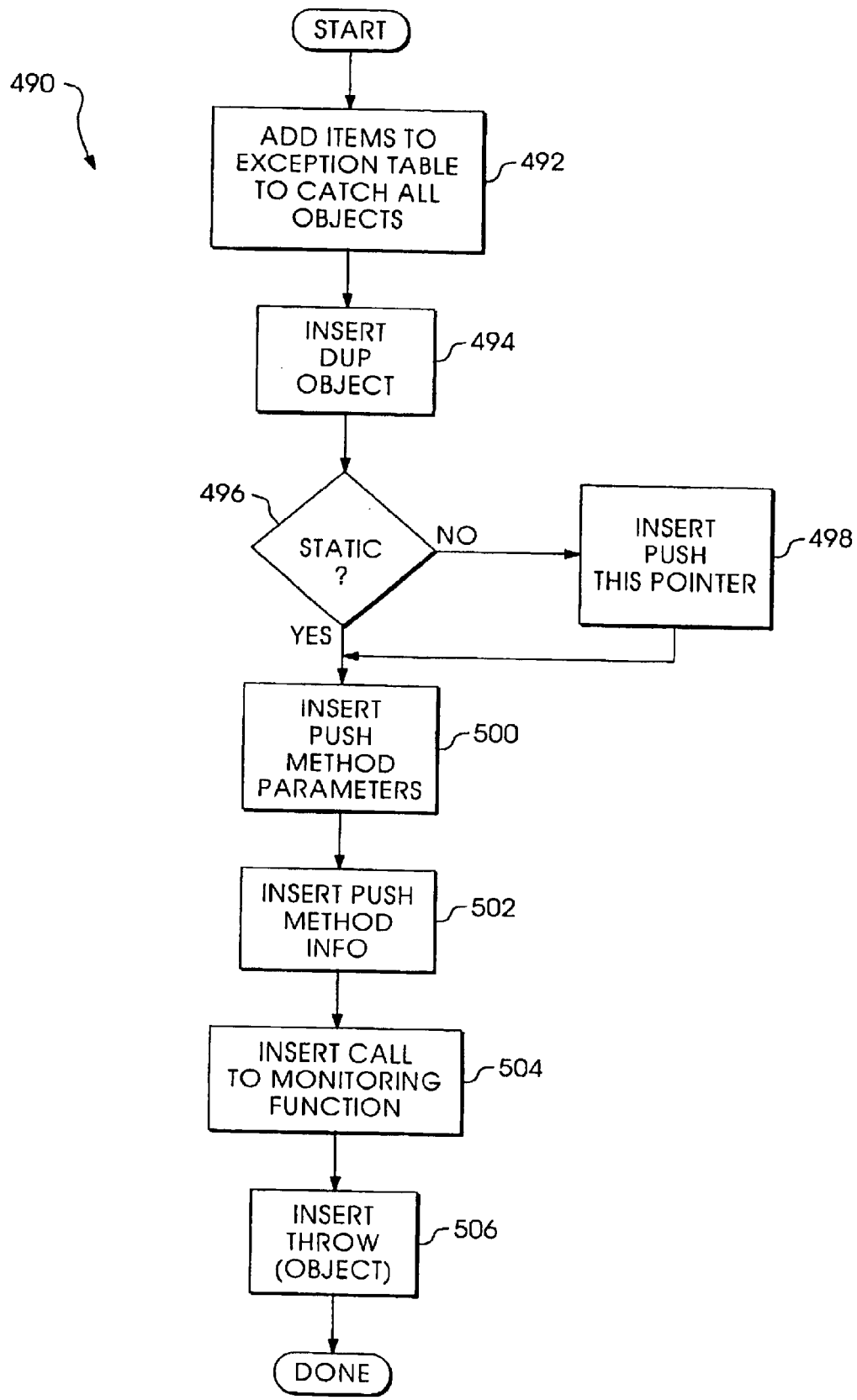
FIG. 16 is a flowchart illustrating in more detail a portion of the flowchart of FIG. 14.

Referring to FIG. 16, a flowchart 490 illustrates in more detail the instrumentation for an abort step 448 from the flowchart of FIG. 14. As discussed above, this instrumentation code is inserted at the end of the method being instrumented.

Processing begins at a first step 492 where the exception table is modified to indicate that the code being added in connection with instrumenting for abort is to be executed whenever an otherwise uncaught exception occurs. Following the step 492 is a step 494 where instructions are inserted to cause the object that is thrown in connection with the exception to be on the stack. Note that, in this instance, it is sufficient to duplicate (DUP) the item at the top of the stack since the thrown object is already at the top of the stack. In a preferred embodiment, both a pointer to the object, and what Microsoft refers to as the object's "hash code" are provided. The hash code is a unique identifier for an object. Use of the unique identifier is described in more detail hereinafter. Note that, unless indicated otherwise, all objects are pushed on to the stack along with the corresponding unique identifier (e.g., the hash code) therefor. For example, in instances where the this pointer is pushed on to the stack, a unique identifier (e.g., the hash code) for the this pointer is also pushed.

Following the step 494 is a test step 496 where it is determined if the method being instrumented is static and a step 498 for pushing the this pointer on to the stack. The steps 496, 498 are similar to the steps 474, 476, described above in connection with FIG. 15. Following either the step 496 or the step 498 is a step 500, which inserts instructions to push the method parameters on to the stack in a manner analogous to that discussed above in connection with the step 478. Following the step 500 is a step 502 that inserts instructions to push the method information on to the stack.

Following step 502 is a step 504 where byte code instructions are inserted to call the monitoring function. Following the step 504 is a step 506 where instructions are inserted to throw the object associated with the abort. Throwing the object in this manner causes execution of the code to be, more or less, the same as it would have been had the exception table not been modified at the step 492. Following step 506, processing is complete.

Figure 17:
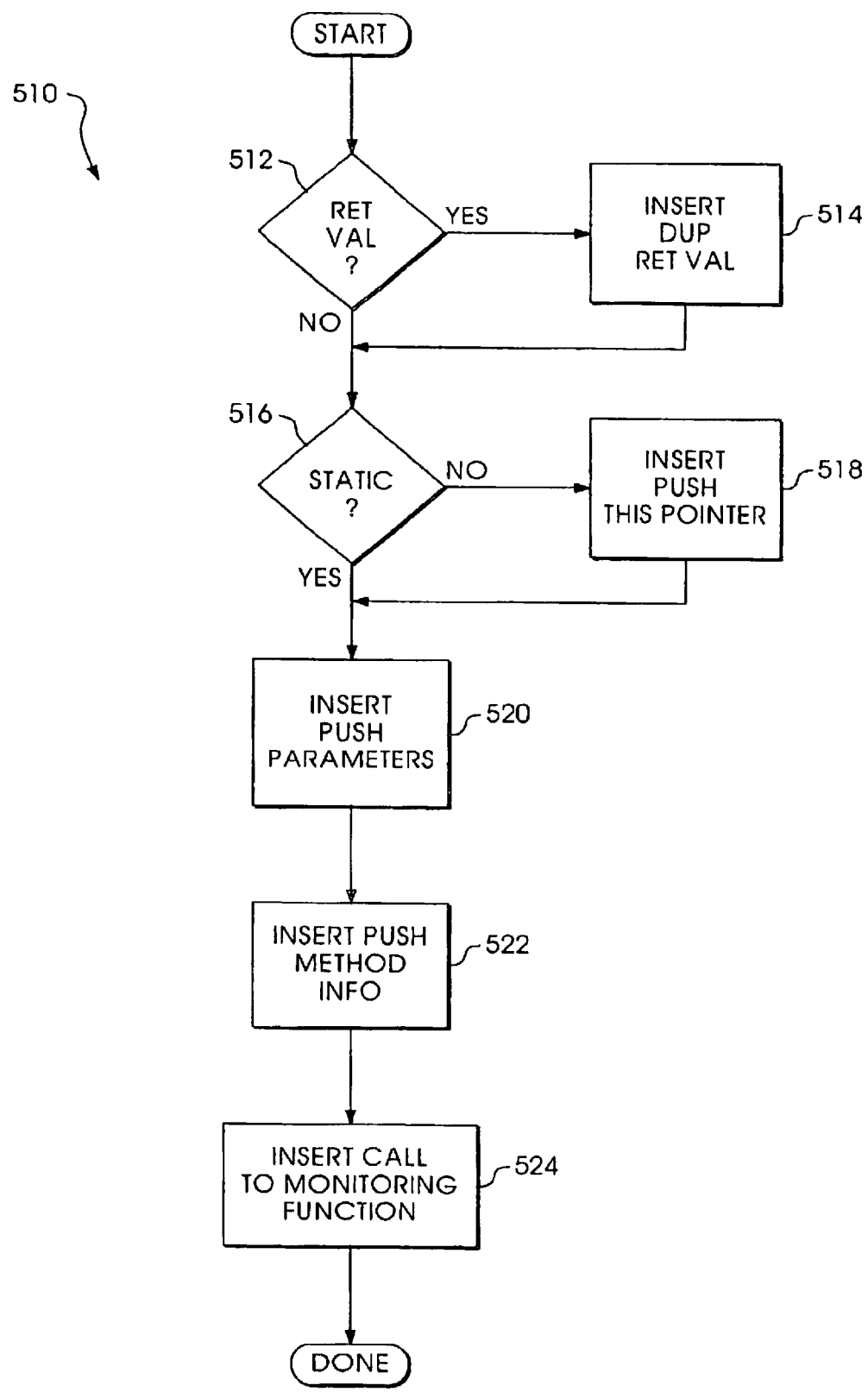
FIG. 17 is a flowchart illustrating in more detail a portion of the flowchart of FIG. 14.

Referring to FIG. 17, a flowchart 510 illustrates in more detail the processing at the step 460 of FIG. 14 where the method exit is instrumented. Processing begins at a test step 512 where it is determined if the method being instrumented has a return value. The determination at the step 512 may be made in a conventional manner by examining the signature of the method, which is retrieved from the constant pool of the class instance that contains the method being instrumented. If it is determined at the test step 512 that the method being instrumented has a return value, then control passes from the test step 512 to a step 514 where instructions are inserted to cause a copy of the return value to be on the top of the stack. In this instance, it is sufficient to duplicate the value at the top of the stack since the return value of the method will already be at the top of the stack.

Following the step 514, or following the step 512 if the method does not have a return value is a test step 516 where it is determined if the method being instrumented is static and a step 518 for pushing the this pointer on to the stack. The steps 516, 518 are similar to the steps 474, 476, described above in connection with FIG. 15. Following step 518, or following the step 516 for static methods, control passes to a step 520 where instructions are inserted to push the method parameters in a manner analogous to that discussed above in connection with other instrumentation. Following the step 520 is a step 522 instruction are inserted to push the method information on to the stack. Following the step 522 is a step 524 where instructions are inserted to call the monitoring function. Following the step 524, processing is complete.

Figure 18:
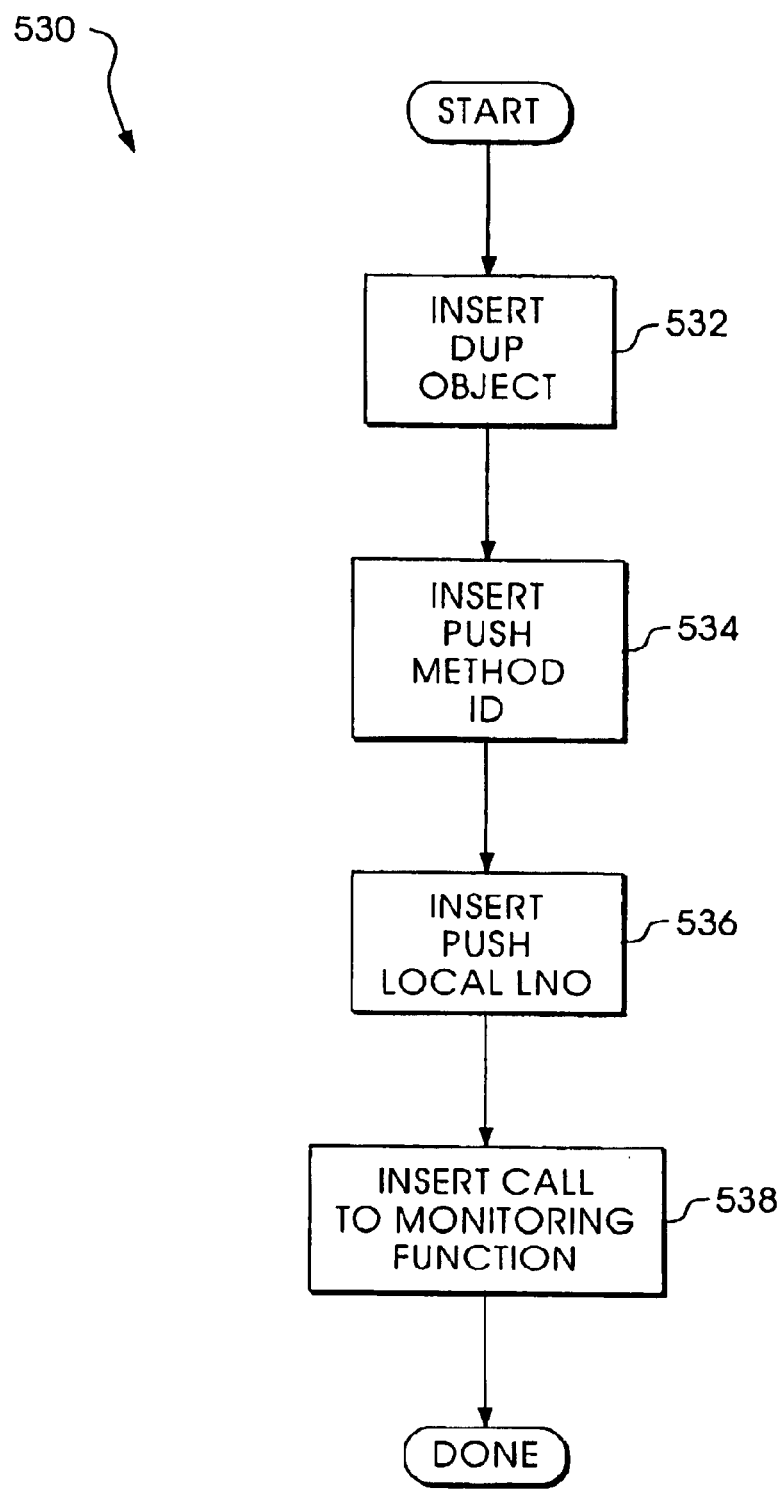
FIG. 18 is a flowchart illustrating in more detail a portion of the flowchart of FIG. 14.

Referring to FIG. 18, a flowchart 530 illustrates in more detail the step 456 of FIG. 14 of instrumenting a throw instruction. Processing begins at a step 532 where instructions are inserted to cause the object being thrown to be on the top of the stack. In this instance, it is sufficient to duplicate the item at the top of the stack, which is the object being thrown. The step 532 is similar to the step 494 of FIG. 16, described above. Following step 532 is a step 534 where instructions are inserted to push the method identifier (not the method information discussed above in connection with FIGS. 15–17). Following step 534 is a step 536 where instructions are inserted to push the line number on to the stack. Following step 536 is a step 538 where instructions are inserted to call the monitoring function. Following step 538, processing is complete.

Figure 19:
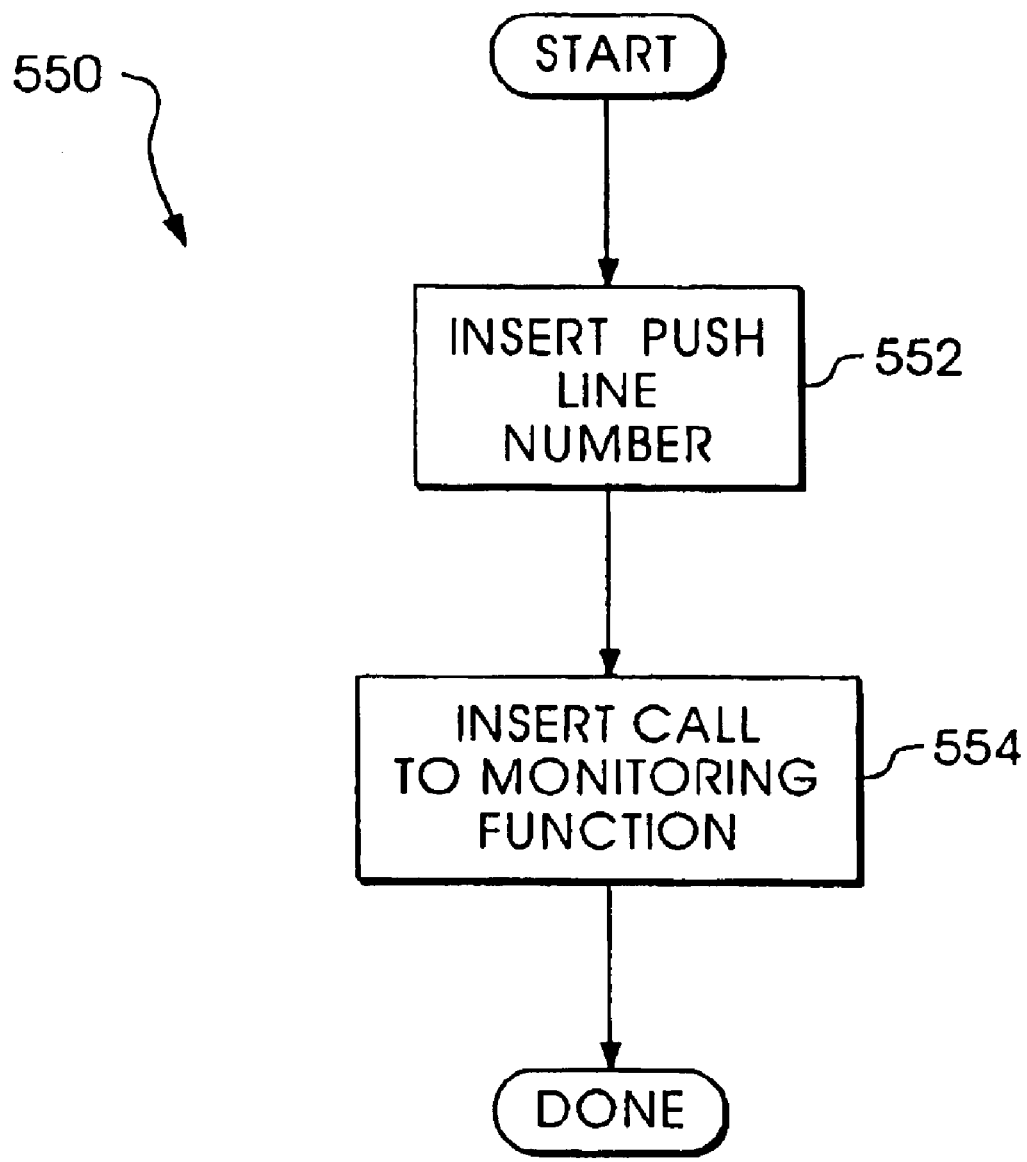
FIG. 19 is a flowchart illustrating in more detail a portion of the flowchart of FIG. 14.

Referring to FIG. 19, a flowchart 550 illustrates in more detail the step 464 of FIG. 14 where the line number is instrumented. Processing begins at a first step 552 where instructions are inserted to push the line number. Following step 552 is a step 554 where instructions are inserted to call the monitoring function. Following the step 554, processing is complete.

Figure 20:
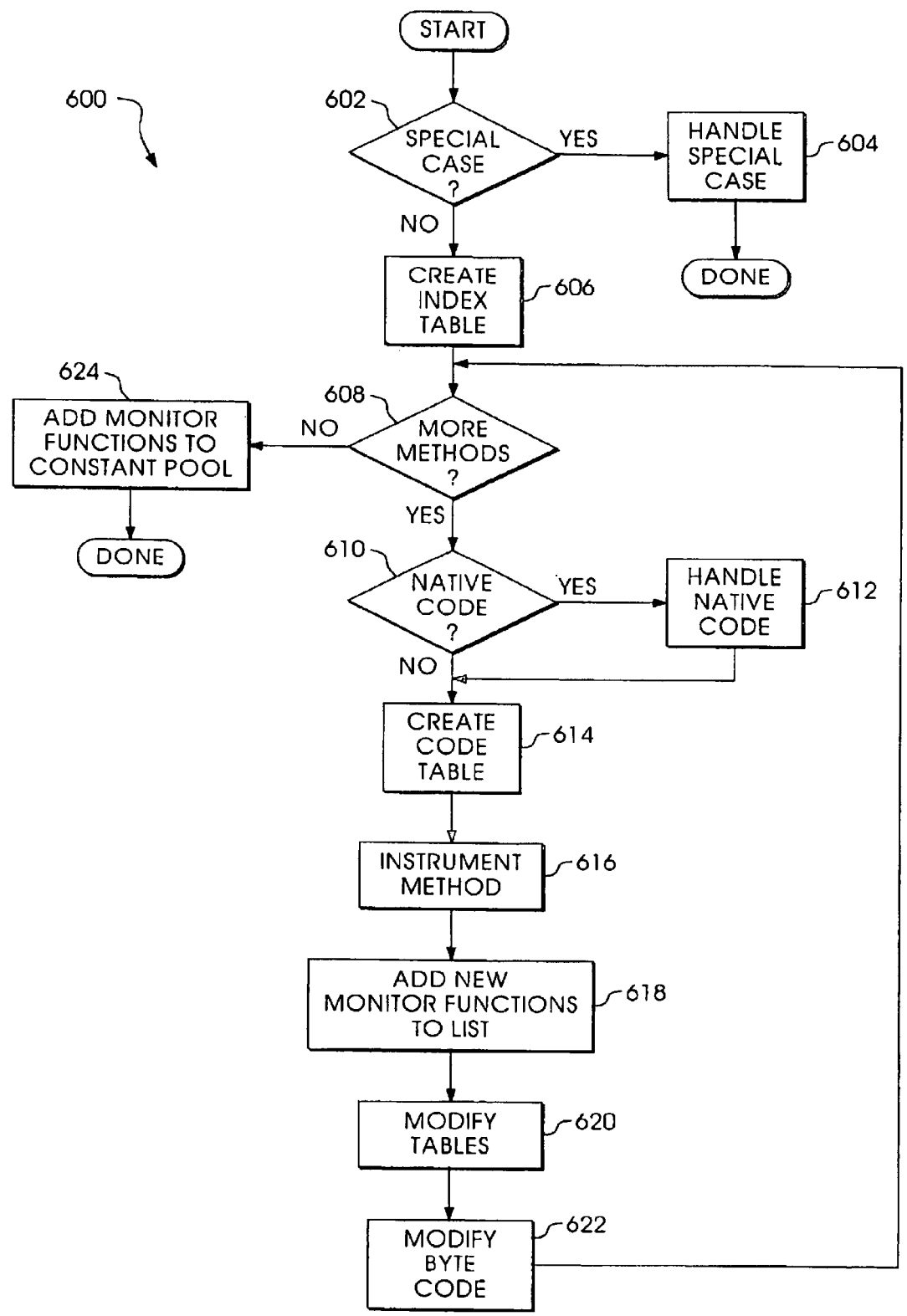
FIG. 20 is a flowchart illustrating instrumenting a class.

Referring to FIG. 20, a flowchart 600 illustrates instrumenting the class 406 of FIG. 12 to provide the instrumented class 412. Processing begins at a test step 602 where it is determined if the class being instrumented is a special class. Special classes are particular classes that either are not instrumented or are instrumented in a special way. Examples include classes containing low level byte code methods provided by the VM vendor where instrumenting the methods would not provide useful information to the user. In most instances, deciding whether to instrument various methods is a design choice based on a variety of functional factors familiar to one of ordinary skill in the art. If the class being instrumented is a special class, control passes from the test step 602 to a step 604 where the special class is handled in a manner described in more detail below. Following the step 604, processing is complete.

If it is determined at the test step 602 that the class being instrumented is not a special class, then control passes from the test step 602 to a step 606 where an index of the class instance is created. The index of the class instance may be a table containing entries indicating the offsets, in the class instance, of various items in the class instance, such as the offsets of each of the methods in the class. The class index is a convenient mechanism that can be used in a conventional manner to assist in providing the functionality described hereinafter.

Following the step 606 is a test step 608, which represents iterating through the methods of the class to instrument each method. If it is determined at the test step 608 that there are more methods to instrument, control passes from the test step 608 to a test step 610 where it is determined if the method being processed is implemented in native code. As discussed above, different VM vendors provide different mechanisms for allowing native code to be called from byte code. In many instances, the interface involves declaring the native method in the source code and providing a specific identifier with the declaration indicating that the executable portion of the native function is provided in a routine external to the resulting byte code.

If it is determined at the test step 610 that the method is implemented in native code (by examining the access_flags in the class), control passes from the step 610 to a step 612 where instrumenting the native code is handled by, for example, adding a byte code wrapper to the method. The wrapper causes the VM (and the instrumentation software) to treat the native method as a conventional byte code method. Processing at the step 612 may include modifying the native attribute of the method to convert the method to a byte code method, creating a new name for the native method and adding the new name as a private native method declaration, and adding byte code instructions to call the native method under the new name. At runtime, part of the initialization of the instrumentation DLL 410 is to patch the operating system's GetProcAddress API (or its equivalent for the particular operating system being used) to intercept calls to the new name and return the address of the native method's code.

Alternatively, a native code method may be handled by first adding the name of the native code method to a special list of pending methods. The GetProcAddress() routine is then patched so that, at runtime, each call from the VM to GetProcAddress() is intercepted to first determine if the called method is on the special list.

The patch uses an assembly code thunk that includes a small amount of assembly code and a class instance (data structure) that lets the patch code get control before the native code routine starts, and also gets control back when the native code routine exits. The class instance may consist of the following, or information that allows derivation of the following:

Hsymbol for the particular method

Signature of the particular method

Pointer to the actual native code routine (presumably in a user-supplied DLL)

The assembly thunk code may put a pointer to the class instance into whichever register the C++ compiler uses for its this pointer, and jump to a common class member function. As is known in the art, the this pointer is a pointer to an address where data for an object is stored. The this pointer is implicitly passed to all non-static class methods as the first parameter to the method. When the compiler sees an unqualified reference to a field in the class that the method being compiled belongs to, the this pointer is used to locate the storage location for the field.

This common class member function will build data structures equivalent to what is described elsewhere herein for the instrumentation of a regular Java method. These structures may be built by interpreting the signature of the method, which is straightforward. The function may call the runtime routine corresponding to method entry. The function may then make a copy of the parameter list, and invoke the actual native code routine. Upon return, it is possible to use the ExceptionOccurredo function (or equivalent, depending upon the VM implementation), to determine if a Java exception was thrown by the actual native function. If not, the function will then call the method exit logic in a manner similar to method entry. If an exception has occurred, the function will call appropriate method abort logic, as described elsewhere herein. Finally, the function will restore the stack and return to the VM.

Following the step 610 or the step 612 is a step 614 where a code table is created. The code table is an array of records that is indexed by the offset in the class instance of each byte code instruction in the uninstrumented class instance. The records contain the new offset of the byte code instructions, which are moved due to insertion of instrumentation instructions. In addition, as described in more detail below, the records of the code Program counter mapping table contain a field indicating the line of source code corresponding to the instrumented byte code.

Following the step 614 is a step 616 where the method is instrumented in a manner described above in connection with FIGS. 14–19. Note that part of the instrumentation process includes modifying the byte code to add calls to the monitoring functions. The native declarations for the monitoring functions are provided in a separate class which is not instrumented, and thus is one of the special classes discussed above in connection with the steps 602, 604. The code for the monitoring functions is provided in the monitoring DLL 414 shown in FIG. 12. Operation of the monitoring DLL 414 is described in more detail hereinafter.

Note also that some VM's are type sensitive with respect to method parameters. Thus, selection of a particular monitoring function may depend, in part, on the number and type of method parameters that are passed to the monitoring function. Thus, one monitoring function may be used to instrument the entry point of a method that is passed two objects while a different monitoring function may be used to instrument the entry point of a method that is passed two integers.

As an alternative, it may be possible to create and insert calls to monitoring functions that are designated as private native functions. Then, each of the created functions may be intercepted by patching, in any one of a variety of conventional manners, the API GetProcAddress() (or its equivalent) to detect when the VM obtains an address for one of the created functions. This alternative technique eliminates the need to have a separate class for the monitoring functions.

Following the step 616 is a step 618 where names and signatures (types) of the monitoring functions that are added to the method in connection with instrumenting the method are added to a list. As described in more detail below, the list is used to modify the constant pool of the class after all of the methods have been instrumented.

Following the step 618 is a step 620 where various tables are modified as a result of the instrumentation. At the step 620, the code table, created at the step 614, is modified to reflect the new offsets of the instrumented byte code. The offsets change because of the instrumentation byte code that is inserted. The code table is used in a manner described below to modify the instrumented byte code to update any control flow instructions that become invalid because of the change in the offsets. The line number table is also modified at the step 620. As discussed above, the line number table correlates source code line numbers with byte code offsets. Since instrumentation modifies the byte code offsets, then the line number table requires modification at the step 620 to reflect the offset change. The class exception table is also modified at the step 620. The exception table is updated to reflect the new byte code offsets in a manner similar to modification of the line number table.

Following the step 620 is a step 622 where the byte code is modified to update branch instructions to reflect the new offsets of the instrumented byte code. This may be performed using the code table, discussed above in connection with the steps 614, 620. Control flows from the step 622 back to the step 608 to instrument the next method.

If it is determined at the step 608 that there are no more methods to instrument, control passes from the step 608 to a step 624 where the monitoring functions are added to the constant pool of the class. The constant pool contains information about all of the methods that are called from methods within the class being instrumented. Thus, when the methods are instrumented by adding calls to the monitoring functions, information about the monitoring functions is added to the constant pool, which is performed in a conventional fashion at the step 624.

Figure 21:
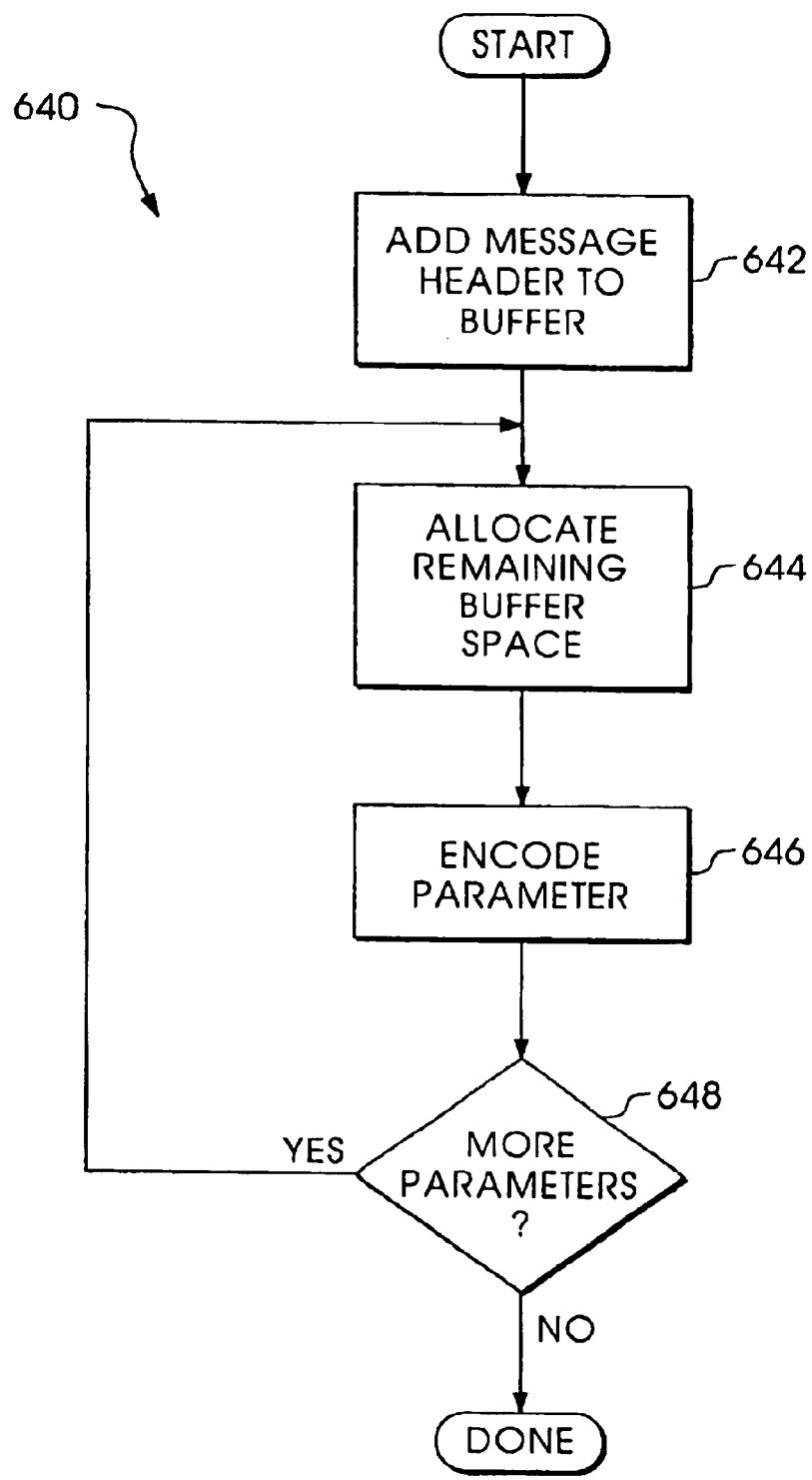
FIG. 21 is a flowchart illustrating passing data collected by instrumentation.

Referring to FIG. 21, a flowchart 640 illustrates in more detail steps performed by the monitoring DLL 414 in connection with providing data to the analyzer/viewers 416 and/or the message data storage 417 via the message stream therebetween. As discussed above, the monitoring DLL 414 may be implemented as native code that is called via the monitoring function calls that are inserted into the instrumented class 412 by the instrumentation DLL 410.

Note that much of the processing of the monitoring DLL 414 may be performed by having the monitoring DLL 414 call byte code functions that are being handled by the VM run-time module 404. For example, it may be useful to call various byte code functions that provide additional information about array elements or object fields. The names and parameters of these functions may vary depending on the VM vendor. Thus, the discussion that follows does not identify the particular functions called to perform the operations and tests described herein. However, one of ordinary skill in the art will recognize where these function calls belong in connection to the description that follows.

Processing begins at a first-step 642 where a message header is added to a buffer that contains data transmitted via the message stream. The information that is passed from the monitoring DLL 414 to the analyzer/viewers 416 and/or the message data storage 417 may be passed using a fixed-length buffer having, in a preferred embodiment, 2100 bytes. Thus, all of the parameter information from the monitoring function calls is added to the 2100 bytes in a manner described in more detail below.

Following step 642 is a step 644 where the remaining space of the buffer is allocated among the parameters of the monitoring function that is called. This is done by simply dividing the number of bytes left in the buffer by the number of parameters that remain to be sent. For example, if there are 2,000 bytes left in the buffer, and if there are 5 parameters, then each parameter is allocated 400 bytes. As discussed in more detail below, this allocation may change depending on how many bytes each parameter actually uses as it is provided to the message buffer.

Following step 644 is a step 646 where each parameter is encoded. The encode parameter step 646 is described in more detail hereinafter. However, generally, the step 646 represents placing the parameter information into the buffer.

Following the step 646 is a test step 648 where it is determined if there are more parameters to be encoded and placed in the buffer. If not, then processing is complete. Otherwise, control passes from the step 648 back to the step 644 where the remaining buffer space is allocated among the remaining parameters. Note that it is possible that the amount of space allocated per parameter will increase as parameters are placed into the message buffer. This occurs because, if a parameter uses less than the allocated space, then, at the step 644, the allocated buffer space that was not used by the previous parameter is added to the buffer space for the other parameters. For example, assume that initially a function call has 5 parameters and there are 2,000 bytes at the step 644 when the first parameter is processed. If the first parameter only uses 100 bytes, then, for the next iteration, at the step 644 there will be 4 parameters and 1900 bytes. Thus, for the next iteration, each parameter is allocated 475 bytes. Note also that it is possible that all of the parameters do not use all of the buffer space.

Figure 22:
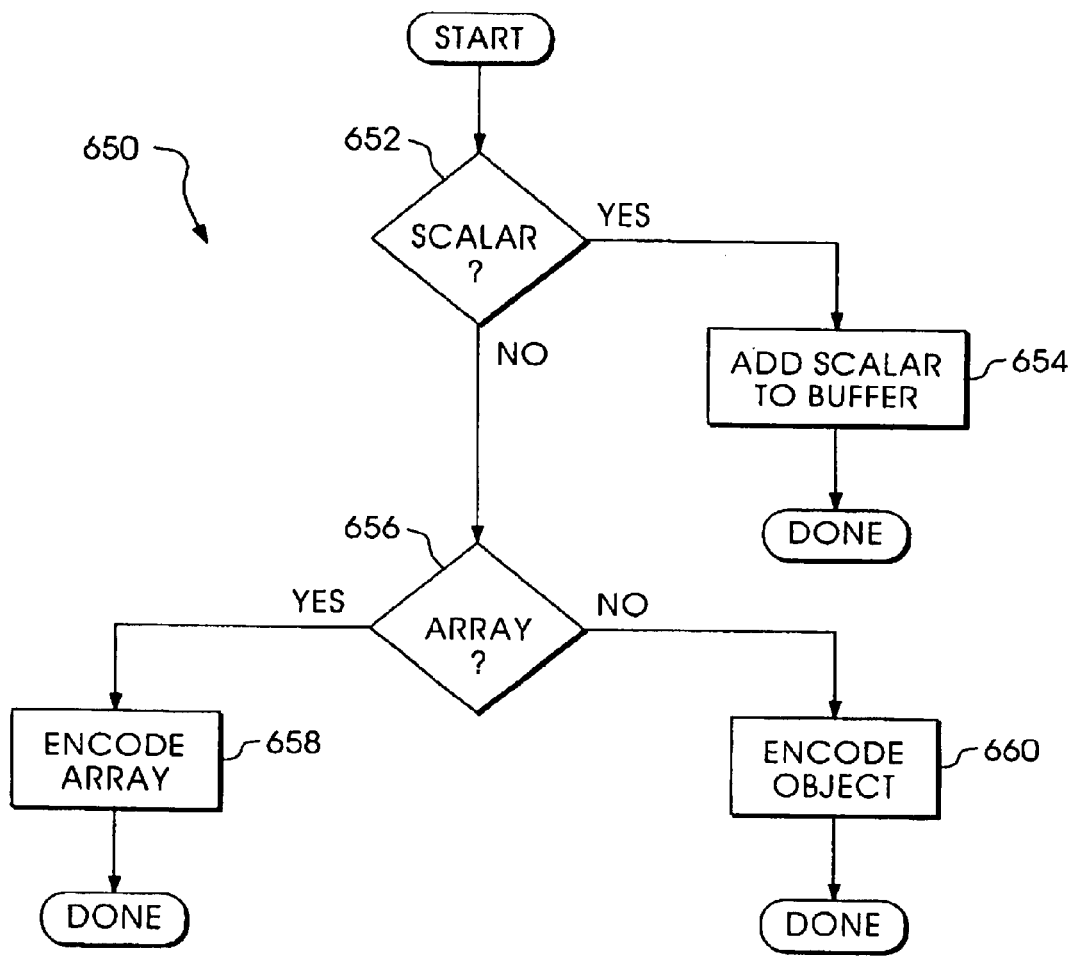
FIG. 22 is a flowchart illustrating in more detail a portion of the flowchart of FIG. 21.

Referring to FIG. 22, a flowchart 650 illustrates in more detail the step 646 of FIG. 21 where each parameter is encoded and placed onto the buffer. Processing begins at a first step step 652 where it is determined if the parameter is a scalar (i.e., an integer, a character, a boolean, etc.). If it is determined at the test step 652 that the parameter is a scalar, then control passes from the step 652 to a step 654 where the scalar is added to the buffer by simply placing a number of bytes corresponding to the scalar onto the message buffer. Following step 654, processing is complete and the parameter has been encoded.

If it is determined at the test step 652 that the parameter is not a scalar, control passes from the test step 652 to a test step 656 where it is determined if the parameter is an array. If so, then control passes from the step 656 to a step 658 where the array is encoded. Encoding the array onto the message buffer at the step 658 is described in more detail hereinafter. Following the step 658, processing is complete.

If it is determined at the test step 656 that the parameter is not an array, control passes from the test step 656 to a step 660 where the parameter (which, by default, is an object) is encoded. Encoding the object parameter at the step 660 is described in more detail hereinafter. Following the step 660, processing is complete.

Figure 23:
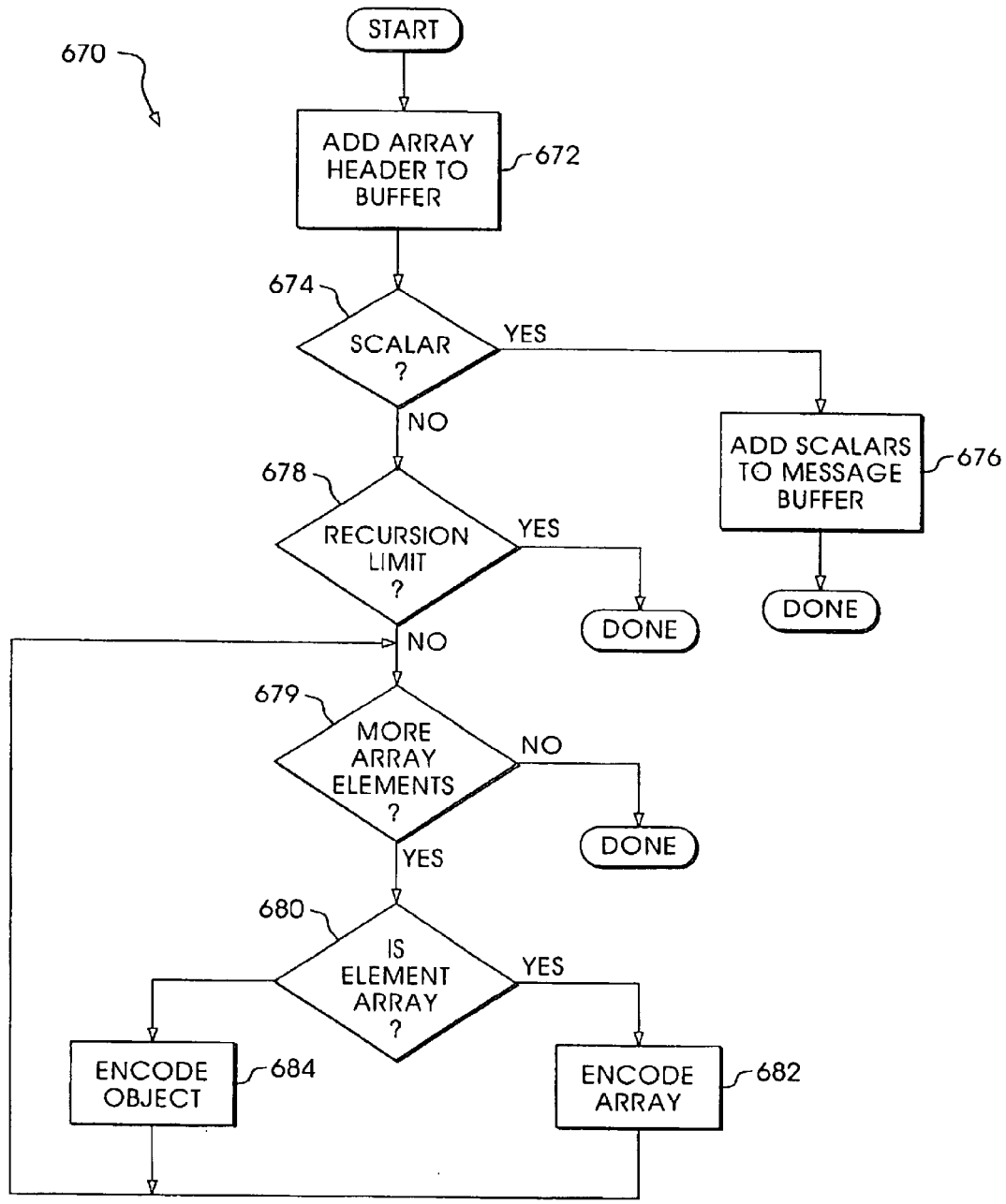
FIG. 23 is a flowchart illustrating in more detail a portion of the flowchart of FIG. 22.

Referring to FIG. 23, a flowchart 670 illustrates in more detail the array encoding step 658 of FIG. 22. Processing begins at a first step 672 where header information for the array is added to the message buffer. Following step 672 is a test step 674 where it is determined if the array is an array of scalars. If so, then control passes from the step 674 to a step 676 where the values of each of the scalar elements is added to the message buffer. Note that, at the step 676, the number of scalar values that are added to the message buffer may be limited according to the amount of message buffer space allocated for the array parameter. Thus, if each scalar element of the array uses, for example, four bytes, and there are one hundred bytes set aside in the message buffer for the array parameter, then the first twenty five array elements will be placed in the message buffer at the step 676. If there are less than twenty five array elements, then all of the array elements are placed in the message buffer.

If it is determined at the test step 674 that the array elements are not scalars, then control passes from the step 674 to a test step 678 where it is determined if the recursion limit has been reached. As discussed in detail below, arrays of arrays and arrays of objects are placed into the message buffer using recursion. However, it is desirable to limit the depth of the recursion to, for example, three. Thus, it is determined at the test step 678 if the recursion limit has been reached and, if so, then processing is complete.

If it is determined at the test step 678 that the recursion limit has not been reached, then control passes from the test step 678 to a test step 679 where it is determined if there are any remaining array elements in the array that have not been processed. If there are no more array elements, then processing is complete. Otherwise, control passes from the test step 679 to a test step 680 where it is determined if the current array element is, itself, an array. If so, then control passes from the test step 680 to a step 682 where the array encoding routine shown in FIG. 23 is recursively called for the array element. Following the step 682, control passes back to the step 679 to process the next array element.

If it is determined at the step 680 that the element being processed is not an array, then, control passes from the step 680 to a step 684 where an encode object routine is called for each element of the array. Note that it cannot be assumed that an array of objects will consist of elements that are objects, because, in some byte code languages (such as Java), an array can be stored in a field or array element that is declared as being an object. Therefore, the runtime check at the step 680 is useful. Following the step 684, control passes back to the step 679 to process the next array element.

Figure 24:
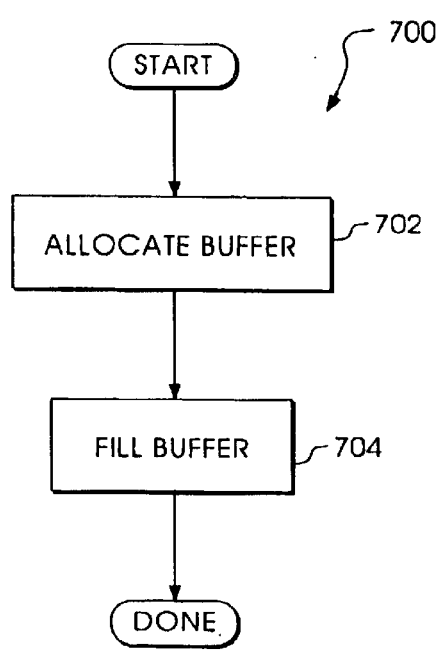
FIG. 24 is a flowchart illustrating in more detail a portion of the flowchart of FIG. 22.

Referring to FIG. 24, a flowchart 700 illustrates adding an object to the message buffer. At a first step 702, the buffer space is allocated for the fields of the object (scalars and headers of array and object subfields) as well as for some of the data in the array and object subfields, as described below. At the allocation step 702, the data that will be placed into the buffer is marked for later copying into the message buffer. Following the step 702 is a step 704 where the message buffer is filled according to the data that is marked at the step 702. The steps 702, 704 are described in more detail hereinafter.

Figure 25:
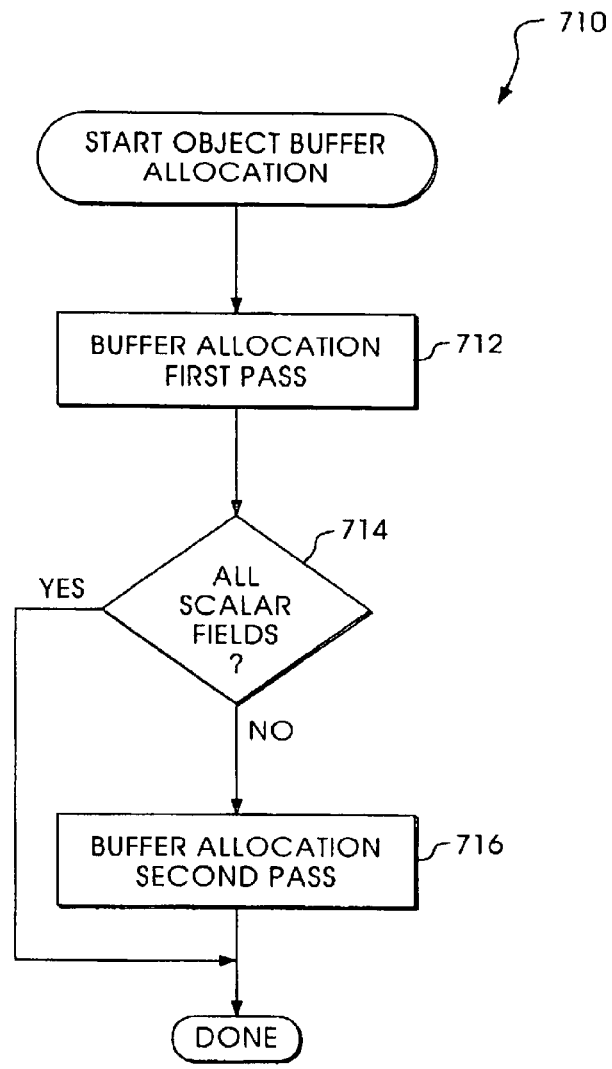
FIG. 25 is a flowchart illustrating in more detail a portion of the flowchart of FIG. 24.

Referring to FIG. 25, a flowchart 710 illustrates the allocate buffer step 702 of FIG. 24. Processing begins at a first step 712 where a first pass of buffer allocation takes place. The first pass of buffer allocation at the step 712 is described in more detail hereinafter.

Following the step 712 is a test step 714 where it is determined whether all of the fields of the object are scalars. If so, then processing is complete. Otherwise, control passes from the test step 714 to a step 716 where a second pass of buffer allocation is performed. The second pass of buffer allocation at step 716 is described in more detail hereinafter.

Figure 26:
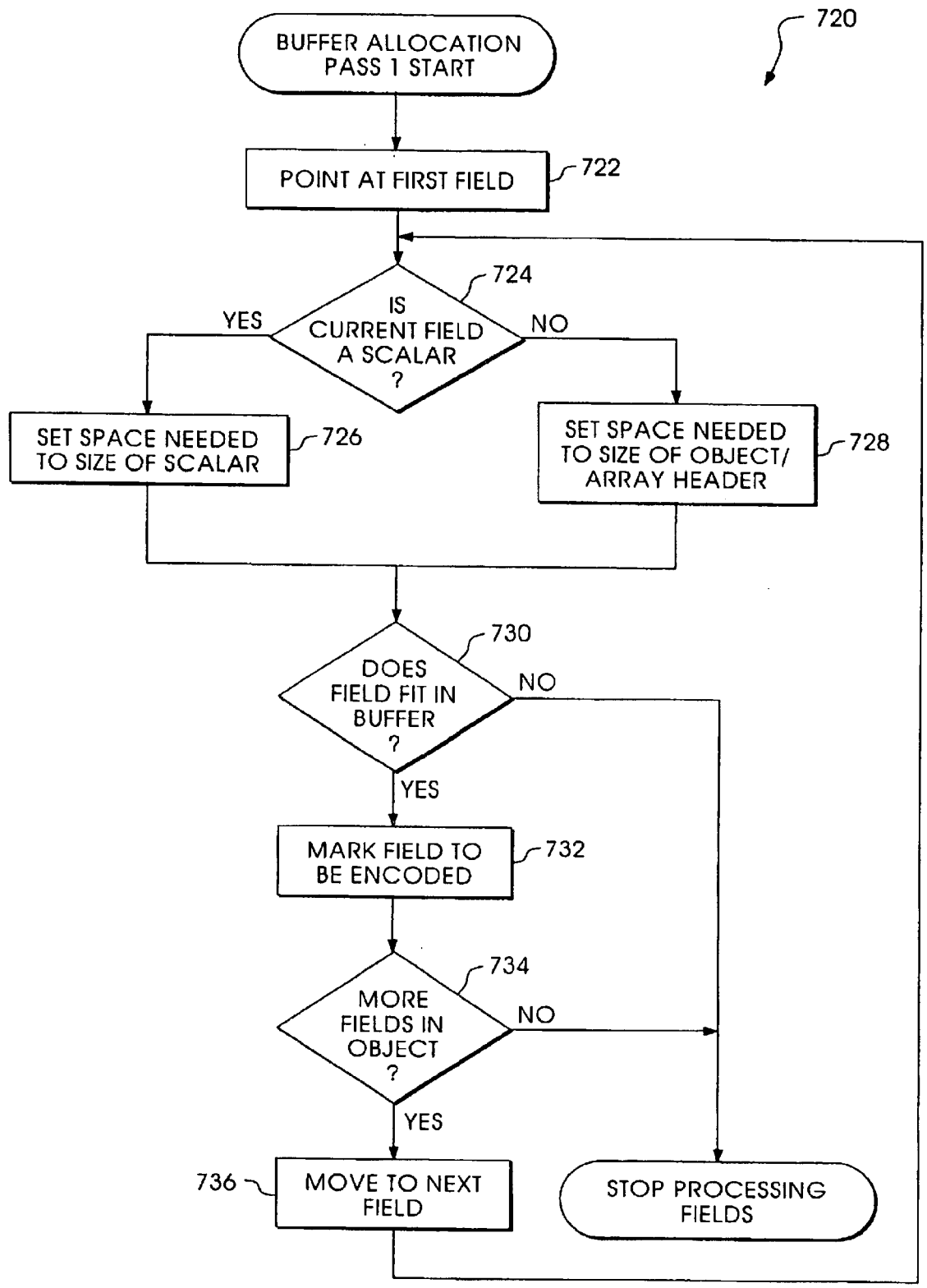
FIG. 26 is a flowchart illustrating in more detail a portion of the flowchart of FIG. 25.

Referring to FIG. 26, a flowchart 720 illustrates the first pass of buffer allocation at the step 712 of FIG. 25. Processing begins at a first step 722 where a pointer is set to point to the first field of the object. Following step 722 is a test step 724 which determines if the current field (i.e., the field that is pointed to by the pointer) is a scalar. If so, then control passes from the test step 724 to a step 726 where the space needed for the size of the scalar is determined. Alternatively, if it is determined at the step 724 that the current field is not a scalar, then control passes from the test step 724 to a step 728 where the space needed for an object header or array header (as appropriate) is reserved.

Following either the step 726 or the 728 is a test step 730 which determines if the amount of space allocated at one of the steps 726, 728 will fit in (i.e., be less than) the remaining space of the message buffer. If not, then processing for the first pass is complete. Otherwise, control passes from the test step 730 to a step 732 where the field that is being processed is marked to be placed in the buffer. Following the step 732 is a test step 734 which determines if there are more fields in the object to be processed. If not, then processing for the first allocation pass is complete. Otherwise, control passes from the test step 734 to a step 736 where the pointer is set to point at the next field of the object. Following the step 736, control passes back to the test step 724, discussed above.

Figure 27:
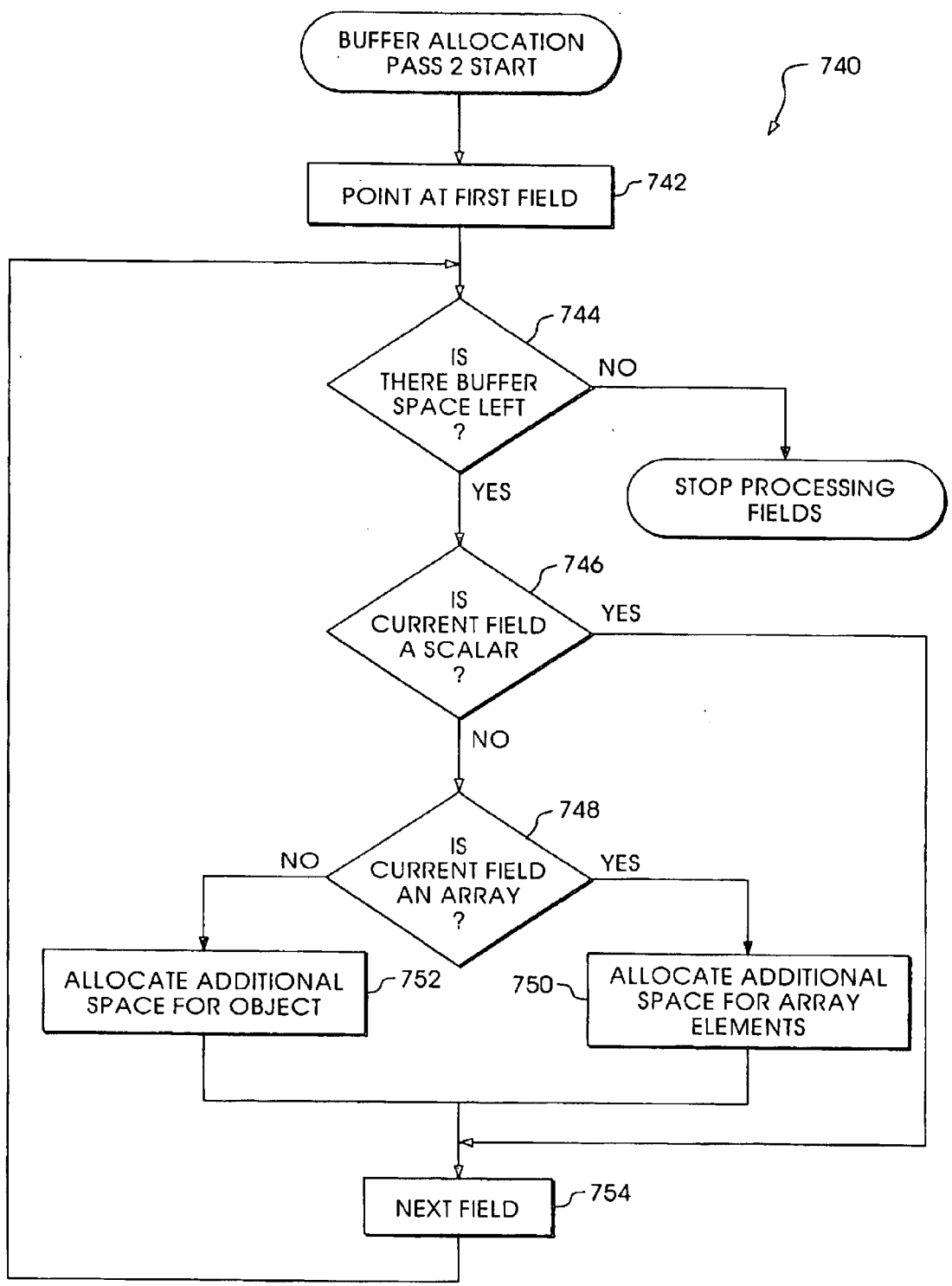
FIG. 27 is a flowchart illustrating in more detail a portion of the flowchart of FIG. 25.

Referring to FIG. 27, a flowchart 740 illustrates the second pass of buffer allocation at the step 716 of FIG. 25. Processing begins at a first step 742 where a pointer is set to point to the first field of the object. Following the step 742 is the test step 744 which determines if there is space left in the buffer. If not, then processing is complete. Otherwise, control passes from the test step 744 to a test step 746 which determines if the current field (i.e., the field that is pointed to by the pointer) is a scalar. If not, then control passes from the test step 746 to a test step 748 which determines if the field being pointed to is an array.

If it is determined at the test step 748 that the field being pointed to is an array, then control passes from the step 748 to a step 750 where additional space for the array is allocated. Allocating additional space for the array at the step 750 may include, for example, allocating enough space to store the values of each element of the array.

If it is determined at the test step 748 that the current field is not an array, then control passes from the step 748 to the step 752 where additional space for an object is allocated. Note that the step 752 is reached if the field being pointed to is an object because of the combination of the test steps 746, 748 causes the control to flow elsewhere if the field being pointed to is either a scalar or an array. At the step 752, the object allocation routine of FIG. 25 is called. That is, the step 752 represents a recursive call to the space allocation routine illustrated by the flowchart 710 of FIG. 25. Following either the step 750 or the step 752 is a step 754 where the pointer is incremented to point to the next field. Note that the step 754 is also reached if it is determined at the test step 746 that the field being pointed to is a scalar. This is because, if the field is a scalar, there is no additional processing needed for the field in the second pass since all of the space for the scalar was allocated at the step 726 of FIG. 26. Following step 754, control passes back to the step 744 to process the next field.

Figure 28:
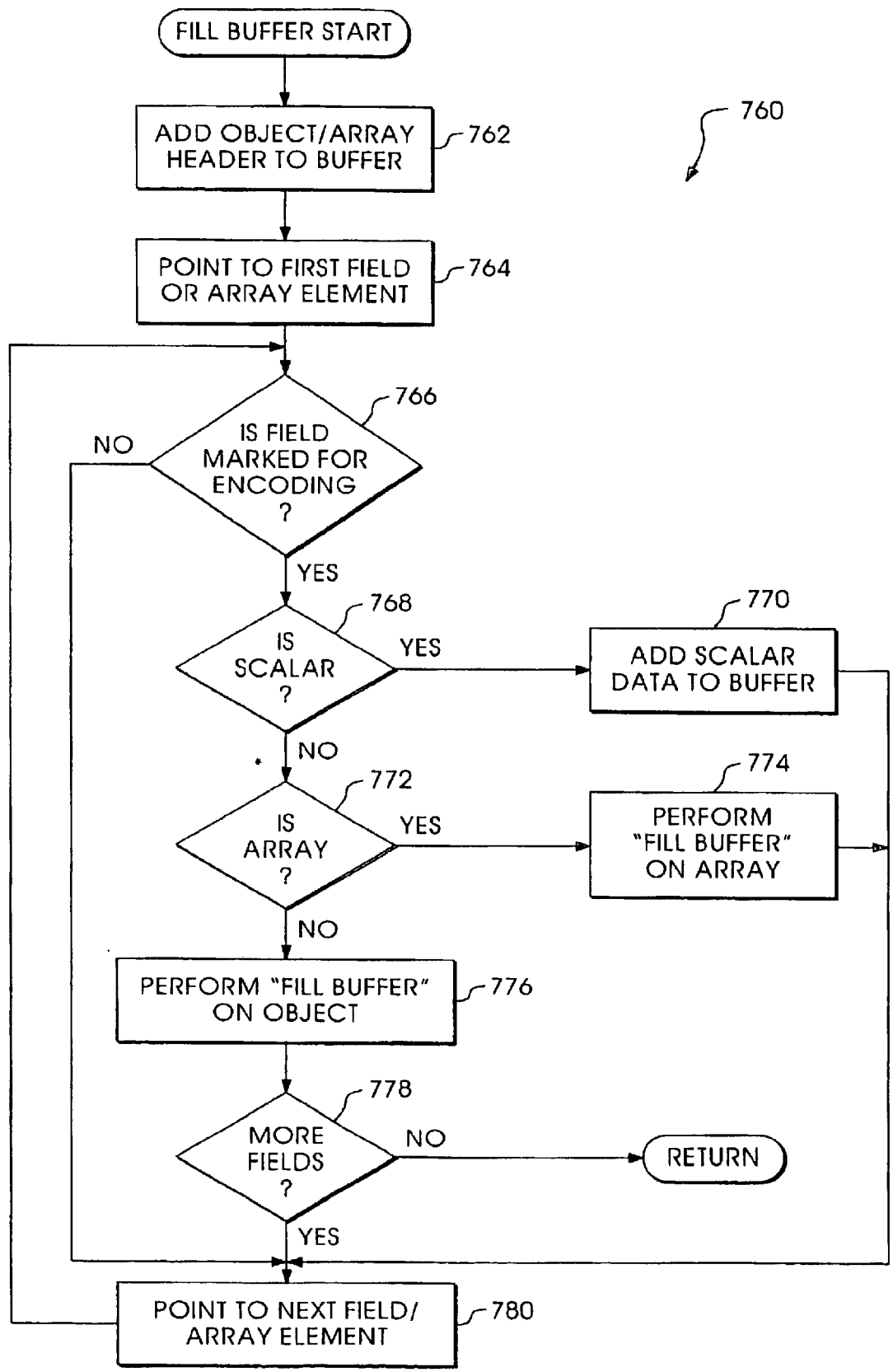
FIG. 28 is a flowchart illustrating in more detail a portion of the flowchart of FIG. 24.

Referring to FIG. 28, a flowchart 760 illustrates the fill buffer step 704 of FIG. 24. Processing begins at a first step 762 where the object/array header is added to the message buffer. Following the step 762 is a step 764 where a pointer is set to point to the first field or array element. Following the step 764 is a test step 766 where it is determined if the field being pointed to is marked for encoding. If so, then control passes from the step 766 to a step 768 where it is determined if the field being pointed to is a scalar.

If it is determined at the test step 768 that the field being pointed to is a scalar, then control passes from the step 768 to a step 770 where the scalar is added to the buffer. If it is determined at the test step 768 that the field being pointed to is not a scalar, then control passes from the test step 768 to a test step 772 where it is determined if the field being pointed to is an array. If so, then control passes from the test step 772 to a step 774 where the fill buffer routine, illustrated by the flowcharts 760 is recursively called for the array element.

If it is determined at the test step 772 that the current pointer does not point to an array, then control passes from the test step 772 to a step 776 where the fill buffer routine is performed on the object that the pointer points to. Note that, the step 776 is reached only if the field being pointed to is an object. Following the step 776 is a test step 778 which determines if there are more fields to be processed. If not, then processing is complete. Otherwise, control passes from the test step 778 to a step 780 where the pointer is set to point to the next field. Note that the step 780 is also reached if it is determined at the test step 776 that the field being processed is not marked for encoding. The step 780 is also reached after the steps 770, 774. Following the step 780, processing loops back to the test step 766 in order to process the next field.

Note that the data that is passed via the message stream may be viewed and/or additionally processed in any one of a variety of conventional fashions, including using an appropriate graphical user interface to display various parameters, function calls, and other values that are passed via instrumentation. It is also possible to first store all of the passed data in the message data storage 417 and then display the data at a later time using either the analyzers/viewers 416 or other appropriate software. Another possibility is to simply display, using conventional text display and/or printing, alphanumerical values corresponding to the data stream.

It is also noted that the description of what is instrumented, set forth above, may be appropriate for debugging byte code. Instrumenting in a slightly different fashion may be appropriate when, for example, performance and/or code coverage measurements are being performed. In that case, as each class is opened for instrumentation, each class and methods therefore may be registered with the runtime instrumentation code. In the registration, information such as the name of the class, name of the methods, and the line numbers of each method, may recorded.

In the case of performance measurement, the instrumentation inserts a call to a runtime function that determines a current timestamp and that is associated with a corresponding line number. Then the timestamp for the previous line number is subtracted from the current timestamp. Hence, it is possible to calculate a duration value for each line.

In the case of instrumenting for code coverage, the instrumentation code and the runtime code may work together in a conventional fashion to denote each line in the program as being in one of three states: Non-executable, executable but not executed, and executed. To accomplish this, a call to a special runtime function is inserted in the prolog of each function. The special runtime function, among other things, uses the registered information for this method, to record each line number in the instrumented function. Then, a call to another runtime function is inserted for each line. The other runtime function indicates that the program source line corresponding thereto has been executed. As the instrumented program executes, each executable line is marked as actually executed. Hence, after the conclusion of the program, the executable line numbers that are not marked as executed are marked as executable but not executed. All other non-executed lines of the method are marked as non-executable. Using this technique, coverage information by class, by method, and by line, is collected.

Just described is a technique for instrumenting code. Now, what will be described is an embodiment which makes use of the foregoing and other code instrumentation techniques.

Figure 29:
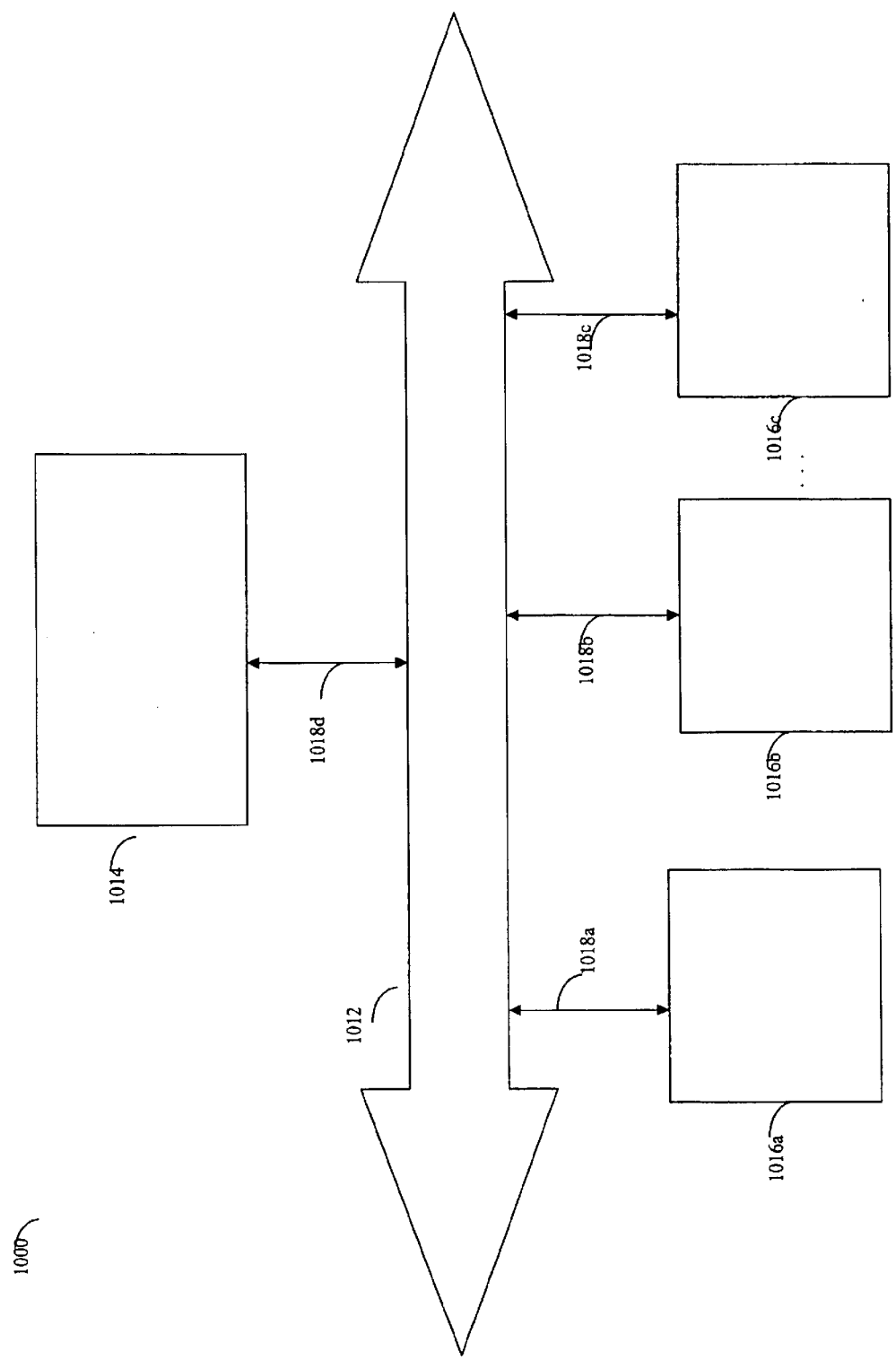
FIG. 29 is an example of an embodiment of a computer system.

Referring now to FIG. 29, shown is an example of an embodiment of a computer system. The computer system 1000 includes a server system 1014 connected to a network 1012 by network connection 1018d. Also included in this embodiment of a computer system 1000 are N client systems 1016a, 1016b, and 1016c connected to the network 12, respectively, by N network connections 1018a, 1018b and 1018c.

Additionally, it should be noted that in the particular embodiment described herein, the network 1012 may be the Internet. Other embodiments may include other kinds of networks, such as an intranet, or any one of a variety of other network or communication connections known to those skilled in the art. The server 1014 and the client system 1016a maybe any one of the variety of computer processors. For example, in one embodiment, each of the client systems 1016a, 1016b and 1016c may be personal computers connected to the Internet 1012 through a dial up modem using services provided by an Internet Service Provider (ISP). The Internet connections 1018a, 1018b, and 1018c may be any one of a variety of network connections as may be provided and supported in accordance with the type of network 1012. The processors 1016a, 1016b and 1016c may be any one of the variety of commercially available personal computers such as an Intel-based processor. The server node 1014 may be any one of a variety of commercially available processors able to support incoming traffic as will be described herein.

It should be noted that the particulars of hardware and software included in each of the client and server nodes of an embodiment of the computer system 1000 may vary with each particular application as well as the number and type of users in a system. For example, in one embodiment, the client and server hardware may be the Intel Pentium 2000 processor running MS Windows or Windows NT software. Other embodiments may include other client and server hardware that is a 32-bit processor with supporting 32-bit Windows operating system software.

Figure 30:
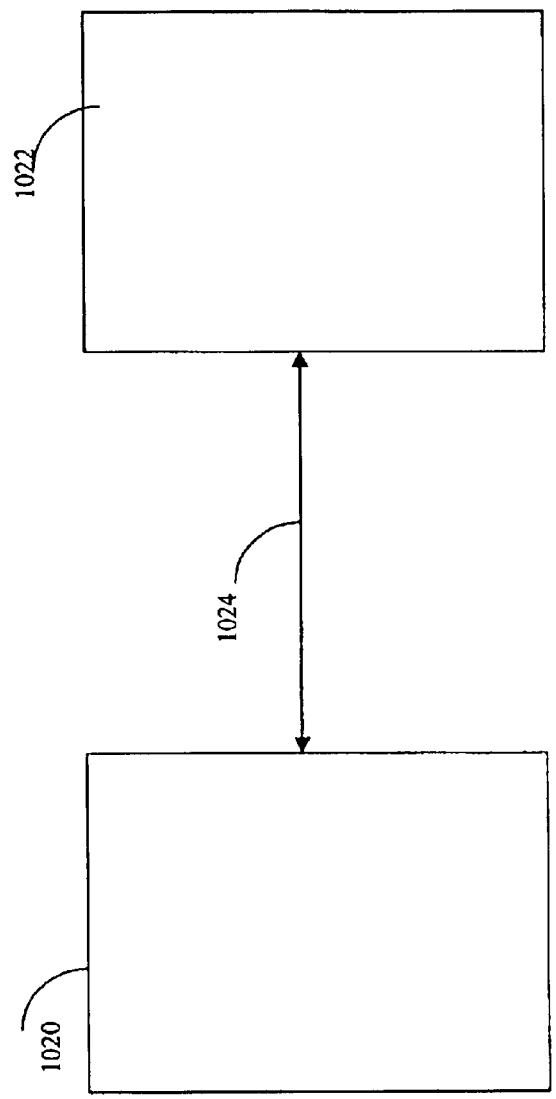
FIG. 30 is an example of an embodiment of software that may reside in a client system and a server system.

Referring now to FIG. 30, shown is an example of an embodiment of software that may reside in a client system and a server system. In particular, the software 1020 may be software that executes in a client system for example such as in systems 1016a–1016c. The software 1022 may be an example of software that may execute in a server system, for example, such as server system 1014. The client and server application may communicate through communication means 1024. The communication means may be a communication channel for interprocess communication as may be used to coordinate different activities of the client software 1020 and the server software 1022. The communication means 1024 may include software which provides for interprocess communication, as will be explained in more detail in paragraphs that follow, for client-server communication in the computer system 1000.

As described herein, techniques may be used to gather execution information about an application, such as a distributed application. The techniques described herein should not be construed as being limited to a distributed application or a client-server application, but may be used in connection with gathering information about an application in general, such as related to different processes and different threads executing in connection with the single application, for example, on different processors or different computer systems.

A distributed software application that executes in the system 1000 may include a portion of the software 1020 and also a portion of the software 1022 collectively. Thus, gathering information regarding the performance of the distributed software application may include gathering performance and other execution information about portions of the software 1020 and 1022 collectively. The interprocess communication mechanism 1024 may be an existing communication mechanism, for example, used in existing client-server communication.

Information may be obtained about an executing application by monitoring program execution. This execution information may describe various behavioral aspects of a program that may be useful. Execution information as may used in embodiments described herein may include, for example, automatic error detection data as may be obtained in connection with Numega BoundsChecker, performance profiling data as may be obtained in connection with Numega TrueTime, coverage data as may be obtained in connection with Numega TrueCoverage, and memory analysis and memory profiling data. Execution information may be used, for example, in improving program reliability and performance. It may also be used for dynamic verification and an understanding of the execution behavior of a program. Correlation of execution information, as described herein, may be used to obtain a collective behavioral analysis of a program.

Processes, and threads that may execute within the context of a single process, included in the distributed software application may be instrumented, as known to those skilled in the art, to include hooks or points to allow for execution information to be gathered at particular points of interest about each of the processes. Processes of the distributed software application may include compiled code, as well as interpretive code, such as byte code. One technique that may be used to instrument compiled code is described in issued U.S. Pat. No. 5,987,249, filed on Aug. 21, 1997. One technique for instrumenting interpretive code, and in particular byte code, is described elsewhere herein. In one embodiment using these techniques, a library, such as a dynamic link library (DLL), may be included in each of the various processes or machine executables that make up the distributed software application being monitored. The library may include code that is invoked to gather various types of performance information. Additionally, it should be noted that distributed software applications may optionally include support to be executed in a debug mode. In other words, each of the processes may be compiled to include information to provide support for different software options that may vary with each implementation. For example, a process may also be compiled to include debug symbol information and code optimizations.

Figure 31:
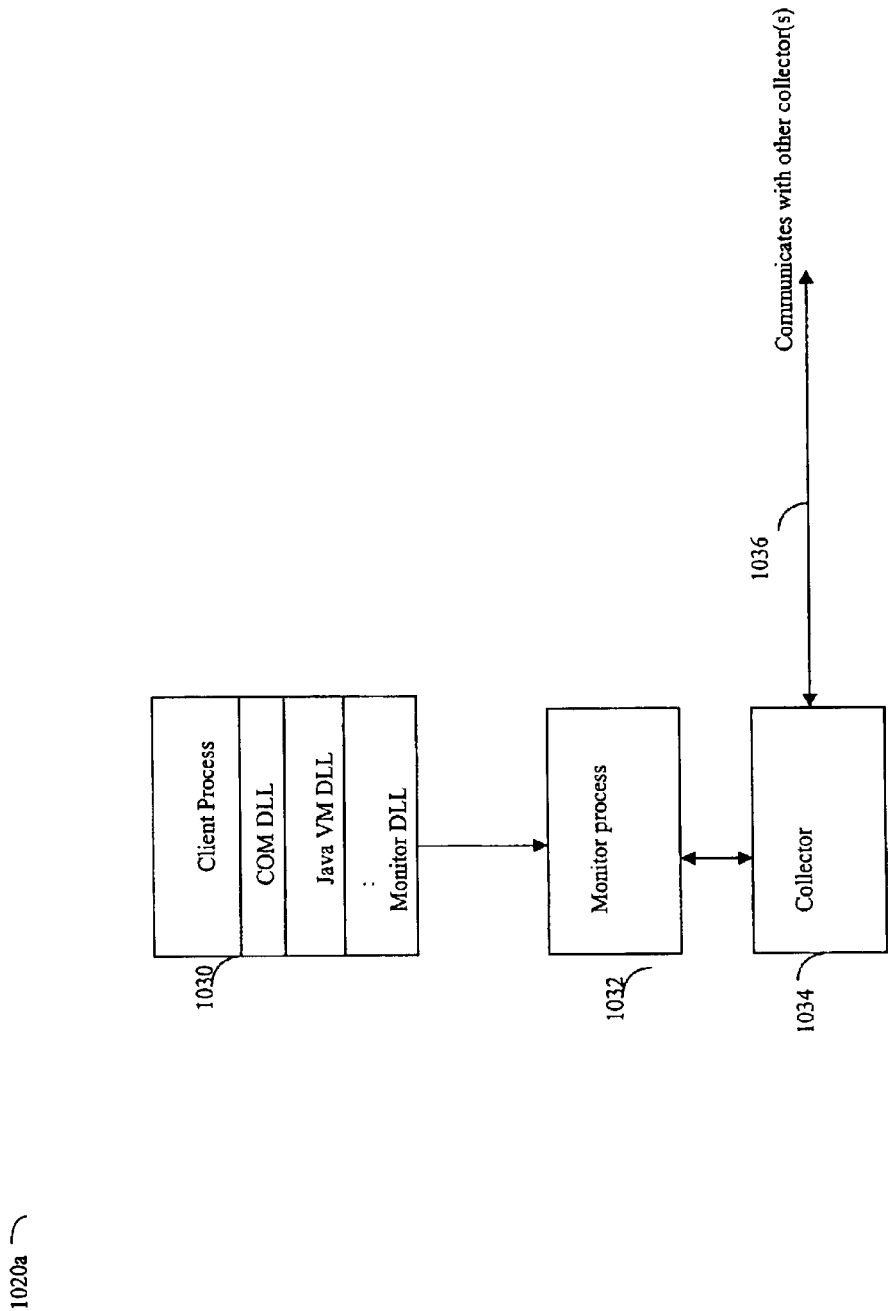
FIGS. 31 and 32 are example of embodiments of client and server software.

Referring now to FIG. 31, shown is an example of the embodiment of client software that may execute in a client system included in the computer system 1000 of FIG. 29. This particular embodiment of the client software 1020a includes a client process 1030, a monitor process 1032, and a collector process 1034 which communicates with other collectors on other client and server systems through connection 1036. In this particular embodiment, the client process includes several libraries. In this example, the COM DLL may be used for facilitating interprocess communication, for example, as between a client and a server as well as between any two server systems. Also included in the client process 1030 is a monitor DLL, for example, as may be included as a result of instrumenting software executing on the client system as elsewhere described herein. In one embodiment, the COM DLL as provided by Microsoft Corporation, may be used to facilitate interprocess communication between client and/or server systems, for example, executing Windows NT. The software 1020a is one particular embodiment of the software 1020 that may execute on a client system as previously described in connection with FIG. 30.

In this embodiment that uses the COM DLL, a software application may perform event registration which, upon the occurrence of particular events, results in signaling and a transfer of control and/or transmission of data to a specified point in the software application. For example, a routine such as IChannelHook may be used for event registration causing control to be transferred to a specified routine included in the monitor DLL upon the occurrence of certain registered events to facilitate gathering performance and other execution information as may be obtained in connection with program monitoring.

With respect to the client software 1020a in this example, control is passed to the monitor DLL when an outgoing request or a remote procedure call is made, for example, to a server process. In other words, a first event that is registered on the client is to have the monitor DLL signalled just prior to an outgoing call resulting in control being passed to a location in the monitor DLL as specified at registration of this first event. This location in the monitor DLL may be referred to as a "hook" to gather and transmit additional data. Upon the occurrence of this first event, the monitor DLL adds data to the information to be passed to the remotely called system or process of the outgoing call.

With respect to the client side, additionally, a second event is registered with the COM DLL to have control passed to the monitor DLL just after the return from an outgoing or remote procedure call. In other words, when the client receives a response from the server system that a request or remote procedure call has completed, control is passed to the monitor DLL to perform certain functions, such as retrieve additional information that may have been communicated from the server system.

With regard to the occurrence of the first event in connection with an outgoing call from a client system to a server system, the hook specified as point of transfer in the monitor DLL inserts "out of band data" into the stream of data that is transferred to the server. In this particular embodiment, this additional data or "out of band data" is used to pass information about the calling function included in the client process 1030. An example of information that may be included in this call as out of band data is described elsewhere herein. This information may be subsequently extracted on the server side and may be used in gathering execution data about the distributed application as a whole as well as components of the distributed application that may execute on different computer systems.

The monitor process 1032 receives information forwarded from monitor DLL registered routines included in the client process 1030, for example, as may be used to record data about the executing client process. The monitor process 1032 may be associated with a single client process. In other words, if there are multiple client processes executing on a single system, each may include a dedicated or associated monitor process interfacing with a single instance of a collector 1034. The monitor process 1032 communicates the transmitted data to the collector 1034.

It should be noted that in this embodiment, one collector is included in each of the client and server systems. As described in more detail elsewhere herein, each collector may be used in connection with one or more local monitor processes on each system to facilitate the collection of execution information, such as coverage and performance information.

The collector 1034 performs a variety of different functions as will be described elsewhere herein. Generally, the collector serves as single collection point for combining session data from multiple processes and multiple sessions. The process of combining data, for example, such as collected from one or more systems in connection with one or more server processes, may be referred to as correlation. Generally, a session of data may be defined as execution data, such as coverage and performance data, associated with the execution of a process or program with predetermined begin and ending time points. The time point defining the beginning and end of a session may be user defined, or may be defined by the beginning and ending of the execution of an application or process of an application. A session of data may have different points of view, for example, as may be defined by a user, and relates to the data to be collected for a session. For example, a session of data having a single process point of view may result in data being collected for a single process executing on one system, such as a single client or single server system, even though a process may be one of several associated with a distributed application that is executing. A session of data may have a multiple process point of view resulting in data being collected for multiple processes executing on different computer systems, such as a client and one or more server systems. The data for a multiple process point of view may be correlated, for example, on a client system by combining one or more data files from each of the client and server systems. Data collection and correlation of data are described in more detail elsewhere herein.

In this particular embodiment, the collector 1034 may be a component that is included in software such as the commercially available product DevPartnerStudio 6.5, to collect profile and other execution information about an executing software application.

In this embodiment, the collector 1034 may be installed on each client system on which session data collection may occur. The client system may be executing Windows NT 4.0 in which the collector 1034 may execute as a Windows NT service process. In an alternate implementation, the client system may be executing Windows 9X, such as Windows 95 or 98, in which the collector may execute as a background process registering itself as a Windows 9X service such that the collector process does not terminate when the distributed application finishes executing. In this particular embodiment, only a single instance of a collector process may be included in each client and each server system, as previously described.

As described elsewhere herein, the collector may perform functions such as collecting and correlating session data received from the different instrumented processes of a distributed application executing in a client and server system. Additionally, the collector may also communicate with other collectors on other systems as needed, as will be described, to transmit session data to the appropriate recipients, for example, to transmit data from one or more server collectors to the originating client collector, such as 1034.

In this particular example, the monitor process 1032 may be deemed to be local with respect to the collector 1034 since they are included in the same client system. Upon the initiation of the process 1030, the monitor process 1032 may establish a communication connection between the monitor process 1032 and the local collector 1034. In one embodiment, the local collector 1034 may be registered as a COM object so that the monitor process may connect to the local collector 1034, such as to send execution information to the collector.

In this embodiment, the collector 1034 may use COM-based interfaces, as may be included as part of the Windows NT operating system, to communicate with monitor processes locally, such as 1032, and other collectors remotely on other computer systems. The COM-based interfaces support local and remote communication among the different components. The collector may be implemented as a COM server and the monitor process 1032 may connect to the collector 1034 by creating an instance of a session manager interface.

As will be described elsewhere herein, a collector may connect to a remote collector on another computer system by creating a remote instance of a session manager interface, such as by invoking a routine that includes the name of the host of the remote collector in the invocation. This may be performed by a collector of a server system as part of the process of transmitting data, for example, from a server to a client system. In this embodiment, and as will also be described elsewhere in following paragraphs, a server collector may receive a chain of system identifiers of all client and server systems as included in an a remote procedure call, for example. The first time the server receives this information from a new client, the server checks to see if it already has registered with the client and collectors of other systems in the chain. In other words, the first time a server receives information from a new client, the server determines if there is an existing communication channel to the client and other systems in the chain for transmitting execution information. If not, the server registers with each system to establish a communication channel with each system for transmitting execution information. A server system may keep track of the existing communication channels using a variety of different techniques. For example, if in addition to the chain of systems a process identifier associated with the client process is included, this process identifier may serve as a unique identifier by which the server may track existing communication channels.

Similarly, a local monitor process such as 1032 may register a session with a remote collector on another system by indicating the host name of the remote collector. At this point, the local collector connects to the remote collector and relays the registered call to the remote collector. From this point on, the local collector acts as a proxy that may be used to relay method calls for the session between the local monitor process and the remote collector.

A local monitor process may register with a local collector, for example, in a first instance to register a local session for the application for which it is monitoring. A local monitor process may also register with a local collector in a second instance if the process associated with the local monitor process has been contacted by a remote client, such as a server to perform a remote procedure call. In the latter second instance, the local monitor process in this embodiment may invoke a method, such as INMSessionManager-::Register method, specifying the host name of the remote client and the process identifier supplied by the remote client identifying the remote client. It should be noted that information identifying the remote client, such as process identifier and host name, may be supplied by a remote client to a server process which, in turn, supplies this information to the monitor process of the server process.

In one embodiment, methods or routines, such as INMSessionManager, may be one of several different interface routines implemented by the collector. This, and other methods, may be instantiated by a monitor process and collector components to facilitate communications between the monitor process and collector on both the same and different computer systems. A summary of interfaces that may be included in one embodiment of the collector are described elsewhere herein.

Each monitor process at startup establishes a connection to its local collector specifying the process identifier of the corresponding instrumented process. For example, monitor process 1032 starts up and establishes a connection to local collector 1034 passing the process identifier of process 1030. This connection establishes a client "session" and enables data to be collected by the collector 1034 for the process 1030. As described elsewhere herein, this process identifier may be used to correlate data collection.

Generally, as described herein, for establishing a remote connection with a remote collector on another system as between a client and a server system, the local monitor process uses the client-side process identifier and system name pair to establish a connection with the remote collector. The monitor process establishes a session with its local collector but further specifies that this session is passed through to a remote collector.

Once a connection has been established between a local monitor process such as 1032 and a local collector such as 1034, the connection may also be used to send session snapshots to the local collector 1034 for saving. As described elsewhere herein, a snapshot may refer to a portion of session data for a defined time period. A snapshot of data may be requested using a variety of different techniques. In one embodiment, a user may manually select or request a snapshot of data via a graphical user interface dialogue selection. The code that is executing may also trigger a snapshot of data request by including an explicit call an instrumentation routine to record data.

In one embodiment, once a connection has been established between a local monitor process, a local collector, and a remote collector based on contact from a remote client, that connection may be used to only send on-demand snapshots to the remote collector. A local monitor process may have a single connection to a local collector, but one or more sessions each having a communication channel through the local collector acting as a proxy to a remote collector.

It should be noted that the techniques described in connection with FIG. 31 and FIG. 32 may be used in connection with a process that includes, for example, compiled code or Java code that may be compiled and interpreted using JavaVM.

The client process 1030 may include code that has been instrumented, such as compiled code or Java code that has been instrumented. With regard to the client process of FIG. 31, for example, if compiled code is executed, control passes from the compiled code to the monitor DLL to determine and collect execution information as well as possibly "inject" data to be communicated remotely, for example, in connection with a remote procedure call. The execution data may be communicated to the monitor process and then the collector and subsequently stored or used in other data gathering. If Java is included in the client process of FIG. 31, for example, as the code is interpreted using the JavaVM, control is passed to the monitor DLL and then control is transferred further in accordance with execution information gathering similar to that as just described in connection with compiled code by communicating data to the monitor process, for example, and the collector.

Figure 32:
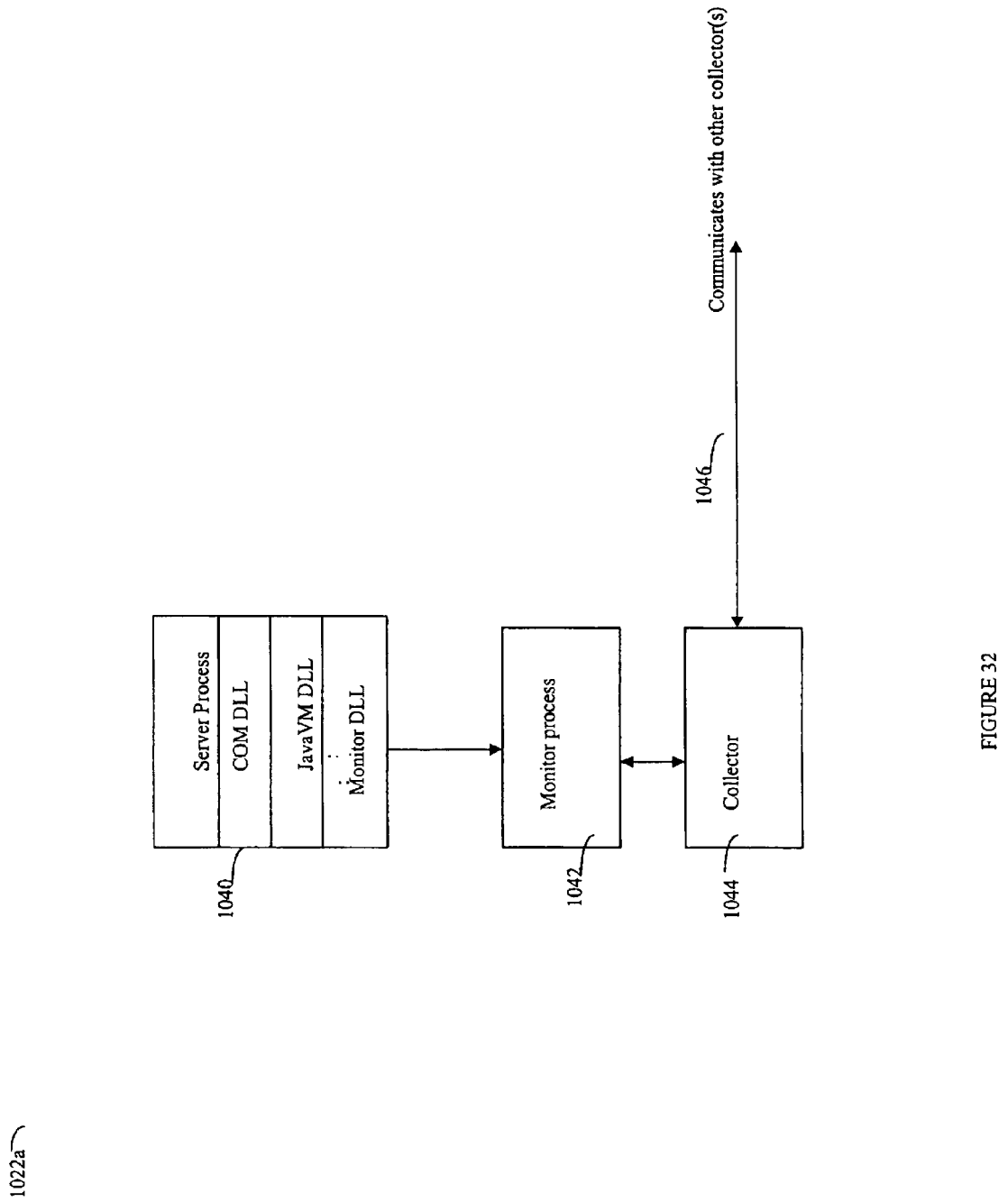

Referring now to FIG. 32, shown is an example of an embodiment of server software 1022*a* that may execute in a server system. It should be noted that the software 1022*a* of the server may be used to communicate with the embodiment of the client software 1020*a* of FIG. 31.

Similar to the client software 1020*a,* included in the server software 1022*a* is a server process 1040, a monitor process 1042 and a collector process 1044 which may communicate with one or more collectors on other computer systems through connection 1046. The server process 1040 includes a COM DLL and a monitor DLL as previously described in connection with the client software 1020*a.*

The monitor DLL included in the server process 1040 may register for signalling upon the occurrence of certain events, for example, using the IChannelHook interface with the COM DLL run time with respect to certain operations that may be performed on the server system.

It should be noted that events on the server system for which event registration may be performed in this embodiment may be viewed as complementary to those performed by the client system described in conjunction with the client software 1020*a.* A first server event for which event registration may be performed is to request notification and to have runtime control passed to the monitor DLL included in the server software 1022*a* when an incoming COM call is received. This may be performed, for example, in connection with an incoming request for the server process 1040 to perform a remote procedure call. When this request arrives or is received by the server system, control is passed to the monitor DLL included in the server process 1040 to retrieve the out of band data, such as information about the calling function sent from the client system. Subsequent to extracting this out of band data, the monitor DLL then passes control to the real routine or object method to perform the processing associated with the incoming request from the client system such as in connection with a remote procedure call.

A second server event for which event registration may be performed is to intercept a return from a COM object method or routine prior to returning information to the client system allowing the server to add data regarding the code just executed on the server system. This additional data returned to the client system from the server system may include information about the method or code that was just executed, such as the amount of execution time for performing that method or code executed on the server system in connection with the client is request. In this particular embodiment, the technique of adding data is similar to that as performed on the client system to communicate additional execution information. This added data is included in an outgoing response returned from the server system to the client system in connection with the initial request received from a client system.

Details of one embodiment regarding the data that may be transmitted between the client and server systems for gathering runtime data are described elsewhere herein.

Figure 33:
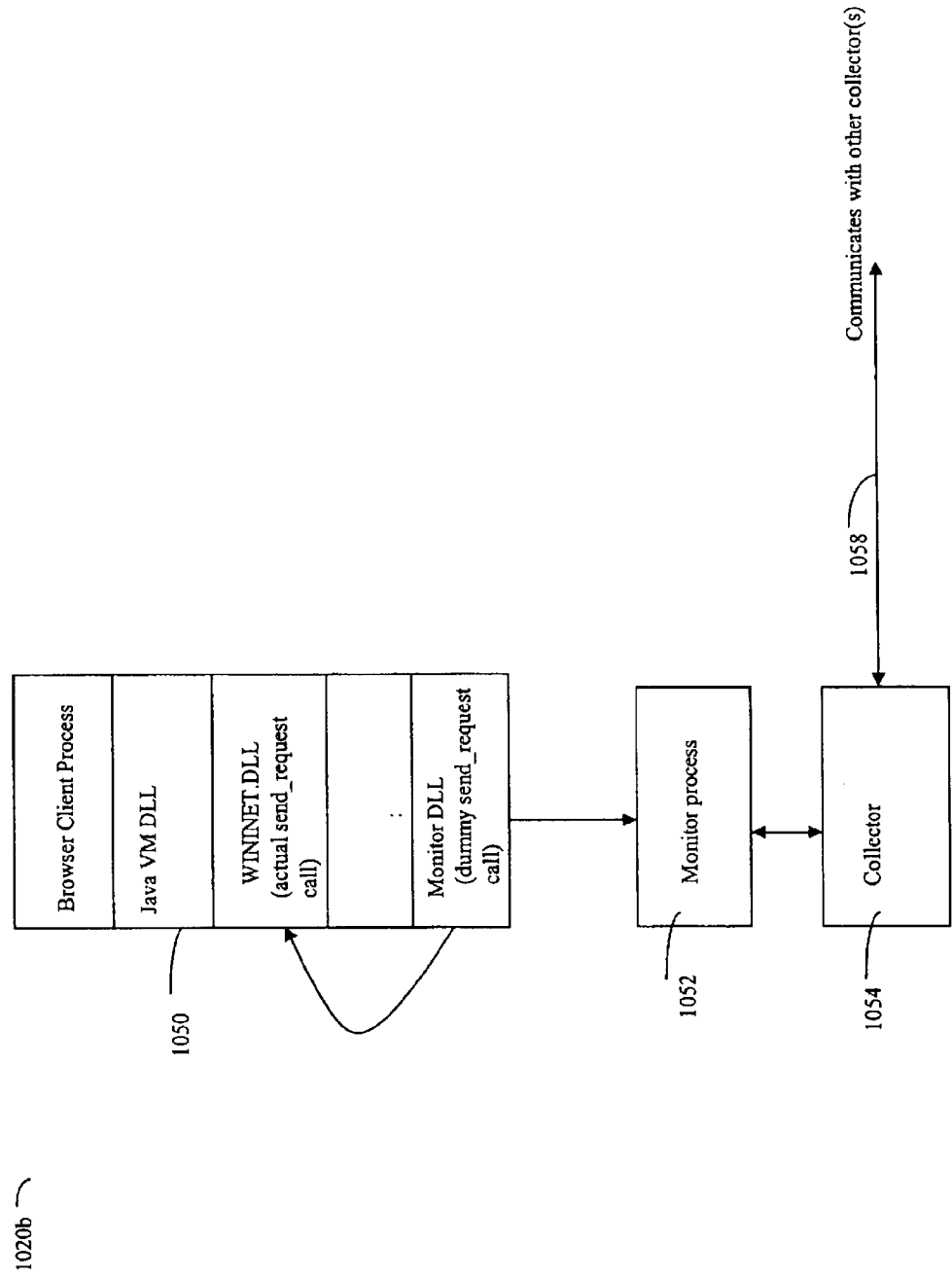
FIGS. 33 and 34 include an example of an alternative embodiment of clientserver software.
Figure 34:
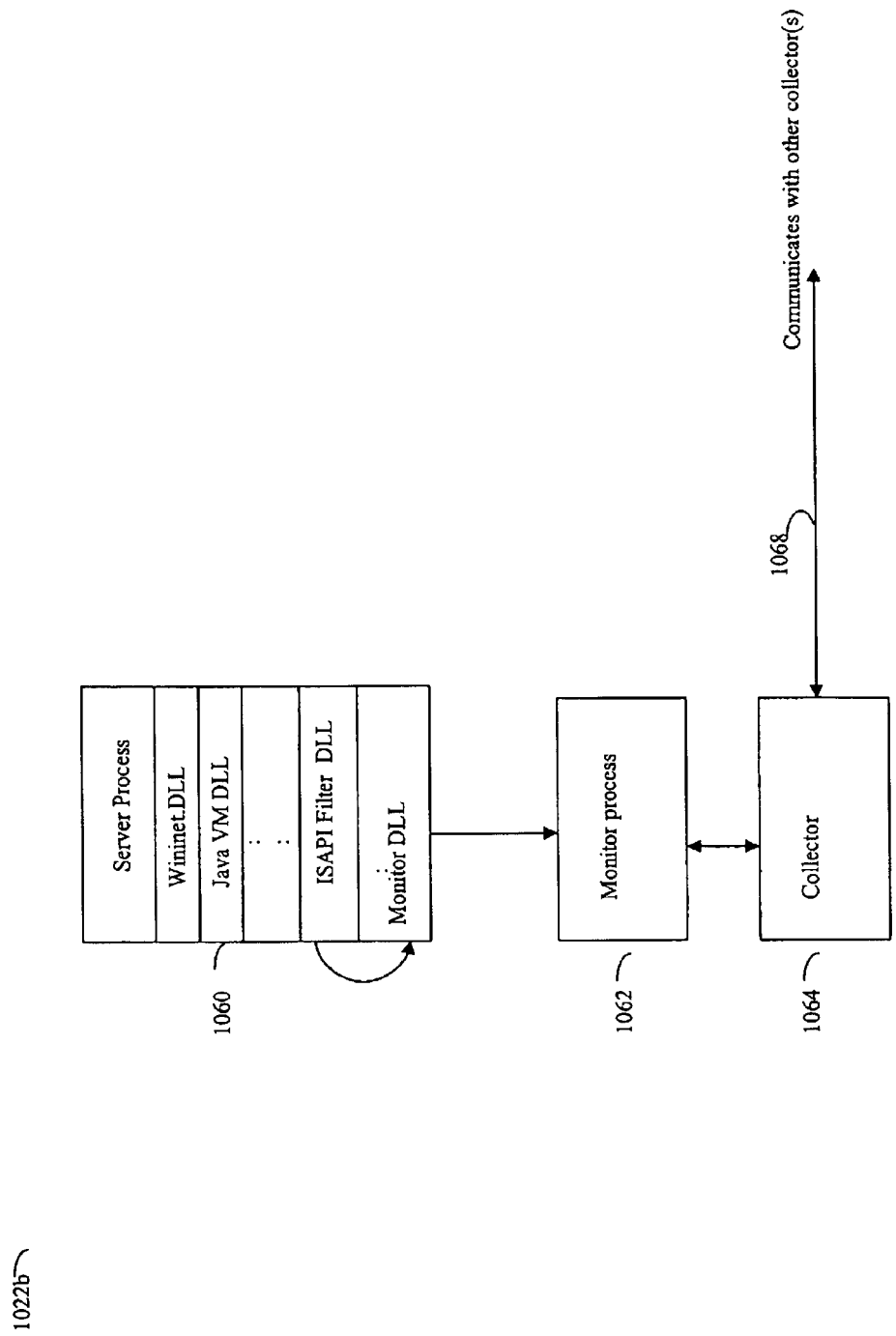

Referring now to FIGS. 33 and 34, shown is another example of an embodiment of the client and server software as may be included respectively in the client and server systems. In this embodiment, a browser may be used in connection with communicating information between the client and the server process. As will be described, FIG. 31 and FIG. 32 use a COM DLL to facilitate communication between systems. In contrast, FIGS. 33 and 34 use HTTP communication functionality and protocol for facilitating communication between systems.

Referring now to FIG. 33, the client software 1020*b* includes a client process 1050 that may be a browser 1056, a monitor process 1052, and a collector 1054. The collector 1054 communicates with other collectors on other systems using communication connection 1058. In this particular embodiment, client and server processes may communicate in accordance with the HTTP protocol. As known to those skilled in the art, the HTTP protocol provides a mechanism for communicating additional information between processes as string parameters. The general technique is to place additional information related to the execution of the distributed application as string parameters on each HTTP request made from a client to a server, and in responses sent from a server to a client.

Browser client process 1050 executing on a client system may issue a send request call, for example, for performing a remote procedure call on a server system. In accordance with the HTTP protocol, an HTTP send_request call, for example, may be made by the browser 1050 to send a call or a request to another system, such as a server system from the client system. This technique provides for placing additional information such as that regarding function call information by intercepting the send_request call. This call interception may be done, for example, by patching an address table providing for transfer of control to a dummy routine such as may be included in the monitor DLL which, after adding the additional parameters, subsequently transfers control to the actual send_request routine as may be included in the WININET.DLL of a 32-bit Windows-based operating system. The additional information added may include, for example, custom header information such as the process identifier and system name of the client process. Generally, the technique includes intercepting calls, such as the send_request call for a remote procedure call, and injecting additional data into the data included in the send_request call. On the server side, the incoming call is intercepted, the additional information removed, and used in accordance with gathering execution information as may be obtained using monitoring techniques and tools.

It should be noted that this technique is similar to that which is described with regard to the COM DLL. However, what is different with respect to the client software 1020*b* is that rather than provide for an automated technique for registration as with the COM DLL, control is transferred to the monitor DLL by patching the routine address table. This results in control being transferred to a dummy routine prior to the actual send request routine in accordance with the HTTP protocol. The monitor DLL dummy routine adds data, such as that related to function information about the calling function. This data may be added as previously described as a string parameter in accordance with the HTTP protocol. Subsequently, control is passed to the actual send_request routine and the additional data is passed along with the request to the server system.

Components that may be included in the client software 1020*b*, such as the monitor process 1052 and the collector 1054, are respectively similar to the monitor process and collector components described in connection with the client software 1020*a*.

What will now be described are steps in one embodiment by which the client browser process 1050 may collect execution data. In one embodiment, the client browser process 1050 may include a Browser Helper Object (BHO) DLL for which support is included in, for example, Microsoft Windows NT operating system. The BHO DLL is registered with the Windows Static registry such that when the browser process starts, the BHO DLL is loaded. Code included in the BHO DLL, such as initialization code executed when the BHO DLL is first loaded, performs an explicit routine call as providing via an operating system support routine, to load the monitor DLL. Within the monitor DLL, code is executed when this DLL is loaded to perform initialization processes that may vary with each particular implementation. For example, if the Java VM DLL is also loaded and may be used in connection with gathering execution information described herein, the monitor DLL may register with the Java VM DLL to receive callbacks at appropriate points in Java VM execution to enable control to be passed to the monitor DLL. When a web page is requested by the browser client process 1050, the call may be intercepted with execution information being injected as needed as described elsewhere herein in more detail. Upon a web page being returned that includes, for example, Java code, the call may be intercepted from the Wininet.DLL by the instrumentation code to extract execution data as may be returned by a server also returning the web page. Upon execution of the web page that includes Java code, the browser passes control to the Java VM DLL and, in turn, to the monitor DLL as appropriate for gathering execution information.

Referring now to FIG. 34, shown is an example of the embodiment of the server software that may be used in connection with the client software 1022a in accordance with the HTTP protocol. In this particular example, the incoming request, such as that sent by the client software 1022a, is received by the server process 1060. The ISAPI filter DLL may be included in the server process 1060 as well as in the monitor DLL, and other DLL as illustrated. Generally, the ISAPI filter DLL is one that may be included in an implementation written, for example, using the Microsoft Internet Information Server and functionality included in a 32-bit Windows-based operating system. The ISAPI filter DLL receives an incoming message, such as the send-request, and examines a particular signature data field looking for the custom header or signature information previously injected by the client. The signature or custom header information may include a unique identifier, such as a string identifier, designating that this incoming request is to be forwarded to the monitor DLL. If the filter DLL finds this signature, control is transferred to an entry point in the monitor DLL. A routine included in the ISAPI filter DLL is called for each incoming HTTP request to examine each request to determine if a custom header exists that was added by a client system. If found, the ISAPI filter DLL passes the process identifier and system name from the custom header to the monitor DLL. Code included in the monitor DLL saves this information that may be used, for example, to tag called functions. After execution is completed by the server, the filter DLL places or injects additional information into the HTTP response from the server that may be extracted and used by the client.

In one embodiment, the filter DLL may be registered causing the filter DLL to be loaded initially when the server process 1060 starts up. The filter DLL performs and explicit call, for example as may be included in its initialization code, to load the monitor DLL.

It should be noted that, in addition to other embodiments described herein, a client process and server process may reside on the same computer system using the same collector and techniques described herein.

The techniques described in connection with FIG. 33 and FIG. 34 may be used, for example, with Java code as may be interpreted using the JavaVM. For example, if a user is browsing on a client system and makes a request via the browser for a particular web page to be retrieved, the browser transfers control to the monitor DLL to inject additional information as needed. This information may include, for example, call origin information as to the identity or address of a calling program on the client, and routing information identifying the client and other system in the chain of systems for an executing process. Control is transferred to the actual send_request routine included in the HTTP or Wininet DLL to perform the send request call. The server may transmit the requested page and other information to the client in response. The client browser receives the page, begins executing Java code that may be included in the returned web page resulting in control being passed to the JavaVM DLL. The instrumented JavaVM byte code is executed and communicates with the monitor DLL in accordance with the code execution. In one embodiment, control may be initially transferred to the monitor DLL using a browser helper object or BHO on the client system.

Generally, the technique performed with regard to the server software 1022b and the client software 1020b is that the server software 1022b extracts information or data sent by the client. This technique is similar to that which is used in connection with FIGS. 31 and 32 of client software 1020a and server software 1022a. FIGS. 31 and 32 generally describe a technique using the COM DLL to communicate information regarding the performance of a distributed application. In contrast, technique of FIGS. 33 and 34 use a different mechanism to communicate this information between the client and server software, for example, as may be performed in accordance with the HTTP protocol. Other embodiments may communicate this information using other techniques.

It should also be noted that the foregoing embodiments of the client and server software may also use a patching technique to provide for transfer of control to the monitor DLL at various processing points. For example, in one embodiment patching of one or more entry points may be performed in connection with operating system supplied routines and events to gather performance data. This may include, for example, routines that load DLLs or other libraries, and other public entry points, such as those of an operating system supplied routine, related to performance data gathering. This may be performed in connection with initialization code when the monitor DLL is initially loaded, for example. Different entry points may be patched in accordance with the particular type(s) of monitoring information being gathered. For example, additional and different entry points may be patched in connection with gathering code coverage information. This may also vary with each embodiment and the software used in connection therewith.

Figure 34A:
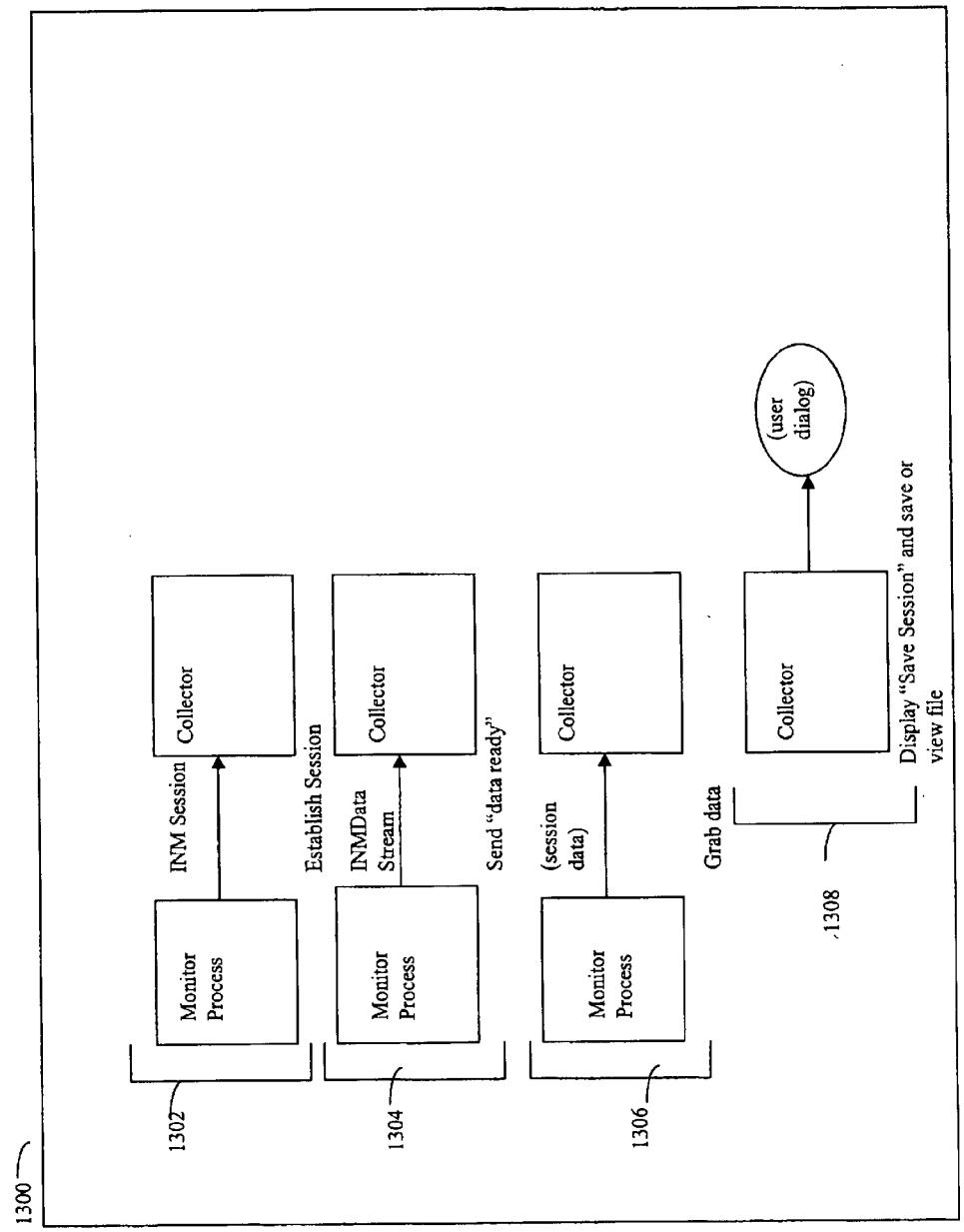
FIG. 34A is an example of a representation of an embodiment of method steps for establishing a local monitor process to collector connection.

Referring now to FIG. 34A, shown is an example of a representation of an embodiment of method steps for establishing a local monitor process to collector connection. This local connection may exist, for example, between a monitor process and collector on the same system in the client system and the server system. Described in connection with the series of steps illustrated 1300 are various methods that may be invoked as included in the COM-based interface techniques. Element 1302 depicts initially establishing and registering a session between a local monitor process and collector. In this example, the interface INMSession may be implemented as a custom COM-based interface invoked to accomplish this function. Element 1304 depicts sending a "data ready" signal to the collector from the monitor process, such as when the monitor process is ready to send data to the collector. In this example, this signal is sent to the collector by the monitor process through invocation of the appropriate INMDataStream custom COM-based method. Element 1306 depicts the monitor process sending the data to the collector once the connection has been established and the collector has received an indication that the data is being sent from the monitor process. Element 1308 depicts what the collector may do with the data received from the monitor process. This may vary in accordance with each embodiment. For example, in one embodiment, there may be software residing in a computer system that provides for displaying the data received to a user, or archiving the data in a data storage device for later use.

In the description of 1300 above, it should be noted that in this embodiment, different methods in connection with support provided by the COM DLL may be created and used to implement the functionality necessary to establish connections and transmit performance data.

Figure 35:
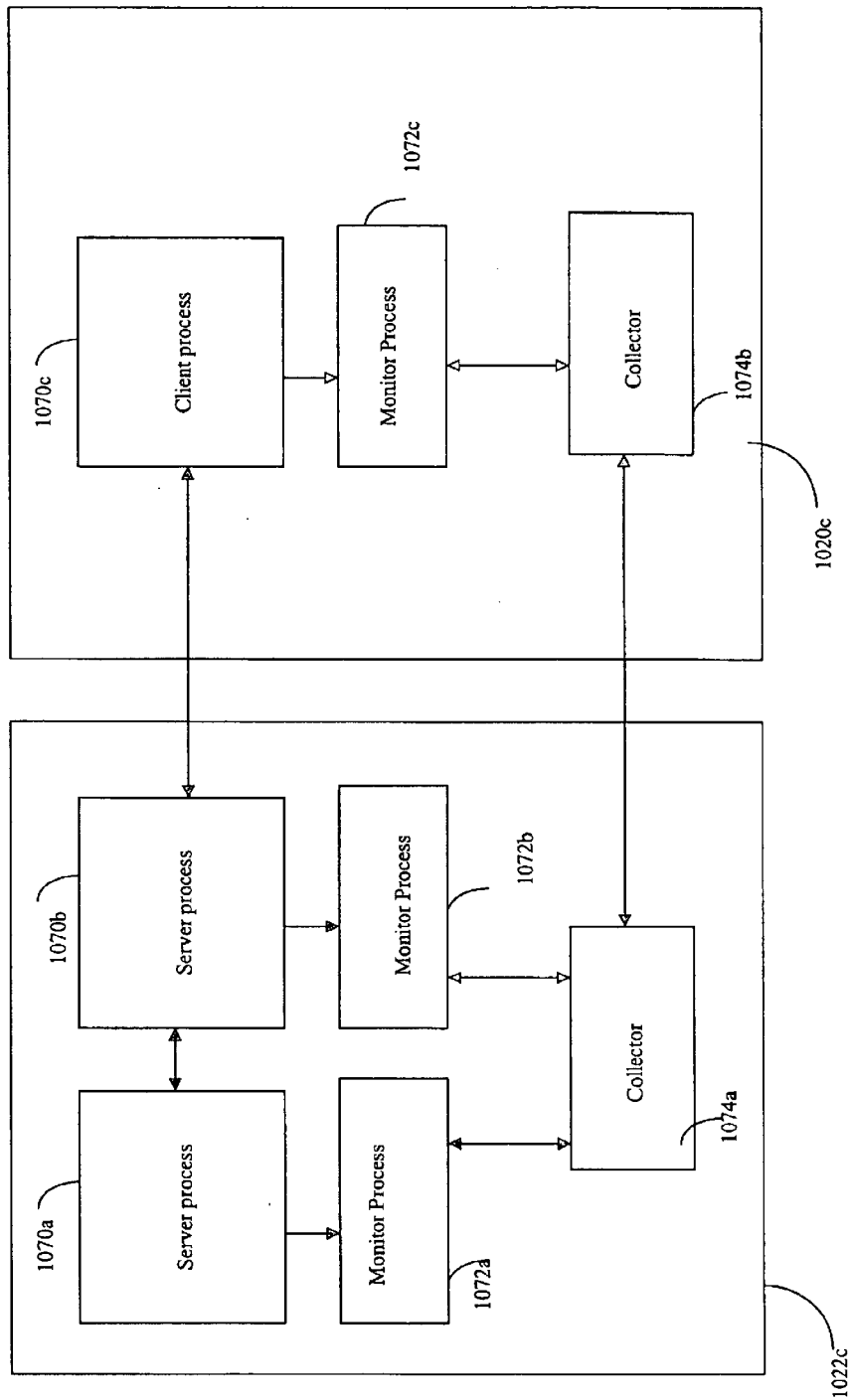
FIG. 35 is an example of an embodiment of a distributed software application.

Referring now to FIG. 35, shown is another example of an embodiment of a distributed application for which performance and other runtime data may be collected. The distributed application arrangement of FIG. 35 may execute in the computer system 1000 of FIG. 29. Included in FIG. 35 is client software 1020c and server software 1022c. In this particular example, the client software 1020c includes a single client process 1070c and associated monitor process 1072c, as well as a collector 1074b installed in the single client system. The client software 1020c communicates with server software 1022c. The server software 1022c includes two server processes, 1070a and 1070b, each respectively having their associated monitor processes, 1072a and 1072b. It should be noted that a single collector, 1074a, is included in the server software 1022c. Both monitor processes 1072a and 1072b forward information regarding the server processes to the collector 1074a. The collector 1074a communicates with collector 1074b to produce information in an organized fashion on the client's system. This will be described in paragraphs that follow.

The embodiment of FIG. 35 illustrates software components included in a server system where there are multiple server processes servicing a single client process. The multiple server processes execute on a single server system. It should be noted that both monitor processes on the server system 1072a and 1072b associated with the server processes interface with a single instance of a collector 1074a. Both local monitor processes 1070a and 1070b have local connections to the collector 1074a that may be established using techniques described herein. Additionally, there is a remote connection between the collector 1074a and 1074b, and each of monitor processes 1072a and 1072b and the remote collector 1074b in which the collector 1074a may act as a pass through agent, for example, when the collector 1074b may request snapshot data from the monitor processes 1074s and 1074b. A connection may be established, for example, using standard COM techniques of a client and server as may be included in a 32-bit Windows based operating system. COM maybe used for monitor process-to-collector communication and collector-to-collector communication.

Figure 36:
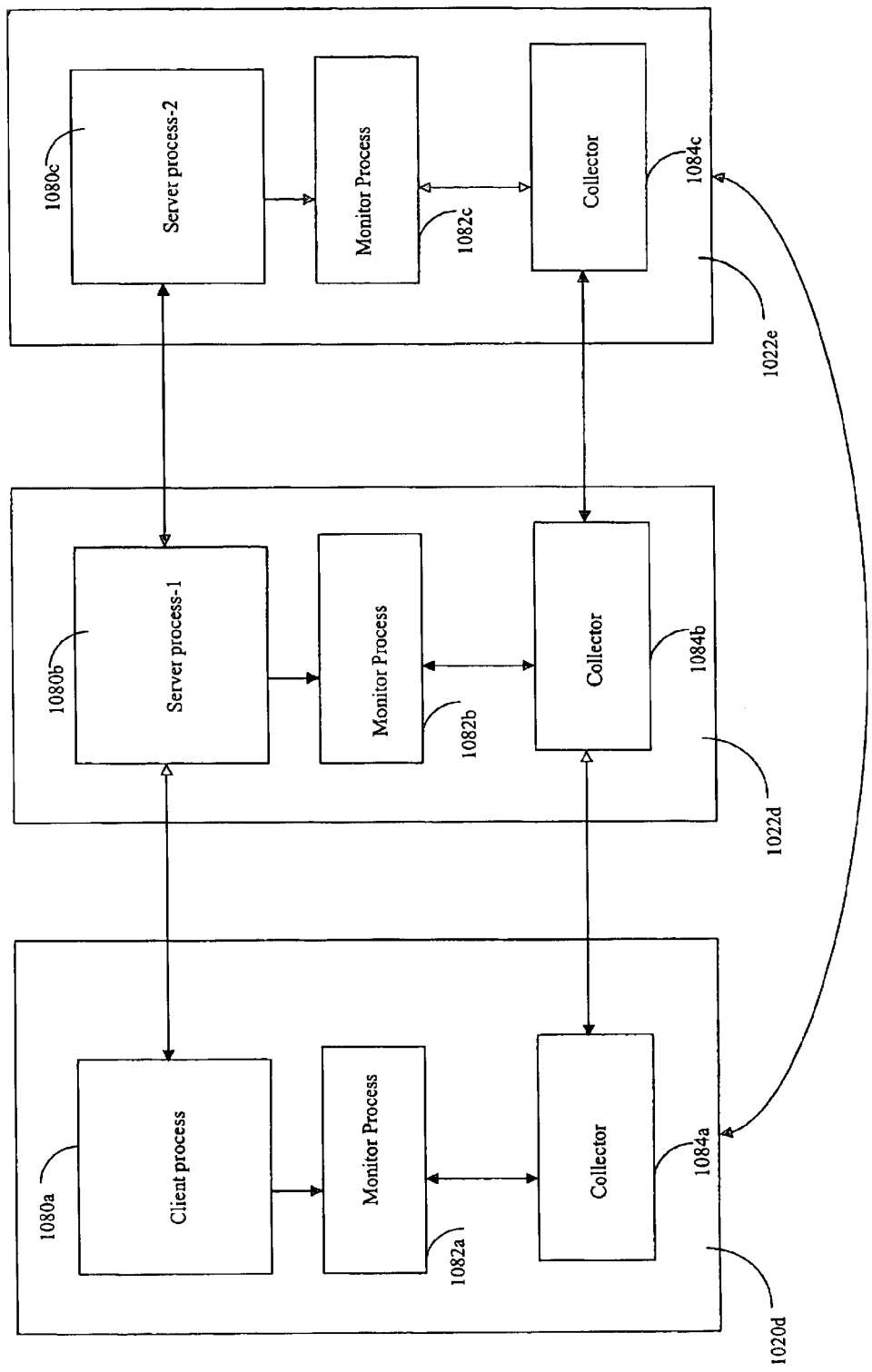
FIG. 36 is an example of an alternate embodiment of a distributed application with multiple server processes and a single client process.

Referring now to FIG. 36, shown is another example of an embodiment of a distributed application for which performance and other runtime data may be collected. The distributed application arrangement of FIG. 36 may execute in the computer system 1000 of FIG. 29. In this particular example, client software 1020d communicates with server software 1022d and server software 1022e in a distributed application. In the arrangement of FIG. 36, the client software 1020d resides on a first client system, server process 1 software 1022d resides and executes on a first server system, and a server process 2 software 1022e resides and executes on a second server system. As part of executing a distributed application, both server process 1 1080b and server process 2 1080c may be invoked and execute code in connection with requests made by the client process 1080a, for example.

If client process 1080a makes a request for server process 1 1080b to perform a remote procedure call, information is communicated from the client process 1080a to the server process 1080b as previously described herein, for example, to identify information regarding where the call is made from within the client process 1080a. This may be done using techniques previously described herein with regard to both the client and server sides, for example, such as in connection with event registration and the COM DLL in a Windows NT environment. This additional data regarding the calling information is placed in a message that is sent in the request to server process 1 1080b. A portion of this information may include, for example, the process identifier of the client process 1080a, an address of the calling routine within the calling process 1080a, and system information serving to identify the computer system upon which the client software 1022d executes. Once this information is received by the server process 1 1080b, information may be gathered and reported to the monitor process 1082b and, in turn, the collector 1084b with regard to certain information as to when the request was received, for example. In turn, the monitor process 1082b may contact collector 1084b to establish a remote connection to client collector 1084a, for example, using techniques described herein.

In this particular embodiment, prior to returning control to the client process 1080a, server process 1 may, in turn, perform a second remote procedure call to server process 2 1080a. As part of the identifying information included in the request from server process 1 to server process 2, the monitor process 1082b passes to the collector 1084b a list of the process identifiers and system names of all of the processes that the client process 1080a has passed to the server process 1080b. In other words, server process 1 1080b acts as a client requesting additional service of server process 2 1080c. Information regarding the client process 1080a and the system associated therewith, as well as the server process 1 1080b and the computer system associated therewith, is passed to the server process 2 1080c when a request is made from server process 1 1080b to server process 2 1080c.

It should be noted that a process making a call or a request of another process may be deemed a client with respect to the process receiving the call, which may in turn be deemed a server. Thus, a system may function as both a client and a server. For each such call or request, the client may pass a list of all known processes of which the client is, in turn, a server. With reference to this example, the software 1022e receives a list of information identifying the software 1022d and its associated system, and the software 1020d and its associated system. The collector 1084c establishes a connection with the collectors on each of the systems associated with the software 1020d and 1022d. In other words, the collector 1084c contacts the collector 1084b and the collector 1084a and registers the local process 1080c as a server of each of the process identifiers in the list associated with process 1080b and process 1080a. It should be noted that using the techniques described herein, the collector 1084c establishes a connection to collector 1084b. Additionally, a connection may be established between the collector 1084c and the collector 1084a indirectly in which collector 1084b may act as a pass through or proxy agent for messages that are relayed to the collector 1084a from the collector 1084c, for example. Other embodiments may establish connections between client and servers using different functionality and combinations of indirect and direct connections in accordance with the details and support included in each embodiment.

Figure 36A:
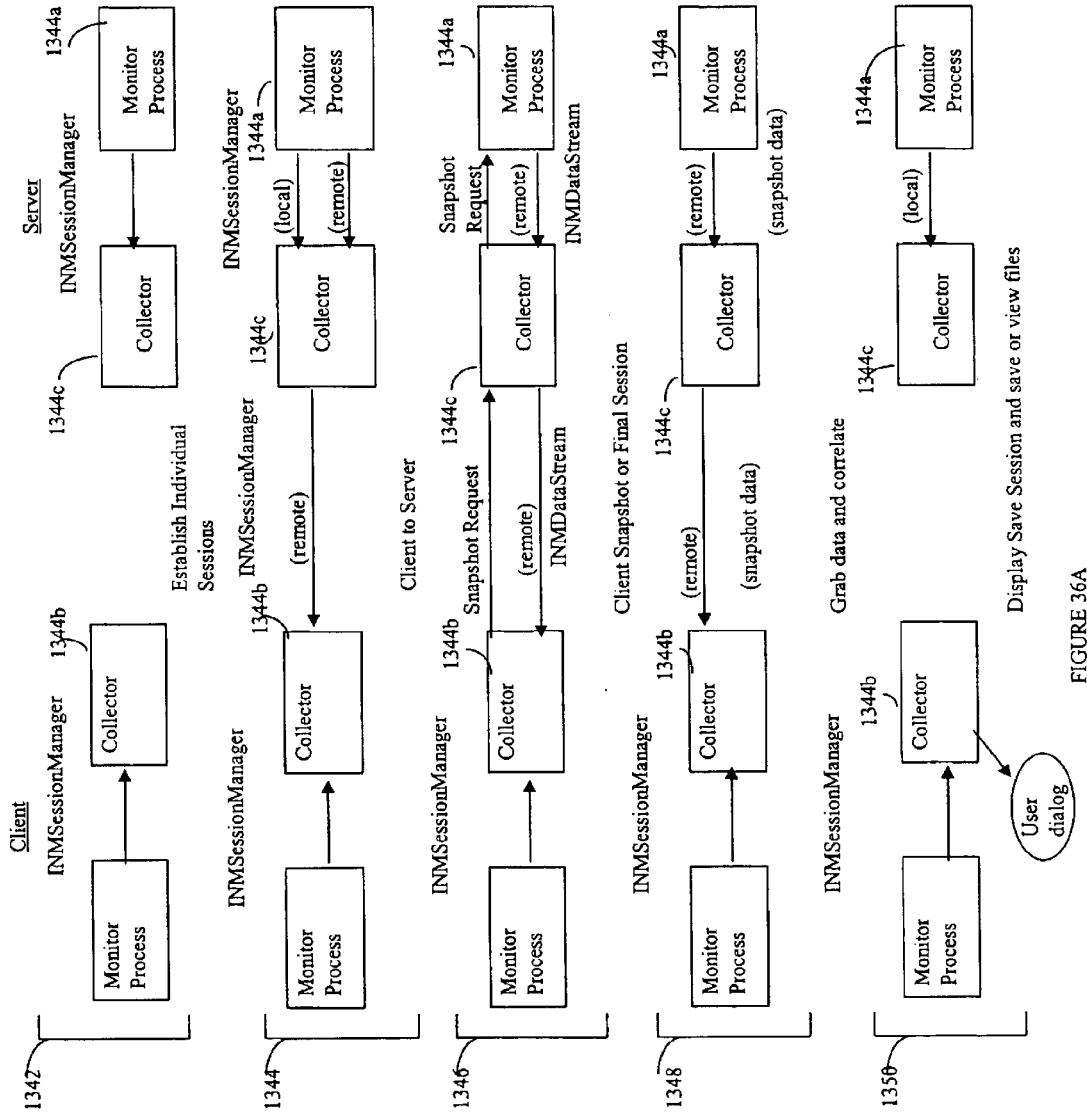
FIG. 36A is an example of a representation 1340 depicting method steps of one embodiment for establishing connections and transmitting execution data between a client and server system.

Referring now to FIG. 36A, shown is an example of a representation 1340 depicting method steps of one embodiment for establishing connections and transmitting execution data between a client and server system. Element 1342 illustrates each of the client and server systems initializing or establishing their own local connections between a local monitor process and local collector. It should be noted that this is similar to that which was described in connection with element 1302 of FIG. 34A as on a single system. Element 1344 illustrates the process of establishing a second remote connection from the server monitor process to the client collector 1344b in which the server collector 1344c acts as a proxy or pass through agent. This connection may be established, for example, as a result of a remote procedure call from the client to the server system in which the server system in turn has its monitor process 1344a initiate and establish a remote connection to the client. Element 1346 illustrates the process of a requesting that a snapshot of data be sent to the client from the server, for example, as may be requested by the client.

Element 1348 illustrates the process of sending the requested snapshot of data as may be requested by the client collector 1344*b*. Element 1350 illustrates the state of both the client and server systems in one embodiment, for example, upon termination of the application. In this example, the collector and monitor process of each system remain, for example, for data gathering.

As described elsewhere herein, a snapshot may generally refer to a portion of a session data set. A snapshot may be defined in this embodiment to include data associated with the execution of a process from the start of execution to the point at which the snapshot is requested. Subsequent snapshot requests may result in data collection and gathering in connection with program execution from the start of the process to the time of the subsequent request. Alternatively, an option may be included in an implementation, such as a "clear" option, which allows for a resetting or clearing of the data collection such that a snapshot request made subsequent to the "clear" results in execution data associated with the starting point of the "clear" and ending with the snapshot request.

Snapshot requests may be communicated to the monitor process which is responsible in this embodiment for gathering the snapshot data and saving this data in a temporary or other file. The monitor process notifies the local collector that the snapshot has been requested and passes the snapshot data gathered locally to the local collector, for example in the client system.

The collector examines data structures or other techniques that the collector implements to keep track of the various communication connections, such as other server connections, established for a given client process identifier. For example, in one embodiment, a collector creates a session record for each process executing in the system for which execution information is gathered. As connections for transmitting execution data between collectors are created during execution, such as a server system establishing a connection to the client system, the collector of the client system is notified and keeps track of these added connections, for example, in a data structure or record associated with a particular client process.

The client collector identifies any existing server connections and issues a message to each collector of the server systems to send a snapshot of the server data collected. Upon receiving this data from the one or more server systems, the client collector correlates the data into a session data file.

An embodiment may include a "final" snapshot request. For example, a final snapshot request may be made by a client of any server systems. In addition to requesting a snapshot of data, the client indicates that this is a final request for execution data. Subsequent to sending the data, the communication connection between the systems as used for sending the data is dropped or disconnected. In one embodiment, either the client or server may issue a snapshot request that is final or non-final. Such requests, and other types of messages described herein, are not limited to the client or server system. In the example in which the client issues the final snapshot request, the server processes may keep executing and collecting data.

In this embodiment, the snapshot is sent back to the original requester. For example, referring back to FIG. 36, if a snapshot request is made by collector 1084*a* of collectors 1084*b* and 1084*c*, the snapshot data is transferred back to the collector 1084*a* which performs the data correlation. Alternatively, if a process executing on system 1022*d* causes collector 1084*b* to issue a snapshot request of collectors 1084*a* and 1084*c*, the collector 1084*b* receives the snapshot data.

It should be noted that the lifespan of a monitor process in this embodiment may be coupled to that of the application or process. For example, as described herein there is one monitor process associated with each process. When the associated process stops executing, the monitor process does also. In contrast, the life span of the collector is not related to the time of execution of a process or application. In one embodiment, the collector may be included in a system start or booting process resulting in the collector being loaded each time a system is booted.

Figure 37:
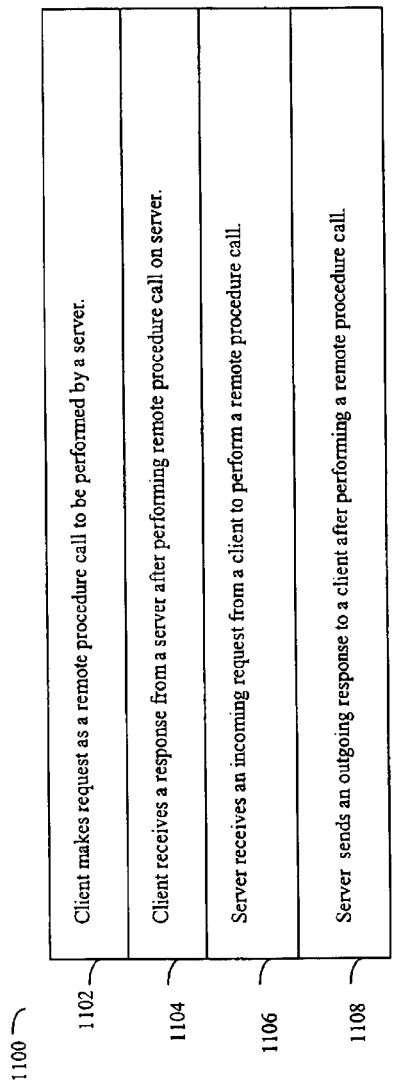
FIG. 37 is an example of an embodiment of the messages that may be exchanged between a client and a server system with regard to remote procedure calls.

Referring now to FIG. 37, shown is an example of an embodiment of the different messages that may be exchanged between a client and server system with regard to passing information related to remote procedure calls such as may be performed in connection with a request from a client to a server system. The chart 1100 includes four messages. Messages 1102 and 1104 are from the prospective of the client. Message 1102 may be sent from a client to a server as a request, for example, when a remote procedure call is requested by a client to be performed by a server. Message 1104 may be received by a client as a response from a server after a remote procedure call may be performed on the server. Message 1102, for example, may be sent with the additional call information inserted into the message regarding the calling process. Message 1104, for example, may be received from the server system and include additional information related to server process execution as inserted into the message by the server system.

Messages 1106 and 1108 are from the prospective of the server system. Message 1106 is an incoming request that may be received by a server system from a client to perform a remote procedure call. Message 1106 is the message 1102 as sent from the client system. The server system may extract the calling process information and forward it to the collector on the server system. Message 1108 with respect to the server system is an outgoing message sent by the server system to a client after performing a remote procedure call. Message 1108 is the message 1104 received by the client system.

In connection with messages 1102 and 1108, each of the computer client and server systems includes data in a message sent to another system. As previously described, this additional data may be inserted into a message sent to another system using techniques previously described herein. With respect to messages 1104 and 1106, data is extracted from an incoming message sent to a computer system. Similarly, techniques may be used to intercept calls to retrieve and extract data from an incoming message such as those sent in connection with messages 1102 and 1108, respectively, on a client system and a server system.

Figure 38:
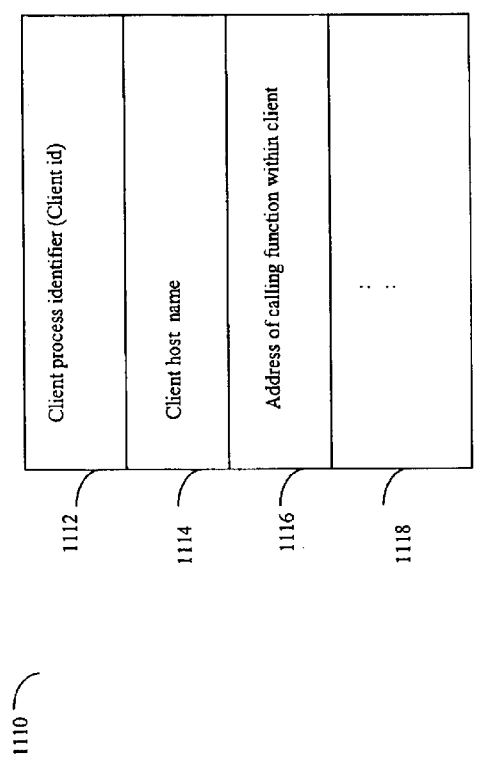
FIG. 38 is an example of an embodiment of the portions of data that may be added in a request from a client to a server system.

Referring now to FIG. 38, shown is an example of an embodiment of the data that may be included in a message for identifying a calling function from a client system making a remote request, for example, for a remote procedure call. Included in data record 1110 is a client process identifier or client id 1112, a client host name 1114, and an address of a calling function within the client software process 1116. These 3 pieces of information 1112, 1114 and 1116 may be included in a request as sent from a client to a server, for example, in connection with message 1102. The client process identifier 1112 may be a unique identifier identifying the client process executing in the client system, such as a unique alphanumeric identifier. The client host name 1114 may be the name of the system upon which the client process identified by 1112 is executing. This may be, for example, a network address or an alphanumeric name of a system. The information or address included in field 1116 may be the address of a calling function within the client identifying a particular instruction at which the request is made for a remote procedure call, for example, to be performed by a server system from a client. Field 1118 may contain other information that may be included in a message sent from the client to the server in accordance with the particular embodiment.

It should be noted that the information included in the record 1110 is that information that may be extracted from an incoming request to a server in connection with message 1106 received by a server.

Figure 39:
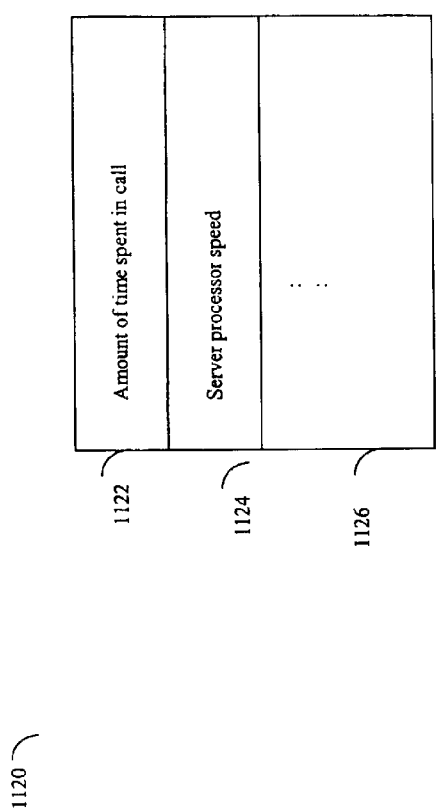
FIG. 39 is an example of an embodiment of the data that may be included in a response sent from a server to a client system.

Referring now to FIG. 39, shown is an example of an embodiment of a data record as may be included in connection with information returned from a server to a client. In this embodiment, the record 1120 includes field 1122 indicating the amount of time spent performing a call on a server system, and field 1124 which includes a server processor speed. Additional information such as denoted by field 1126 may also be included in a return call from a server to a client system in accordance with each particular embodiment in the information needed to be relayed from the server to the client.

The data depicted in record 1120 may be added to a message, for example, sent from a server to a client in connection with message 1108. Message 1104 as received by the client may extract this information as indicated by field 1120 from the response of the server. It should generally be noted that server processor speed may be denoted in processor units and may be used as fully explained in more detail in performing a normalization function in compensating for the different processor speeds that may included in the distributed computing environment with multiple servers to determine the amount of time for execution of a particular code segment in connection with the distributed application. It should be noted that the amount of time spent in a call as represented by 1122 may be CPU execution time. In another embodiment, this amount of time may also indicate actual wall clock time, in addition to, or as an alternative to, CPU execution time.

Figure 40:
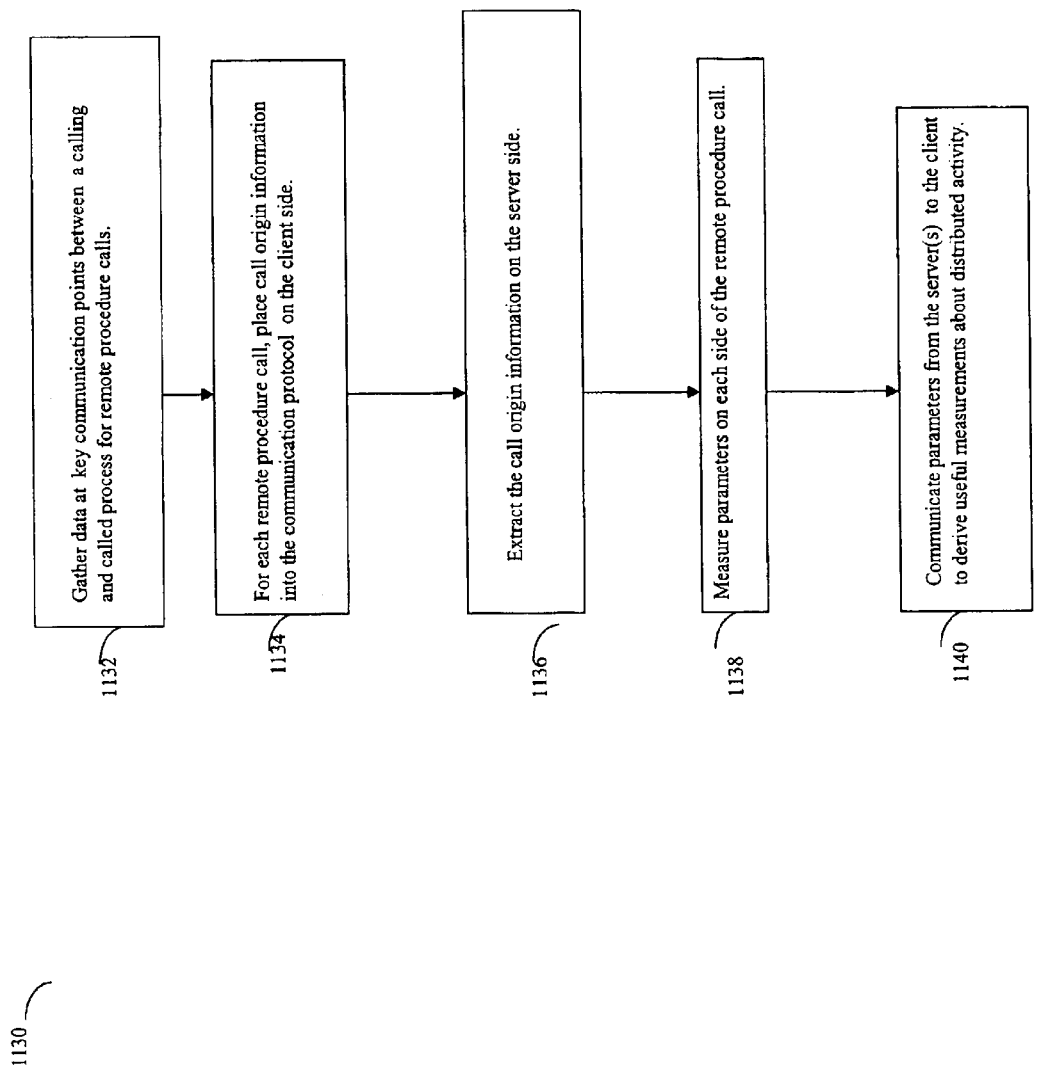
FIG. 40 is a flowchart of the method steps of one embodiment of a technique for gathering and recording information in a client and server distributed application.

Referring now to FIG. 40, shown is a flowchart of an example of embodiment of the method steps that may be performed in obtaining performance information about a distributed application executing in a computer system 1000. It should be noted that these steps may be performed in connection with gathering execution information about a remote procedure call, for example, as between a client and server system described elsewhere herein. At step 1132, data is gathered at key communication points between a calling and called process for remote procedure calls. At step 1134, for each remote procedure call, call origin information is included in the communication protocol on the client side which is then forwarded to the server. At step 1136, the call origin information is extracted on the server side. It should be noted that data may be stored in both the client and the system as needed in accordance with the different statistics to be gathered about the distributed application. At step 1138, parameters on each side of the remote procedure call are measured. For example, with regard to remote procedure call, the execution time on a server system may be tallied and reported back to the client system originating the call. It should be noted that other embodiments may gather other types of information in accordance with each embodiment.

At step 1140, parameters from the server or servers to the client are communicated to derive useful measurements about the distributed activity. It should be noted that in connection with step 1140, additional information may be gathered on each the client and the server system besides data in connection with remote procedure calls. In other words, local information may be gathered by a local collector with respect to tasks performed on a single client system and tasks performed just on a single server system in addition to the intersystem or remote procedure call information.

In one embodiment, upon completion of a distributed application, all of the information both locally and remotely gathered by each of the server systems may be reported back to the originating client system to derive useful measurements about the overall activity of a distributed application.

Figure 41:
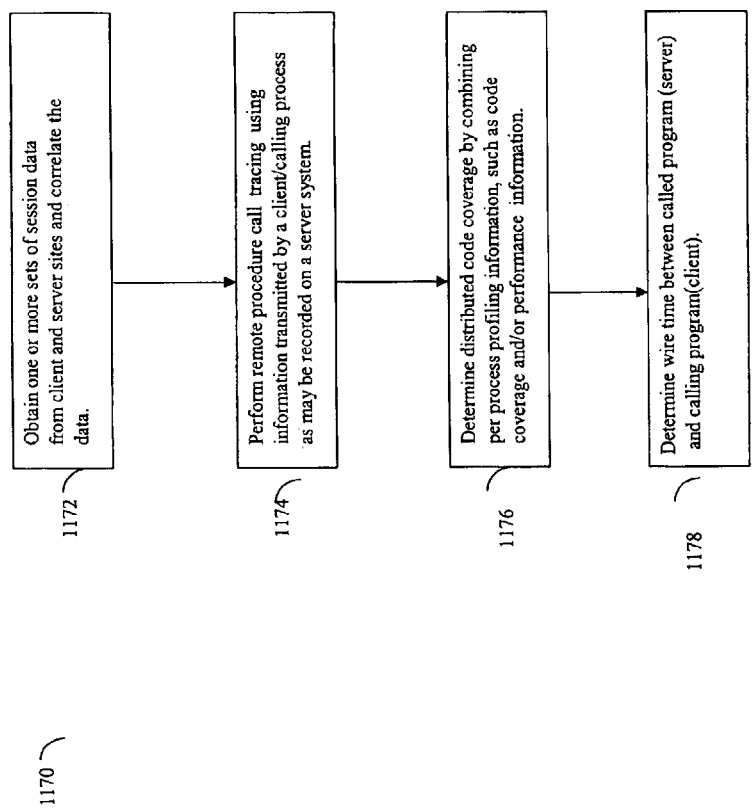
FIG. 41 is a flowchart of an example of an embodiment of method steps as may be performed by the collector of a client upon termination of a distributed application.

Referring now to FIG. 41, shown is a flowchart of the method steps that may be performed upon completion of a distributed application. In other words, the steps performed in connection with flowchart 1170 are those method steps that may be used in gathering different information about the distributed application upon completion. It should be noted that these steps are particular to the performance of a client-server application sequence in which the client process may be terminating and the one or more server processes may also either terminate or continue to execute and gather execution data. At step 1172, one or more sets of session data are obtained from the client and server sites and correlated by the collector, for example, included in the client system. This process may be initiated by the client collector. Data forwarded to the client collector by the one or more server collectors may be done in accordance with identifying client process information. As described elsewhere herein and shown in connection with other figures, there may be a collector communication connection between collectors of a client and server system used to transmit execution data between collectors, for example, in connection with a snapshot request. There may be another second communication channel between the client and the server system as also described elsewhere herein in which remote procedure call information, for example, may be transmitted between the client process and server process, rather than to facilitate communications between collectors as with the collector communication channel. The collector communication connection between the collectors may be established subsequent to the second communication channel transmitting call routing information. In one embodiment, a remote procedure call may be made from a client to a server transmitting call origin information about the calling program, such as an address of the calling routine in the client and client process identifier, and additionally routing information indicating a chain of one or more systems included in the client/server chain, such as described elsewhere herein. This information may include a system address or other information needed to establish a connection between systems. The receiving server system establishes a communication channel between itself and each system in the chain to facilitate collector communication between the collectors on each of the systems. As part of this process, the server system establishes the collector communication channel between the client collector and the server collector using information as included in the remote procedure call.

What is now described in connection with steps 1174, 1176, and 1178 are various types of performance and execution calculations that may be performed for the distributed application. It should be noted that other embodiments may include different calculations and perform these and other steps in a different order than what is specified in the flowchart 1170.

At step 1174, remote procedure call tracing may be performed using information transmitted by a client or calling process as may be recorded on the server system. For example, the call information that is sent in a request from a client to a server may be used to generate a call stack and trace a particular call originating from a client, for example. One embodiment includes a user interface that provides for graphical display of a single level of calls. In other words, the user may select a routine for which a single level of call outs are displayed. Subsequently, a user may further select another routine for which calls are displayed.

At step 1176, execution information, such as distributed code coverage and other execution information, may be obtained by combining the per process or thread information. Recall that execution information may generally refer to data related to the execution or runtime behavior of a program. Code coverage information and performance information may be referred to as two particular types of execution information. As used herein, it should be noted that the techniques described herein may be used for generally obtaining execution information. For example, the collector on a client system may have information as to the amount of code coverage with respect to each process on each computer system. A collective percentage may be determined in view of each of the individual percentages of code coverage for each process on each server system.

As part of the correlation and analysis process in connection with step 1178, wire time may be determined between a called program or server and a calling program or client. Generally, wire time may be defined as the latency or elapsed time between a calling program from one process to the called program in another process before execution of any code in the called program. Determining wire time as will be described in more detail herein may be useful in software applications to provide an indication of the costs associated with making a cross process and cross machine call irrespective of the cost of executing the body of code of the function itself as may be performed by a server system. Given the hooking of the client and the server call points in any given distributed transaction message, the wire time may be measured.

Figure 42:
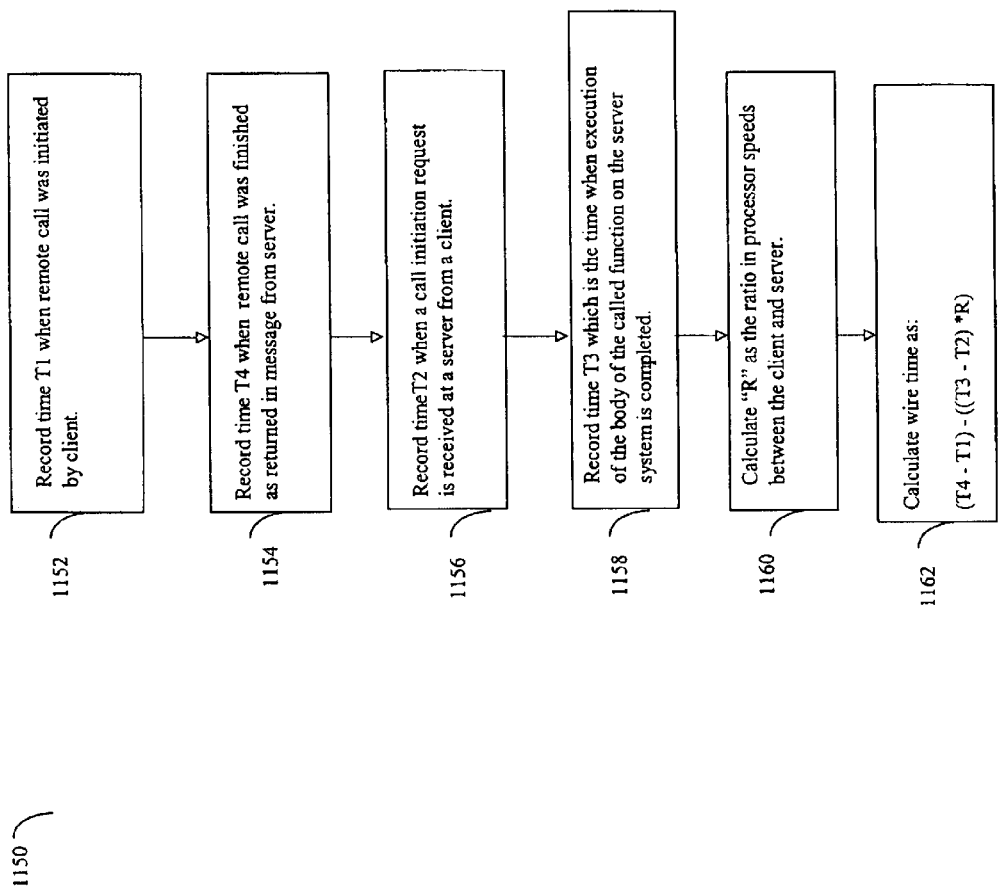
FIG. 42 is an example of an embodiment of calculating wire time as may be performed by a client collector in the computer system.

Referring now to FIG. 42, shown is a flowchart of a method of the steps of one embodiment for calculating wire time. At step 1152, record time TI as to when the remote call was initiated by a client to a server. At step 1154, record time T4 as to when the remote call was completed as returned in a message from the server to the client. At step 1156, record time T2 as to when a call initiation request is received at a server from a client. At step 1158, record time T3 which is the time when execution of the body of the call function on the server system has completed. At step 1160, R may be calculated or determined as the ratio in processor speeds between the client and the server system. This R value may be used as a normalization mechanism to account for the different processor speeds of a client or server system in a distributed application. At step 1162, wire time may be calculated and determined as the quantity:

$$(T4-T1)-((T3-T2)*R)$$

It should be noted that the processor speeds that may be used in connection with calculating "R" may use values such as that communicated from a server to a client system in a response from the client system in the data description 1120 described elsewhere herein. This is one use of the processor speed that may be transmitted from a server, for example, when wire time calculations are performed by a client collector.

Generally as just described, the wire time represents the actual time spent transmitting information on the wire or using communication connections between the client and the server. In other words, it includes the sum of the time of sending a request from the client to the server and the amount of time in getting a response from the server to the client with regard to transmission time over a communication medium between a client and the server. It should be noted that the processor speed may be measured, for example, in CPU clock cycles per second.

When there is a remote procedure call made from a client, the monitor DLL included in the client process records the time TI prior to the RPC being made. In one embodiment, the time T1 may be stored in thread local storage. It should be noted that this and other times may be stored in other locations in accordance with each implementation. The client also records time T4 upon a return from an RPC to the client. Times T3 and T2 are recorded on the server side. Code included in the monitor DLL on the server records time T2 prior to calling the actual code of the procedure or routine (e.g., at function start). This may be also stored in thread local storage, such as a thread information block (TIB) on the server. Time T3 is determined upon return from performing the actual routine (e.g., at function end). The server than determines the difference of T3–T2 and returns this, along with other information such as the CPU processor speed, to the client in a return RPC message. On the client, code included in the monitor DLL calculates the wire time using the time T1 and T4 and the differenceand processor speed returned from the server. This wire time is sent to the monitor process and subsequently to the collector for storing in a data file for the current session. Other variations of the foregoing may be included in an embodiment, such as sending the times T3 and T2 to the client rather than having the server compute the difference and report a single value. Such variations may be included in an embodiment in accordance with specifics of each embodiment. For example, it may be preferrable to compute the difference T3–T2 on the client rather than a server due to server system load and/or slow CPU server processor speed.

Figure 42A:
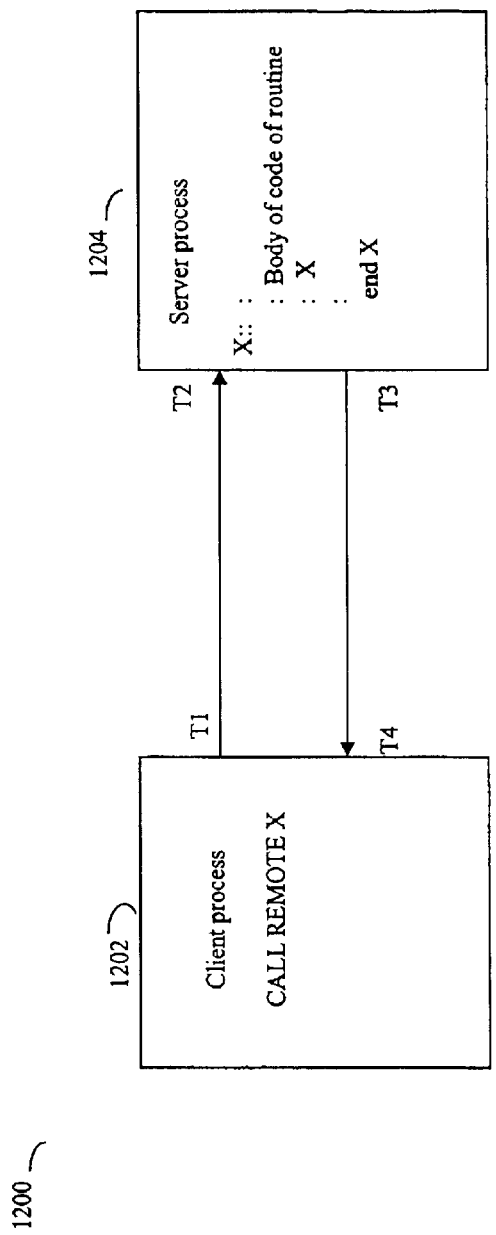
FIG. 42A is a representation of the time components that may be used to calculate wire time.

Referring now to FIG. 42A, shown is an example of a representation of how wire time may be calculated with regard to a remote procedure call from a client to server. The example representation 1200 includes a client process 1202 and a server process 1204. In this example, the client process executes in a first computer and the server process executes in a second computer. The client process initiates the request at time T1. The server process receives the request at time T2. Code may be executed in connection with performing the remote procedure call of the client request. At time T3, the server completes performing the code execution. The server then sends a response to the client process that the remote procedure call of the request is complete. The client receives this response from the server at time T4. In one embodiment, the client system may tabulate and store the information of T1 and T4. The times T2 and T3 may be communicated to the server system as described elsewhere herein to determine wire time.

Figure 43:
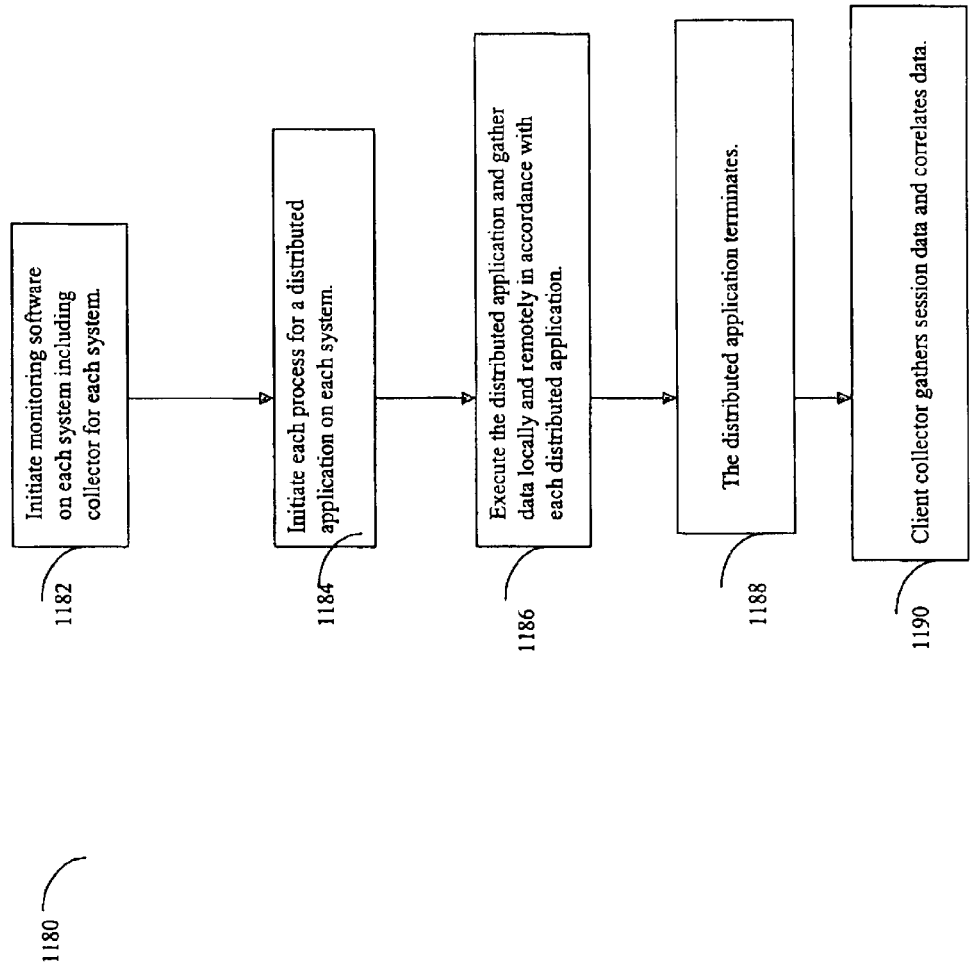
FIG. 43 is a flowchart of an example of an embodiment of a method of the steps performed by the distributed application software and the software gathering data about the distributed application.

Referring now to FIG. 43, shown is a flowchart of a method of one embodiment describing the overall behavior of a distributed application executing in a computer system with regard to gathering information as to the distributed application's execution. At step 1182, the monitoring software is initiated on each of the systems for example each of the client and server system as may be included in a computer system 1000. As part of step 1182, for example, each of the collectors may be installed and initiated on the computer systems. In one embodiment, the collector may be installed as part of a boot process, for example, a part of system start up. At step 1184, each process that is part of the distributed application is initiated on each system in the computer system 1000. Performing this step may include, for example, instrumenting an application and loading each portion of the client and server application in preparation for execution to obtain execution information. At step 1186, the distributed application may be executed and data may be gathered locally and remotely in accordance with each distributed application. In other words, as previously described, data statistics regarding the execution of a particular local function for example as performed on one computer system may be gathered. Additionally, remote information such as related to a remote procedure call may be gathered and stored in accordance with each distributed application as various runtime calls are made. It should be noted that the local and remote information gathered may vary with each distributed application and the actual path it takes at execution time. As part of the processing of step 1186, snapshots may be requested as described elsewhere herein.

At step 1188, the client process of the distributed application terminates. It should be noted that this is just one sequence of events for a particular client-server application in that, for example, the server processes may continue to execute and collect execution information and having a termination independent of the termination of the client process. Other alternative scenarios as to the execution and termination of client and server processes vary with each particular application. At step 1190, the client collector gathers session data and correlates data. It should be noted that how the client collector may gather and correlate session data is described elsewhere herein. An end product of the data correlation by the client collector is a session data file.

Figure 43A:
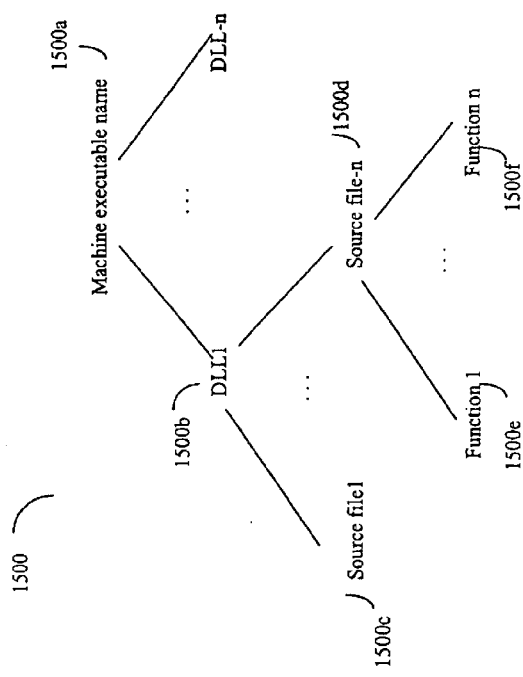
FIG. 43A is an example of a representation of a graphical display of a process.

Referring now to FIG. 43A, shown is an example of a representation of a graphical display of a process. Shown is a tree display 1500 representing the static structure of a process. The root of the tree 1500*a* is the name and other information of the machine executable of the process. This may include, for example, the name of a file in which the machine executable code is stored as a result of linking. At the next level of the tree is the DLL or library information. One of the DLLs 1500*b* includes n source files denoted 1500*c*–1500*d* at the next tree level. Source file n 1500*d* includes n functions denoted 1500*e*–1500*f*. This tree maybe displayed, for example, as part of a user interface display allowing the user to navigate and examine execution information as may be stored in a session data file including correlated session data. For example, by selecting a function from the tree such as by clicking with a mouse button, the source code of a function may be displayed with code coverage information being designated. Color differentiation may be used to indicate which lines of code in a function have been executed.

Session data associated with the machine executable displayed in FIG. 43 may be included in a file as represented in FIG. 43A. It should be noted that data included in this file may be stored in a depth first order in accordance with the tree display represented by FIG. 43.

Figure 43B:
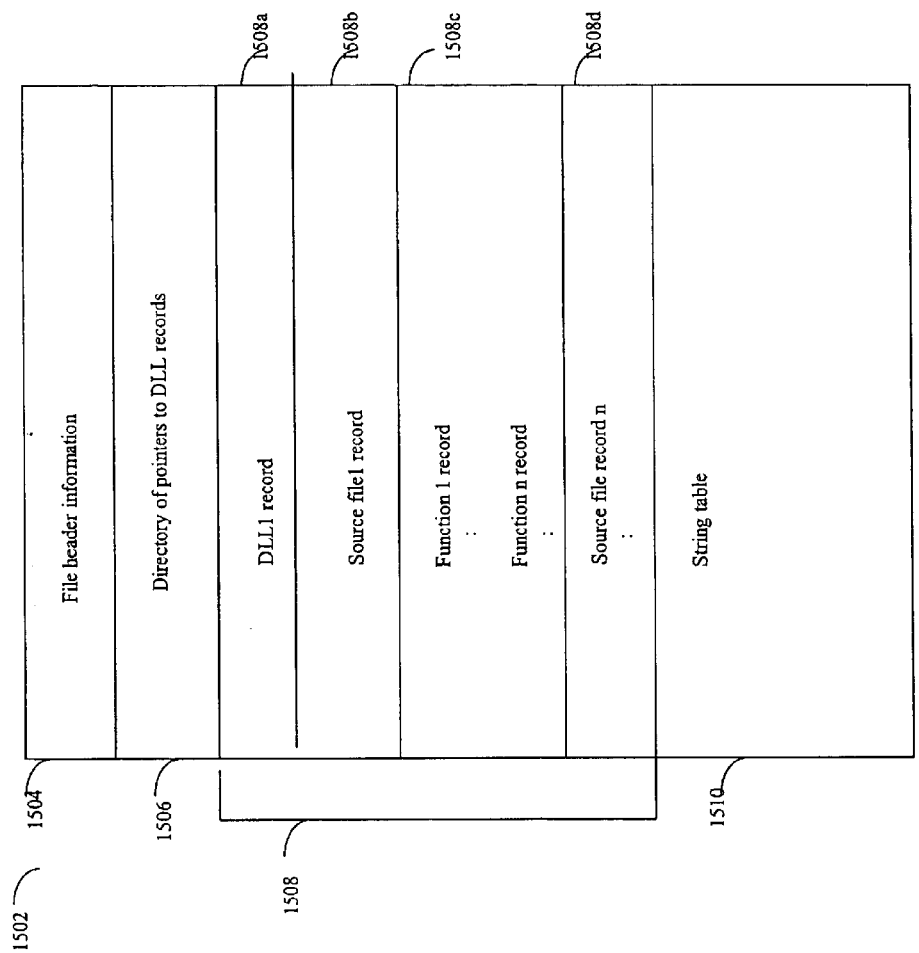
FIG. 43B is an example of an embodiment of a session data file.

Referring now to FIG. 43B, shown is an example of a representation of a session data file. The file representation 1502 includes file header information 1504 identifying the file 1502, such as file type, length of file, and the like. Field 1506 is a directory of pointer to DLL records in the file 1502. In one embodiment, the field 1506 includes information identifying records in the file 1502 in which each record describes a DLL. Records 1508 associated with the first DLL 1 include a DLL1 record 1508*a*, source file records, 1508*b* and 1508*d*, and function records associated with each DLL, such as function records 1508*c* associated with source file 1 record 1508*b*. Subsequent DLLs include information grouped similar to that as represented in 1508. Following all DLL, source file, and function information is a string table 1510 that includes the names, for example, of modules, functions, and the like. References may be made, for example, as by pointer to locations in the string table, to function names as may be referenced in a function record.

In one embodiment, a function record may include an address of the function, a pointer to the function name in the string table, an integer value of the number of times the function was executed, an integer quantity representing the number of CPU cycles spent executing code associated with this function, an integer value representing the number of functions or routines called from this function, and a list of called functions. Information regarding the called functions, such as number of called functions and names of each, may be determined by the collector as part of the correlation process.

When a client function A calls a server function B as part of a remote procedure call (RPC), the address of A is passed as part of the call origin information in the RPC, such as by the monitor DLL on the client. The monitor DLL on the server side extracts this and other information from the RPC data which is sent to the monitor process and, in turn the collector for storing in the data file of the server. In one embodiment, stored on the server in a data file in accordance with a particular client session is information identifying the called function B and the address of the calling function A as included in the RPC. Subsequently, a snapshot of data, for example, may be requested from the server to be sent to the client collector. The client collector correlates the data in the server file regarding the RPCs. In one embodiment using the foregoing, the collector examines each server function record, such as those associated with function B, to determine if there is a match between the address of the calling function as stored with the function record, with a particular calling function address, such as the address of A stored in the client data file. In other words, it is determined if there is a match between the calling function address stored in a function record of the server data file and a defining function address as stored in a client data file. If so, the collector may update information included in a correlated session file corresponding to the function A, such as to have the list of called functions include the function B.

In one embodiment, it should be noted that procedure calls may be local or remote with respect to a particular calling and called function. It is remote if the calling and called function are on two different systems. Otherwise, the call is local. A local procedure call may be denoted in the execution information records by having a 0 (zero) included in the calling function address, such as stored in the function record. A non-zero value may indicate a remote function call. Function records may be generated, as by a monitor process and collector. At the start of a function on the server side, information about the function being called and the calling function, for example, may be temporarily stored in the TIB. At the end of the function, the server may determine other data in connection with the execution information being recorded for a function. For example, if code coverage information is being determined, information regarding the code coverage for the particular called function may be stored in the function record of the server data file. Upon completion of the called function and gathering of execution information associated with this function call, the function record may be written to a server data file, for example, as by transmitting data to the monitor process and collector.

It should be noted that in the client for a calling function, wire time computed may be associated and stored in the client data file, for example, in a function record created for a calling function. In one embodiment, an instance of a session data file represented in FIG. 43A may be stored on each system and accordingly updated as each system performs as a client and a server. A correlated data file may also be created on each client system representing an integrated collection of client and server data files.

In the foregoing descriptions, it should be noted that the first time a monitor process interacts with a collector on its system, the collector establishes initial client session information for each process for which it is gathering information. In one embodiment, the monitor process sends the process identifier as the session identifier used to correlate information that may be received from other collectors. Similarly, when a monitor process has been notified, for example, by a process that the process is a server of another client in connection with a remote procedure call, for example as previously described in connection with FIG. 36, under the monitor process passes to the collector of that server system a list of the process identifiers and system names of all the processes that the client has passed to the server. As previously described, the collector in turn contacts the collector in each of the systems in the list and registers the local process as a server of each process identifier in the list. This is described, for example, in connection with the embodiment of FIG. 36 in which the collector 1084*c* registers with both collector 1084*b* and collector 1084*a*.

In addition to performing the foregoing tasks in connection with session management of receiving session data from a local monitor process as well as registering a current system as a server of each of the systems passed to the server, the collector may perform other functions. For example, the collector may perform functions in connection with snapshot management. In this particular embodiment, snapshot management functionality included in the collector may be triggered when an instrumented process generates snapshot data for example as a result of a user request or a recording control API call.

Upon the occurrence of each of these events, the monitor process notifies its local collector that a snapshot session of data has been created and passes the snapshot data to the collector. The collector determines whether any other processes are associated as servers with the process that generated the snapshot. If so, the collector requests each of these processes to generate its own snapshot and forward that snapshot to the collector. In other words, when a collector receives a snapshot of data from a client, it additionally requests snapshots from other server systems.

In one embodiment, each system acting as a "client" maintains a data structure for each client session identifier. This includes information, such as existing communication connections between other server collectors that may be used, for example, in collecting data in connection with a snapshot request. This data structure may be maintained, for example, by the collector. Other embodiments may use other record keeping and tracking techniques.

When the collector has received the snapshot as requested from each of the associating server processes as well as a snapshot, for example, from the client process, the snapshots are then correlated and may be further be displayed, for example, to a user in accordance with user requests in different modes of software that may be included in an embodiment. The collector may be instructed to display information about a particular snapshot each time it receives data related to a particular session. Data may be viewed and displayed to a user, for example, using additional software tools that may be included in an embodiment. In one embodiment, these tools may include options for filtering, sorting, and reporting of session data.

Using the foregoing technique, information may be gathered regarding the execution of a distributed application in which each of the components or processes of a distributed application have been instrumented. In addition to local information that may be gathered, for example, with regard to a single process performed on a single computer system, additional information may be gathered about interprocess communication as well as about the distributed application as a whole. Statistics such as the measurement of wire time may be useful in determining the cost of making interprocess in cross machine calls irrespective of the cost of execution of code by a server system.

With regard to performance information about a distributed application for cross procedure or interprocedure calls, call origin information may be injected into a call from the client's side. On the server side, this call origin information may be extracted and further associated with a target procedure call that is performed and executed on the server side. Information regarding the server session with regard to the target procedure call may be recorded. Upon completion of the distributed application of the client and server components, the client and server data sets as separately recorded on each on the client server systems may be correlated in accordance with the matching call origin information associated with the server side call.

It should be noted that using this origin information and tracing it from the different clients to different servers, different statistics and performance information may be gathered with regard to a particular chain or causal connection, such as those that may be associated with nested procedure calls. Using this call origin information, for example, as initiated from a particular point of execution in the client, it may be determined dynamically which procedures are called as originated from a particular point of execution in the client system. Information regarding execution, for example, associated with particular portions of code executed on a server system as originating from a call on the client's system may be determined. Thus, a particular dynamic call chain and associated performance and coverage information may be obtained.

Also as previously described herein with regard to distributed application using the techniques set forth herein, distributed code coverage information may be obtained from concurrently executed components of a distributed application. Rather than just view each of the processes in the code coverage individually for each process, the collector, for example, as included in a client's system may request and collect information from the different collectors of the server systems and combine the individual process information into a comprehensive map of the overall coverage of distributed application information. Information such as that gathered with regard to code coverage performance, wire time and the like may be stored in a data base, for example, as connected to the client system or collector. This information may be used to show trends and execution and display to user in connection with other software that may be included with an embodiment of a client's system.

Figure 45:
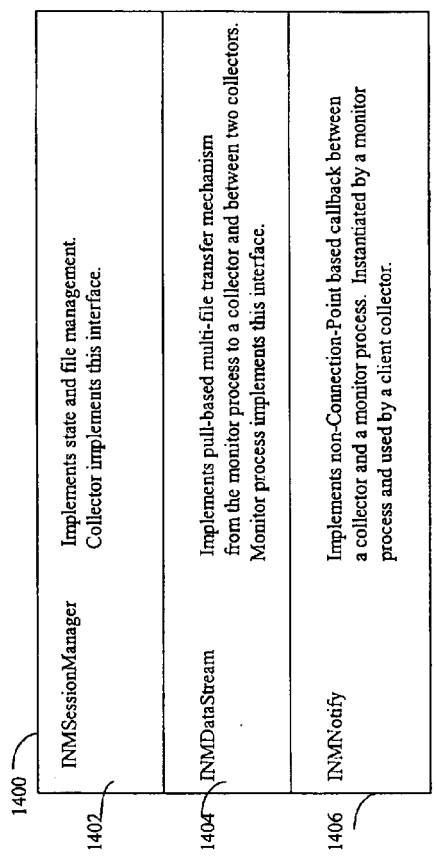
FIG. 45 is an example of an embodiment of a portion of the collector interfaces.

In FIGS. 44 and 45, included are classes of methods and interfaces as may be used in one embodiment to implement the foregoing techniques described herein. Other embodiments may have different routines, methods and the like, in accordance with the particulars of each embodiment.

Referring now to FIG. 44, shown is an example of an embodiment of some of the non-COM based classes that may be implemented by the collector in one embodiment. In one embodiment, these functions are not used in the collector to collector communication, or for collector to monitor process communication. Rather, these may be used, for example, for local communication within one computer system. Included in the chart 1370 are six classes. Generally, these classes represent C++ object classes of methods that may be invoked, such as from an instance of the collector, to perform certain tasks. It should be noted that other embodiments may include other classes in addition to those described herein.

Entry 1372 CNMFilePair is a class of methods that may be included in an embodiment to encapsulate pairs of file names. In one embodiment, all files that may be received by the collector that include data gathered with regard to the execution of an application may be cached as temporary files. Additionally, other types of files such as HTML or script search files may also have a file name associated with them. Methods of this class encapsulate pairs of files names in which a first file name describes a real temporary file and the second file name describes the final original name of the temporary file. These methods may be used to keep track of the relationship between temporary files and non-temporary files, such as in connection with using temporary files to store data temporarily as when a monitor process takes snapshot data that may be passed to the collector in a temporary file.

Entry 1374 CNMFileCollection encapsulates a list of file pairs. Generally, the entry 1374 represents a class of methods used by a client collector in maintaining the collection of files created by a client for correlating snapshot and/or session data. In one embodiment, this is a collection of "file pairs", as may created and used in connection with entry 1372.

Entry 1376 CNMSessionData represents a class of methods that encapsulate the session, script source, file content and session summary information for a session as between a collector and a monitor process. This may be used by client and server collectors.

Entry 1378 CNMProcessGroup implements a class of methods in connection with the contents for a local client session. Generally, this class implements the context for a local client session that may be identified by the process identifier of the process which hosts the session. Instances of sessions created by remote server processes associated with this client are also attached to this class. The CNMProcessGroup class is also responsible for displaying session dialogue, for example, as may be displayed in connection with software displaying results to a user, and performing correlations between client and server session data received for sessions attached to the CNMProcess GroupClass. This may be used by a client collector.

Entry 1380 CNMSnapshotGroup describes a class of methods that implement a context for a single snapshot as a local or client session. It should be noted that a single snapshot in this embodiment is identified by a snapshot identifier in connection with the process identifier of the process which hosts the session. Instances of snapshots that may be created by remote server processes associated with this client are also attached to this class. The CNMSnapshotGroup is also responsible for displaying a user dialogue, for example, as may be performed when displaying snapshot data to a user, and for performing correlations between client and server snapshot data received for sessions attached to the CNMSnapshotGroup for snapshot sessions as used by the client collector.

Entry 1384 CNMQueueEntry represents a class of methods that encapsulate information used by a processing routine when session data is queued as may be received, for example, from local and remote sessions asynchronously. Generally, the collector receives session data from both local and remote sessions asynchronously. Session data may be queued for serialized processing by the collector. The methods included in this class encapsulate the information needed by the processing routine when session data is queued. For example, this class additionally includes pointers and the interfaces associated with the session and its data as well as a snapshot identifier if the data received is a snapshot. Once the processing routine has dispatched data, the corresponding CNMQueueEntry for that data is removed from the processing queue. This may be used by the client collector to organize information that may be sent from remote server systems, such as to serialize snapshot data collected in a queue. It should be noted that in one embodiment, the collector may be implemented as a multi-threaded application or process in which a thread is used to synchronize access to shared data structures, such as this queue, used as a temporary holding area for incoming execution data. Other embodiments may implement the collector as a different application in accordance with the functionality available with each system. Accordingly, the routines used to manage and maintain data structures as well as how information is communicated may also vary with each embodiment.

Referring now to FIG. 45, shown is an example of an embodiment of interfaces that may be implemented by a collector as related to the COM interfaces. It should be noted that these interfaces are instantiated by the monitor process and the collector components as described herein in order to facilitate communications between a monitor process and a collector on the same system, as well as facilitate communications between collectors that may be on different systems such as between a client and a server system.

The chart 1400 includes three interfaces which may generally be implemented, for example, as routines with associated bodies of code and data. This is to be distinguished from the previous description of a class of methods as related to the non-COM based interfaces. In one embodiment, COM -based communication may be used in performing interprocess communications (IPC), for example, as between collectors.

Entry 1402, the INMSessionManager interface, implements data and file management. The collector implements this interface. In other words, code associated with this method or routine is included as part of the collector, or the collector is responsible for performing the functionality associated with this by calling the appropriate methods. Generally, the INMSessionManager implements date and session file management for instances of the monitor process as may be included in client and server systems. In one embodiment in which the collector may be implemented as a COM server, a monitor process may connect to its local collector by creating an instance of the INMSessionManager interface represented by the entry 1402. The monitor process invokes, for example, CoCreateInstance to request connection to a local collector. A collector connects to a remote collector by creating a remote instance of the INMSession manager interface. The local collector invokes CoCreateInstanceEx and specifies the host name of the remote collector in the invocation. The collector receiving session data implements this interface.

For a local monitor process to register a session with a remote collector, the local monitor process calls the INMSessionManager::Register method specifying the host name of the remote collector. At this point, the local collector connects to the remote collector and relays the register call to the remote collector. As previously described herein from this point on, the local collector may act as a proxy relaying method calls for the session between a local monitor process and the remote collector.

Entry 1404 INMDataStream represents an interface that implements a pull-based multifile transfer mechanism from a monitor process to a collector, as well as may be used between two collectors. Generally, the monitor process implements this interface to pass session data from a monitor process to the local collector. Additionally, a collector may implement this interface to relay data between itself and a client collector. In other words, the collector may relay execution data in this instance. The monitor process instantiates the interface through a constructor, adds a list of files to be pooled by the collector, and passes the marshaled instance pointer to the collector. The collector unmarshals the instance pointer and pulls each file through the interface as a sequence of bytes.

Entry 1406 INMNotify represents an interface that implements an efficient non-connection point based call back mechanism between a collector and a monitor process. This interface is instantiated by a monitor process and by a proxy collector and may be used by a client collector to notify a server monitor process through the service proxy collector that a snapshot is required of the server process.

It should be noted that as described herein, the COM interfaces may be used to perform monitor process to collector and collector to collector communication. The non-COM interfaces may be used, for example, in other instances, such as in the client collector to manage data Using the foregoing, in one embodiment a collector may acts as a host for a local client process, or as a pass-through agent for a server process that may communicate with a remote collector. Arguments passed to a collector by a monitor process through the INMSessionManager::Register method determines whether the collector acts as a host or proxy. For example, a NULL system name may indicate that a monitor process is registering locally. A non-NULL system name may indicate establishing a connection with a remote server. A proxy collector in turn instantiates an INMSessionManager instance on the target collector by instantiating an INMNotify interface and passing that interface to the target collector. When the proxy collector receives an INMDataStream instance from a server monitor process, it instantiates its own INMDataStream interface, saves a pointer to the monitor process's INMDataStream interface, and passes its own instantiated INMDataStream to the target collector. When the target collector calls methods on a proxy collector's INMNotify or INMDataStream interfaces, the proxy collector pass the arguments along in a call to the corresponding method of the server monitor process's INMNotify or INMDataStream interface.

With regard to client-server communication described, recall that the calling function information may be passed to the server using techniques described herein, for example, as in connection with an RPC. On the server side, this information may be extracted and stored in the thread information block (TIB) for the thread to which the call is dispatched. On the server side, a routine in the monitor DLL associates the stored calling function information with the next function called on the same thread. This information regarding the runtime call chain may be transmitted to the monitor process and is associated with function data written to the session file. It is this call chain that, when compared to the function data of other session files permits the identification of a client-side call to a server-side function during the correlation of session data. In other words, it is the identifying function information, such as address of calling function on a client system, which enables a collector to provide a tracing of run time calls between client and server systems.

Various techniques for gathering execution information, including code coverage and performance information, for example, have been described. For example, included in the foregoing description are techniques for gathering information using instrumented compiled code, such as in connection with issued U.S. Pat. No. 5,987,249 filed on Aug. 22, 1997, and FIGS. 31 and 32, and using instrumented interpretive code, such as byte code, as described herein and, in particular, in connection with FIGS. 33 and 34. Once this execution data has been obtained, such as using one of the foregoing instrumenting techniques or others as may exist in an implementation, also described are techniques for coordinating the collection of data gathered at various points in a computer system in connection with one or more processes that may be associated with an application.

The use of the foregoing techniques for obtaining execution information may be dependent upon how machine executable code may be produced. In particular, use of the foregoing techniques may be used in connection with machine executable code produced using what may be referred to as a generative approach characterized by the process by which output may be produced from a given input, such as source code.

The generative approach to translation may be characterized generally as a two-stage process of translation and then execution. For example, a source language program may be translated, as by compilation and linking, to produce a machine language program. This machine language program may then be executed with a set of data to produce output execution results. Generally, translation and execution may be characterized as distinct conceptual phases. Translation may precede execution by some arbitrary amount of time. The production of a machine language program allows for subsequent executions of the machine language program with additional input data sets without repeating translation. Use of compiled code and byte code are examples employing this type of language translation process.

In contrast, a second approach of producing a machine executable program from an input such as source code may be characterized as a single-stage or non-generative translation approach including a single stage process in which the source language program, for example, may be translated into actions that directly result in the production of output data. Generally, a machine language or other intermediate form of the program may not be produced. Translation and execution are intimately linked in a single stage. In other words, translation time is deferred until execution time and the source language program is translated each time it is executed. VBScript and JavaScript are two examples of such languages employing the single-stage or non-generative translation approach.

Generally, software application monitoring techniques exist for gathering execution information, such as coverage and execution information, using the generative approach and the single-stage translation approach. To collect execution information, such as timing and coverage data, in connection with execution of a software application produced using either the generative approach or the single-stage translation approach, existing techniques may include instrumenting code. As described herein, these techniques may be used in connection with the generative approach. For example, intermediate code and object code as may be produced using a compiler may be instrumented to generate and gather execution data at various points in program execution.

One technique that may be used with both the generative and the one-stage translation approaches involves special hooks as may be provided by a particular translator. For example, a particular translator may provide a mechanism, such as callbacks, for notification and transfer of control to monitoring software upon the occurrence of certain events. Using this technique, control may be transferred at particular points, such as when certain runtime functions or subroutines are invoked, to special routines that may inject and/or extract information prior to executing the actual code associated with a routine. Use of this technique may alleviate the need to modify and then recompile or reinterpret the modified source code. However, there is a dependency upon a vendor of the generative translator or one-stage approach translator to provide these hooks.

A problem may exist when no such hooks are provided. With a generative translator, other techniques, for example such as those described herein, may be used to gather execution information. When no hooks are provided with a one-stage or non-generative approach translator, such as with JavaScript and VBScript, a third set of techniques that will now be described may be used.

What will now be described is yet another way in which execution information, such as code coverage and performance information, may be obtained from a machine executable in which a debugger interface may be used to obtain the execution information. It should be noted that this additional technique may be used in conjunction with other ways of obtaining execution data. Once this execution data is obtained, the previously described techniques for coordinating the collection of execution data gathered at various points in a computer system in connection with one or more processes that may be associated with an application may also be used. In other words, execution data may be produced using any one of a variety of techniques in accordance with the machine executable code being monitored. Once the execution data is obtained, it may be collected and correlated using other techniques described herein, such as those used in connection with communicating the information to a single common collection point.

When instrumenting code as may be produced by a compiler, the intermediate language graph (ILG) may be rewritten to include instrumentation information, such as calls to particular routines, to gather and output information that may be used in gathering execution information. Similarly, when using Java code as with NuMega True Time V 1.1, Java code may be input to a Java compiler to produce byte code which is, in turn, interpreted by a Java VM engine. Using the techniques previously described herein, the Java byte code may be rewritten to include various hooks and other instrumentation information similar to that which is rewriting the IL produced by a compiler. Execution information may also be obtained in connection with machine executable code produced using, for example, JavaScript or VBScript, using the debugging interface techniques.

It should also be noted that the techniques described herein in connection with the debugger interface are not limited to use with the single stage or non-generative translation approach. In other words, a debugger and/or use of a debugging interface may also be used with compiled code or with a Java VM coding techniques. If a debugger is provided to work with an implementation, a similar technique may be used in that the monitor DLL and code included therein may be registered as a debugger. As with the VBScript and JavaScript code, the debugger may notify the monitor DLL code upon the occurrence of certain events. Thus, the techniques used in connection with the debugging interface for gathering execution information may also be used with the generative coding techniques, such as with a compiler and in connection with the Java VM, as well as the non-generative or one-pass technique. Thus, the following description employing the use of debugger interface techniques in an embodiment using non-generative or one-pass translation approach, such as in JavaScript or VBScript, should not be construed as a limitation of these techniques as they are applicable by one of ordinary skill in the art using a debugging interface and/or debugger in connection with other translation approaches.

Figure 46:
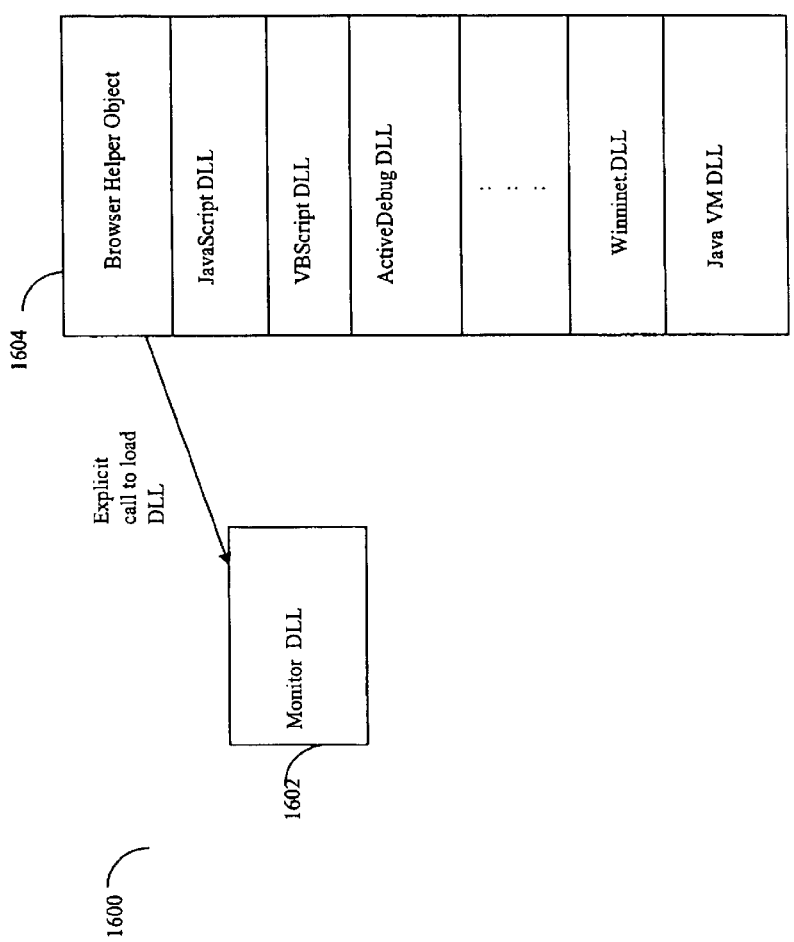
FIG. 46 is an example of an embodiment of a portion of client software in connection with a debugging interface technique.

Referring now to FIG. 46, shown is an example of an embodiment of software that may be included in a client. In this example, the client software includes a monitor DLL 1602 and a client process 1604. The client process 1604 may be, for example, a browser. Included in the browser process space are DLLs, such as a Browser Helper Object DLL, and various DLLs that may be used in connection with different languages, such as JavaScript DLL, VB Script DLL, and the Java VM DLL. Also included in the client process 1604 is an Active Debug DLL that may be used in obtaining debugging information. In this example, there exists a Microsoft provided interface that may be used in connection with VBScript and JavaScript for active debugging. Generally, APIs are provided allowing a developer to write a debugger to be used in connection with code executing that is written, for example, in VBScript and JavaScript. Items included in FIG. 46 client process 1604 are similar to those described in connection with FIG. 33. However, in the embodiment of FIG. 46, additionally included are the JavaScript DLL, the VBScript DLL, and the ActiveDebug DLL. Other DLLs, such as the JavaVM DLL, may also be invoked as needed in accordance with the code that is being executed and are shown for completeness. However, what will be described in this example are the uses of the ActiveDebug and the debugging interface in connection with obtaining execution information with the JavaScript DLL and the VBScript DLL. In this example, it should be noted that ActiveDebug is available for use with Windows 2000 and Windows 95 by Microsoft.

Similar to that as previously described herein, the Browser Helper Object (BHO) DLL may be registered with the Windows static registry causing the BHO DLL to be loaded when the browser or client process 1604 in this embodiment, is loaded. The browser may be, for example, Microsoft Internet Explorer. As also described, the BHO may be C++ code included in an implementation to load the monitor DLL 1602. The BHO DLL is loaded and executes in the client browser process space 1604. In turn, the BHO DLL includes initialization code that is executed and performs an explicit call to load the monitor DLL 1062 as depicted in FIG. 46.

Figure 47:
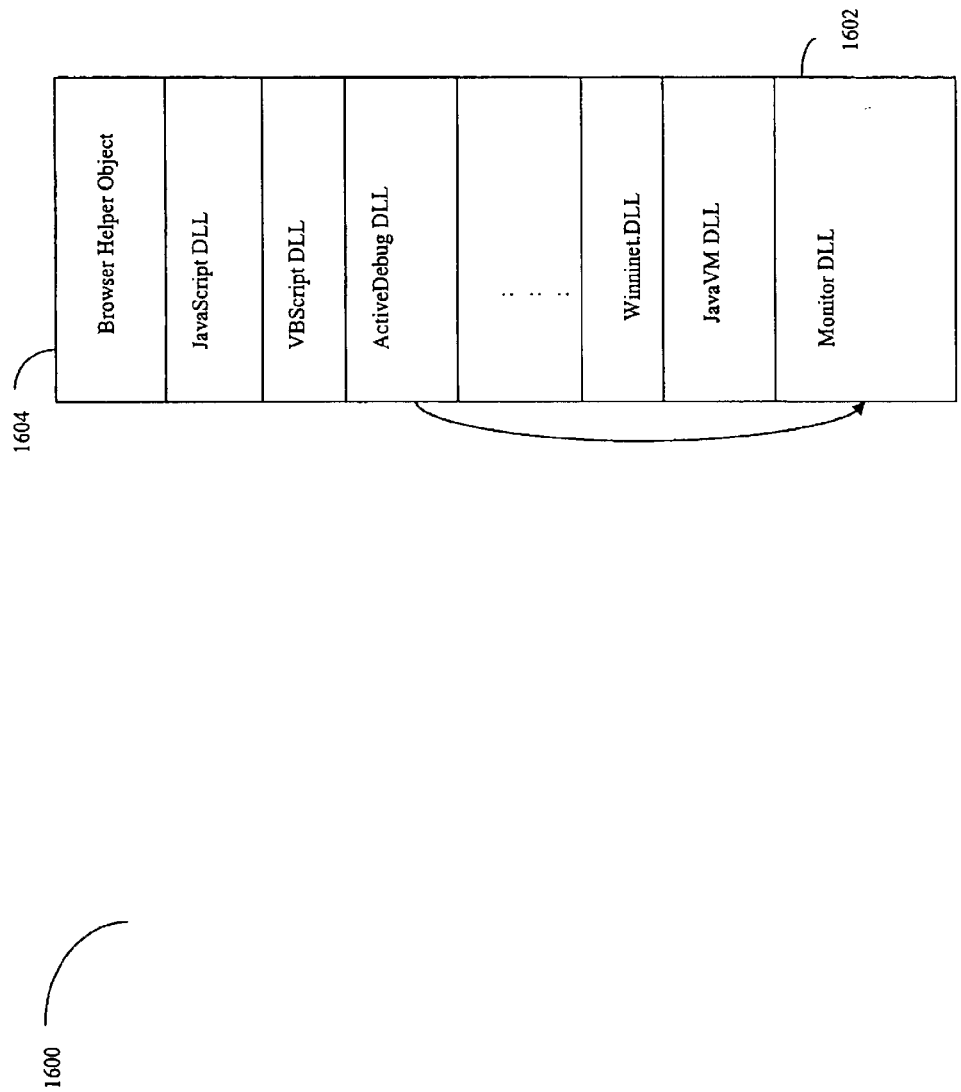
FIG. 47 is an example of an embodiment of a portion of client software in connection with a debugging interface technique as updated from FIG. 46.

Referring now to FIG. 47, shown is an example of the resulting monitor DLL being included in the client browser process 1604 as a result of performing the explicit load call. Initialization code within the monitor DLL is executed to register with ActiveDebug as a "debugger". In other words, the code included in the monitor DLL is, from the perspective of ActiveDebug, registered as a debugger to which ActiveDebug performs event notification, for example. It is through this interface that execution information is communicated to the monitor DLL, for example, in connection with performance and code coverage information about the code being executed. Additionally, as part of the initialization code included in the monitor DLL, the VBScript and JavaScript interpreter interfaces may be patched to transfer control to the monitor DLL at the end of processing since there is no debugging interface or event registration available in connection with this point in processing in this implementation. Thus, this patching technique is used in which the actual address of the routines associated with end of control processing are replaced with an address of a routine in the monitor DLL. Subsequently, the monitor DLL then transfers control to the actual routine.

At some point later in time, the browser may request a web page, such as from a server. A web page may be returned and received by the Winninet DLL. The browser may determine that the web page includes JavaScript or VBScript code and accordingly pass control to the appropriate DLL. As the JavaScript or VBScript included in the web page is executed, control passes between ActiveDebug and the appropriate script engine as needed. In accordance with the particular events that the monitor DLL initialization code registered for, ActiveDebug notifies the monitor DLL upon the occurrence of certain events as the code included in the web page is executed.

It should be noted that in the foregoing client software 1600, the browser also transfers control, for example, to the JavaVM DLL if the web page includes Java code. Instrumentation may occur, for example, using the interpretive code instrumentation technique described herein.

Figure 48:
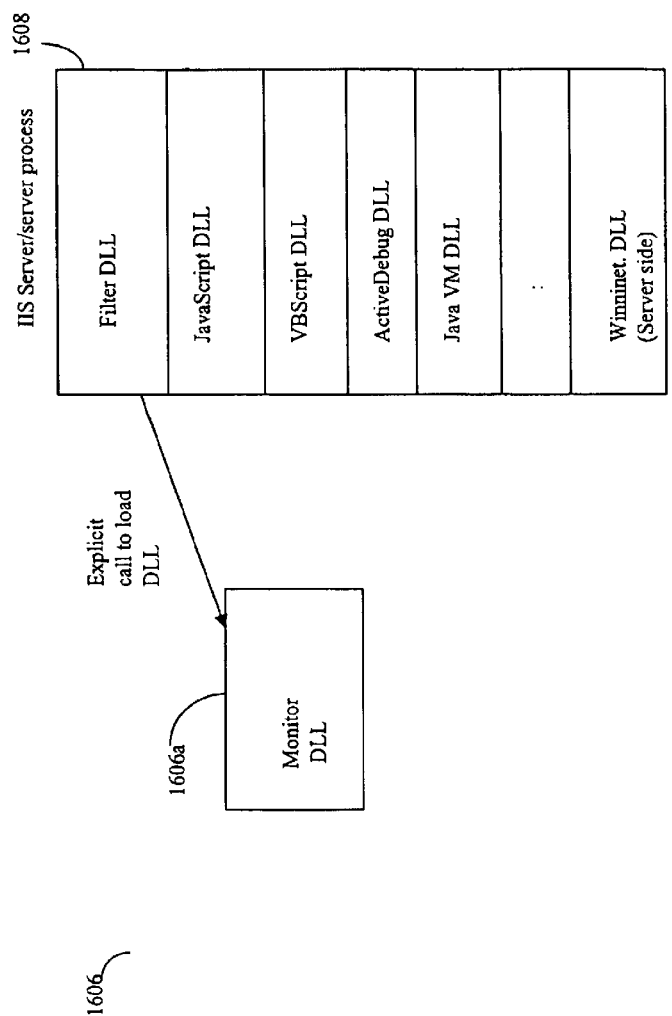
FIG. 48 is an example of an embodiment of a portion of server software in connection with a debugging interface technique.
Figure 49:
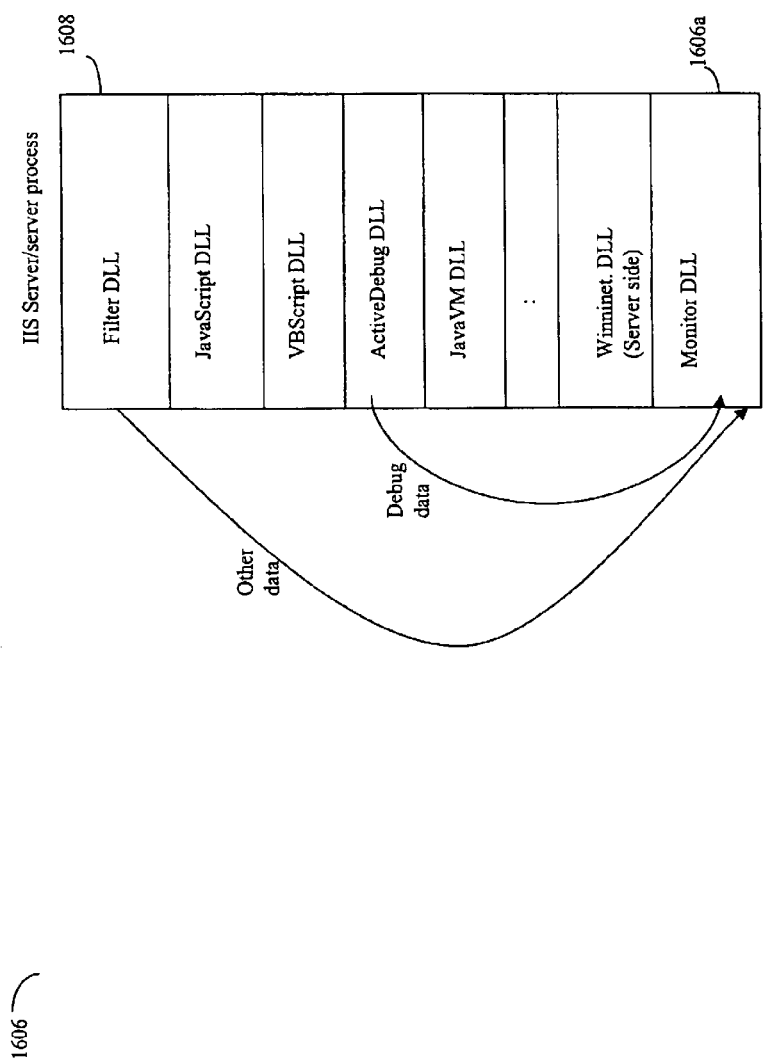
FIG. 49 is an example of an embodiment of a portion of server software in connection with a debugging interface as updated from FIG. 48.

Referring now to FIGS. 48 and 49, what will be described is software that may be included in an embodiment of the server software. Referring to FIG. 48, server software 1601 may include a monitor DLL 1606*a* and an IIS server or other server process 1608. Components included in the server process 1608 are similar to those as previously described in connection with the client process 1600. However, variations may occur in accordance with each implementation to take into account the server-side functionalities that may be provided. In this example, the Filter DLL may be registered such that it is loaded when the IIS server process starts. This is similar to the client-side step of registering the BHO DLL that is loaded upon client browser process initialization and start up. When the filter DLL is loaded, initialization code is executed that performs an explicit call to load the monitor DLL 1016*a* to be included a part of the server process 1608. Referring now to FIG. 49, shown is an example representing the loading and inclusion of the monitor DLL 1606*a*. As with the client software, the monitor DLL includes initialization code that registers the monitor DLL as a debugger with ActiveDebug to be notified upon the occurrence of certain events. Additionally, as similarly performed in connection with the client software, the monitor DLL patches the VBScript and JavaScript interfaces to transfer control to the monitor DLL at the end of processing since there is no equivalent debug event for which event registration may occur providing for transfer of control to the monitor DLL.

At some point later in time, the server executes a portion of code, for example, JavaScript or VBScript code included in a web page. This results in a transfer of control to the appropriate DLL, such as VBScript or JavaScript in accordance with the code included in a web page. ActiveDebug and the script engine interact as needed. ActiveDebug accordingly notifies the monitor DLL as appropriate.

It should be noted in both the client and server software, the monitor DLL transforms the debug information into the execution information, for example, that may be communicated to a local monitor process and, in turn, a local collector. This data may be further forwarded to other collectors as described using data collection and correlation techniques described elsewhere herein.

Figure 50:
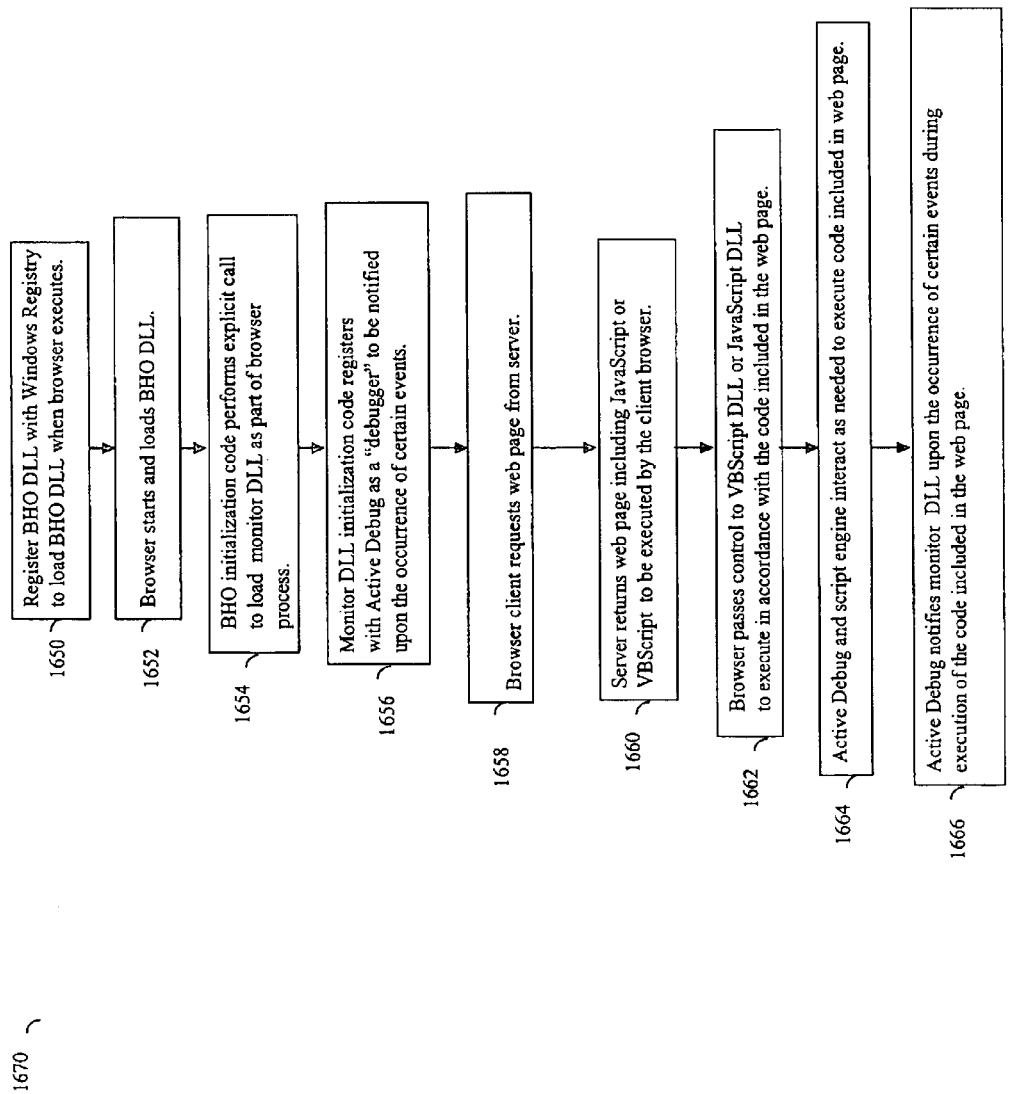
FIG. 50 is a flowchart of method steps performed in connection with obtaining execution information in a client using debugging techniques.

Referring now to FIG. 50, shown is a flowchart of method steps of one embodiment as may be performed in connection with the client browser 1600. This flowchart summarizes steps that may be performed in connection with the description previously set forth for FIGS. 46 and 47. At step 1650, the BHO DLL is registered with the Windows Registry resulting in the BHO DLL being loaded with the browser is loaded. At step 1652, the browser starts and loads the BHO DLL. At step 1654, BHO initialization code performs and explicit call to load the monitor DLL as part of the browser process. The monitor DLL initialization code registers with the Active Debug as a debugger to be notified upon the occurrence of certain events. Additionally, the end of processing entry points in the VBScript and JavaScript DLLs are patched to transfer control to the monitor DLL at the end of processing. At some time later, at step 1658, the browser client requests a web page from the server. At step 1660, the server returns the web page including JavaScript or VBScript to be executed by the client browser. At step 1662, the browser passes control to the appropriate DLL in connection with executing the code included in the web page. At step 1664, Active Debug DLL and the appropriate script engine DLL interact as needed to execute the code included in the web page. At step 1666, ActiveDebug notifies the monitor DLL upon the occurrence of certain events during execution of the code included in the web page.

Figure 51:
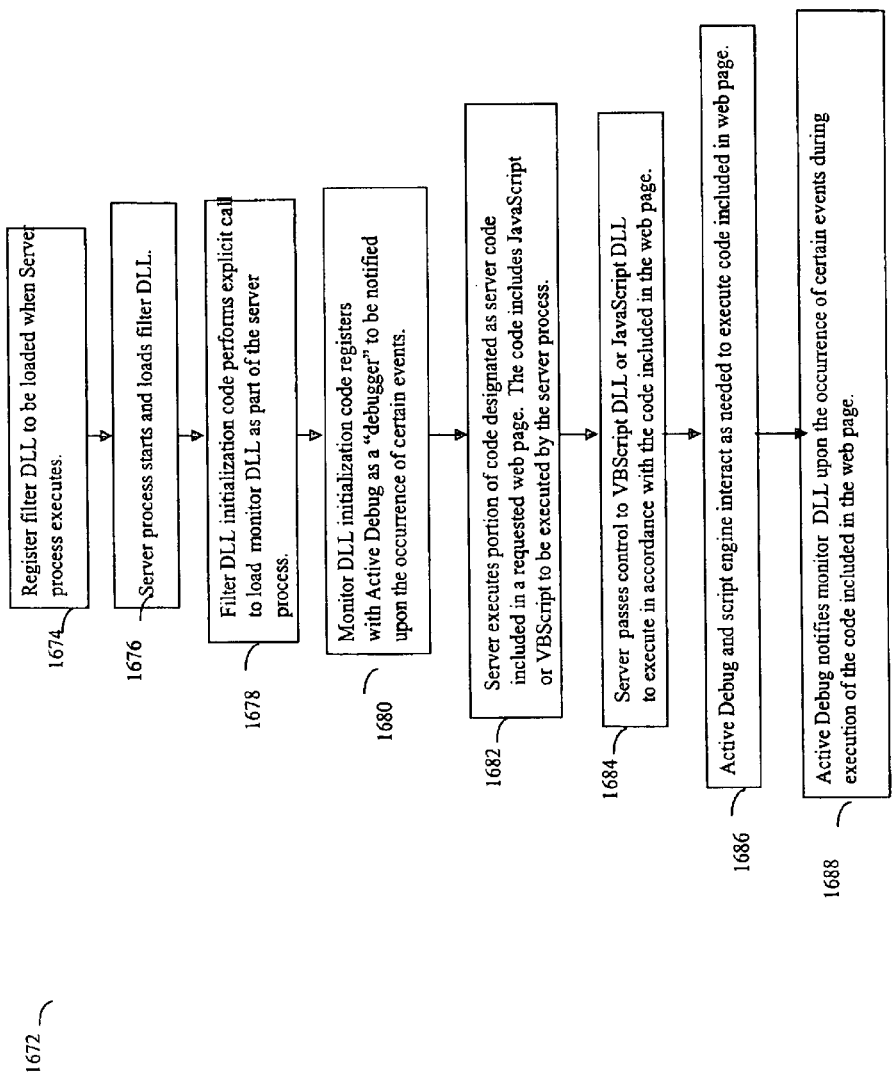
FIG. 51 is a flowchart of method steps performed in connection with obtaining execution information in a server using debugging techniques.

Referring now to FIG. 51, shown is a flowchart depicting method steps of one embodiment performed in connection with the server process 1606. At step 1674, the filter DLL is registered to be loaded when the server process starts up. At step 1676, the server process starts and loads the filter DLL. At step 1678, the filter DLL includes initialization code that performs an explicit call to load the monitor DLL as part of the server process. The monitor DLL includes initialization code that registers with ActiveDebug as a debugger to be notified upon the occurrence of certain debug events, such as end of line processing, as will be described in more detail in following text. Additionally, the VBScript and JavaScript entry points for end of routine processing control are patched to provide for transfer of control to the monitor DLL.

Some time later, the server, at step 1682, executes a portion of code that may be included in a web page, for example, designated as server code. At step 1684, the server process passes control to the appropriate VBScript or JavaScript DLL to be executed in accordance with the code being executed. At step 1686, ActiveDebug and the script engine DLL interact as needed to execute the code included in the web page. At step 1688, ActiveDebug notifies the monitor DLL upon the occurrence of certain events during the code execution.

In this embodiment, the monitor DLL is written in C++. The monitor routines may be a set of methods. Control may be transferred to this DLL and other DLLs, such as the VBScript and JavaScript DLL, for example, using an address table which includes a list of addresses or pointers the method routines. In one embodiment, in connection with patching the VBScript and JavaScript end of processing routines, for example, the address table base may be used plus an offset at which the pointer to the end of processing routine(s) are modified to point to a routine in the monitor DLL.

Also, in this embodiment, as part of the step of registering with ActiveDebug, execution is placed in single step mode whereby ActiveDebug transfers control to the monitor DLL after the execution of a single step or instruction.

It should be noted that in this example, five particular pieces of execution information may be determined from the debugger information. In other words, what is described in more detail elsewhere herein are steps in transforming debugger reported data to these five pieces of execution information:

1. Function entry information
2. Function exit information
3. execution information prior to executing a line of source code
4. execution information after executing a line of source code
5. tracing information about what code was executed for providing code coverage information, if requested.

Figure 52:
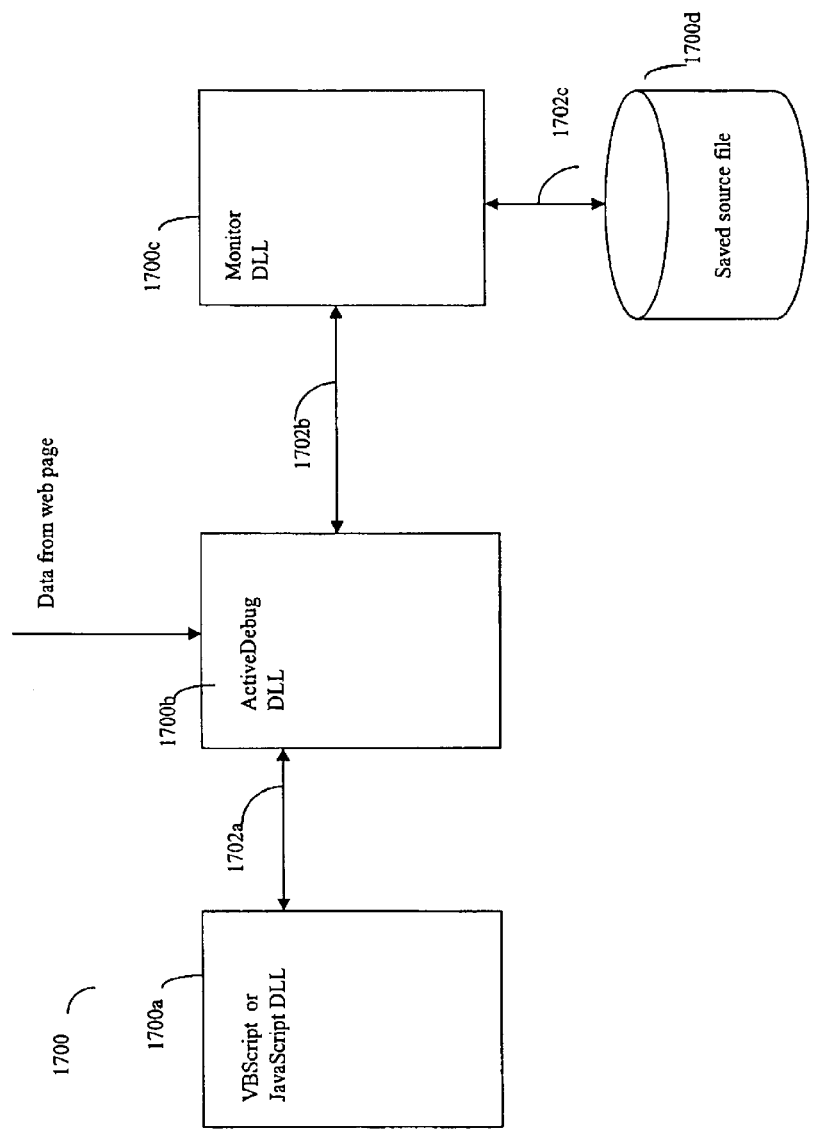
FIG. 52 is an example of more detailed processing and cooperation between the various components as may be included in a client and/or server software using debugging techniques.

As previously described, data is passed to the monitor DLL registered as a "debugger" from the Active Debug DLL. Referring now to FIG. 52, shown is an example of representation of the dataflow between some of the components as previously described in connection with the client and server software. The components 1700 include the script engine, such as the VBScript or JavaScript DLL 1700a that interacts with the ActiveDebug DLL 1700b. The ActiveDebug DLL in this embodiment acts as a driver directing the control between other components as needed, such as between the scripting engine DLL and the monitor DLL 1700c. The monitor DLL 1700c may store the source code as a file 1700d. In this embodiment, the source code may be as input received from the web page and forwarded from the ActiveDebug through connection 1702b to the monitor DLL 1702c. It should be noted that the foregoing may refer to components previously described in connection with both the client and the server. In other words, this description applies to software included in both the client and the server software.

As will be described in more detail, ActiveDebug transfers control and data to the isntrumentation DLL using connection 1702b at various processing times. A first occurs at document registration time in connection with, for example, an incoming web page including source code to be executed. A second occurs when there is a break point at the end of executing an instruction. The first and second points in this embodiment are official registration points, such as those registered in connection with Active Debug as a debugger. A third processing point is at the completion or end of processing, such as at the end of executing a routine or program. Control may be transferred to the monitor DLL in this embodiment using the foregoing patching of the scripting engine DLL as previously described.

Figure 53:
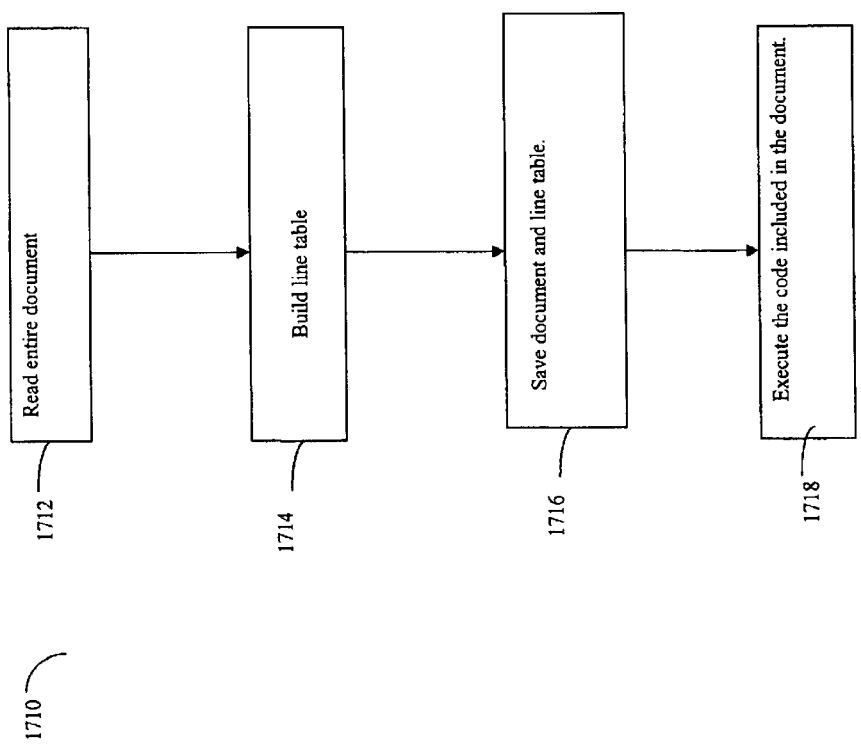
FIG. 53 is a flowchart of method steps of one embodiment performed by the components of FIG. 52.

Referring now to FIG. 53, shown is a flowchart depicting method steps of one embodiment performed in connection with obtaining debugger information as be a client or server software. At step 1712, the entire document, such as a web page, including the code to be executed, is received and read as input. This is communicated to the monitor DLL through the ActiveDebug DLL as part of document registration of an incoming document to be executed as including code, such as VBScript or JavaScript. At step 1714, a line table is built that includes information per source line as may be determined, for example, by parsing the input stream for detection of line breaks in the input. At step 1716, the entire source file to be executed and the associated line table built are stored. The source file may be stored, for example, in a file 1700d as may be included in a file system. In one embodiment, the line table may be stored in memory for quicker reference and use. Other embodiments may store the line table on another memory device or other storage device as needed in accordance with each embodiment. At step 1718, the code included in the source file is executed and control transfers between components, such as the various DLLs as appropriate in connection with execution of the code and obtaining the execution information.

Recall that in this embodiment, Active Debug is in single step execution mode to provide for transfer of control from Active Debug to the monitor DLL after the occurrence of each line of source code. Also, in this embodiment, the ActiveDebug DLL detects "end of processing", as may be associated with the end of a program or routine, when the scripting engine DLL "times out" or remains "inactive" with regard to code execution for a predetermined amount of time. How other embodiments determined this may vary.

Control is transferred to the monitor DLL upon completion of executing in single step mode. When control is transferred after executing step "n", this is also treated as gathering execution information prior to executing instruction "n+1".

In connection with a breakpoint as may be associated with executing a single line of source code, Active Debug transmits through a debugging interface as by routine parameters certain data. In this embodiment, this information may include:

1. document identifier of the source file, such as 1700d
2. position in terms of character offset of the statement or current source line relative to the beginning of the source file
3. a string description of the stack frame, such as "IN FUNCTION CALL" or "FUNCTION XYZ" indicating the current function being executed or called, if any.
4. an integer indicating the stack depth as to how many calls deep for the current processing point. In one embodiment, this is an integer quantity with a beginning depth of 1 that is incremented by 1 each runtime call, and accordingly decremented by 1 each time a call is complete.

Different portions of the foregoing information may be stored or communicated to the monitor process, for example, for use in further calculations and determinations.

It should be noted that at the time of a breakpoint, the system time, such as by using an operating system supplied routine, may be obtained. This may represent the CPU execution time. In another embodiment, the CPU execution time may also be obtained as by reading the value from system wide storage location, such as a register, directly. Other information may be determined and obtained in connection with a breakpoint in accordance with each embodiment. Differences in time values may be used, for example, to determine an amount of execution time associated with a single line number, such as may be used in determining the efficiency of interpretation of a single line.

The line table may be used in connection with the supplied offset to determine the actual source line number being executed.

Figure 54:
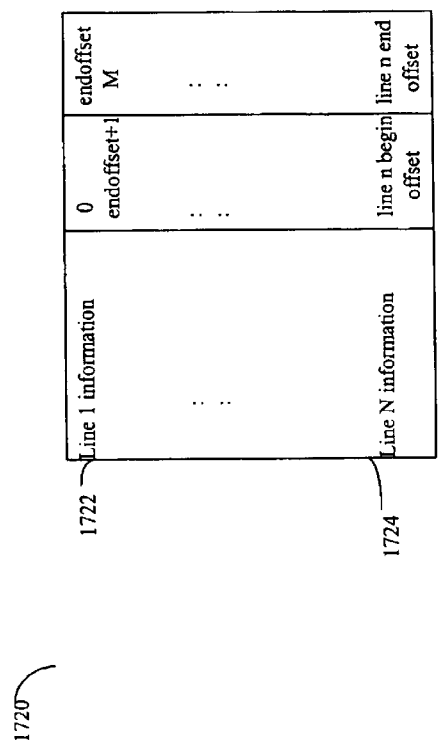
FIG. 54 is an example of an embodiment of a line table.

Referring now to FIG. 54, shown is an example of an embodiment of a line table 1720. The line table 1720 includes information corresponding to each source line as received as input and stored in the file. Source line information includes, as in the first column of the table, the text of the source line itself, or a pointer to where this may be located. In columns 2 and 3 associated with each line number are, respectively, the beginning and ending offsets as may be associated with the beginning and ending character positions relative to the start of the file. Thus, in this embodiment, the character position may be mapped to a source line number. In one embodiment, this may be performed by performing a binary search of the line table to locate a line number for which the character position falls inclusively within beginning and ending offsets of each line.

ActiveDebug transfers control in connection with a function entry. Additionally, data is communicated to the monitor DLL at time of function entry. In one embodiment, this data may include:

1. stack depth or other indicator as to whether the depth increased.
2. string or stack description.

The information actually saved in connection with the function entry, as may be stored in a data file or communicated to a monitor process, may include:

1. function name, as may be obtained from the string or stack description from the ActiveDebug
2. time stamp, as may be obtained using a system supplied routine as described elsewhere herein;
3. source or record line number, as may be determined using the line table and an iterative binary search technique.

At function exit, Active Debug communicates information similar to that as described in connection with the function entry information with the difference that the stack depth is decreased by one. Similarly, an embodiment may output or communicate information similar to that associated with a function entry, to a monitor process, for example, or stored or used in connection with forming other execution information.

At the end of processing, as may be associated with the end of executing a routine, for example, end of line information may be recorded, such as a call to determine the current CPU time.

If code coverage information is requested and included in an embodiment, when a line of source code is executed, as determined in connection with a breakpoint processing, an indicator may be stored and included in the line number table. In one embodiment, this may be a binary indicator associated with each line number that is set to true or 1 when executed, for example, as may be determined in connection with breakpoint processing in step mode. If an embodiment does not include code coverage information, or such information is not requested, as by a user, then this additional bit of information does not need to be recorded or stored, for example, as may be included in the line table.

It should be noted that the monitor DLL may perform some lexical processing in connection with inputting a source file. For example, line breaks need to be determined in connection with creation of the line table. Additionally, some static scoping as to beginning and ending of functions and which lines of code are executable may be determined. Function begin and end may be determined to associate particular source line(s) with certain functions. This information may be used in connection with other information communicated from ActiveDebug.

Other embodiments may include other processing in accordance with the particulars of each implementation.

The foregoing technique may be used for gathering execution information, such as profiling, coverage, and execution tracing for an application, using a debugging interface as may be provided in connection with an operating system. Other third-party products may also provide a debugger interface that may also be used in an alternate embodiment. As will be described in paragraphs that follow, using this debugging interface, execution data for an application may be gathered at various points in execution of the software application. Generally, the technique uses the already available debugging interfaces may be included in an operating system for notification to software that gathers execution data. This technique may be particularly useful, for example, in connection with non-generative or one-step language translation processing techniques.

One embodiment uses an available mechanism from Microsoft, known as Active Debugging, which is a set of component object module interfaces defined by Microsoft for debuggers on Windows operating systems, such as Windows 95 and Windows 2000, for use with VB Script and Java script code.

Monitoring software may be registered as a debugger which is notified by the debugging support as may be included in the Active Debugging component of the Microsoft operating system upon the occurrence of certain events. As each line of the code is interpreted by a script engine, the Active Debugger notifies the monitoring software so that data may be collected.

One advantage of the foregoing is that the underlying technology used for collecting execution data is widely available requiring no special hooks or support other than which may be provided in an operating system. It should generally be noted that other debugging mechanisms such as may be supplied by a third-party, may also be used in gathering execution information. Additionally, the foregoing provides an advantage in that it may be used in an environment in which source code is interpreted by an execution engine. Thus, the foregoing technique may be used with one-stage approach languages such as the VB Script and Java Script in which the combination of translation and execution may be performed as a one-stage translation process without hooks. Additionally, the foregoing techniques may also be used with other language processing, such as generative language processors, without requiring the use of instrumentation.

Data obtained using the debugging interface may be communicated to a local monitor process and other points, such as local and remote collectors, using data collection and correlation techniques also described herein. The execution data obtained using the debugging interface may be used in connection with other execution data obtained using other techniques. For example, a client process may be written using JavaScript and VBScript. Client execution data may be obtained using the debugging interface techniques just described. A first server process may include only instrumented compiled code and execution data may be obtained using a different technique, such as that described in issued U.S. Pat. No. 5,987,249, filed on Aug. 21, 1997. Yet a second server process may include only Java code and execution information may be obtained using the previously described instrumented Java byte code instrumentation techniques. In yet a third server system, a combination of the foregoing techniques may be used in accordance with the different code executed, such as a combination of compiled code routines and Java code. All of the execution information may be communicated and correlated at the single client using coordinated application monitoring techniques also described herein.

As also described herein are techniques used in connection with gathering information in connection with remote procedure calls. It should be noted that as described herein, a remote procedure call is an example of a cross execution context call to which these techniques may be generally applied. Thus, although the foregoing embodiments and techniques may be described with particular reference to remote procedure calls, these techniques may be used to gather information in connection with any cross execution context call in general. A cross execution context call may be defined as a call, as between a first and second routine, in which each routine has an associated different context. A context may be defined as a description of the execution environment of a routine and may include, for example, a particular computer processor, a particular execution mode, such as kernel or user mode, a particular stack, and the like. When a change exists between a first and a second context, such as a different stack being associate with each context, and a call is made from code executing in the first context to other code executing in the second context, this may be referred to as a cross execution context call in which there is a change in execution environment. Examples of cross execution context calls may include, but are not limited to, calls between two threads, or calls between two processes. A remote procedure call is a cross execution context call in which the called routine and the calling routine may be on different computer systems. Another example of a cross execution context call is a call made from a first thread to a second thread in which the first thread waits for the second thread to finish executing before resuming. Thus, as described herein, information may be gathered about remote procedure calls, so may the same techniques be used to gather information about other cross execution context calls as related to an application's execution or runtime behavior, such as that of a distributed application.

What will now be described are techniques for gathering platform information in connection with program execution. Platform information may include, for example, software component information and system configuration information uniquely identifying a particular instance in connection with a program.

Figure 55:
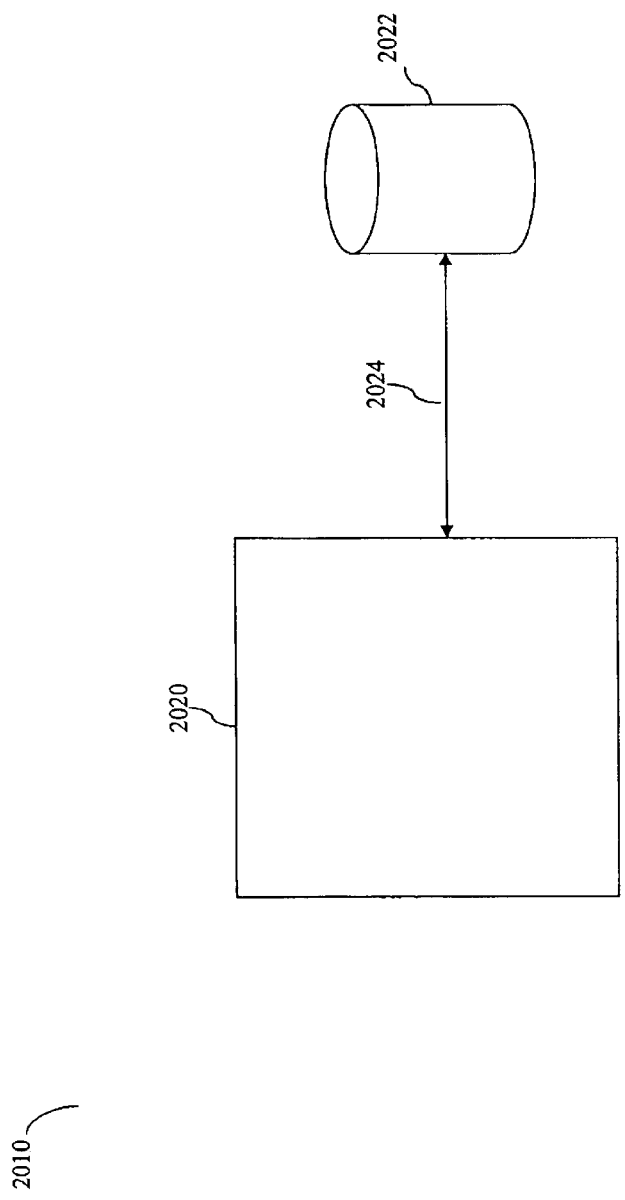
FIG. 55 is an example of an embodiment of a computer system.

Referring to FIG. 55, shown is an example of an embodiment of a computer system. The computer system 2010 includes a computer processor 2020 connected to a database 2022 by communication means 2024. In the computer system 2010, the computer processor 2020 may be any one of a variety of commercially available processors, such as an Intel-based processor. It should be noted that other computer processors may be used in an embodiment and neither the type nor number of processors should be construed as a limitation.

The computer processor 2020 is connected by a communication means 2024 to a data storage device 2022. The data storage device 2022, for example may be any one of a variety of data storage devices known to those skilled in the art. The data storage device 2022 may include a database and comprise a varying number and type of storage devices ranging from, for example, a plurality of disks to a single "floppy" drive.

As known those skilled in the art, both the processor and the data storage device may vary in accordance with each embodiment and implementation in terms of number and type of each. Similarly, the communication means 2024 used to facilitate communications between the processor 2020 and the data storage device 2022 may be any one of a variety of communication devices, such as a network connection in accordance with each implementation and embodiment.

Figure 56:
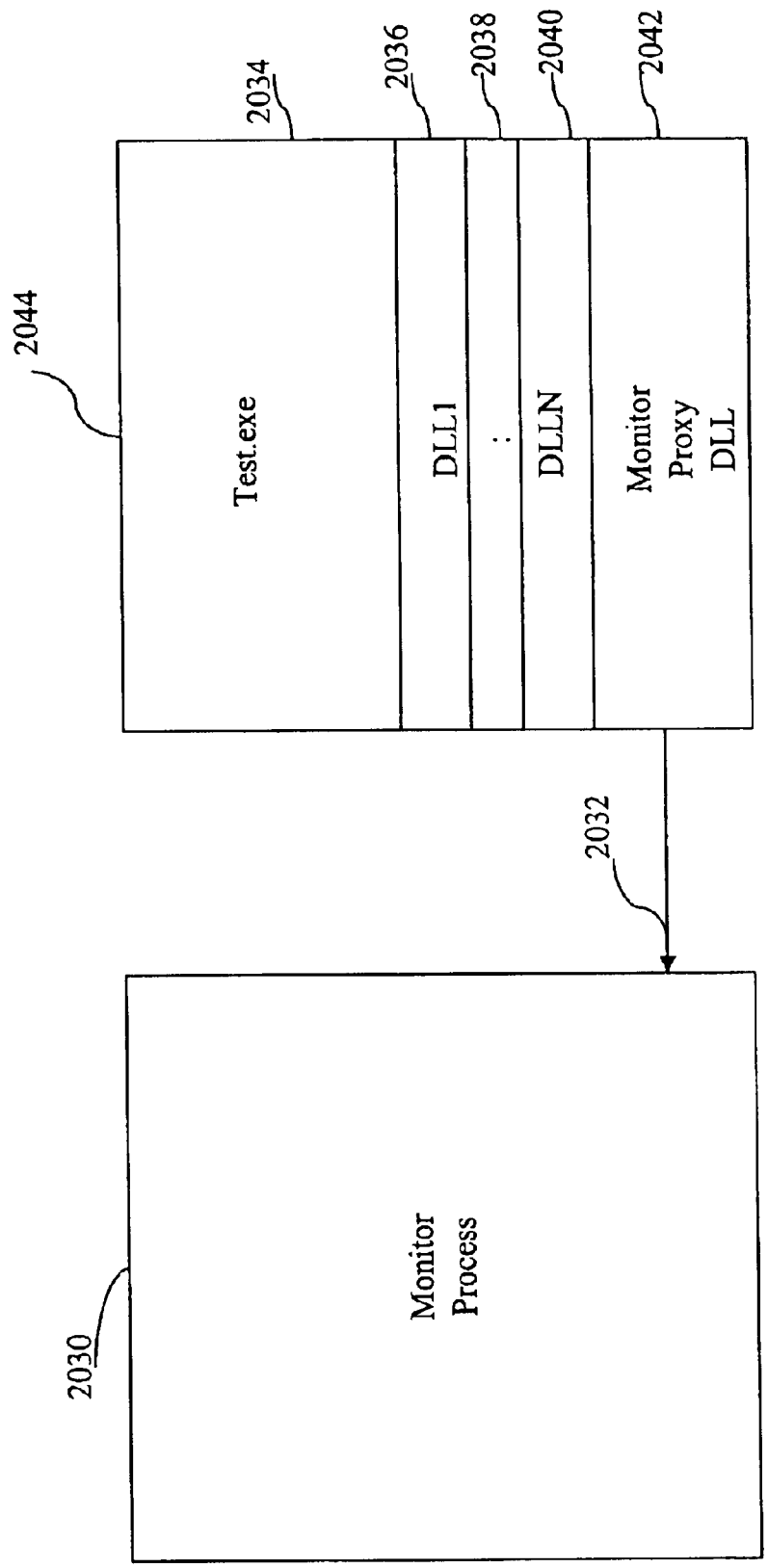
FIG. 56 is an example of an embodiment of a monitor process gathering information from a test program.
Figure 57:
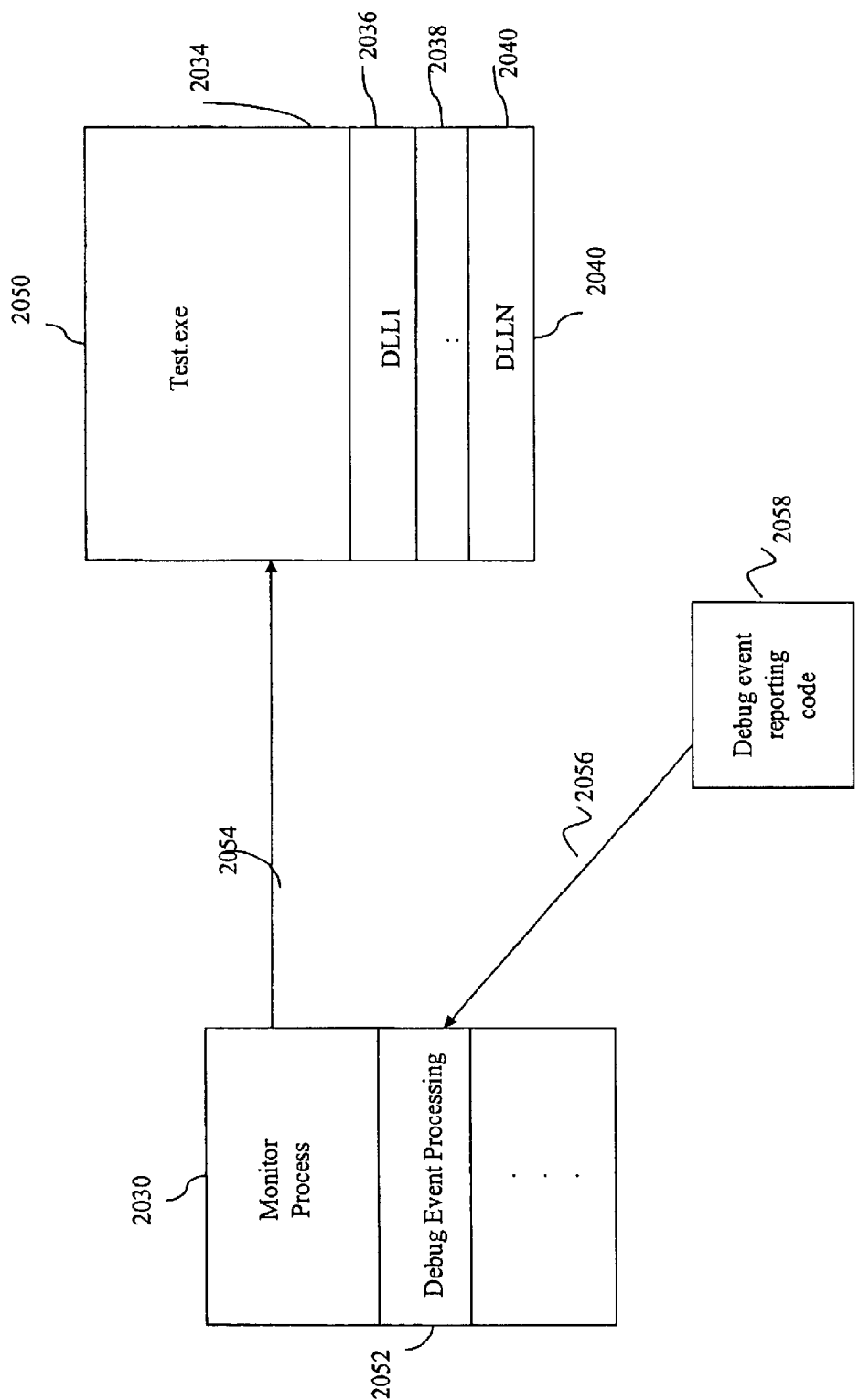
FIG. 57 is an example of another embodiment of a monitor process gathering information from a machine executable program.

What will now be described in conjunction with FIG. 56 and FIG. 57 are embodiments that may be used to gather a portion of platform data. Platform data generally includes system configuration information and software data that describes a software programming environment. The software data includes software component information distinguishing one version of a software component from another. The system configuration data may include, for example, different software settings or options and hardware data particular to a system environment. The hardware data may include, for example, hardware configuration data distinguishing the system upon which a program is executed. Taken together, the system configuration data and software data describe a "platform" as may describe the environment in which a program is executed.

Referring now to FIG. 56, shown is an example of an embodiment of software that may execute in the computer system 2010. FIG. 56 includes a monitor process 2030 and a program being monitored 2044. Both the monitor process 2030 and the machine executable program being monitored (test.exe 2044) may be executed by the computer processor 2020 and stored on the data storage device 2022. The machine executable code associated with the monitor process 2030 and the program being tested 2044, for example, may be stored on the data storage device 2022 in the computer system 2010 and loaded for execution via communication means 2024 to the computer processor 2020.

The monitor process 2030 may be a machine executable program written in any one of a variety of commercially available programming languages, such as C++. An example of a monitor process is included in the commercially available implementation of NuMega BoundsChecker. Generally, the monitor process 2030 gathers information and data in accordance with the execution of the program under test 2044 which in this example may be referred to as test.exe. The machine executable program 2044 being monitored in this particular example may be written in one of a variety of conventional, commercially available languages, such as C, and C++, for which instrumentation may be provided. One technique of how instrumentation of a program may be performed is described in U.S. patent application Ser. No. 08/916,125, entitled "IR Code Instrumentation".

The illustration in FIG. 56 of the program being monitored, test.exe 2044, includes several portions. The portion 2034 corresponds to a segment of user supplied source code. Also included in the program 2044 are several dynamic link libraries (DLLs). Each of the DLLs, for example such as DLL1 2036 and monitor proxy DLL 2042, correspond to shared machine executable code which resides in the computer system 2010 as a library of routines which may be used, for example, by the user supplied portion 2034. Additionally, a DLL, such as DLLN 2040, may be included due to an indirect call from within another DLL, such as DLL1 2036. This may occur, for example, if a call is made by DLLl 2036 to an operating system or other routine which is included in another DLL. As previously described, a call may also be made to a DLL directly from the user portion 2034.

It should be noted that the monitor proxy DLL 2042 may be included automatically at link time into the machine executable 2044 in this particular embodiment as a result of code instrumentation. Alternatively, other embodiments may employ other techniques to cause DLL 2042 to be loaded into process execution space, for example, as described in "Programming Applications for Microsoft Windows", 4th Edition, by J. Richter, Microsoft Press, September 1999. In this particular embodiment, the monitor proxy DLL 2042 is included in the commercially available product NuMega TrueTime in conjunction with the monitor process 2030, for example, using the techniques set forth in U.S. patent application Ser. No. 08/916,125, entitled "IR Code Instrumentation". Generally, the monitor proxy DLL 2042 includes monitoring routines which report information back to the monitor process 2030. In this particular embodiment, the monitor proxy DLL 2042 includes code that monitors events related to the loading of various types of libraries. For example, the libraries monitored by routines in the monitor proxy DLL 2042 include shared libraries or DLLs as well as OCX or ActiveX Control libraries. Generally, as known to those skilled in the art, DLLs and OCXs include shareable machine executable code that may be used for example by program 2044. The proxy monitor DLL 2042 includes routines that send load event information to the monitor program 2030 using connection 2032.

In this embodiment, the monitor proxy DLL 2042 may receive DLL load information by scanning the process virtual address space, or, by monitoring calls to operating system routines that load the DLLs, such as the LoadLibrary routine from Microsoft Windows. Information may be transferred to the monitor 2030 using shared memory as the communication channel 2032. It should be noted that other embodiments may employ other techniques in accordance with each implementation.

The library load information communicated from the monitor proxy DLL 2042 to the monitor process 2030 may be achieved, for example, in a Windows programming environment, such as using Windows 95 or Windows NT. In this environment, programming applications may be invoked from a menu option. For example, using a "start" option selected from a menu display, the machine executable program 2044 may be selected to begin execution. Once the program 2044 to be tested or monitored is executed, the monitor process 2030 is invoked indirectly from code included in the monitor proxy DLL. The monitor process 2030 is invoked indirectly because previously the machine executable program 2044 was linked for instrumentation and monitoring.

The monitor proxy DLL 2042 monitors operating system events for loading machine executable code or libraries such as DLL1 2036 and DLLN 2040. The monitor proxy DLL 2042 includes code to accomplish this, for example, by monitoring user API calls made within the user supplied portion 2034. For example, the monitor proxy DLL may monitor specific user APIs such as CoCreateInstance and Load Library which are APIs used in the Windows environment for loading DLLs. It should be noted that other embodiments may include monitoring of other particular APIs from within user code 2034. Additionally, other techniques may be used to gather information regarding software components used with a program being tested 2044.

It should be noted that the foregoing description regarding FIG. 56 refers to one technique by which data regarding software components used by a particular program being tested may be communicated to a monitor process for gathering of software component information whose use will be described in the following paragraphs.

Referring to FIG. 57, shown is an example of another embodiment by which information may be gathered regarding particular operating system events as needed for loading different software components or libraries. In FIG. 57, shown is the monitor process 2030 a machine executable program to be tested 2050 and debug event reporting code 2058. The debug event reporting code 2058 may be a portion of operating system code that is invoked when a particular system event occurs. In this particular embodiment, the program being tested 2050 does not include a monitor proxy DLL 2042 as previously shown in the embodiment of FIG. 56. Additionally, it should be noted that the program 2050 may also be written in any one of a variety of commercially available programming languages, such as C or C++.

In this particular embodiment, the debug event reporting code 2058 forwards information regarding operating system events for loading different libraries such as DLL 1 2036 to a portion of code referred to as debug event processing code 2052 included in the monitor process 2030.

The alternate embodiment as depicted in FIG. 57 may occur, for example, by invoking the monitor process directly from the "start" program menu as in a Windows-95 or other similar programming environment. Subsequently, from within the monitor process 2030, a command or graphical user interface may be displayed and the user may enter commands to invoke the machine executable program to be tested 2050.

When program 2050 is executed, the debug event reporting code 2058 monitors or "catches" certain operating system events, such as the loading of libraries such as DLL1 2036. In this embodiment, the operating system includes code for loading the library, such as DLL1. The operating system also includes the code associated with the debug event reporting code 2058. Thus, in this embodiment, the operating system transfers control from the load library routine to the debug event reporting code 2058, for example, upon loading a DLL. Subsequently, when a DLL load event occurs, the debug event reporting code 2058 is executed and reports the occurrences of the load event to the debug event processing code 2052 of the monitor process 2030. In one particular embodiment, the debug event processing code 2052 includes a code loop which continuously monitors events from the WIN32 API as reported by the debug event reporting code 2058.

In one embodiment, the communication channel between the debug event reporting code 2058 and the debug event processing code 2052 may be established by having monitor process 2030 identified or associated with the program 2050 as a debugger process, such as by using operating system routines. Other embodiments may employ other techniques in accordance with each implementation.

It should be noted that the embodiments previously described with regard to FIGS. 56 and 57 are two of a variety of different techniques that may be used to gather various software component information. In this particular embodiment the software components for which information is being gathered are libraries, such as DLLs or OCXs as known in the Windows environments. Other types of programming environments may include different types of software components other than a library such as a DLL or OCX.

The types of software components that may be used in connection with testing a software program may vary with programming environment. However, generally a software component is a unit of software that may be used with a machine executable program, such as 2050 of FIG. 57 and 2044 of FIG. 56. In other words, each of the software components are units that may be varied within a machine executable program to be tested. Using these monitoring techniques, data regarding the different software components is gathered.

In the previously described embodiment of FIG. 56, the monitor proxy DLL 2042 is included as a portion of the program being tested 2044 to monitor for specific calls and communicate information to the monitor process 2030 when a particular software component is loaded. This DLL 2042 is automatically included in the linked program 2044 as a result of instrumentation of the program. In this embodiment, for example, DLL 2042 may be included in a commercially available product such as NuMega TrueTime. The technique of FIG. 56 may be used with a program that uses code instrumentation. For example, the program 2044 may be an instrumented machine executable program produced using C source code.

In contrast, the embodiment in FIG. 57 uses debug event reporting code 2058, such as operating system code invoked for debug event processing, that forwards data to the monitor process when a particular software component is loaded. No instrumentation is used and no monitor proxy DLL 2042 is included in the resulting program being tested 2050.

Using either technique in FIG. 56 or FIG. 57, information regarding the software component used is communicated to the monitor process 2030. Generally, the information which is recorded for the particular library or software component is distinguishing information enabling one to identify a particular version of the software component or library. This information may include, for example a version number, a link date and time, a file size, as well as other information which may be used to distinguish one version of the software component from another.

What has been described generally is the gathering of information with regard to software components. In the previously described embodiments, the software components included libraries such as DLLs or OCXs. The information which is gathered with regard to each of the libraries is distinguishing or identifying information to enable one particular version of a software component to be distinguished from another version of the software component. What will now be described is how this information may be stored and used within the system 2010, as well as a particular embodiment of the information in accordance with a database schema.

Figure 58:
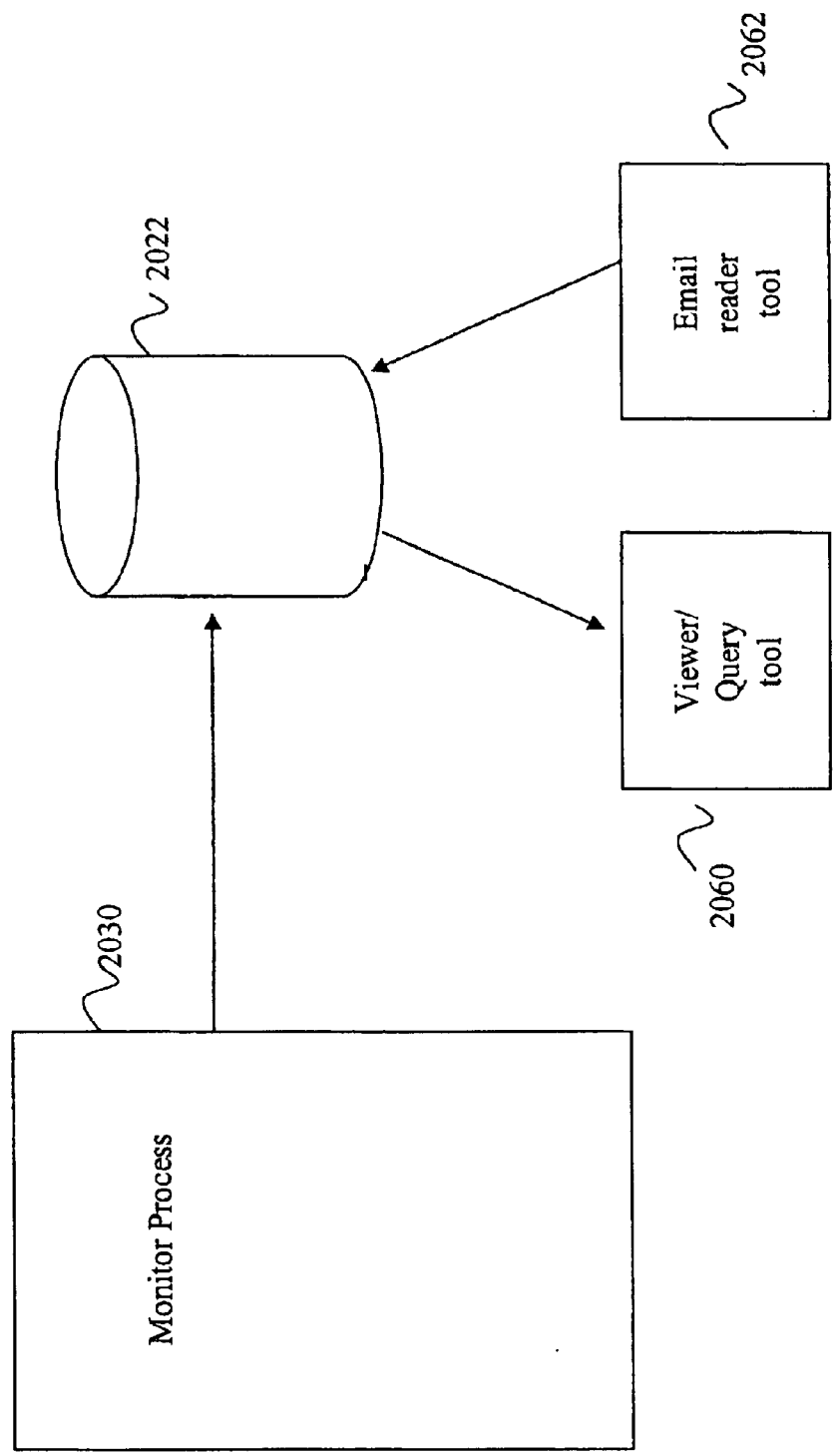
FIG. 58 is an example of an embodiment of a monitor process interacting with a database and other tools using information stored to the database.

Referring to FIG. 58, shown is a data flow diagram of one embodiment of the data flow relationship between the monitor process and various tools using software component information. The monitor process 2030 and the e-mail reader tool 2062 in this particular embodiment store the information gathered regarding the libraries on the storage device 2022. This information may be used by various tools such as a viewer/query tool 2060.

It should be noted that other embodiments may include other tools using the information in device 2022. Additionally, other information besides the software component and other platform data may reside on the storage device 2022.

Generally, platform data includes the software component information gathered by the monitor process. The platform data is stored in the data storage device 2022 in any one of a variety of data organizations and formats that may be understood and accessed by the various tools, such as the viewer/query tool 2060 and the e-mail tool 2062. In one embodiment, the viewer/query tool 2060 accesses platform information and, via a user interface, displays the information in a user-readable form.

The e-mail reader tool 2062 may be connected to an outside network and is forwarded formatted e-mail messages, for example, from a customer site reporting a problem. The formatted e-mail message may describe the platform upon which the problem occurs. The e-mail reader may interpret this formatted e-mail message and enter associated platform data in the database for the bug report.

It should be noted that the formatted e-mail message may be in any one of a variety of fixed formats. For example, in one embodiment, the e-mail message includes one or more pairs of data. Each pair includes a field-name and one or more corresponding data fields. The field-name is recognized as a keyword by the e-mail reader tool and the keyword and corresponding data map to fields and corresponding data values as may be used in a database organization. For example, a field-name, may refer to a particular type of database object having one or more associated fields. The corresponding data may identify a particular field of the object and a value for an instance of that field. Other embodiments may have other types of formatted input that the tool understands and subsequently maps to a corresponding database item.

Tools, such as the viewer query tool 2060 and e-mail reader tool 2062, may be bundled with the commercially available monitor process 2030. Alternatively, each of the software tools may also be additional third party products that interact with data in a particular format for example as will be described in a particular database format. It should also be noted that other tools and other functions in accordance to the particular embodiment may exist and interact with the data storage device 2022 making use of software component information as gathered by the monitor process 2030.

In one embodiment, the platform data on the data storage device 2022 is stored in a particular database format known as an object-oriented database, such as that used with the commercially available object-oriented database "Poet", by Poet Software. In this particular implementation, the data which is gathered by the monitor process 2030 is stored in an object database in which the data is represented in the form of objects that are connected or associated with one another. The data is stored on the storage device 2022 and the various tools such as the viewer/query tool 2060 and the e-mail reader tool 2062 interact with this commercially available database, for example, using a query language and interface provided with the commercially available database product. For example, APIs as provided by the commercially available object database software may be used to formulate a query and obtain data resulting from a query.

Figure 59:
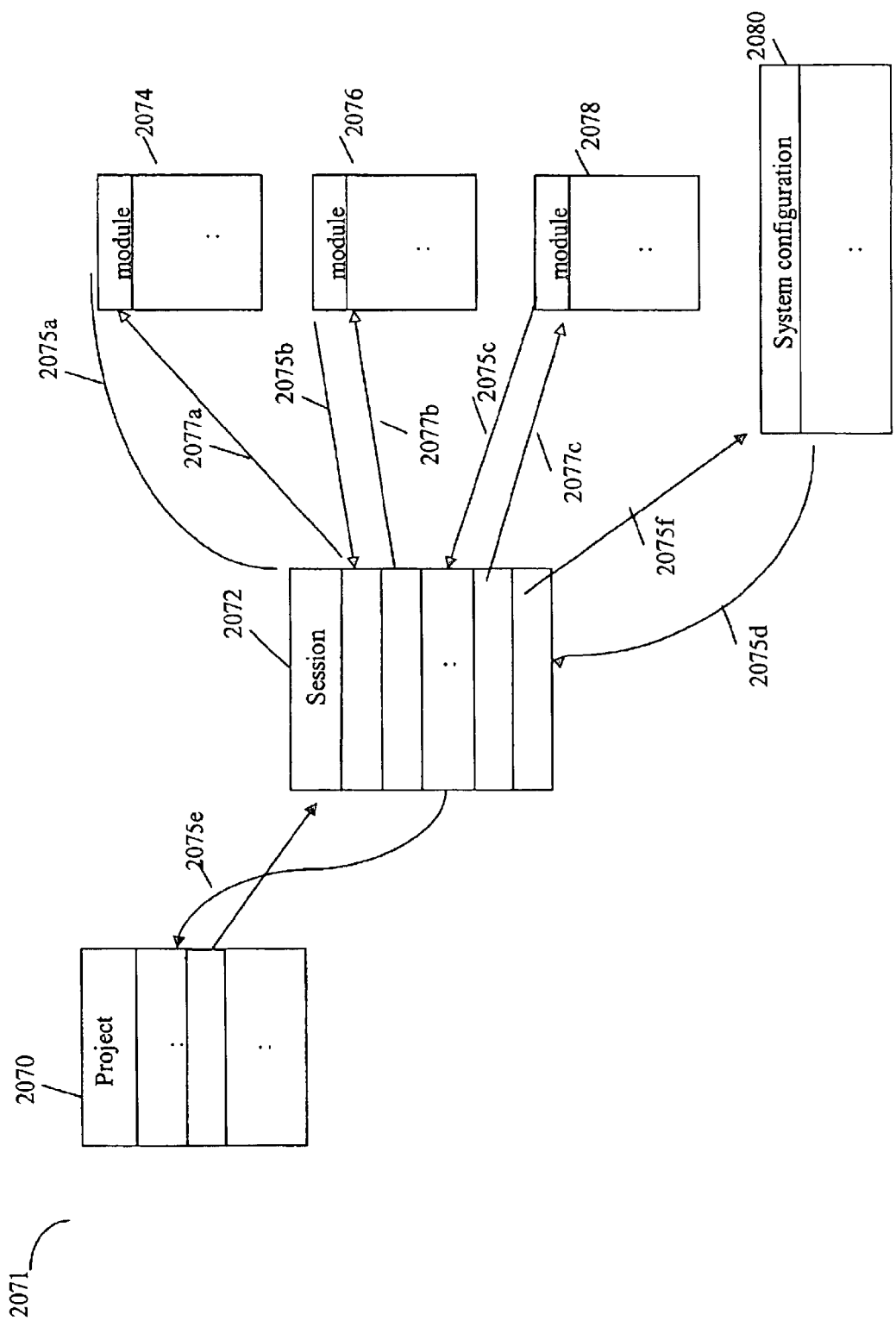
FIG. 59 is an example of an embodiment of a data representation of information stored in the database of FIG. 58.

Referring to FIG. 59, shown is an example of a representation of a database schema 2071 describing a database organization. In accordance with the representation 2071, the various types of software component information as gathered by the monitor process 2030 may be stored on the device 2022. It should be noted that although what will be described is stored in a particular type of database and a particular representation of the data, other embodiments may use other types of databases and other representations for storing the platform data gathered by the monitor process 2030. Included in the representation of the database schema is a project object 2070, a session object 2072, module objects 2074, 2076 and 2078, and system configuration object 2080. Relationships stored in the database between these various objects are represented by the arrows, for example, such as 2075*a*, 2075*b* and 2075*c*.

In this particular instance shown in FIG. 59, a project object 2070 points to a particular session object 2072. Generally, the project object represents information about a particular software project, for example, a particular software product under development. The session object 2072 generally describes a particular test run or execution. The various fields represented within the session object 2072 identify different hardware and software data and settings particular to the session instance being tested or identified by the object 2072. Generally, a platform is referred to as various combinations of hardware and software data and settings. In this particular description, platform data includes software component information such as may be communicated by the monitor process 2030, as well as system configuration information 2080. All of this information such as the software component information and the system configuration information is described in more paragraphs that follow.

Generally, the objects and the relationships between the objects as stored in accordance with the model 2071 are dictated by the various types of operations in queries to be performed upon the data stored in the device 2022 as gathered by the monitor process 2030. In this particular embodiment, each of the module objects such as 2074, 2076 and 2078 identify software component specific information. For example, in the database representation 2071, a module corresponds to a particular library, such as a DLL. Recorded within each of the module objects such as 2074 is software component information which uniquely identifies a particular version of a DLL for example. Similarly, the system configuration object 2080 identifies various hardware configuration items and software environment conditions that may be referred to as system configuration items that were tested with regard to a particular session or test execution 72.

From the representation in FIG. 59, given a particular session, the different software and hardware information particular to that test execution may be obtained. Similarly, given a particular module object, it may be determined what test runs or sessions included or tested that particular software component. This is shown for example by the arrow 2075a from the module 2074 to the session object 2072. Generally, in this embodiment, there are double pointers between each pair of project and session objects, system configuration and session objects, and components and session objects.

It should be noted that although FIG. 59 shows only a single session, in the database stored on the device 2022 a plurality of sessions may be stored in which multiple sessions may point to the same instance of a module object. In turn, that single module object may have multiple arrows such as 2075a from the module to the various sessions which utilize that particular software component. It should be noted that the same relationships may exist between one or more session objects and a system configuration object included in the representation 2071.

Generally, although the representation 2071 of FIG. 59 includes only a particular number of various types of objects, it should be noted that this is a "snapshot" of one state of the database. Other embodiments may have a varying number of objects and associations, for example, in accordance with the number of modules, and the like represented in the database.

Figure 60:
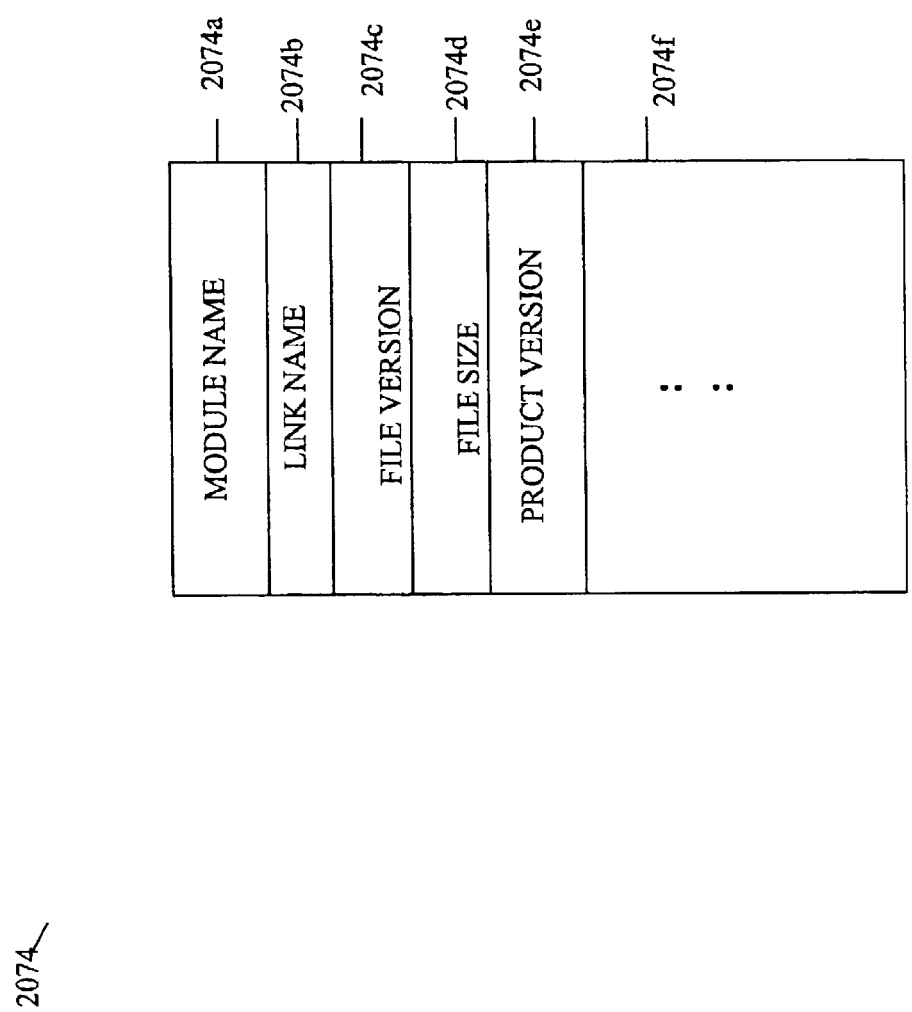
FIG. 60 is an example of the module object as included in the database schema.

Referring to FIG. 60, shown is an example of an embodiment of the module object 2074. It should be noted that although what is shown are the details of only a single module object 2074, these field that will be described may also be included in other modules objects, such as 2076, included in the representation 2071. In this particular embodiment, the module object includes information which identifies uniquely a particular version of a shared library. Included in module object 2074 is a module name 2074a, a link date 2074b, a file version 2074c, a file size 2074d, a product version 2074e, and additional fields denoted by 2074f. In this particular instance, a module name 74a may be an alpha-numeric or other representation identifying the software component. Additionally, the link date 2074b may includes a date format record indicating, for example, the month, day, year, and time in terms of hours, minutes and seconds, of a particular linking of the module. In file version field 2074c, a string, for example, may be stored as "4.3", identifying a particular release of a module. The file size is indicated in field 2074d. This may be, for example, a numeric quantity representing the size of the module in bytes. The product version field 2074e may also be a string that similarly identifies a version of an associated product, for example, that includes or uses the module identified by the object. Additional information may be stored also in this module record as indicated by 2074f, for example, such as pointer to one or more session objects that include this module like that indicated by arrow 2075a from FIG. 59.

Figure 61:
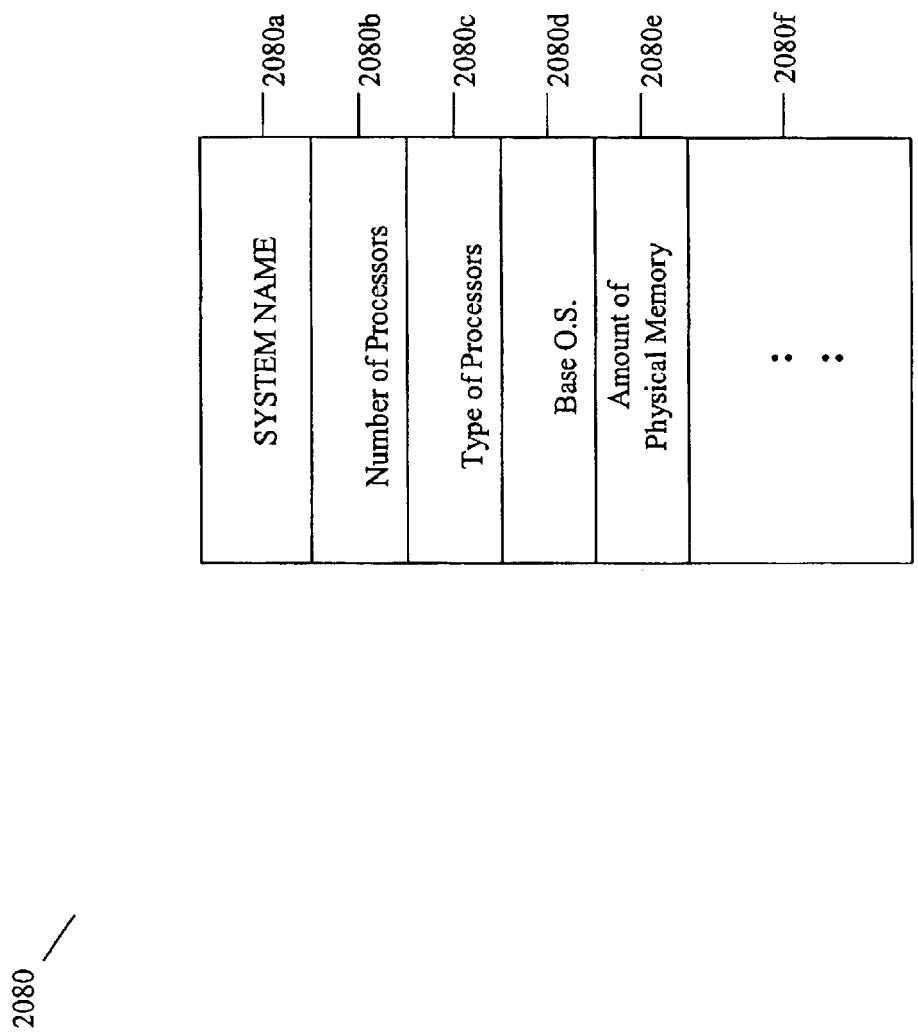
FIG. 61 is an example of an embodiment of the system configuration information object that may be included in the representation of a database schema.

Referring now to FIG. 61, shown is an example of an embodiment of the system configuration object 2080. In this particular embodiment, the system configuration object includes fields which identify and describe a particular system environment, for example, including hardware configuration information as well as various software environment settings defining a particular platform. The representation 2080 includes fields system name 2080a, number of processors 2080b, type of processors 2080c, base operating system 80d, amount of physical memory 2080e, and other system configuration information fields indicated by 2080f. For example, a system name is indicated field 2080a which may indicate a particular alphanumeric name identifying a processor or node within a network upon which various test execution runs may occur. Also indicated in the number of processors field 2080b may be a numeric quantity representing the number of processors that are in the system corresponding to system name and field 2080a. Field 2080c may indicate the type of each processor that occurs in the system name identified by 2080a. Field 2080d may be a base operating system indicator of a particular type and/or version number of an operating system. Field 2080e may be a numeric quantity representing the amount of physical memory available in system 2080a. It should also be noted that additional information may be included in accordance with each particular embodiment as indicated by 2080f of FIG. 61. This information may include, for example, display resolution, indicator as to the number of colors (i.e., 256, 65536, 24-bit color, and the like), number of monitors, country information, language information, indicators as to whether various hardware and system support is available or set regarding, for example, double byte character set or whether Middle Eastern support (i.e., support for Hebrew and Arabic) is enabled, number of mouse buttons. Additionally, there may be pointer information, such as an indicator as to the associated one or more sessions such as indicated by arrow 2075d of FIG. 59.

Figure 62:
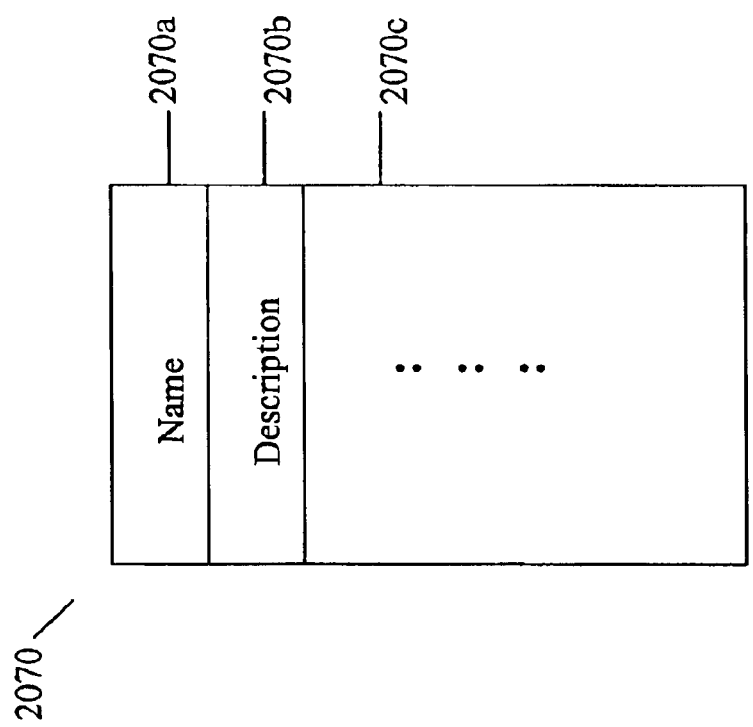
FIG. 62 is an example of an embodiment of the project object that may be included in the representation of the database schema.

Referring to FIG. 62, shown is an example of an embodiment of a project object 2070. This embodiment of the project object 2070 includes a name field 2070a, a description field 2070b, and other fields indicated by 2070c. The name field 2070a may be a string or other identifier associated with a project name. The description field 2070b may be an alphanumeric description of the project. The other fields indicated by 2070c may include, for example, pointer information to other objects such as a pointer to the session object 2072 as indicated in FIG. 59.

Figure 63:
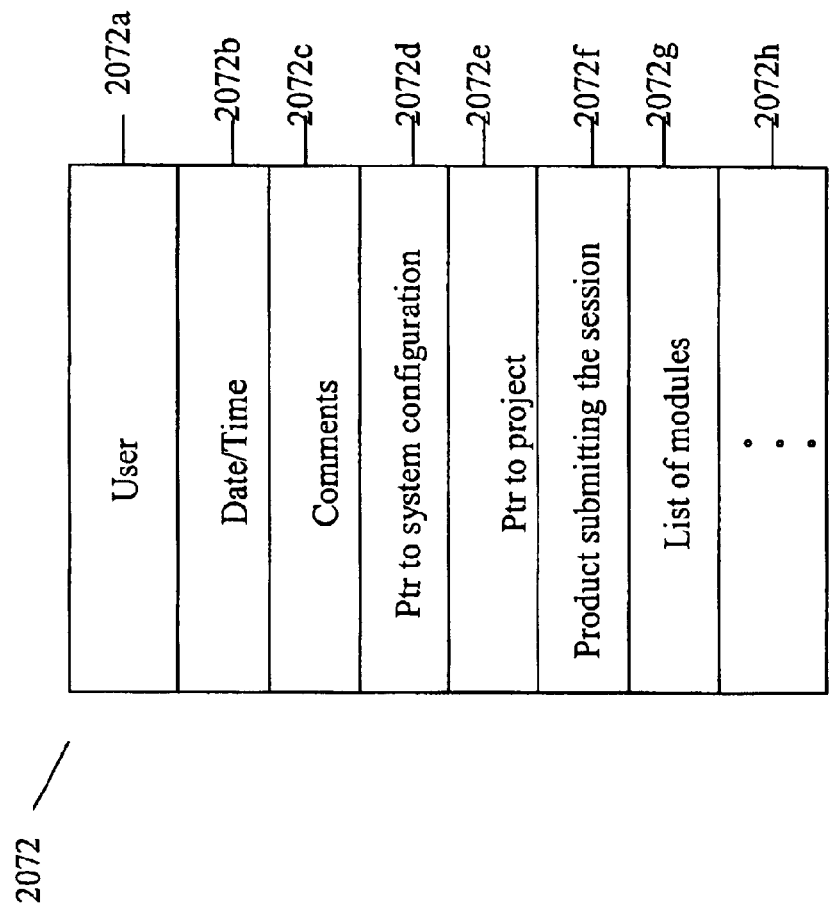
FIG. 63 is an example of an embodiment of the session object that may be included in the representation of the database schema.

Referring to FIG. 63, shown is an example of an embodiment of a session object. The session object 2072 in this example includes a user field 2072a, a date/time field 2072b, a comment field 2072c, a pointer to the system configuration 2072d, a pointer to the project 2072e, an identifier as to the product submitting the session 2072f, a list of components included in this session 2072g, and other information as indicated by field 2072h. The user field 2072a identifies a particular user-identifier, such as a login identifier of a user. This may be represented, for example, as an alpha-numeric string. The date/time field 2072b is a date/time stamp information as to when the session occurred. This may be stored, for example, as an alpha-numeric string. The comments 2072c may be a text field describing the particular session, for example, "test run for bug correction number nnn". Field 2072*d* is a pointer to the associated system configuration object, such as indicated by arrow 2075*f* of FIG. 59. Field 2072*e* is a pointer to the project object, such as indicated by arrow 2075*e* of FIG. 59. Field 2072*f* is an indicator as to the product submitting the session. In this embodiment, this field indicates which monitor product in the commercially available product suite, such as NuMega DevPartner Studio, the identified user 2072*a* was running. Field 2072*g* is a list of modules associated with this session. For example, this list of associated modules may be represented as arrows 2077*a*, 2077*b*, and 2077*c* of FIG. 59. Field 2072*h* may include other information related to the session being represented in a particular embodiment.

Figure 64:
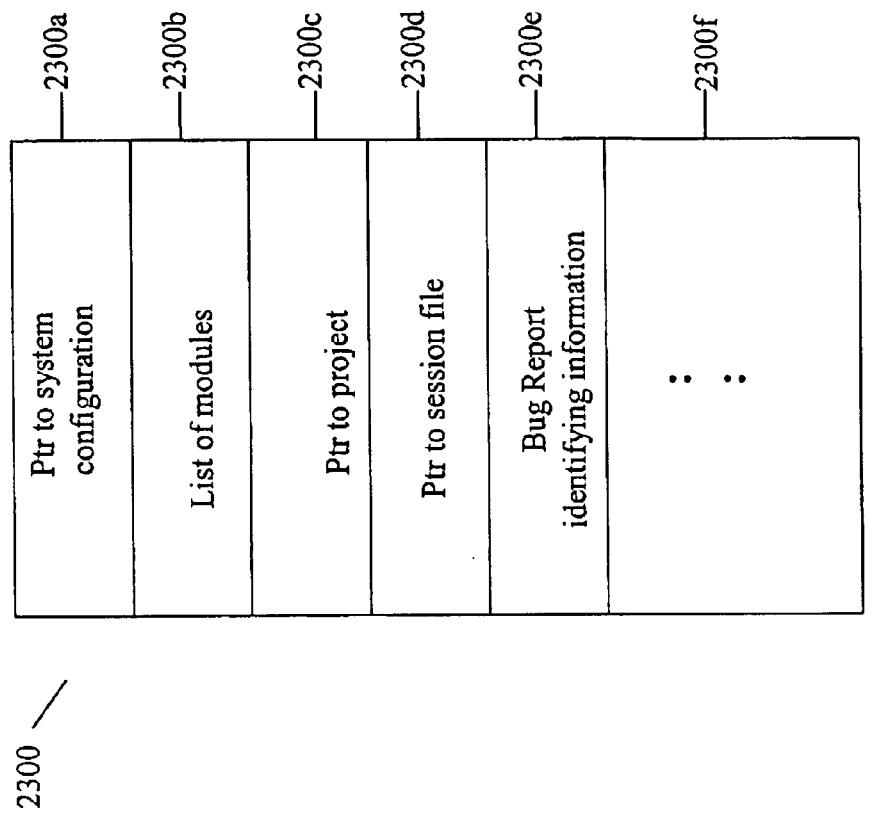
FIG. 64 is an example of an embodiment of a bug report object that may be included in the representation of the database schema.

Referring to FIG. 64, shown is an example of an embodiment of a bug report object that may be included in the previously described representation of the database schema 2071. The bug report object 2300 in this embodiment includes a pointer to a system configuration object 2300*a*, a list of modules 2300*b*, a pointer to a project object 2300*c*, a pointer to a session file 2300*d*, bug report identifying information 2300*e*, and other bug report data 2300*f*. This object may be created, for example, in conjunction with a bug report submitted to the e-mail reader tool 2062, and included in the database. It should be noted that the fields 2300*a*–2300*c* refer to objects previously described. Data associated with this object may be retrieved and used, for example, as will be described in paragraphs that follow, when querying the database regarding a version of a software module associated with a bug report. The pointer to a session file 2300*d* identifies a corresponding data file related to the bug report, for example, a data file related to test coverage data as may be generated by a testing tool such as NuMega TrueTime or TrueCoverage. The bug report identifying information 2300*e* may be one or more fields of data identifying the reported bug. For example, this information 2300*e* may include data such as a priority, who entered the bug report, the date of bug report submission, a description of the problem, product information associated with the reported bug, and the like. It should be noted that, as with other data representations described herein, the fields included may vary in accordance with each implementation.

Figure 65:
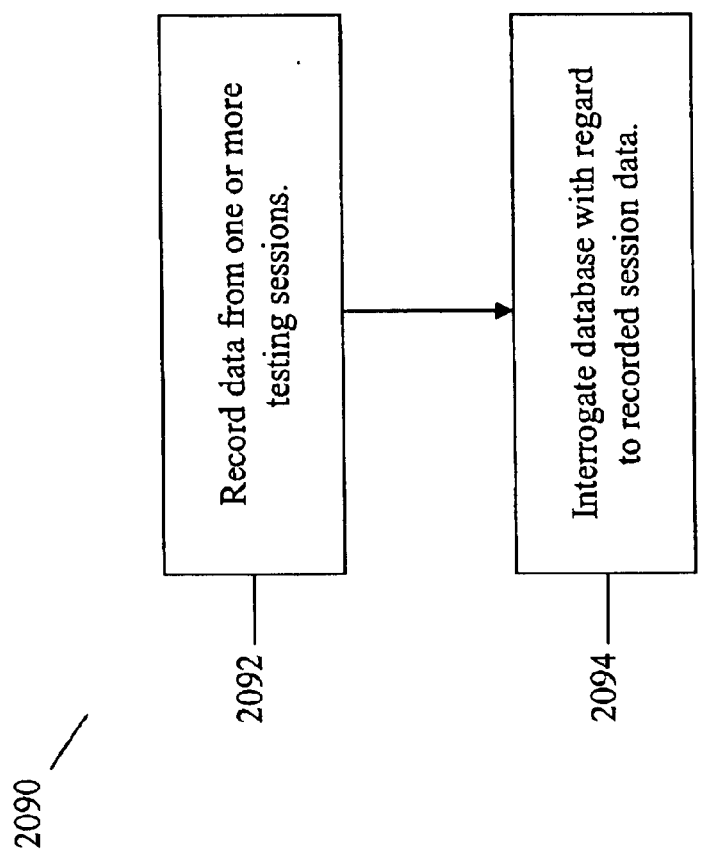
FIG. 65 is a flowchart of an example of an embodiment of how testing data is recorded and used by the monitor process tool.

Referring to FIG. 65, shown is a flowchart of an example of an embodiment of the steps of how software and hardware component and environment information may be stored and used within the system 2010. At step 2092, one or more sets of platform data, each corresponding to a testing session or execution run, is recorded. At step 2094, the database may be interrogated with regard to the recorded session data.

Figure 66:
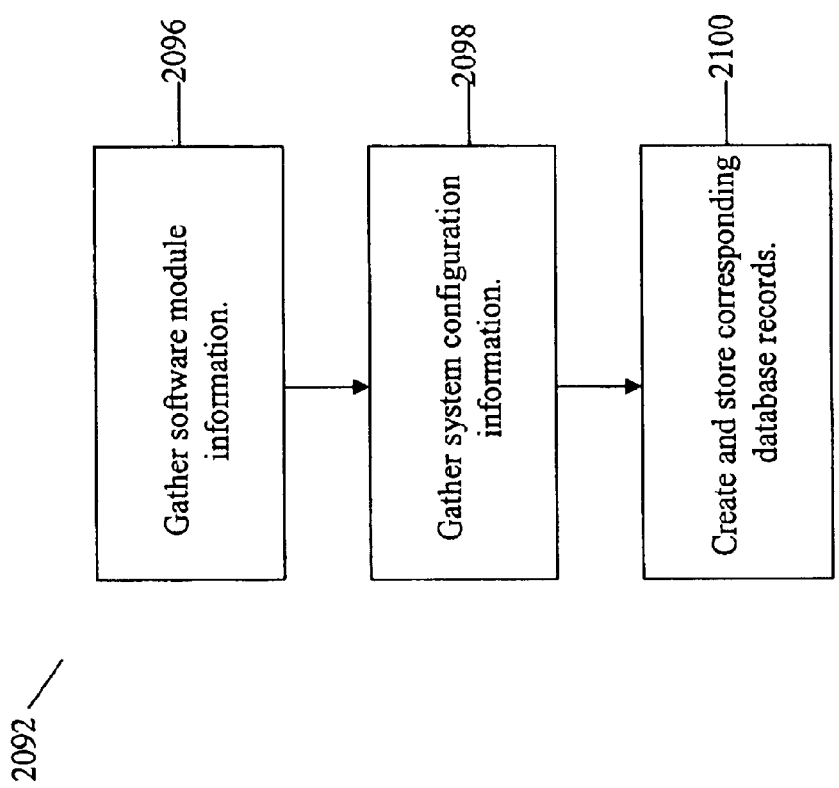
FIG. 66 is a flowchart of an example of embodiment of a method of how data is gathered for one or more testing sessions.

Referring to FIG. 66, shown are more detailed steps of one embodiment for recording platform data describing each testing session environment. At step 2096, software module information is gathered. In this particular embodiment software module information is stored in accordance with the previously described database representation 2071 using the module object such as 2074. In this embodiment, each of the software modules represented by a module object such as 2074 corresponds to a library such as DLL or OCX including shared code. The type of information gathered as represented by the module object uniquely identifies a particular version of each of these libraries. It should be noted that gathering software information portion of a set of platform data may be obtained using the foregoing data gathering techniques of a monitor process. Additionally, software information may also be gathered using alternative techniques, such as using operating system calls that return software information as related to a platform.

At step 2098, system configuration information is gathered. It should be noted that in this particular embodiment the system configuration information includes data as represented and stored in the system configuration object in accordance with the data representation 2071. The system configuration information generally includes data which uniquely identifies a particular system configuration. For example, the system configuration information gathered in step 2098 may include a portion of the information as may correspond to, for example, Windows registry settings.

The system configuration information may be gathered using a variety of different techniques in accordance with each particular embodiment. In one embodiment, system configuration information such as operating system version and number and type of processors may be obtained by performing operating system calls. The particular calls as well as their availability is in accordance with each of the systems as well as the means provided to obtain system configuration information.

At step 2100, corresponding database records are created and stored on a data storage device. In this particular embodiment, the database records are created in accordance with an object database for example as represented by the model 2071, and stored for example, on a data storage device such as 2022 a FIG. 58. Routines to create and store database records may be supplied by the commercially available database package in accordance with each particular embodiment and implementation. The storing of the foregoing information may result in the creation of additional database objects in this embodiment, such as the session and project objects, in conjunction with the module and system configuration objects, to result in a database organization in accordance with the previously described schema.

Figure 67:
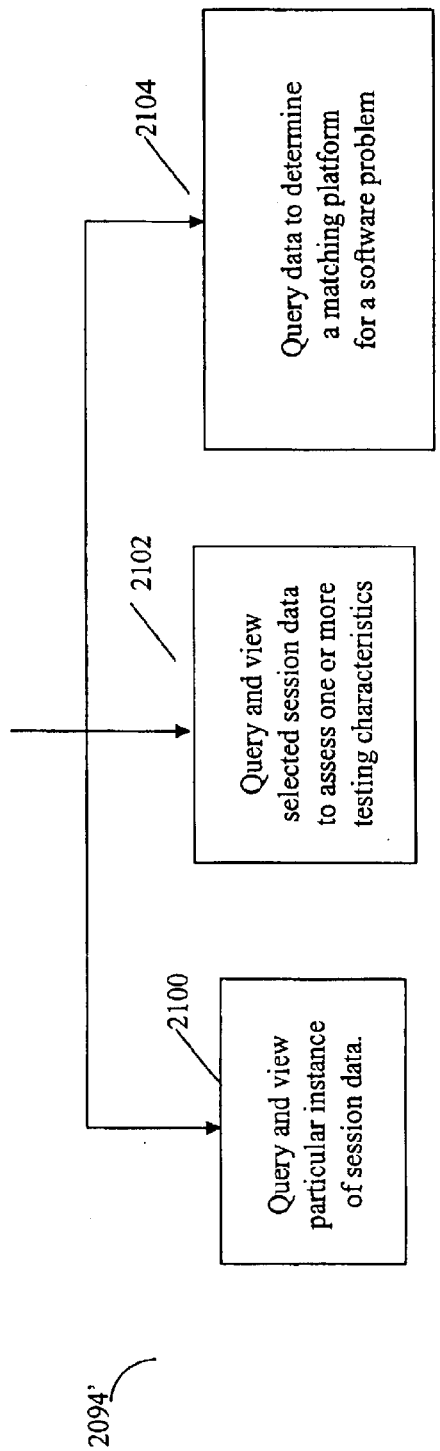
FIG. 67 is an example of an embodiment of the different types of data operations that may be performed with regard to recorded session data in the database.

Referring to FIG. 67, shown is an example of an embodiment of a flowchart that includes several options of how the database may be interrogated with regard to recorded platform data corresponding to a session. Generally, 2094' is a flowchart representing 3 different functions described in steps 2100, 2102 and 2104 setting forth in more detail processing steps associated with previously describes step 2094 of flowchart 2090. The user may interact with the database to perform any of these functions 2100, 2102, 2104 in this particular embodiment. Additionally, the functionality associated with each of these steps as will be described may be embodied in one or more software tools that may be provided in conjunction with the database product as well as sold with a commercially available implementation of the monitor process 2030. These software tools may be a machine executable program produced, as by compiling and linking for example, using a conventional, commercially available programming language, such as C or C++. These software tools are executable by a computer processor, such as the computer processor 2020 previously described in conjunction with FIG. 55.

The user may select an option of 2100, 2102 or 2104 to perform a function regarding the database. At step 2100, a user may select to query and view a particular instance of session data. For example, a developer may wish to see which platform data gathered with regard to a particular test run on a particular day. Using database interface and function calls, for example, as may be provided in accordance with the commercially available object database Poet, a software tool may implement step 2100 by interacting with the database using various database calls and a query language as provided in accordance with each particular implementation.

At step 2102, a user may choose to query and view selected session data which may involve multiple sessions in order to assess testing coverage. For example, using database query language interfaces, a developer may desire to have a complete list of all of the various platforms including hardware and software configuration and component information tested with regard to a particular project. This may be performed, for example, using set union operations, or their equivalent operations, on the various data stored in the session, module, and system configuration objects of the database. Using the links and connections previously described between each of the objects, a query may be made of the database, for example using set union operations, to produce such a query result and display it to the user for example using a tool. More detailed steps regarding processing related to this step in one embodiment is discussed in paragraphs that follow.

A user may also select at step 2104 to query the database to determine a matching platform for a particular software problem. Additional detail regarding processing in one embodiment related to this step is discussed in paragraphs that follow.

It should be noted that the monitor process 2030, in addition to performing routine calls to obtain various system configuration information, may also perform system calls as provided in accordance with operating system functionality for additional software information besides that which may be supplied by the processes described in conjunction with FIGS. 56 and 57.

In the embodiment previously described in conjunction with FIG. 57, a portion of module information, such as the name of a loaded DLL, may be obtained from the debug event reporting code. Additional module information may be obtained, for example, by using the module name as an input parameter to an operating system API which returns the additional module information. In the embodiment previously described in conjunction with FIG. 56, the monitor proxy DLL may obtain a DLL handle, for example, as a return API value from a routine that loads the DLL. The Monitor Proxy DLL 2042 may further use this DLL handle to obtain additional module or DLL information, for example, using values returned from operating system routines or APIs. Other embodiments may obtain portions of the system configuration data and software module information using techniques such as these or others in accordance with the type of data being obtained and the function provided in each embodiment, for example by a particular operating system.

What will now be described in conjunction with FIGS. 68–72 are processing steps that may be associated with step 2102 of flowchart 2094'. Generally, described are various techniques and operations that may be performed with regard to data included in the previously described database, for example, to assess one or more testing characteristics. An embodiment, for example, may include one or more of these techniques by presenting the user with a menu selection to perform the various associated operations.

Figure 68:
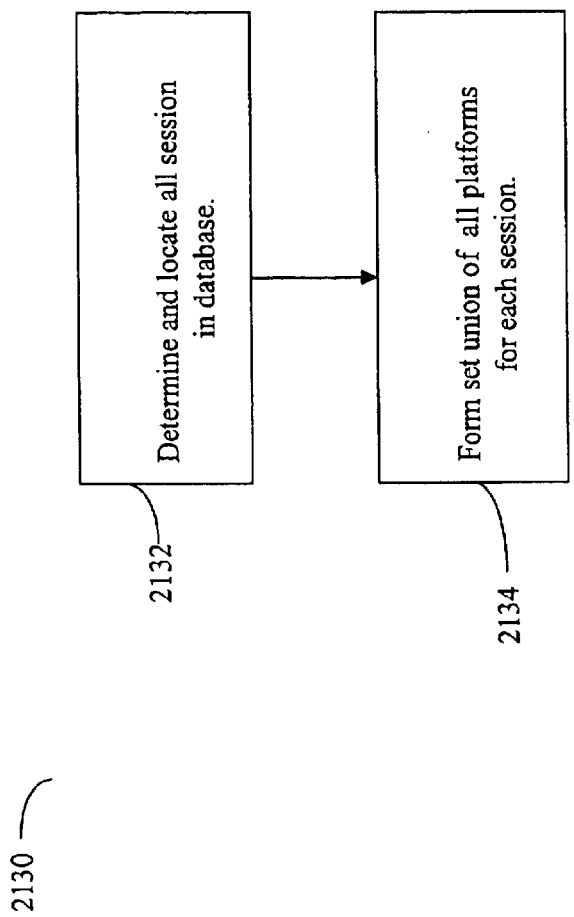
FIGS. 68–72 are examples of embodiments of flowcharts associated with processing operations upon data recorded in the database to assess one or more testing characteristics.

Referring to FIG. 68, shown is a flowchart of method steps of one embodiment associated with performing step 2102. The flowchart 2130 generally sets forth steps for determining the various platforms tested. At step 2132, all session objects in the database are determined and located. This step may be performed using the foregoing object oriented database. As previously described, this and other steps making an inquiry of the database may be performed using database queries, as by an API provided in conjunction with the database or other technique in accordance with each implementation.

At step 2134, a set union operation is performed over the session objects from step 2132 to form a resulting set union of all platforms. This resulting set union represents the set of all uniquely occurring platforms amongst the sessions.

Figure 69:
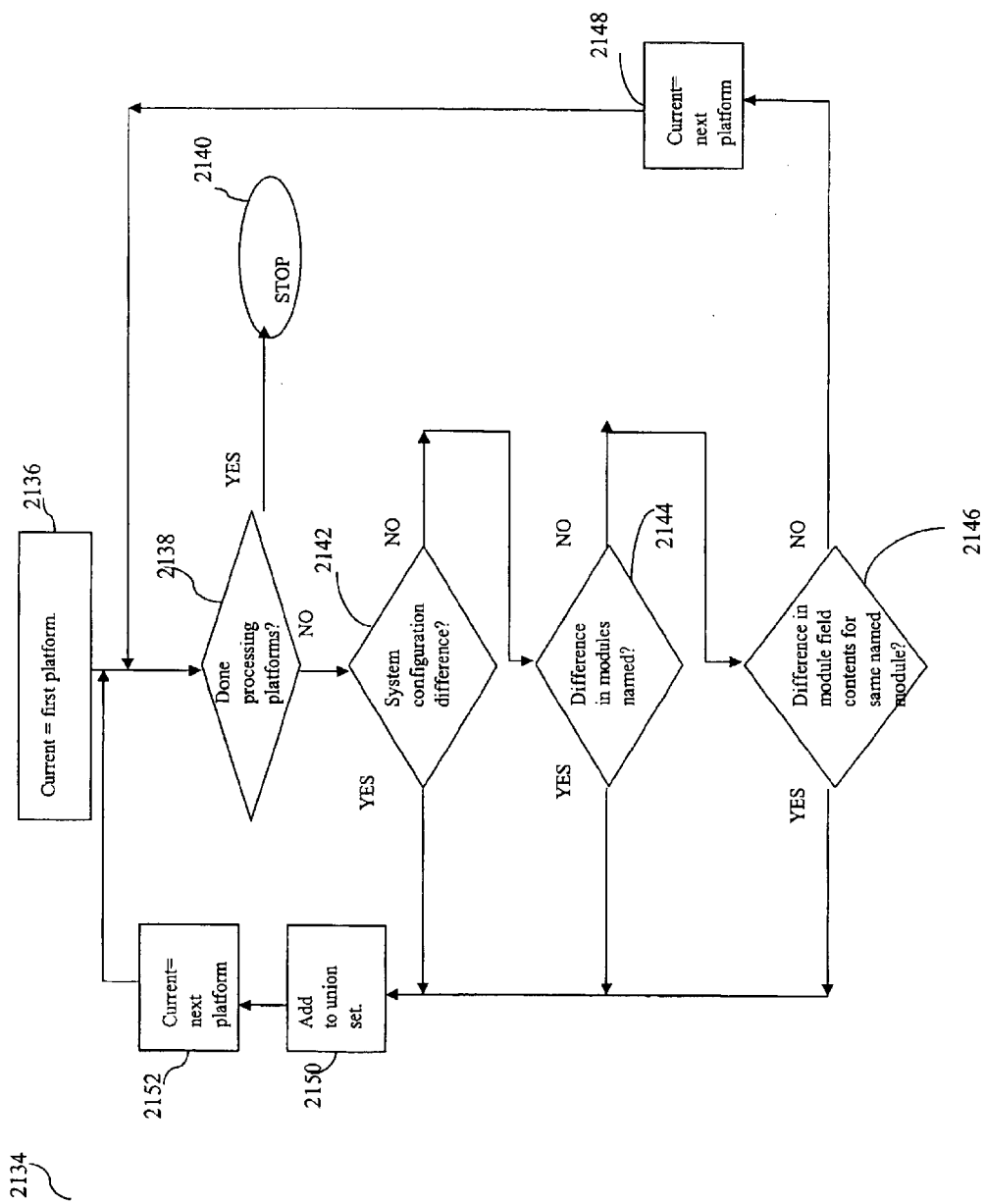

Referring to FIG. 69, shown is a flowchart of an embodiment of a method for performing step 2134 to form the set of all unique platforms. Generally, the processing of flowchart 2134 iterates through each platform associated with each session and compares the various hardware and software information.

At step 2136, "current", indicating the current platform being processed, is assigned the first platform associated with one of the session objects. At step 2138, a test is performed to determine whether the processing of platforms is complete. If a determination is made that processing is complete, that is there are no remaining sessions having a platform to be examined, control proceeds to step 2140 where processing of flowchart 20134 stops.

If a determination is made at step 2138 that processing of platforms is not complete, control proceeds to step 2142 where a determination is made as to whether there is a system configuration difference. This difference may be determined, for example, by comparing the various field values or attributes of the current platform to those of the platforms already included in the resulting union set of all unique platforms. If there is a difference in system configuration control proceeds to step 2150 where the current platform is added to the resulting union set, and the next platform is examined by making it the current platform, as in step 2152.

If a determination at step 2142 indicates that there is no system difference between the current platform and those platforms included in the resulting union set thus far, control proceeds to step 2144 where a determination is made as to whether there is a difference in the modules named for the current platform and those named in each of the platforms included in the resulting union set. If at step 2144 a determination is made that there is a difference in the named modules, control proceeds to step 2150 where the current platform is added to the resulting union set. If at step 2144 a determination is made that there is no difference in the named modules, control proceeds to step 2146 where the various attributes or field contents associated with each module are further examined.

A determination is made at step 2146 as to whether, for each named module, the attributes or values of each field of the current platform match those of the corresponding named module for each platform in the resulting union set. If a determination is made that there is a difference, the current platform is added to the resulting union set at step 2150. If a determination is made that there is no difference in attributes for each corresponding module, control proceeds to step 2148 where the next platform becomes the current platform for examination upon the next loop iteration.

Figure 70:
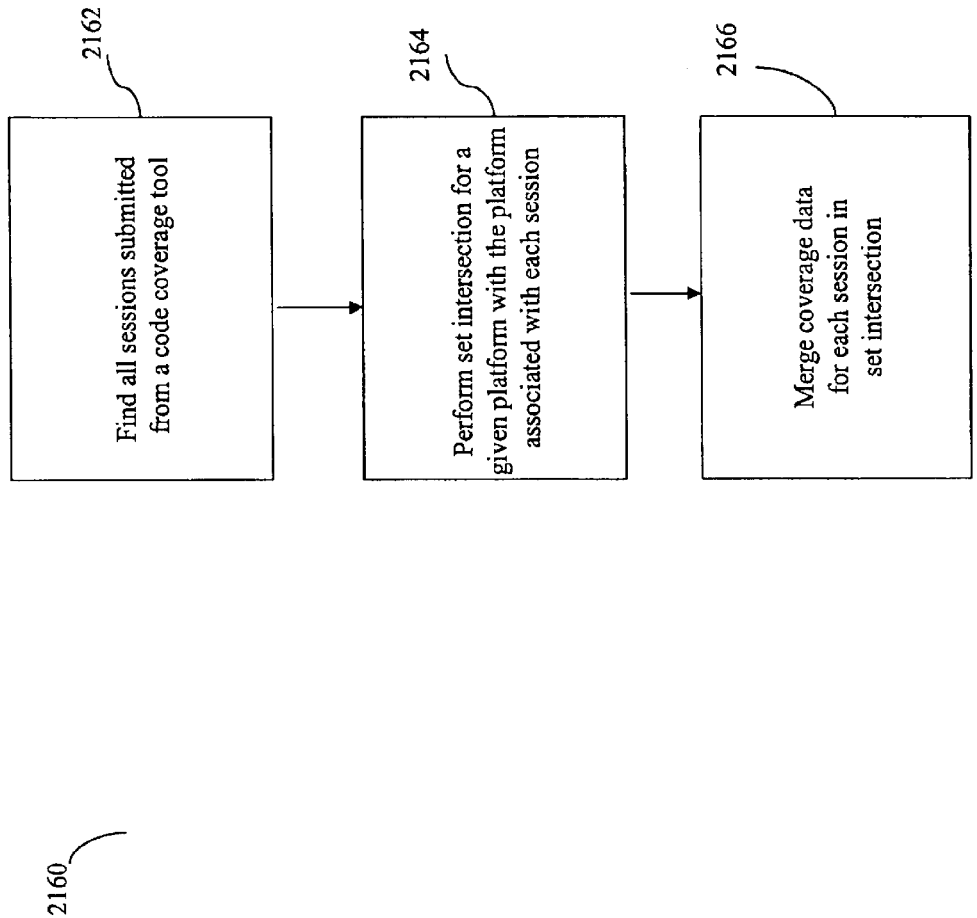

Referring to FIG. 70, shown is a flowchart of an example of a method that may also be performed in an embodiment associated with step 2102 processing. Generally, the flowchart 2160 describes a technique for determining the amount of testing for a given platform. At step 2162, all sessions in the database submitted from a code coverage tool, such as TrueCoverage, are determined. A query is performed of the database to determine which sessions have corresponding testing information previously obtained by another software tool that determines, in this example, the amount of code tested in a particular session.

In one embodiment, this testing coverage information may be associated with the previously described session object, for example, by having a pointer field included in the session object identifying a testing coverage data file. The testing coverage data file may be created, for example, by a code coverage tool. The testing coverage data file may be stored in the database and retrieved, for example, using database query and retrieval techniques previously described. Other embodiments may have other data storage and retrieval techniques and arrangements for testing coverage data, or other data, associated with a session.

At step 2164, a set intersection operation is performed between a given platform and the platforms associated with each session from step 2162. At step 2166, the resulting set intersection represents the sessions associated with a given or predetermined platform. Merging the coverage data associated with each session of the resulting set intersection represents the amount of testing performed for the predetermined platform. This data merging, for example, may be performed using function provided by the code coverage tool. Other techniques may used to merge the data in accordance with each implementation.

Figure 71:
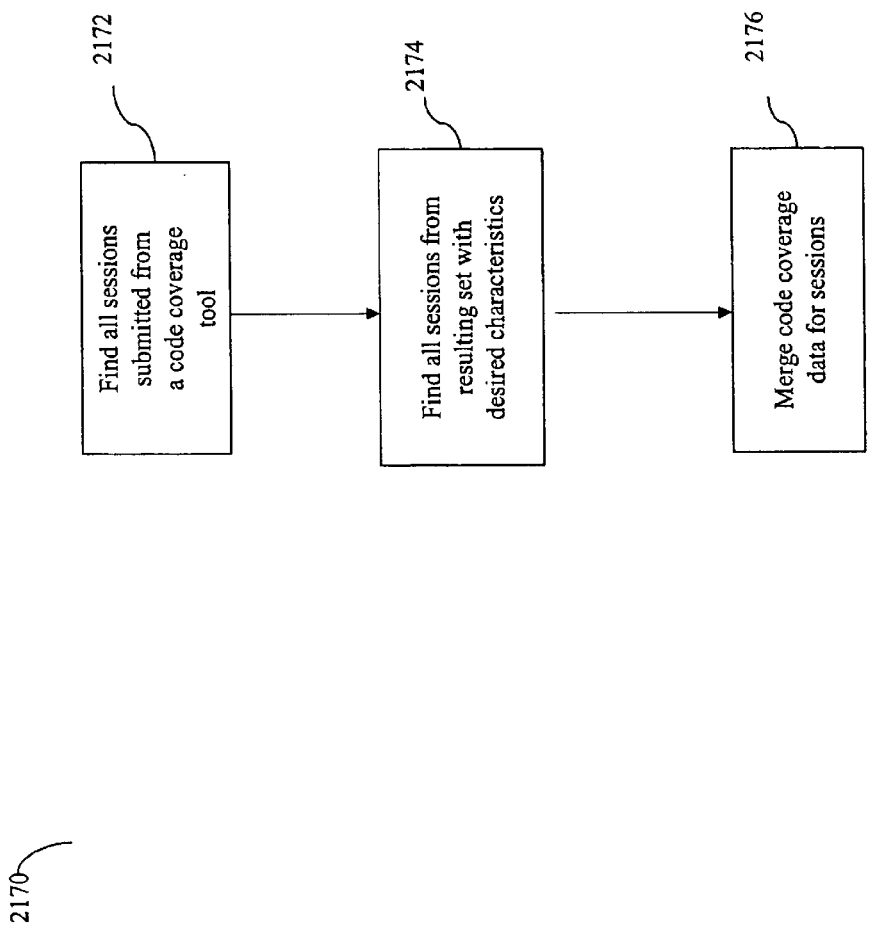

Referring to FIG. 71, shown is a flowchart of an example of method steps of another embodiment associated with the processing of step 2102. Generally, the flowchart 2170 describes how to determine test coverage data to be merged in accordance with predetermined criteria, such as in accordance with a particular platform. Flowchart 2170 may be viewed as a generalization of the steps of flowchart 2160. At step 2172, all sessions associated with code coverage information, as may be produced with a code coverage tool, are determined. At step 2174, predetermined criteria or characteristics are determined. The resulting set is formed by determining all sessions with the predetermined criteria. This may include, for example, determining which sessions are used to test a particular operating system thereby reporting on code coverage by operating system, or reporting on testing coverage associated with multi-processor machines. Similarly as described in processing associated with step 2164 of flowchart 2160, the set intersection operation may be used to locate these sessions by performing a database query in accordance with the predetermined criteria. At step 2176, the code coverage data is merged for the sessions identified as a result of step 2174. This merging may be performed, for example, as also previously described with regard to step 2166 of flowchart 2160.

Figure 72:
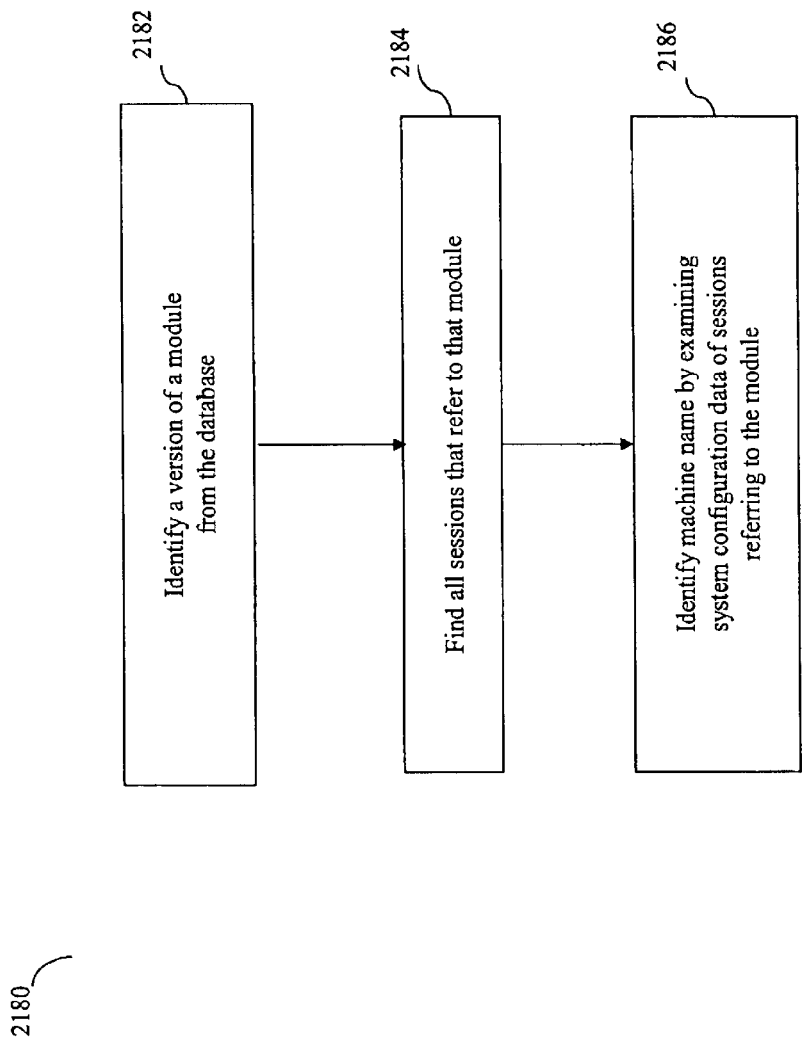

Referring to FIG. 72, shown is a flowchart of another embodiment of a method that may be associated with step 2102 processing steps. Generally, the flowchart 2180 uses historical platform data to find a machine with certain attributes. For example, if a bug is reported, as using the e-mail reader tool 2162, that included using a version of a DLL, such as the COMCTL32.DLL, different than the version currently present on a developer's system, a developer may use the technique of flowchart 2180 to locate another machine using stored platform data that may have the library version as included in the bug report. At step 2182, a database query is performed to locate the version of the DLL as included in the bug report. This may be accomplished, for example, performing a database query of the module objects in accordance with particular attributes, or field values, that identify the particular version. At step 2184, all sessions that refer to this module are determined. This may also be performed using a database query, for example, using the pointers, such as 2075c, from the module to the referencing sessions. This information may be returned as the result of a database query or other operation in accordance with each embodiment. At step 2186, a machine name may be identified by retrieving and examining the system configuration information of sessions referring to this module.

Figure 73:
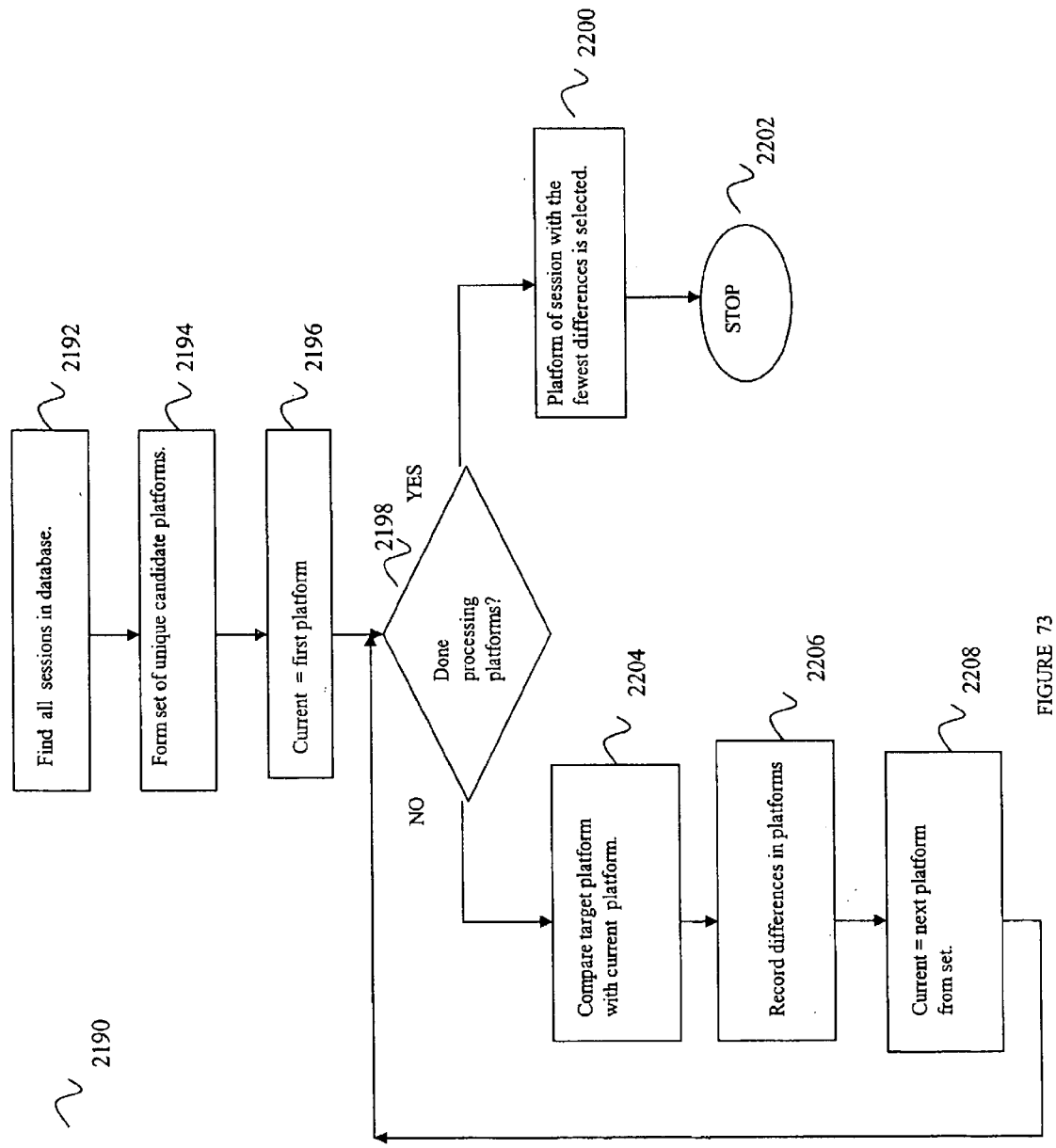
FIGS. 73–74 are examples of embodiments of flowcharts associated with processing operations to determine a matching platform in accordance with a target platform in an embodiment.
Figure 74:
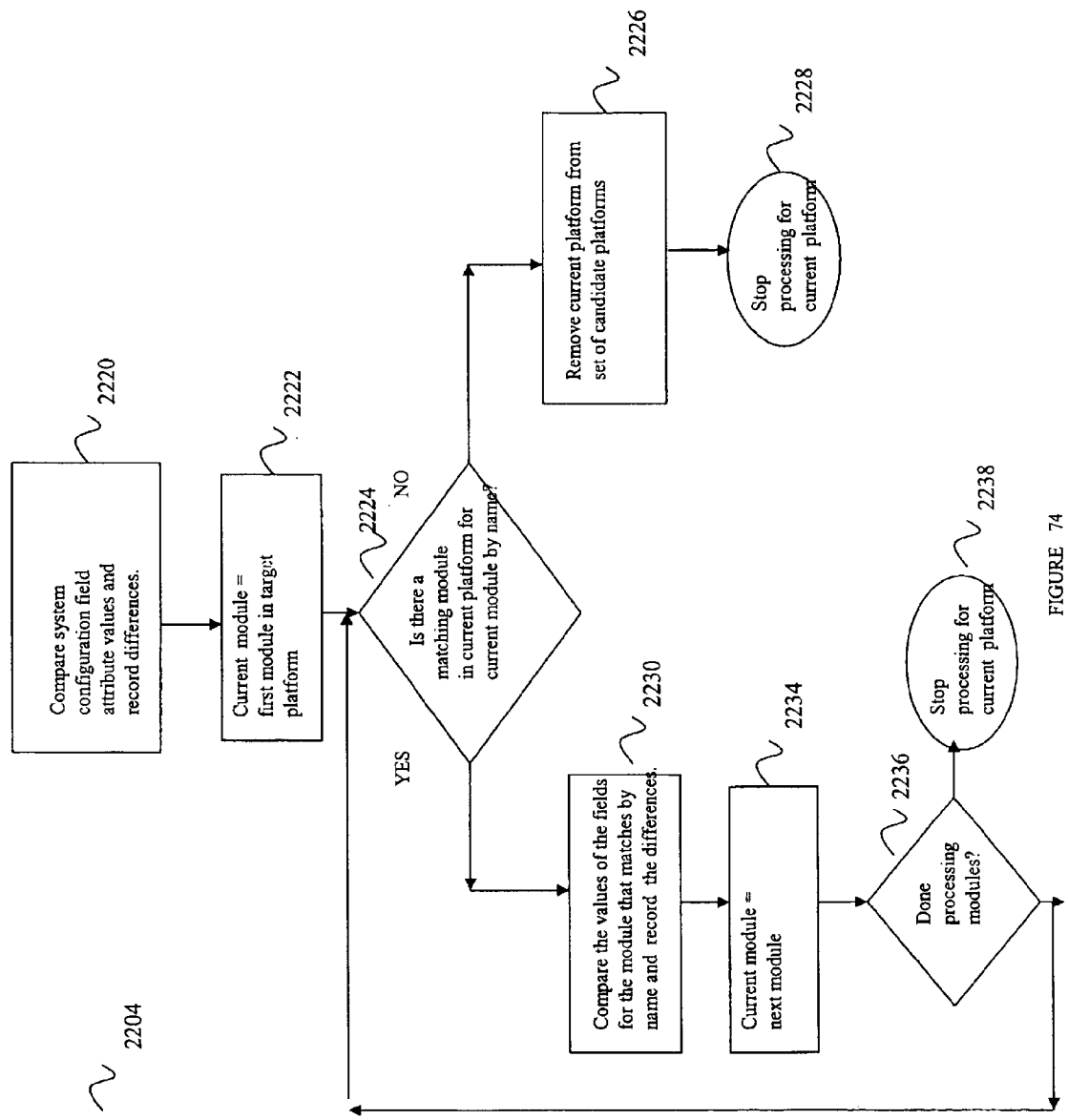

What will now be described in conjunction with FIGS. 73–74 are techniques that may be performed in conjunction with processing of step 2104 to determine a matching platform for a software problem in one embodiment.

Referring to FIG. 73, shown is a flowchart of an example of a method that may be performed with the processing step 2104 of flowchart 2094'. Generally the flowchart 2190 describes a technique for determining a matching platform in accordance with, for example, a platform coinciding with reproducing a bug as submitted in a bug report. For example, a developer may locate which machine has the platform closest to that of a submitted bug report in order to enable the developer to attempt to reproduce the bug. At step 2192, all sessions in the database are determined. At step 2194, a set of unique candidate platforms is determined. This may be done, for example, by performing the previously described set union operation with regard to platforms associated with the sessions obtained in step 2192. At step 2196, the first platform becomes the current platform being examined and compared to the target platform for which a search is being performed.

At step 2198, a determination is made as to whether the processing of platforms is complete. In other words, have all platforms been examined. If a determination is made at step 2198 that processing of all platforms is complete, control proceeds to step 2200 where the platform or platforms having the fewest differences, if any, with regard to the target platform is selected. At step 2202, processing of flowchart 2190 stops.

If a determination is made at step 2198 that the processing is not complete with respect to examining and comparing all platforms, control proceeds to step 2204 where a comparison is made between the target platform and the current platform. Additional detail regarding processing of step 2204 is discussed in paragraphs that follow. At step 2206, any differences between the target platform and the current platform are recorded. These differences may be recorded in any one of a variety of data structures or other forms to be used in later processing, for example, of step 2200. For example, one embodiment may include a data structure having a first field that is an integer quantity representing the count or number of differences determined. The data structure may also include a second field that is a pointer to the one or more objects representing the best platform match determined thus far. At step 2208, the next platform becomes the current platform which is examined in the next loop iteration.

Referring to FIG. 74, shown is a flowchart of more detailed processing steps of step 2204 of an embodiment for comparing the target and current platforms. At step 2220, the system configuration field attribute values of the target platform and the current platform are compared and then recorded. In following steps, a loop iteration is described which iterates over all modules associated with the current platform.

At step 2222, the current module is set to the first module associated with the current platform. A determination is made at step 2224 as to whether there is a matching module in the current platform corresponding to the current module by name. If a determination is made that there is no matching module, control proceeds to step 2226 where the current platform is removed from the set of candidate platforms formed at step 2194. Control proceeds to step 2228 wherein processing for the current platform stops.

If a determination is made at step 2224 that there is a matching module name in the current platform and the target platform, control proceeds to step 2230 where a comparison is made of the attributes or database fields associated with each matching module name. The differences between these fields, if any, are recorded. At step 2234, the next module becomes the current module for processing in the next loop iteration. At step 2236, a determination is made as to whether the processing of modules for the current platform is complete. If a determination is made that the module processing is complete, control proceeds to step 2238 where processing for the current platform stops. Otherwise, if module processing is not complete as determined at step 2236, control proceeds to step 2224 to the next loop iteration.

It should be noted that in the foregoing descriptions, various operations, such as set union and intersection operations, are set forth to describe a more general technique. The actual operations, such as set union or intersection, used in each implementation may vary in accordance with each implementation. Those of ordinary skill in the art are able to determine comparable operations in accordance with the function provided by each implementation.

The number of the foregoing methods and techniques that may be included in an embodiment vary with each implementation. They may be included and used in various combinations to perform different assessments with regard to the database. For example, the methods and techniques of FIGS. 69 and 70 may be used in combination to first determine all platforms and then determine the amount of testing coverage for each platform. Alternatively, an embodiment may also separately provide the functions associated with FIGS. 69 and 70 rather than use them in combination.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for gathering data about an application comprising:
   intercepting execution control at a first communication point between a calling function and a called function for a cross execution context call to include call origin information in a request to perform the cross execution context call, said calling function being associated with a first execution context and said called function being associated with a second execution context;
   extracting the call origin information prior to executing the called function at a second communication point; and
   communicating at least one parameter between the called function and the calling function, said at least one parameter being associated with information about the cross execution context call.

2. The method of claim 1, further including:
   instrumenting at least one portion of said application.

3. The method of claim 2, wherein said at least one portion includes compiled code.

4. The method of claim 2, wherein said at least one portion includes interpreted code techniques to perform machine executable instructions executed in a computer system.

5. The method of claim 4 wherein said at least one portion includes byte code.

6. The method of claim 1, further comprising:
   associating the call origin information from a calling function with the call origin information extracted at a called function site for the cross execution context call;
   storing a first portion of execution information associated with said calling function;
   storing a second portion of execution information associated with said called function; and
   correlating said first and second portions of execution information using said call origin information.

7. The method of claim 6, wherein said calling program is associated with a first computer system and said called program is associated with a second computer system.

8. The method of claim 7, further comprising:
   routing a third portion of execution information between said second and said first computer systems in accordance with said call origin information.

9. The method of claim 1, wherein said call origin information is used to determine wire time of said cross execution context call, and the method further including determining wire time by:
   determining a first time, T1, when the cross execution context call is initiated by the calling function;
   determining a second time, T2, when a request for performing the cross execution context call is received at a computer system associated with said called function;
   determining a third time, T3, when execution of machine executable code associated with the cross execution context call of the called function completes execution;
   determining a fourth time, T4, when the calling function receives a response that the cross execution context call has completed;
   determining a ratio, R, as a ratio of a first processor speed and a second processor speed, said first processor speed associated with a first computer system of said calling function, said second processor speed associated with a second computer system of said called function; and
   determining wire time as represented by $(T4-T1)-((T3-T2))*R$.

10. The method of claim 9, further including:
    transmitting said second processor speed to said first computer system as return information included in a response from said second computer system that said cross execution context call is complete.

11. The method of claim 10, further comprising:
    intercepting at a third communication point said response from said second computer system that said cross execution context call has completed; and
    extracting said return information.

12. The method of claim 11, wherein said cross execution context call is a first cross execution context call, said calling function is a first calling function, and said called function is a first called function, and a second cross execution context call is made from a second calling function of said second computer system to a second called function of a third computer system, and the method further comprising:
    transmitting system information about said first and said second computer systems to said third computer system; and
    establishing a first communication channel between said third computer system and said second computer system and a second communication channel between said third computer system and said first computer system wherein, in said second communication channel, said second computer system is a proxy relaying messages between said first and said third computer systems.

13. The method of claim 12, wherein said first and second communication channels are used to facilitate communication between data collectors on each of said first, second and third computer systems.

14. The method of claim 13, further comprising:
using an additional communication channel for transmitting data in connection with the cross execution context call between the called function and the calling function.

15. The method of claim 14, further comprising:
establishing said first and second communication channels using data transmitted in connection with said cross execution context call.

16. The method of claim 13, further comprising:
requesting program execution data by a client system from at least one server system;
transmitting program execution data using at least one of said first and second communication channels to said client system; and
correlating, at said client system, said execution data from said at least one server system and said client system.

17. The method of claim 12, further comprising:
transmitting program execution information to said first computer system using said first and second communication channels;
correlating, at said first computer system, said program execution information for said application; and
determining at least one metric in accordance with said program execution information.

18. The method of claim 17, wherein said program execution information includes at least one of: code coverage information, error detection information, program tracing information, and performance information.

19. The method of claim 18, wherein said program execution information includes remote procedure call tracing.

20. The method of claim 9, further comprising:
communicating between said first and said second computer systems said at least one parameter wherein said at least one parameter is one of said first and second processor speeds.

21. The method of claim 1, further comprising:
transmitting program execution information to a first data gathering point associated with said calling function from a second data gathering point associated with said called function; and
correlating, at said first data gathering point, said program execution information for said application.

22. The method of claim 21, further comprising:
determining at least one metric in accordance with said program execution information.

23. The method of claim 1, wherein said first execution context and said second execution context are each associated with different threads of execution.

24. The method of claim 23, wherein said calling function is executed on a client computer and said called function is executed on a server computer.

25. The method of claim 24, wherein said cross execution context is a remote procedure call.

26. A computer program product for gathering data about an application comprising:
machine executable code for intercepting execution control at a first communication point between a calling function and a called function for a cross execution context call to include call origin information in a request to perform the cross execution context call, said calling function being associated with a first execution context and said called function being associated with a second execution context;
machine executable code for extracting the call origin information prior to executing the called function at a second communication point; and
machine executable code for communicating at least one parameter between the called function and the calling function, said at least one parameter being associated with information about the cross execution context call.

27. The computer program product of claim 26, further including:
machine executable code for instrumenting at least one portion of said application.

28. The computer program product of claim 27, wherein said at least one portion includes compiled code.

29. The computer program product of claim 27, wherein said at least one portion includes interpreted code techniques to perform machine executable instructions executed in a computer system.

30. The computer program product of claim 29, wherein said at least one portion includes byte code.

31. The computer program product of claim 26, further comprising:
machine executable code for associating the call origin information from a calling function with the call origin information extracted at a called function site for the cross execution context call;
machine executable code for storing a first portion of execution information associated with said calling function;
machine executable code for storing a second portion of execution information associated with said called function; and
machine executable code for correlating said first and second portions of execution information using said call origin information.

32. The computer program product of claim 31, wherein said calling program is associated with a first computer system and said called program is associated with a second computer system.

33. The computer program product of claim 32, further comprising:
machine executable code for routing a third portion of execution information between said second and said first computer systems in accordance with said call origin information.

34. The computer program product of claim 26, wherein said call origin information is used to determine wire time of said cross execution context call, and the computer program product further including machine executable code for determining wire time by:
machine executable code for determining a first time, T1, when the cross execution context call is initiated by the calling function;
machine executable code for determining a second time, T2, when a request for performing the cross execution context call is received at a computer system associated with said called function;
machine executable code for determining a third time, T3, when execution of machine executable code associated with the cross execution context call of the called function completes execution;
machine executable code for determining a fourth time, T4, when the calling function receives a response that the cross execution context call has completed;
machine executable code for determining a ratio, R, as a ratio of a first processor speed and a second processor speed, said first processor speed associated with a first computer system of said calling function, said second processor speed associated with a second computer system of said called function; and machine executable code for determining wire time as represented by (T4−T1)−((T3−T2))*R).

35. The computer program product of claim 34, further including:

machine executable code for transmitting said second processor speed to said first computer system as return information included in a response from said second computer system that said cross execution context call is complete.

36. The computer program product of claim 35, further comprising:

machine executable code for intercepting at a third communication point said response from said second computer system that said cross execution context call has completed; and machine executable code for extracting said return information.

37. The computer program product of claim 36, wherein said cross execution context call is a first cross execution context call, said calling function is a first calling function, and said called function is a first called function, and a second cross execution context call is made from a second calling function of said second computer system to a second called function of a third computer system, and the computer program product further comprising:

machine executable code for transmitting system information about said first and said second computer systems to said third computer system; and machine executable code for establishing a first communication channel between said third computer system and said second computer system and a second communication channel between said third computer system and said first computer system wherein, in said second communication channel, said second computer system is a proxy relaying messages between said first and said third computer systems.

38. The computer program product of claim 37, wherein said first and second communication channels are used to facilitate communication between data collectors on each of said first, second and third computer systems.

39. The computer program product of claim 38, further comprising:

machine executable code for using an additional communication channel for transmitting data in connection with the cross execution context call between the called function and the calling function.

40. The computer program product of claim 39, further comprising:

machine executable code for establishing said first and second communication channels using data transmitted in connection with said cross execution context call.

41. The computer program product of claim 38, further comprising:

machine executable code for requesting program execution data by a client system from at least one server system;

machine executable code for transmitting program execution data using at least one of said first and second communication channels to said client system; and machine executable code for correlating, at said client system, said execution data from said at least one server system and said client system.

42. The computer program product of claim 37, further comprising:

machine executable code for transmitting program execution information to said first computer system using said first and second communication channels;

machine executable code for correlating, at said first computer system, said program execution information for said application; and machine executable code for determining at least one metric in accordance with said program execution information.

43. The computer program product of claim 42, wherein said program execution information includes at least one of: code coverage information, error detection information, program tracing information, and performance information.

44. The computer program product of claim 43, wherein said program execution information includes remote procedure call tracing.

45. The computer program product of claim 34, further comprising:

machine executable code for communicating between said first and said second computer systems said at least one parameter wherein said at least one parameter is one of said first and second processor speeds.

46. The computer program product of claim 26, further comprising:

machine executable code for transmitting program execution information to a first data gathering point associated with said calling function from a second data gathering point associated with said called function; and machine executable code for correlating, at said first data gathering point, said program execution information for said application.

47. The computer program product of claim 46, further comprising:

machine executable code for determining at least one metric in accordance with said program execution information.

48;. The computer program product of claim 26, wherein said first execution context and said second execution context are each associated with different threads of execution.

49. The computer program product of claim 48, further comprising:

machine executable code included in a client computer for executing the calling function; and machine executable code included in a server for executing said called function.

50. The computer program product of claim 49, wherein said cross execution context is a remote procedure call.

* * * * *